DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 1

INVENTOR
ARTHUR A. COLLINS
BY
ATTORNEY Donald W. Phillion

Dec. 1, 1970 A. A. COLLINS 3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 2

INVENTOR
ARTHUR A. COLLINS

BY

ATTORNEY Donald W. Phillion

INVENTOR
ARTHUR A. COLLINS

BY

ATTORNEY Donald W. Phillips

INVENTOR
ARTHUR A. COLLINS
BY
ATTORNEY Donald W. Phillion

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 5

INVENTOR
ARTHUR A. COLLINS
BY
ATTORNEY Donald W. Phillion

INVENTOR
ARTHUR A. COLLINS
BY
ATTORNEY Donald W. Phillips

Dec. 1, 1970 A. A. COLLINS 3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 7

INVENTOR
ARTHUR A. COLLINS

BY

ATTORNEY Donald W. Phillion

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 8

INVENTOR
ARTHUR A. COLLINS
BY
ATTORNEY Donald W. Phillion

INVENTOR
ARTHUR A. COLLINS
BY
ATTORNEY Donald W. Phillips

INVENTOR
ARTHUR A. COLLINS
BY
ATTORNEY Donald W. Phillips

INVENTOR
ARTHUR A. COLLINS

BY

ATTORNEY Donald W. Phillion

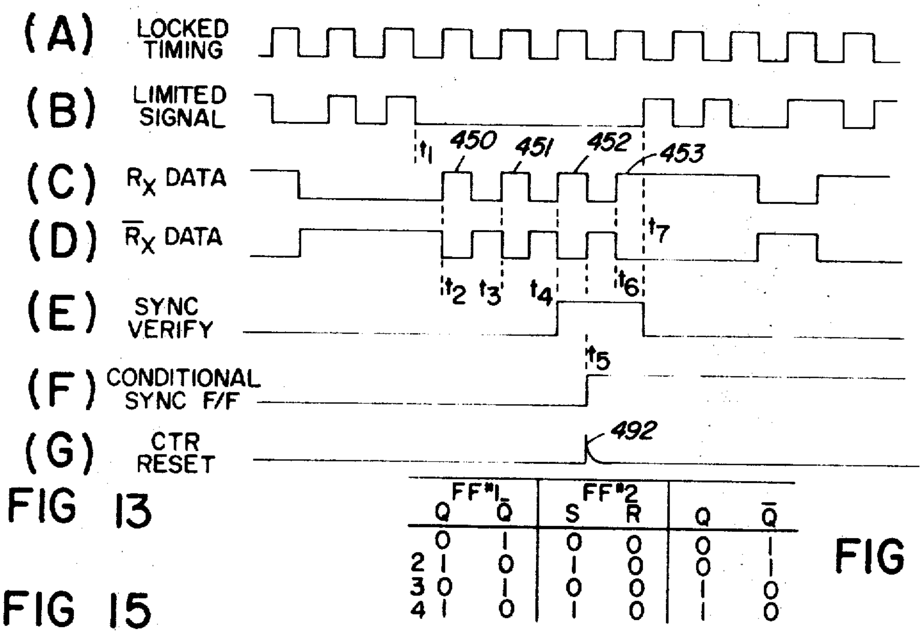
FIG 13
| | FF#1 Q | FF#1 $\bar{Q}$ | FF#2 S | FF#2 R | Q | $\bar{Q}$ |
|---|---|---|---|---|---|---|
| | 0 | 1 | 0 | 0 | 0 | 1 |
| 2 | 1 | 0 | 1 | 0 | 0 | 1 |
| 3 | 0 | 1 | 0 | 0 | 1 | 0 |
| 4 | 1 | 0 | 1 | 0 | 1 | 0 |
FIG 14A
FIG 15
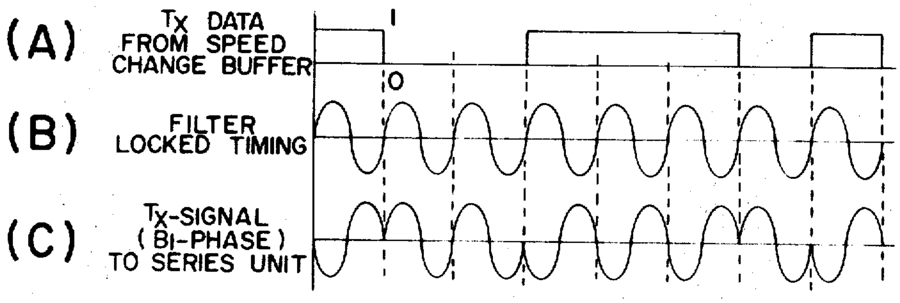
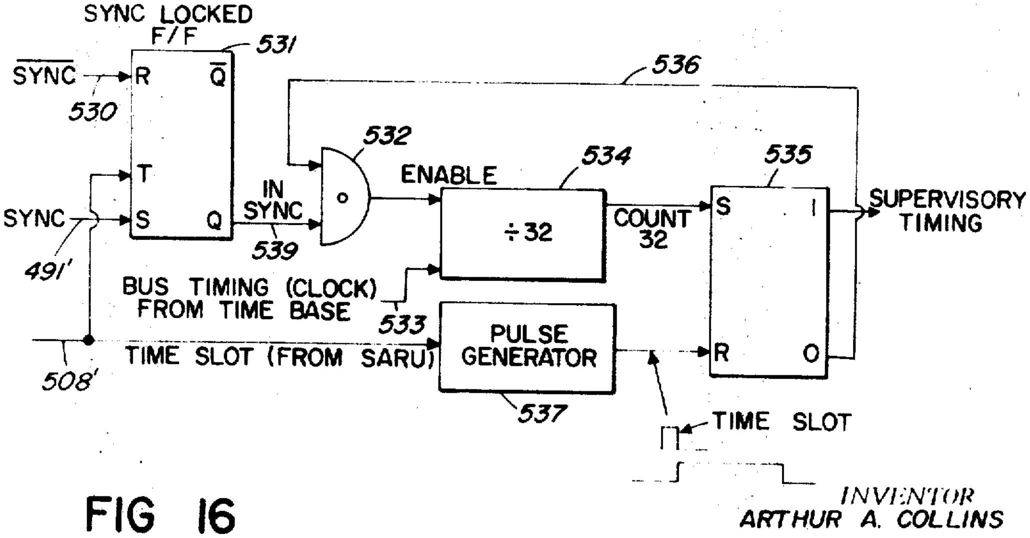
FIG 16
INVENTOR
ARTHUR A. COLLINS
BY
ATTORNEY Donald W. Phillion

INVENTOR
ARTHUR A. COLLINS

BY

ATTORNEY Donald W. Phillion

DIGITALIZED COMMUNICATION SYSTEM WITH COMPUTATION AND CONTROL CAPABILITIES EMPLOYING TRANSMISSION LINE LOOP FOR DATA TRANSMISSION

INVENTOR
ARTHUR A. COLLINS

BY

ATTORNEY Donald W. Phillips

Dec. 1, 1970 A. A. COLLINS 3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 15

INVENTOR
ARTHUR A. COLLINS

BY

ATTORNEY Donald W. Phillion

INVENTOR
ARTHUR A. COLLINS
BY
ATTORNEY Donald W. Phillion

Dec. 1, 1970 A. A. COLLINS 3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 17

INVENTOR
ARTHUR A. COLLINS

BY

ATTORNEY Donald W. Phillips

INVENTOR
ARTHUR A. COLLINS

BY

ATTORNEY Donald W. Phillion

INVENTOR
ARTHUR A. COLLINS
BY
ATTORNEY Donald W. Phillips

INVENTOR
ARTHUR A. COLLINS
BY
ATTORNEY Donald W. Phillion

INVENTOR
ARTHUR A. COLLINS
BY
ATTORNEY Donald W. Phillion

INVENTOR
ARTHUR A. COLLINS
BY
ATTORNEY Donald W. Phillion

INVENTOR
ARTHUR A. COLLINS

BY

ATTORNEY Donald W. Phillips

INVENTOR
ARTHUR A. COLLINS
BY
ATTORNEY Donald W. Phillion

INVENTOR
ARTHUR A. COLLINS
BY
ATTORNEY Donald W. Phillips

Dec. 1, 1970 A. A. COLLINS 3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 26

INVENTOR
ARTHUR A. COLLINS

BY

ATTORNEY Donald W. Phillips

INVENTOR
ARTHUR A. COLLINS

BY

ATTORNEY Donald W. Phillips

INVENTOR
ARTHUR A. COLLINS
BY
ATTORNEY Donald W. Phillion

INVENTOR
ARTHUR A. COLLINS
BY
ATTORNEY Donald W. Phillion

INVENTOR
ARTHUR A. COLLINS

BY

ATTORNEY Donald W. Phillips

Dec. 1, 1970 A. A. COLLINS 3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Filed July 2, 1968 48 Sheets-Sheet 31

INVENTOR
ARTHUR A. COLLINS

BY

ATTORNEY Donald W. Phillips

INVENTOR
ARTHUR A. COLLINS

BY

ATTORNEY Donald W. Phillips

INVENTOR
ARTHUR A. COLLINS

BY

ATTORNEY Donald W. Phillion

INVENTOR
ARTHUR A. COLLINS

BY

ATTORNEY Donald W. Phillion

INVENTOR
ARTHUR A. COLLINS

BY

ATTORNEY Donald W. Phillips

INVENTOR
ARTHUR A. COLLINS
BY
ATTORNEY Donald W. Phillion

INVENTOR
ARTHUR A. COLLINS

BY

ATTORNEY Donald W. Phillips

INVENTOR
ARTHUR A. COLLINS
BY
ATTORNEY Donald W. Phillips

INVENTOR
ARTHUR A. COLLINS

BY

ATTORNEY Donald W. Phillion

INVENTOR
ARTHUR A. COLLINS
BY
ATTORNEY Donald W. Phillion

INVENTOR
ARTHUR A. COLLINS
BY
ATTORNEY Donald W. Phillion

INVENTOR
ARTHUR A. COLLINS

BY

ATTORNEY Donald W. Phillips

INVENTOR
ARTHUR A. COLLINS
BY
ATTORNEY Donald W. Phillion

INVENTOR
ARTHUR A. COLLINS
BY
Donald W. Phillion
ATTORNEY

INVENTOR
ARTHUR A. COLLINS

BY

ATTORNEY Donald W. Phillips

INVENTOR
ARTHUR A. COLLINS

BY

ATTORNEY Donald W. Phillips

INVENTOR
ARTHUR A. COLLINS

BY

ATTORNEY Donald W. Phillips

INVENTOR
ARTHUR A. COLLINS

BY

ATTORNEY Donald W. Phillion

United States Patent Office 3,544,976

Patented Dec. 1, 1970

3,544,976

DIGITALIZED COMMUNICATION SYSTEM WITH COMPUTATION AND CONTROL CAPABILITIES EMPLOYING TRANSMISSION LINE LOOP FOR DATA TRANSMISSION

Arthur A. Collins, Cedar Rapids, Iowa, assignor to Collins Radio Company, Cedar Rapids, Iowa, a corporation of Iowa Filed July 2, 1968, Ser. No. 741,966
Int. Cl. G06f 9/18
U.S. Cl. 340—172.5 70 Claims

ABSTRACT OF THE DISCLOSURE

A communication system with computation and control capabilities and comprising computer means, transmission line loop means beginning and terminating at the computer site, and interface means for transferring identifiable data words from the computer to the loop and for transferring data words received from the loop into identifiable storage locations in the computer. Each data word circulating in the loop occupies a time slot and is encoded to establish the relation of said time slot with a given reference storage location in the computer. A plurality of stations positioned along the loop are each constructed to intercept predetermined ones of identifiable circulating data words, to generate response data words when required, and to insert said response data words into predetermined time slots in the circulating data stream. Further, each station can comprise means for controlling a device and for generating said response data words.

This invention relates generally to a data transmission and distribution control system and, more particularly, to a time division multiplexing system or transmitting and distributing data in serial form between a data store such as a data processor and a plurality of local control stations.

The use of computer means to control peripheral devices is old in the art. For example, it is commonplace today for a computer or a data processor to control the operation of printing machines, teletypewriter machines, paper punch machines, storage devices of various types, tools, such as drill presses, lathes, or milling machines, and even processes requiring many steps. In some instances an input/output channel of the data processor is connected to a given peripheral device through some type adapter. Instructions then pass from the data processor through the adapter which changes the data into a form suitable for operation of the peripheral device. The peripheral device in turn might generate a response which is passed back through the adapter which changes it into a form acceptable by the data processor. The data processor then usually acts upon this received information to prepare a further instruction to the peripheral device. The adapter also functions to maintain proper synchronization between the signals passing between the peripheral device and the data processor.

If more than one peripheral device is involved the data processor can supply information to the other peripheral devices in a substantially parallel manner. Such parallel supplying of data can be accomplished in two basic ways. Firstly, the output from a single input/output register of the data processor can be multiplexed to poll each of the plurality of peripheral devices in rapid succession at a polling rate compatible with the operating speed of the equipments being polled. In essence, this polling amounts to successive connections to each of the peripheral devices, such connections being substantially in parallel had they occurred simultaneously.

Secondly, a separate input/output register of the data processor can be allocated to each of the several peripheral devices. The second arrangement is also essentially a parallel arrangement.

Both arrangements require a large number of connectors running from the data processor to the peripheral devices.

In addition to the large number of connections involved, it is usually necessary to provide some type adapter from each of the peripheral adapters and the data processor to provide not only for proper synchronization between the peripheral device and the data processor, but also to change the format of the words passing back and forth. For example, a teletypewriter machine ordinarily requires that data be delivered thereto in serial form at a much slower rate and in time asynchronous manner, as compared to the time requirements of a data processor. The adapter functions to change the teletypewriter word format into one which is usable by the data processor and, conversely, to accept the relatively high-speed words from the data proessor and change them into serial, low-speed bauds which are employed by the teletypewriter machines.

In some installations the data processor might be located several thousand feet from the locations of the various peripheral devices it controls. For example, in manufacturing operations a data processor might be employed to control several tool machines which function to perform a series of operations upon a component being manufactured. Furthermore, it is conceivable that during manufacture the component will have to pass through assembly lines located in different buildings. Thus the data processor might be located in a first building and be required to control machines in one or more other buildings, all located from several hundred to several thousand feet from the data processor site. It is apparent that under present prior art systems separate connections must run from the computer to each of the controlled machines, raising very formidable problems, not only from the sheer volume of connecting wires and cables but also from problems of maintaining synchronism due to the differing lengths of the interconnecting wires and cables.

The problem of maintaining synchronization can perhaps be seen better by the following example. If both the peripheral device and the associated adapter are located several thousand feet from the data processor, a finite time will be required for a signal from the data processor to reach the adapter, and for a signal from the adapter to reach the data processor. Now, while the synchronization problem for signals from the processor to the adapter is perhaps not acute, the reverse situation is critical. It is necessary that the signal from the adapter to the processor leave the processor at the proper time. Otherwise, operation of the processor is not possible unless a second adapter or some buffer storage means is employed at the data processor site.

In summary, by locating the adapter near the peripheral device it is possible to decrease the length of leads between adapter and peripheral device. However, the connections between adapter and processor are too long and create serious problems since the various adapters might, and probably will, be different distances from the processor, thus requiring different transmission times.

A further problem exists in that in many processors data is handled in parallel manner at the I/O registers. Transmission of this parallel data to the remote adapters requires many connectors, each of which presents possibilities for error and malfunction. The alternative of converting the data to serial form at the processor site, before transmission to the adapters is expensive and would require much better quality transmission lines because of the higher transmission rate.

Furthermore, polling logic ordinarily is required when a plurality of adapters are interfaced with a common I/O register.

On the other hand, if all the adapters are located the processor site, there must be separate connections from each adapted to its associated peripheral device. Further, polling is still required and it is also required that data be handled in parallel manner at the I/O registers of the processor, thus necessitating large numbers of leads between the adapters and the processor. An additional problem lies in the fact that many peripheral devices utilize data in parallel form, thus either necessitating large numbers of leads running from the adapters to the devices or logic converting the data from parallel to serial at the adapter and back to parallel at the device.

It is apparent that the most desirable arrangement is to locate the adapters adjacent their respective devices and to provide some means for transmitting data from the processor to the adapters in the simplest and error-free manner, and which minimizes synchronization problems. The present invention performs such a function.

It is a primary object of the present invention to provide a multiplex control system employing a single cable loop connecting the data processor to a plurality of stations identified herein as loop coupler units (LCU) which, in turn, supply data derived from the loop to devices associated therewith.

A second object of the invention is to provide a multiplex control system employing a single cable loop connecting together the central data processor and a plurality of loop coupler units (LCU), and in which problems of synchronizing the loop coupler units with the data processor due to transmission line distortion is substantially nonexistent.

A third object of the invention is to provide a multiplex type control system employing only a single large cable loop connecting the output of the processor to the input thereof, with loop coupler units being positioned at intervals along said loop and in which direct synchronization of the operation of the loop coupler units (LCU) with the data processor is not required.

A further object of the invention is a multiplex type data distribution control system involving a minimum of wiring and a minimum of synchronizing problems.

A fourth object of the invention is a simplified multiplex control system wherein a data processor is connected to a plurality of LCU's by a single cable through which all data is passed serially, and in which the multiplexing function is accomplished by the LCU intercepting words at predetermined intervals as said words propagate along the transmission cable.

A fifth object of the invention is a multiplex type control system wherein data is supplied through a transmission cable which loops back to the data processor and along which is spaced a plurality of LCU units which intercept certain predetermined words propagating through the cable, thus effecting a multiplexing function.

A sixth object of the invention is a multiplex type control system employing a minimum of wires, a minimum of synchronizing means, and in which information from a data processor is applied to the input of a transmission cable loop which can be several thousand feet in length and which eventually terminates at the data processor, and with LCU units positioned at various points along said loop which are constructed to intercept predetermined words flowing through said loop, thus effecting the multiplexing function and eliminating the requirement for direct synchronization between the LCU and the central data processor.

A further object of the invention is the improvement of multiplex type control systems generally.

In accordance with the invention there is provided a high serial data rate time division multiplex loop which services a plurality of lower data rate serial transmission device control busses. The time division multiplex loop is comprised of a transmission cable loop along which are located a number of LCU units which function generally to extract information from the loop and supply it, at a lower data rate, to the device control busses or, inversely, to take information from said device control busses at a low data rate and insert it into the loop at the loop data rate. The loop begins and terminates at a multiplex control unit (MCU) which buffers the loop from the processor. The data supplied to the loop originates a memory table in the data processor and is supplied back to said memory table in the data processor via the multiplex control unit (MCU). Each of the words passing through the loop has a unique address and represents a particular time slot.

A time slot is identified as the location of a particular word measured from the beginning of the entire group of words (a frame) being circulated on the loop. In one format a frame consists of 256 words, each of which is periodically reviewed, processed, and replaced by the processor during the time it is in the memory table. Each of the loop coupler units is constructed to intercept the words occupying certain time slots and to act upon such words in accordance with supervisory instructions contained in the words. Specifically the LCU will respond to certain of said instructions to supply the intercepted word onto the associated device control bus, which is a transmission line system along which are positioned, at intervals, a plurality of device control units (DCU's). Each DCU examines each word appearing on its device control bus for purposes discussed below.

Since each LCU functions to intercept only certain of the words propagating through the loop, the word rate of the data supplied from the LCU's to the device control units (DCU's) will thus necessarily be lower than the word rate in the loop. By strapping each LCU to select time slots at proper intervals, the proper word rate and, as will be subsequently shown, the proper bit rate for some of the controlled devices can be directly obtained. Also inherent in the system is the multiplexing concept wherein other LCU's can be allocated time slots between adjacent time slots of any given LCU.

The LCU word intercepting means can comprise timekeeping means which counts each word (time slot) from an identifiable reference point in the circulating data and intercepts those words corresponding to certain counts.

It should be noted that synchronization is maintained between each LCU and the data processor in that each LCU responds to the data circulating on the loop to generate a bit timing signal substantially phase locked with said circulating data bits at the time said data bits reach the LCU. Word and frame synchronization are obtaned by means of unique encodings which appear periodically in the circulating data, and which are identifiable by the LCU.

Each intercepted word has a second address therein which is identifiable by a particular device control unit (DCU). Such DCU then functions to receive said word and to transfer the operand portion thereof to a device control functional element (DCFE) which, in turn, operates directly upon a peripheral device, as for example a teletypewriter, a lathe, or a printing machine. By appropriate logic and local programming, the device control functional element (DCFE) will subsequently generate a response signal (a monitor word) indicating that the peripheral has completed its operation or that it has received the instruction. Such response is supplied to the device control unit which, in turn, adds the proper address thereto and then supplies said word to another bus identified herein as the monitor bus. Such word is transmitted along the monitor bus back to the LCU where it is stored in an appropriate shift register until the appropriate time slot (usually that time slot from which the original instruction was taken), passes through the LCU. The stored monitor response word is then inserted into said time slot in the time division multiplex loop. Next said word propagates through the loop and back to the data processor where it is stored in the proper word location of the time division table in MCS. Because of coding impressed on the monitor word as it passes through the LCU, the data processor is able to recognize said word as a monitor response word. Later the data processor will examine such stored monitor word and if the system programming requires, will replace said monitor word with another word, identified as a command word which will then be taken from the word table in its turn and propagated around the multiplex loop.

It should be noted that monitor response words received back from the DCU's and stored in the time division table are not retransmitted onto the loop since a second transmission would be incorrectly interpreted by the addressed DCU as another command. The MCU functions to transmit a special no-command signal during the time slot in question as long as the word in the corresponding address of the word table is coded as a monitor word. Similarly, once a word has been transmitted through the loop it is not transmitted a second time. In this instance, the loop control unit which intercepts said word, changes the coding of the supervisory portion thereof so that when said word is stored in the word table, the MCU will subsequently determine from the supervisory portion thereof that said word has been transmitted once. All subsequent transmissions of that word location are in a format ignored by all DCU's.

It should be noted that any word intercepted by an LCU and then transferred to the associated device control bus is also supplied back into the time division multiplex loop, but with the change in the supervisory portion thereof indicating that it has been received by the proper loop control unit.

In accordance with one form of data organization, each of the words is 36 bits long with 256 words forming a frame. The first four bit positions of each word form the supervisory field of said word and function to enable the LCU's to maintain frame synchronization and identify each word within the frame with respect to the beginning of the frame. The fifth bit is known as the dialogic control bit and is used to pass control between the DCU and the data processor. More specifically, when a word is being transmitted to a device control unit, the dialogic bit is a binary "1" and when a word is transmitted from the device control unit back to the processor, the dialogic bit is a binary "0."

The MCU employs the dialogic bit to avoid repeating commands and overwriting responses. More specifically, it is by means of the dialogic bit that the MCU determines if a word in the MCS word table should be propagated along the loop.

The next five bits of a word, or sometimes the next seven bits, contain the address of the particular DCU for which the word is intended. The device control unit recognizes its address in the received word and supplies the operand portion thereof to the DCFE which, in turn, functions to cause the controlled device to perform the encoded function.

The above noted and other objects and features of the invention will be more fully understood from the following detailed description thereof when read in conjunction with the drawings in which.

Figures 4A, 4B, 4C, 4D:
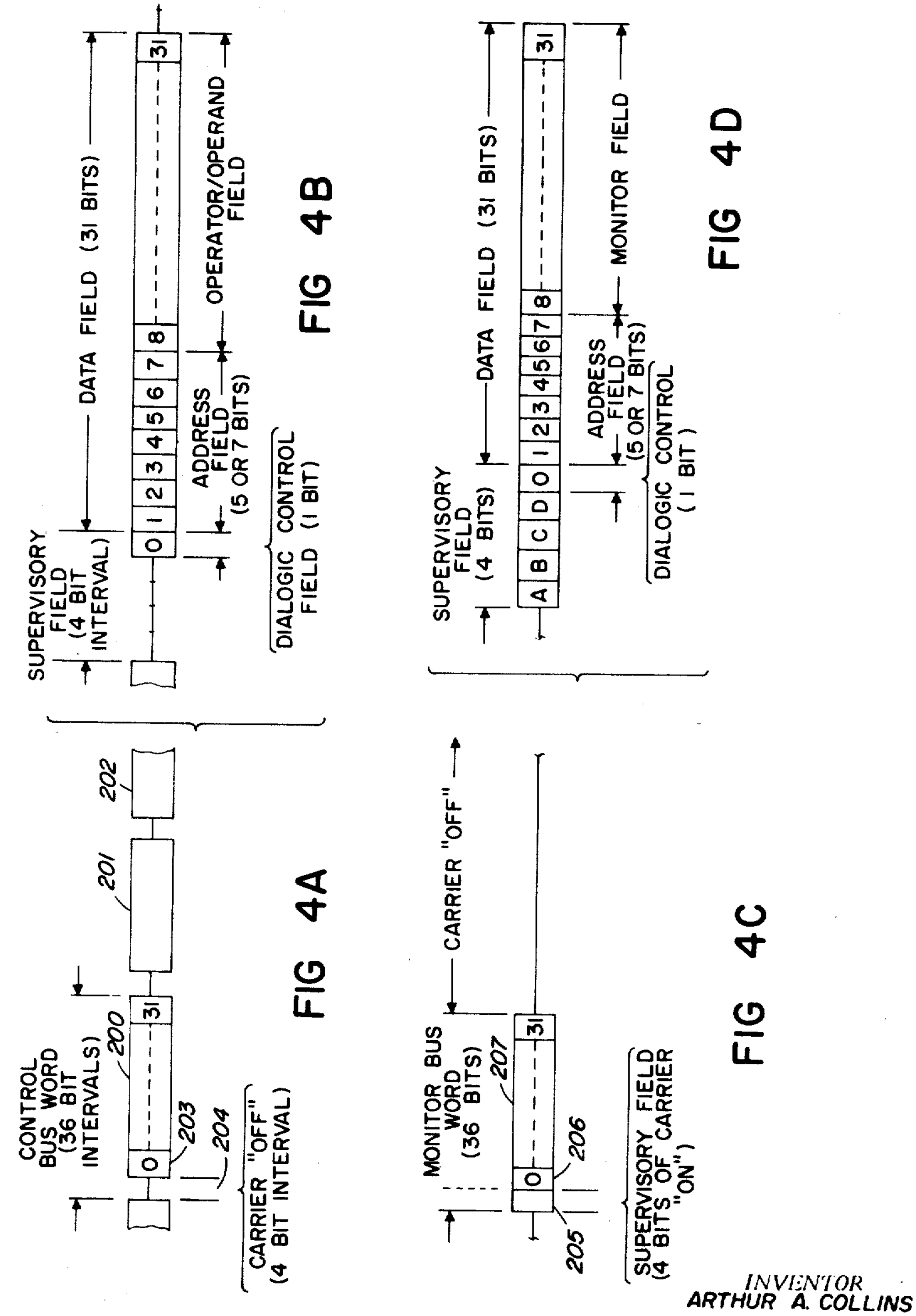
Figures 5A, 5B, 5C:
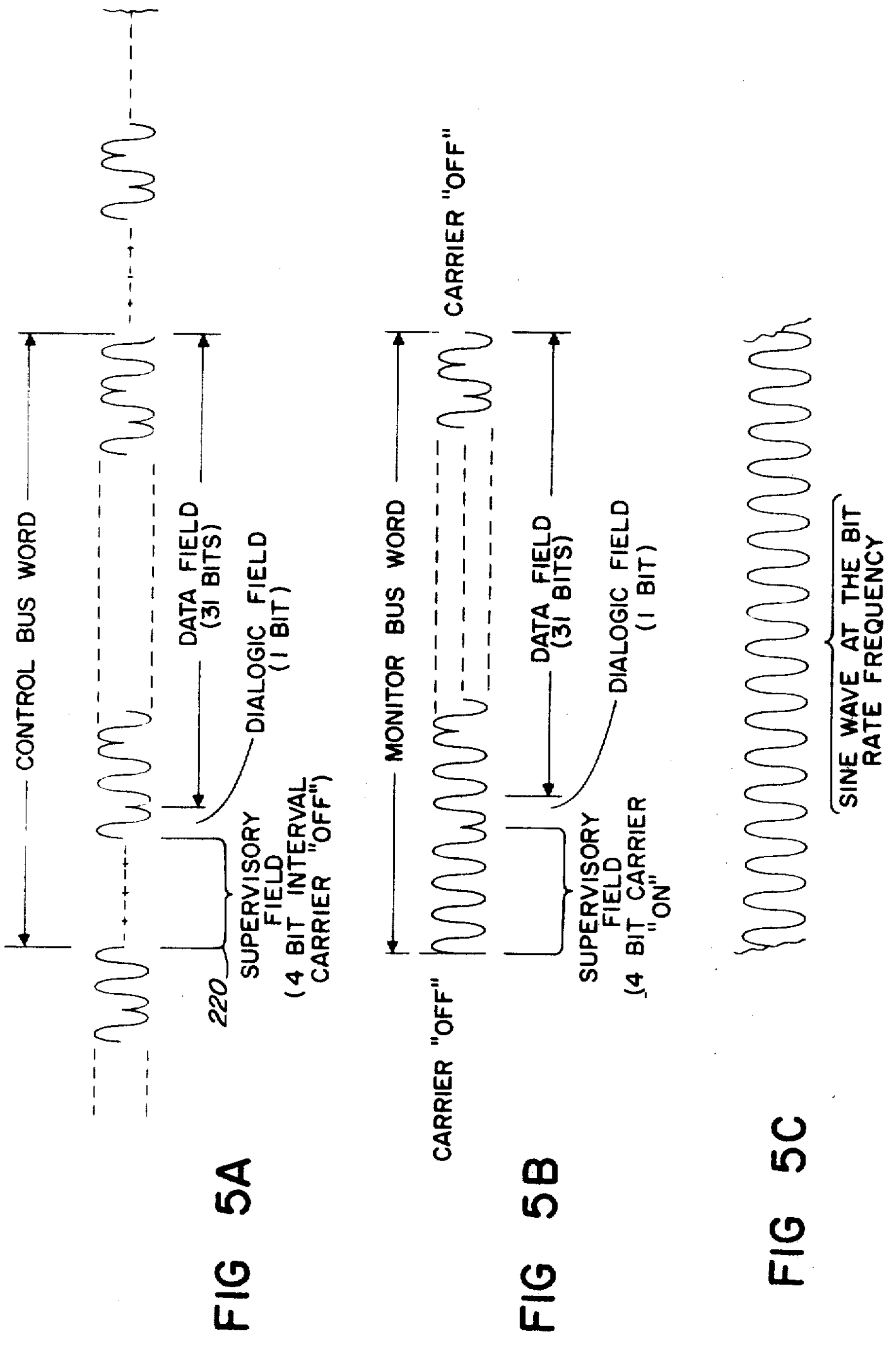
Figure 6A:
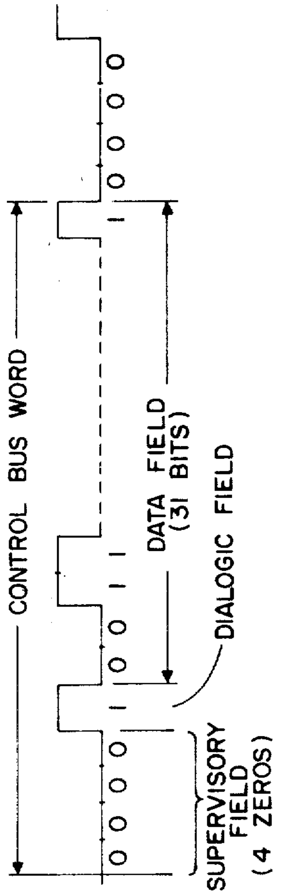
Figure 7:
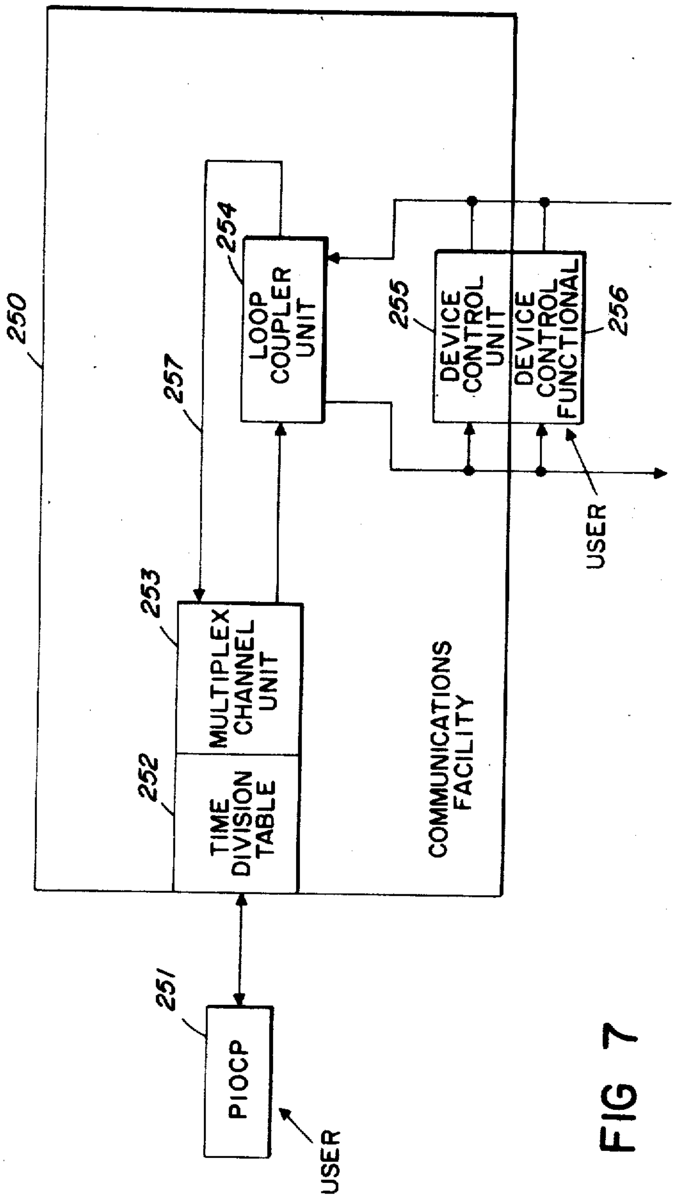
Figure 8:
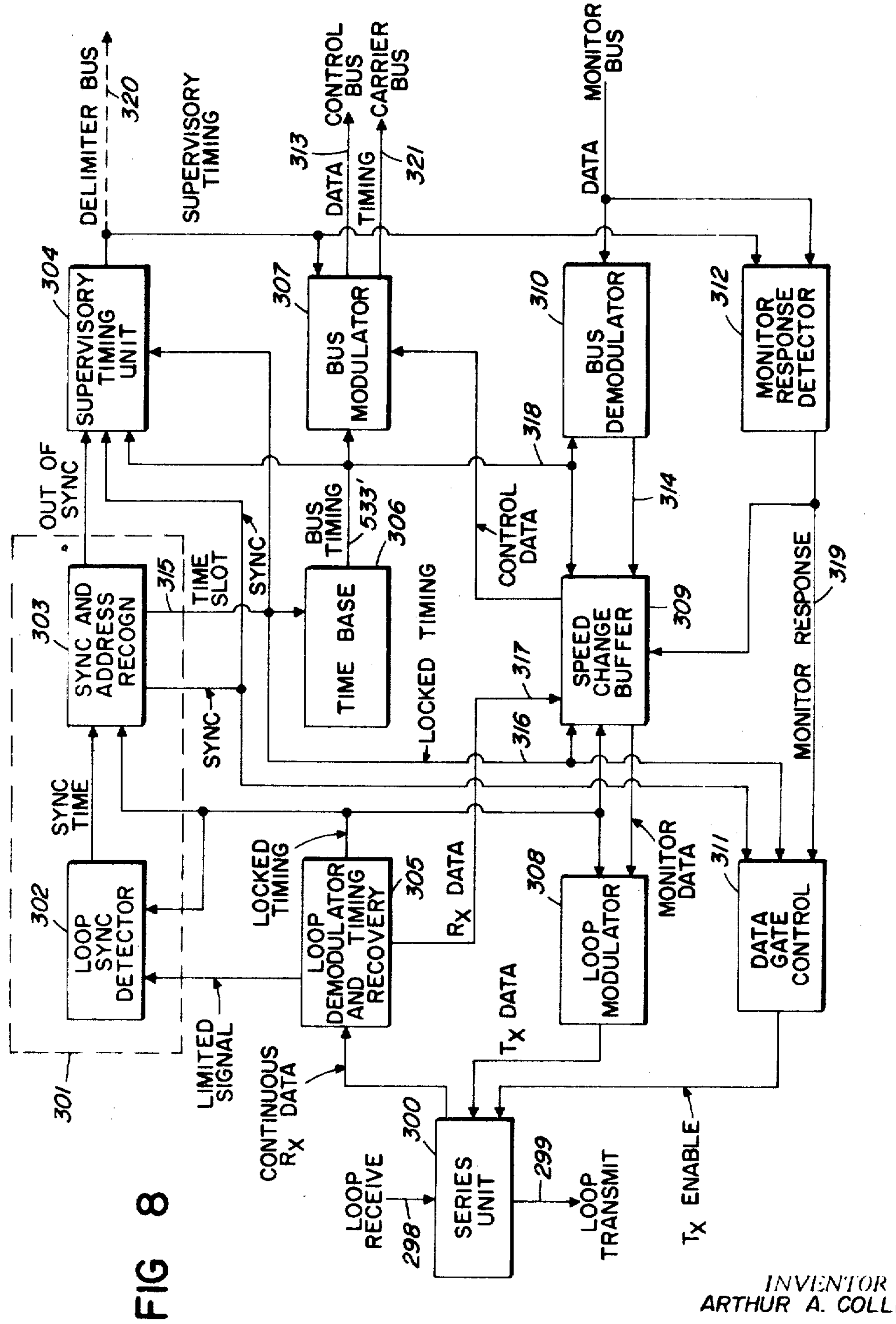
Figure 9:
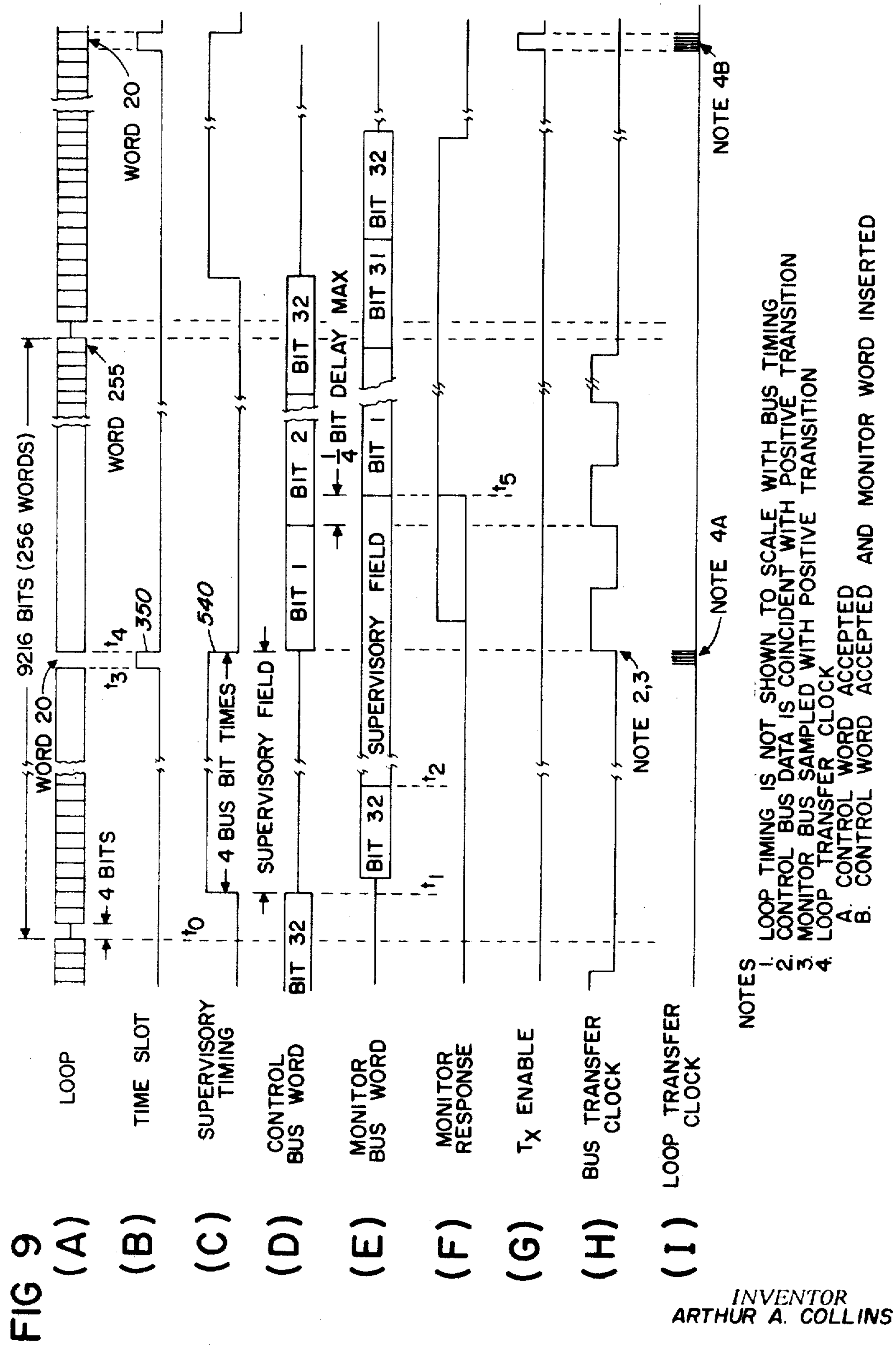
Figure 10:
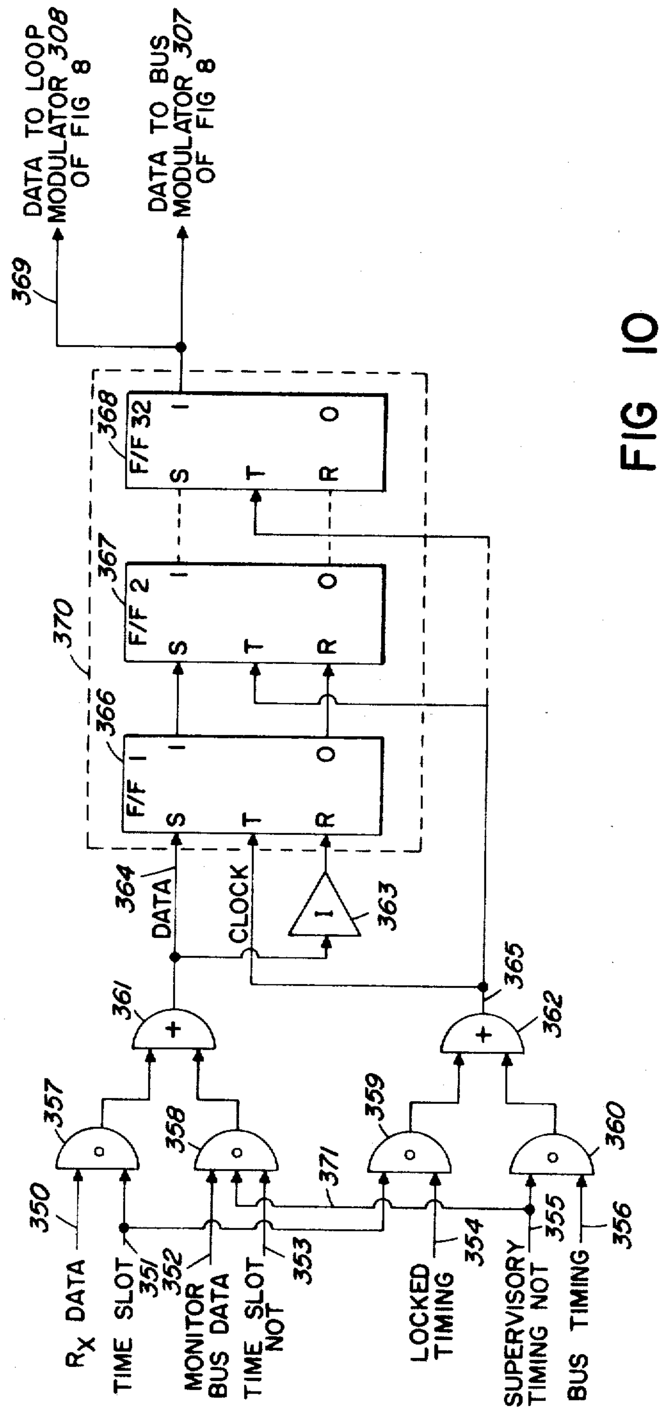
Figure 11:
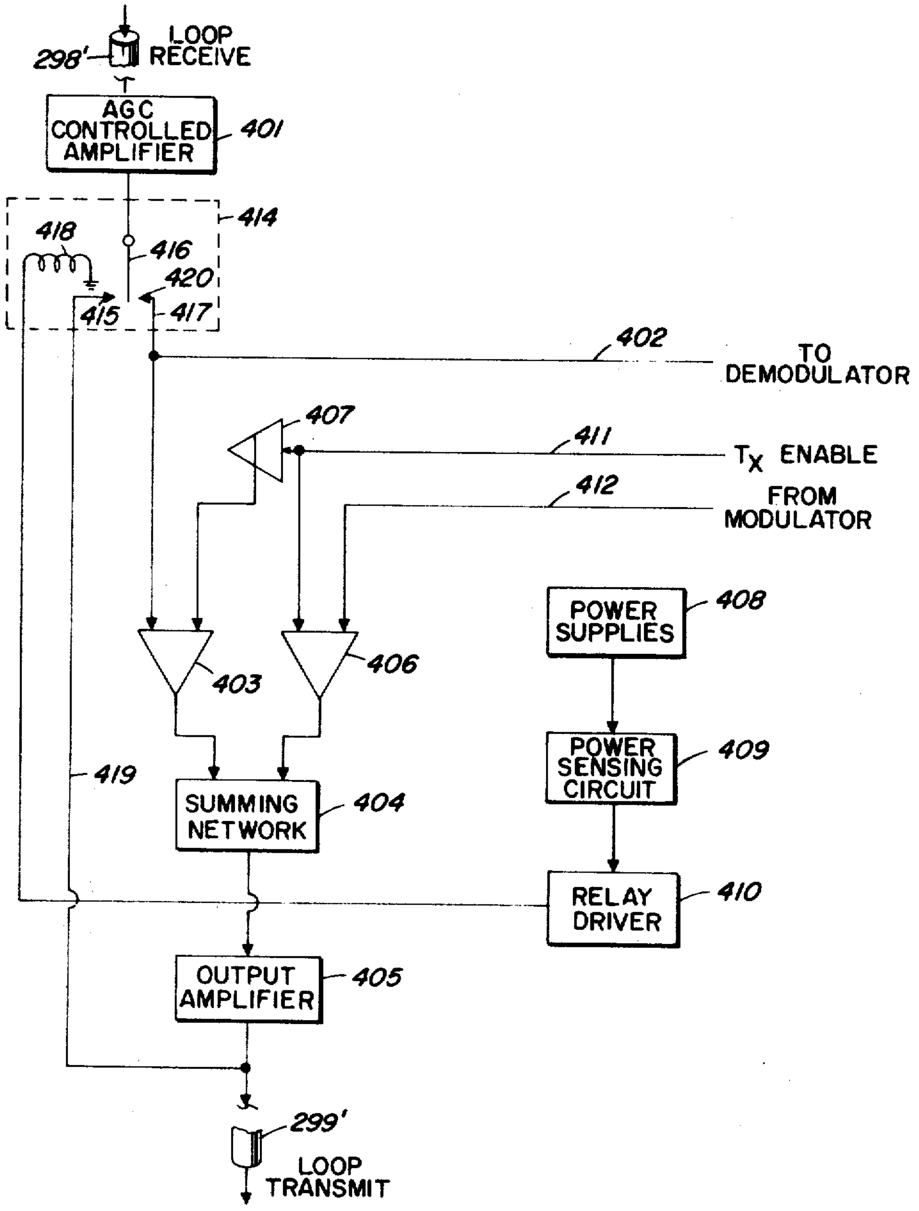
Figure 12:
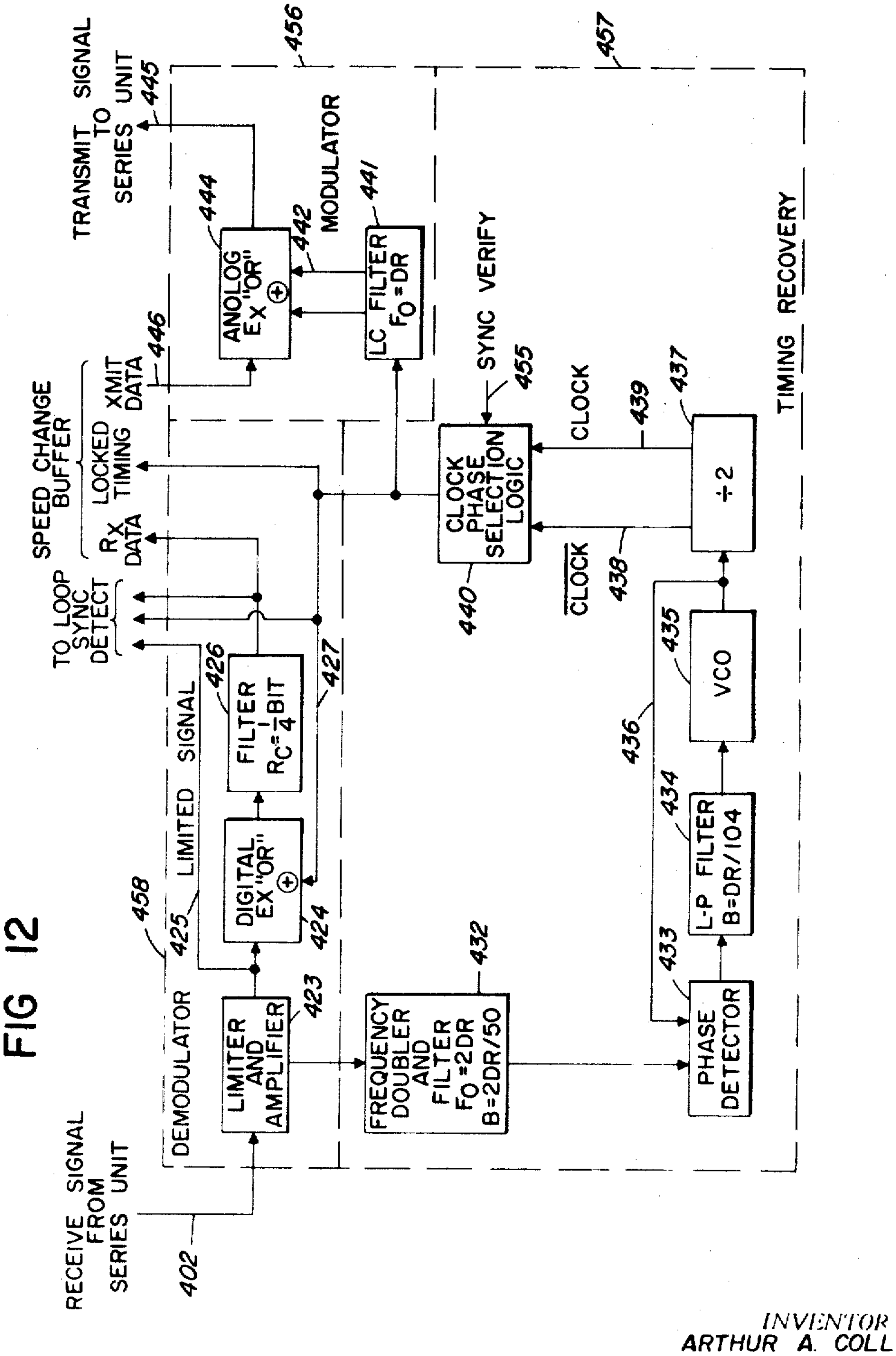
Figure 14:
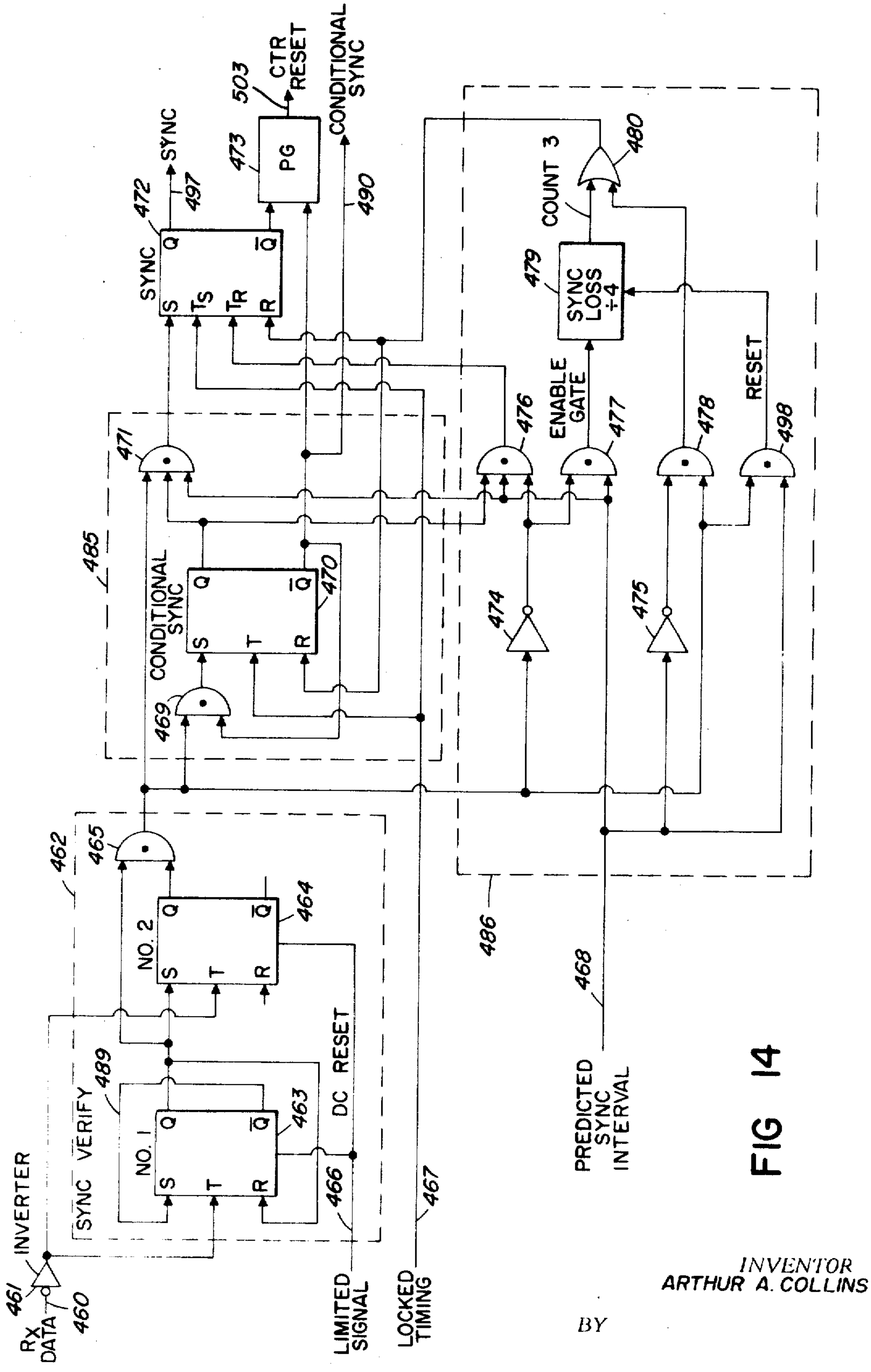
Figure 15A:
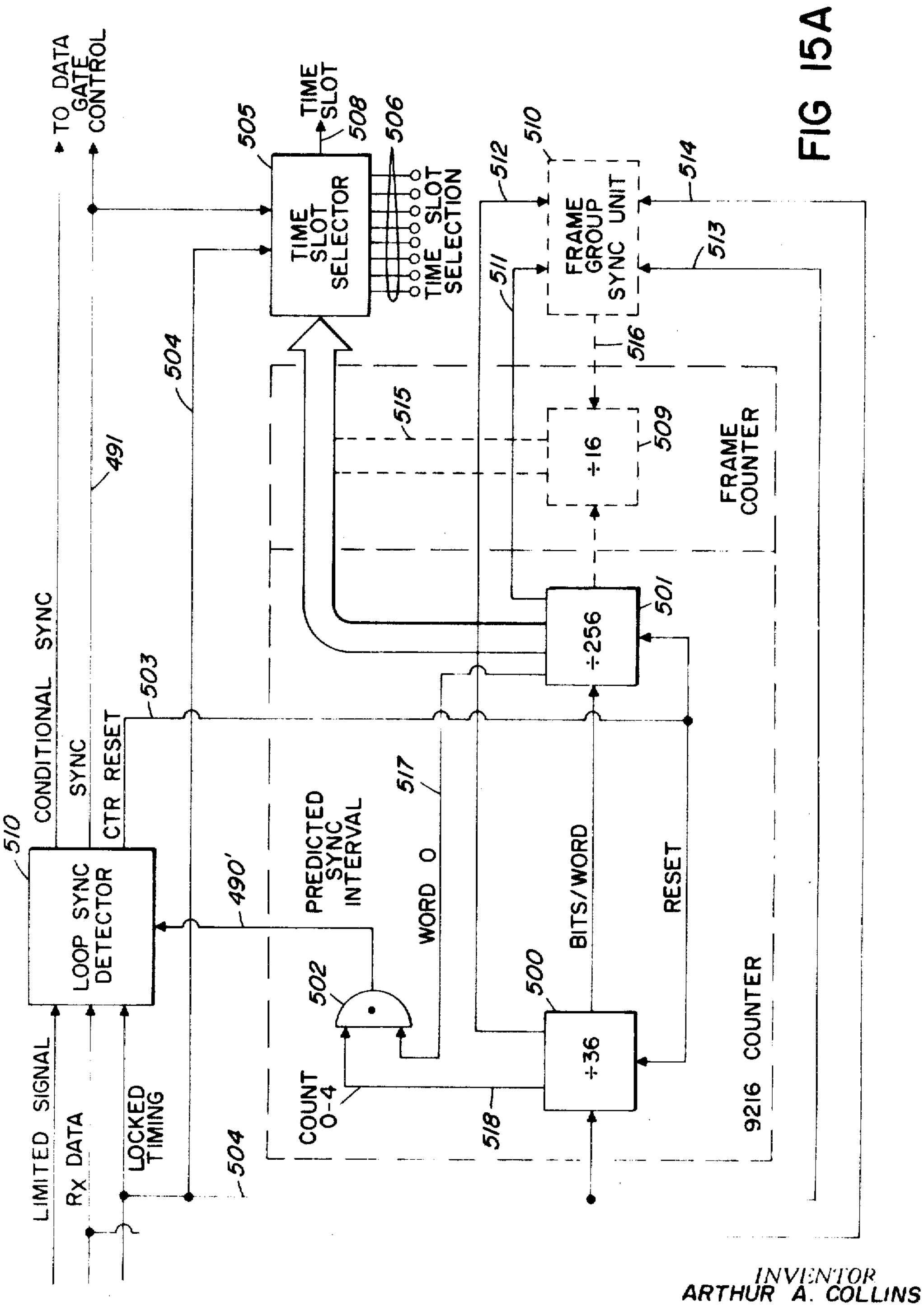
Figure 17:
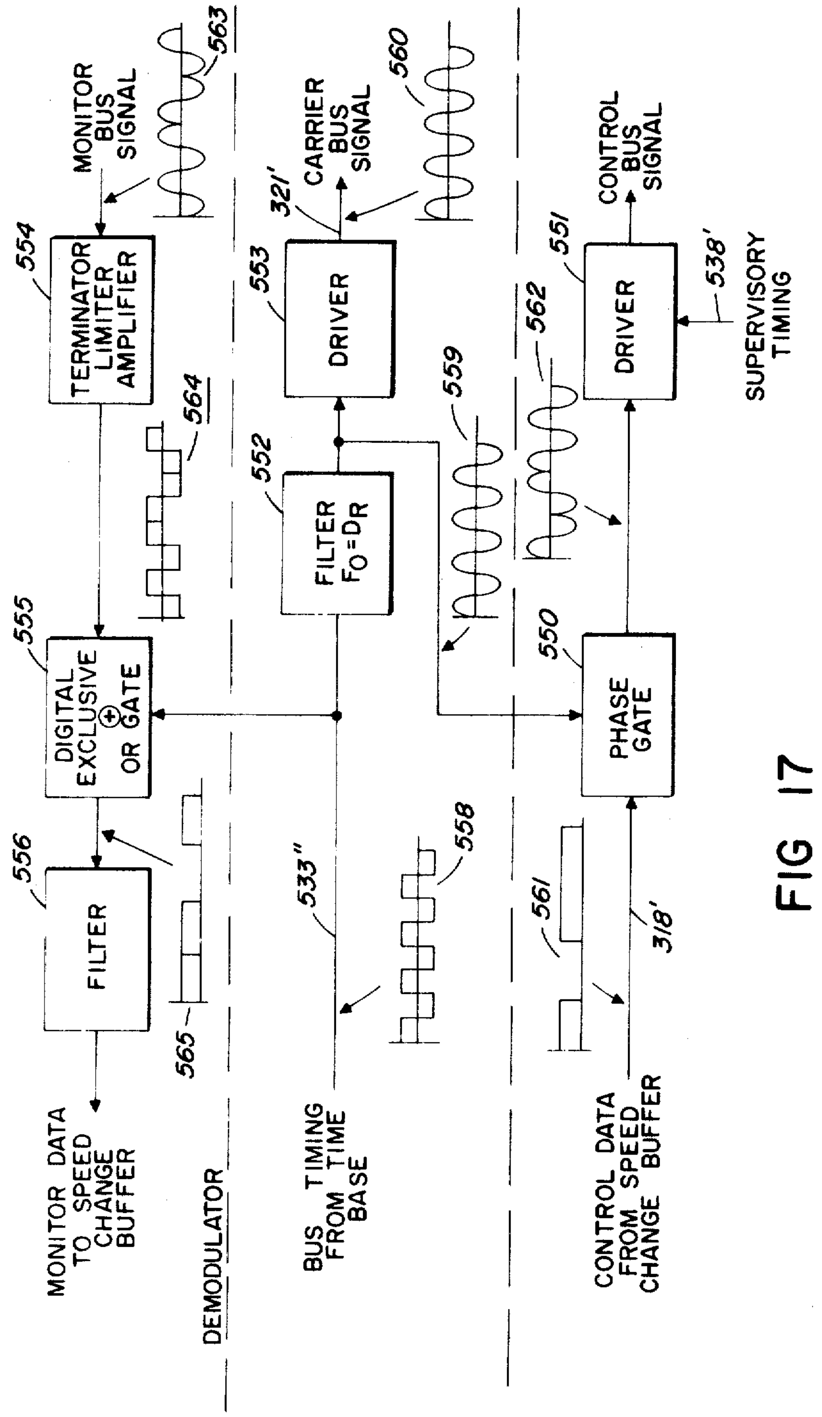
Figure 18:
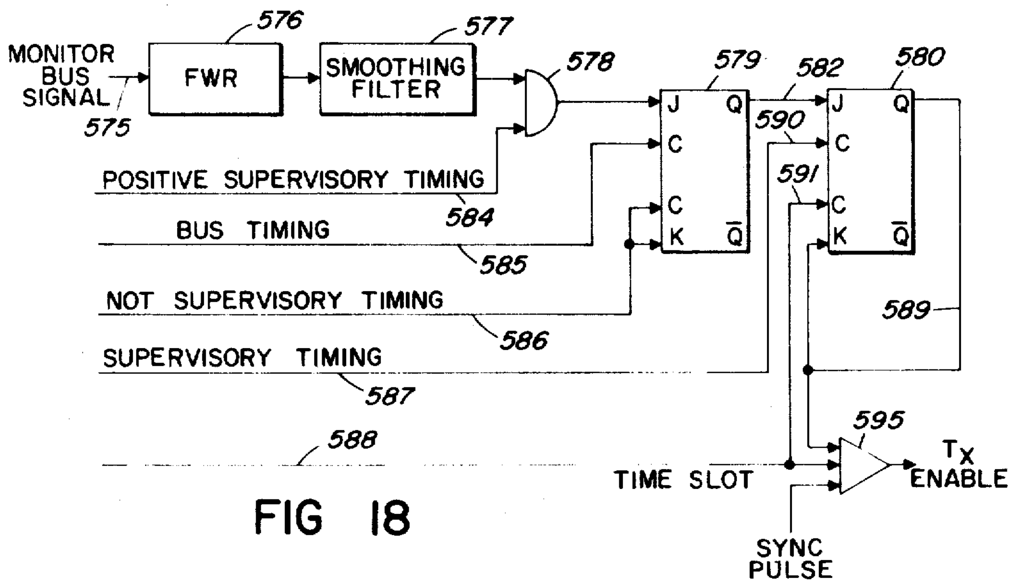
Figure 19:
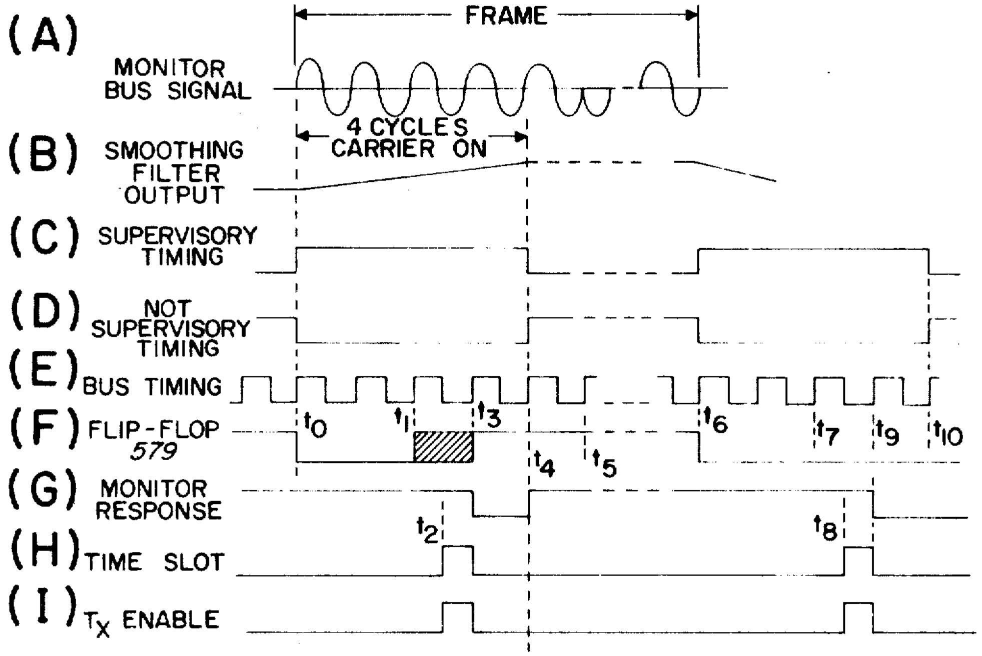
Figure 19A:
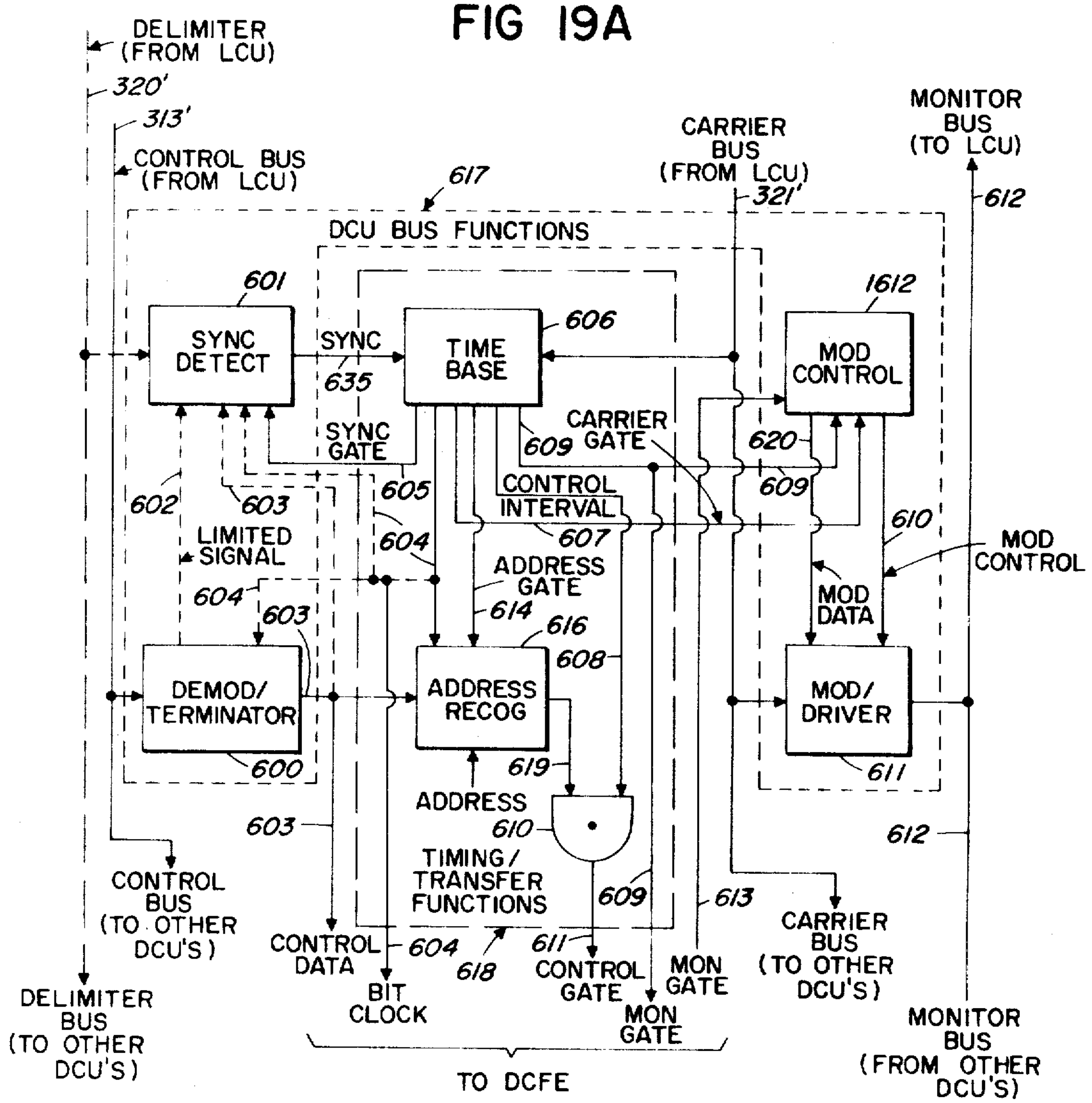
Figure 20A:
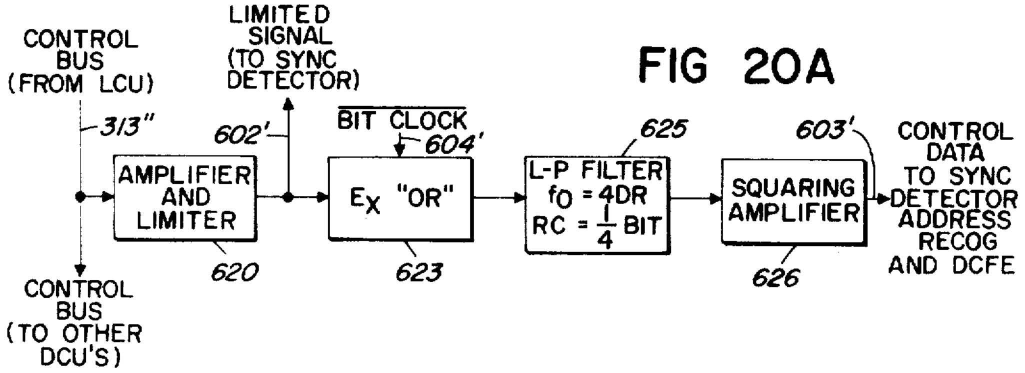
Figure 20B:
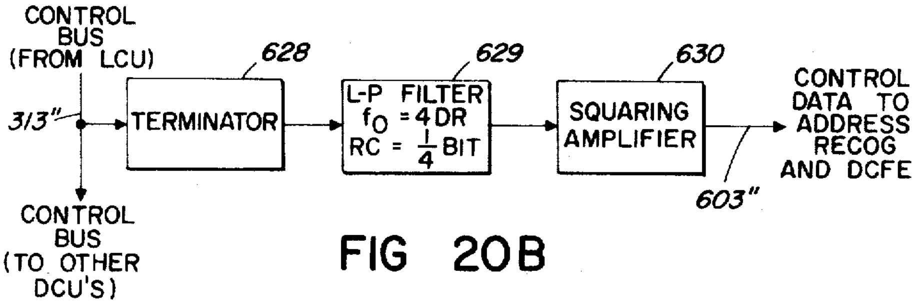
Figure 22:
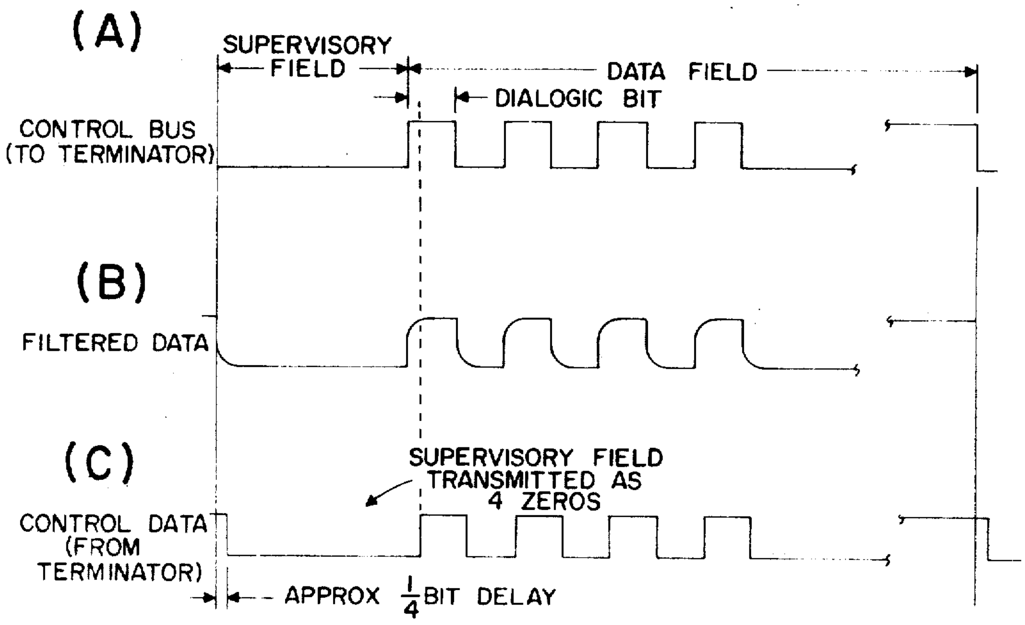
Figure 21:
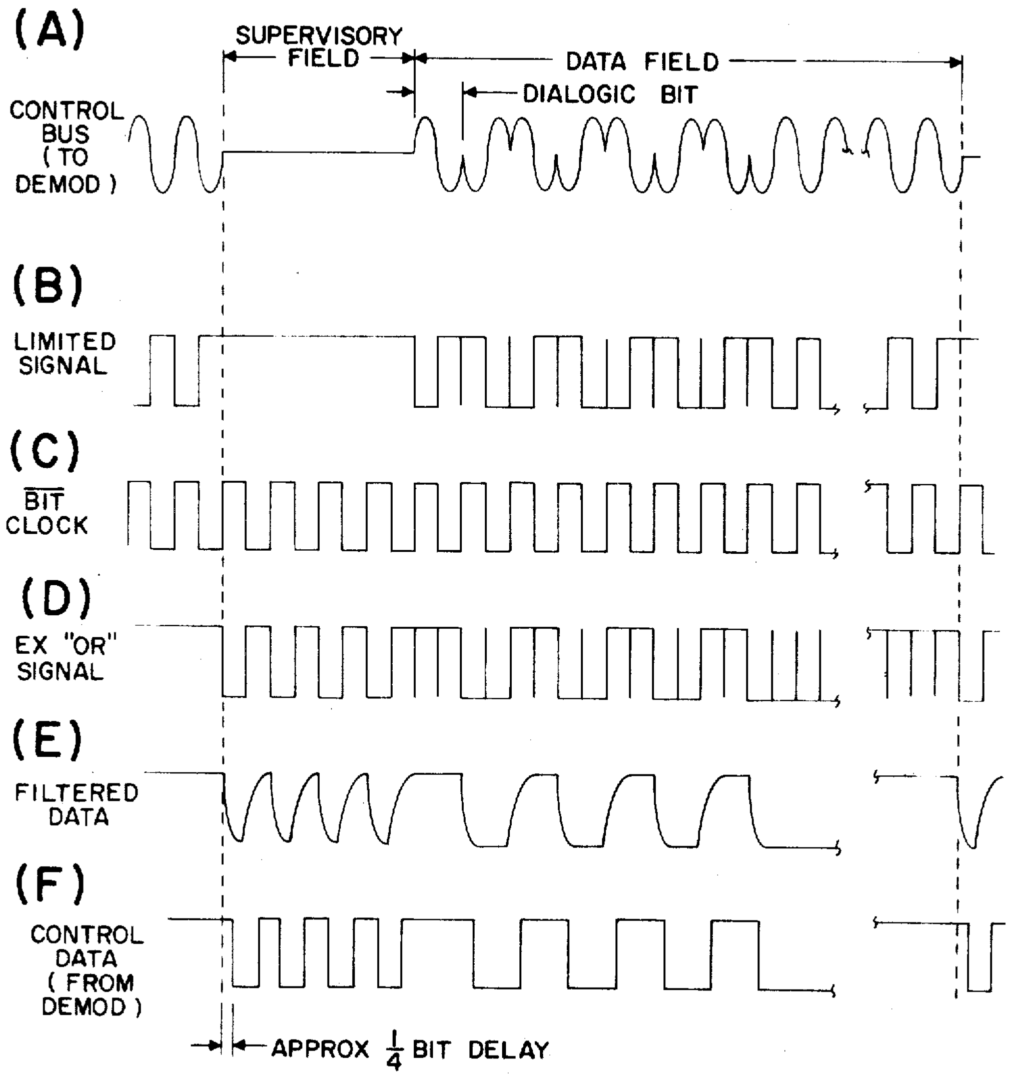
Figure 23:
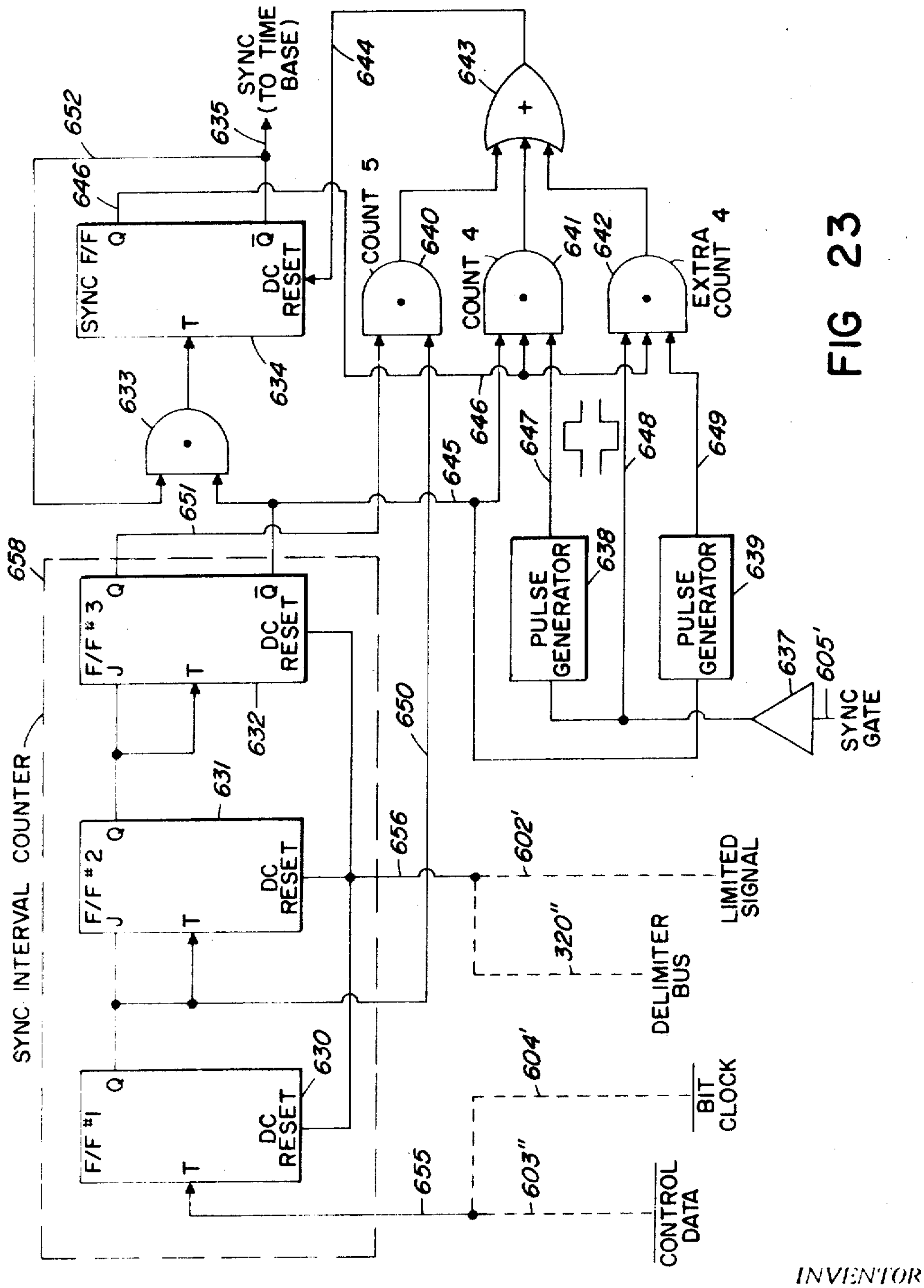
Figure 24:
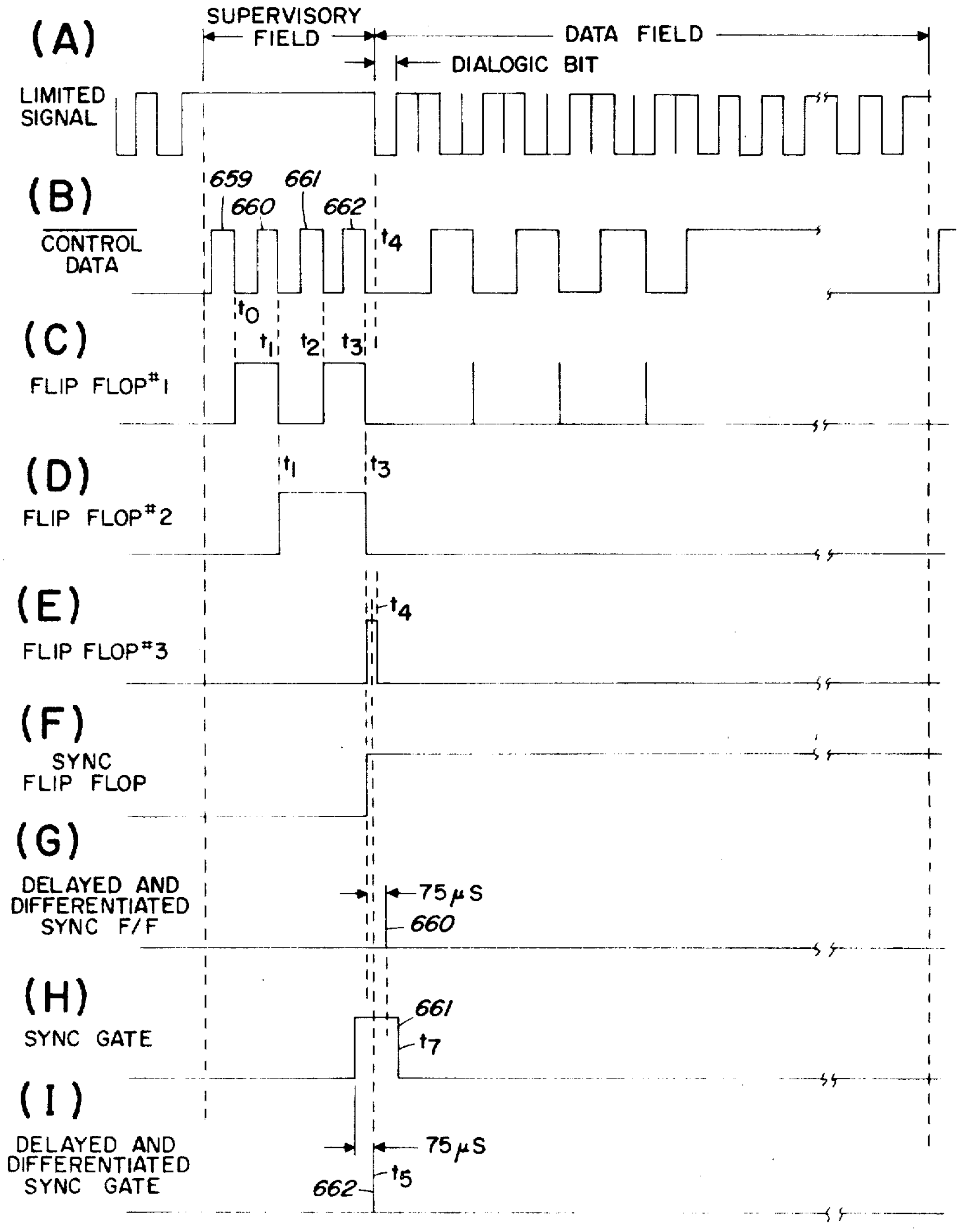
Figure 25:
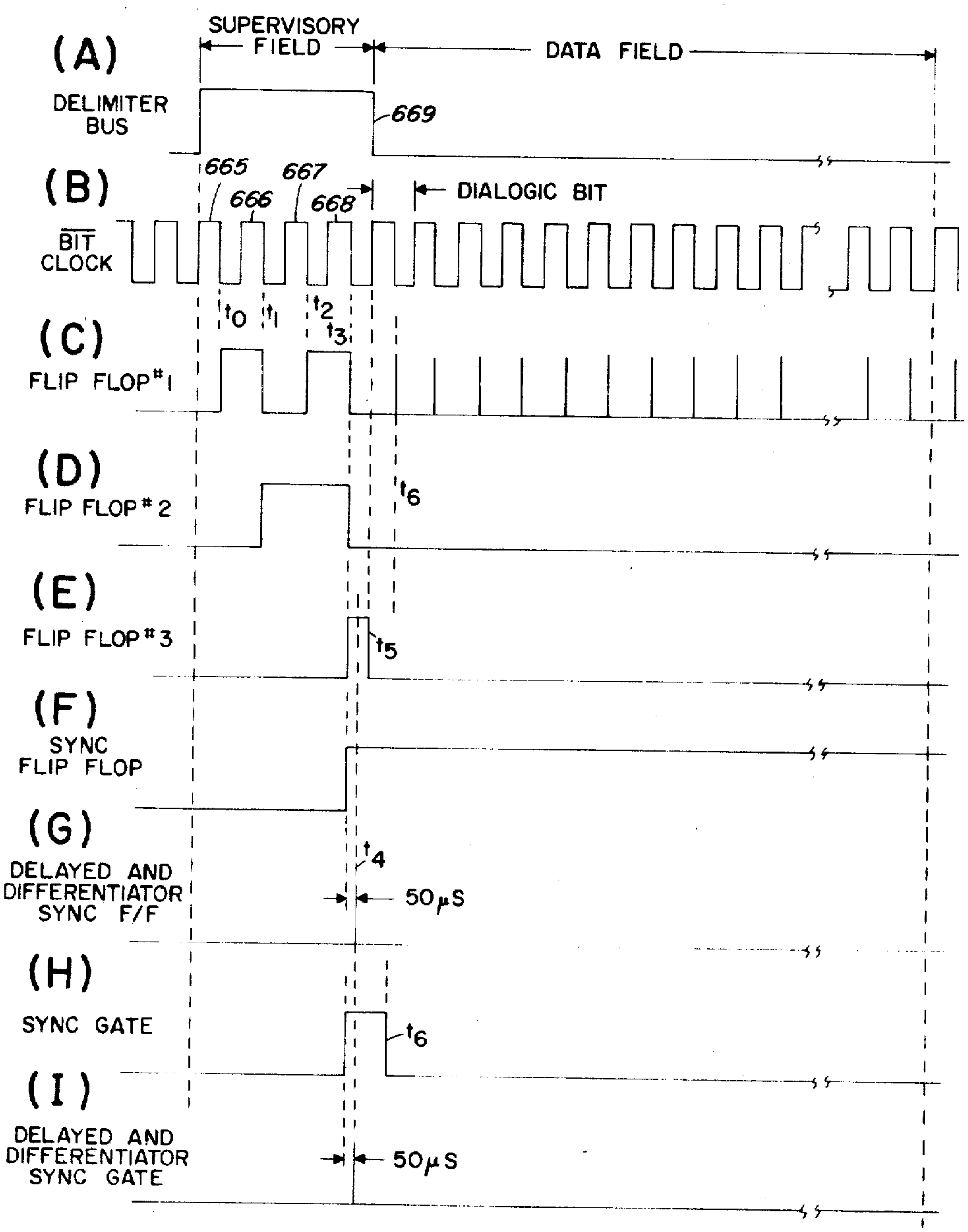
Figure 26:
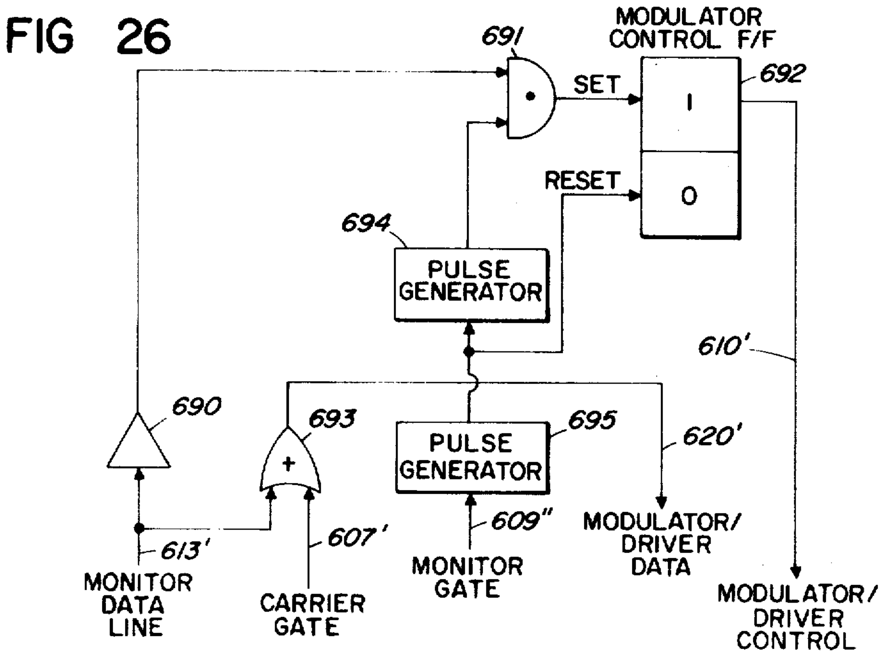
Figure 27:
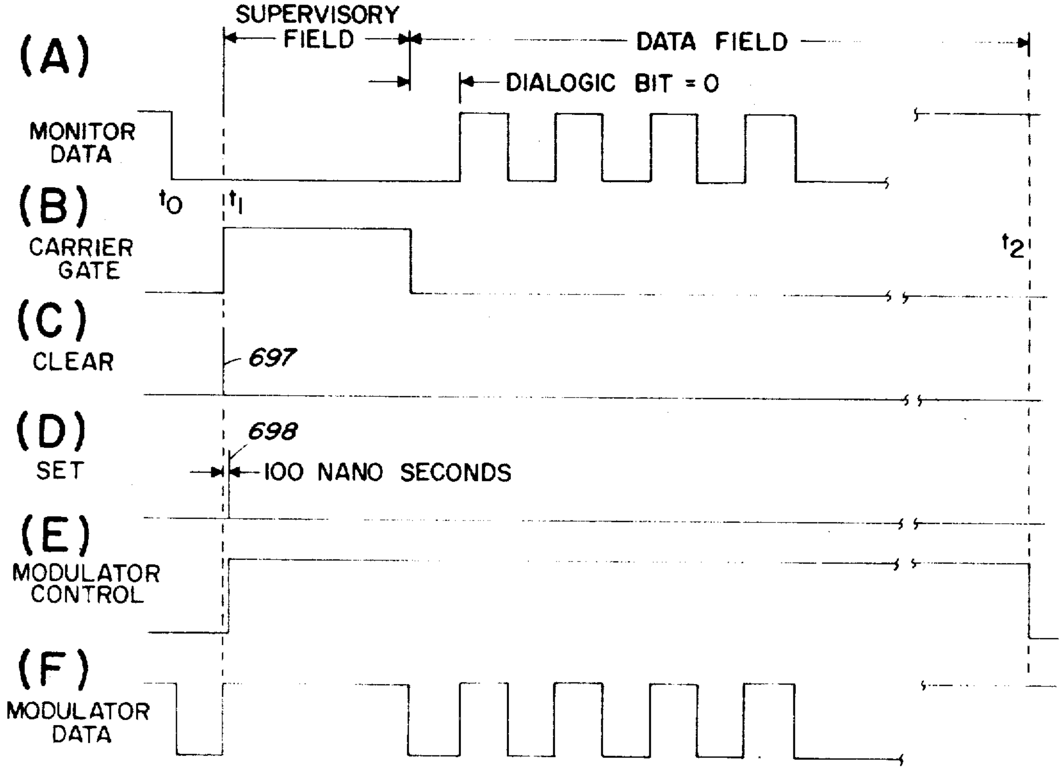
Figure 28A:
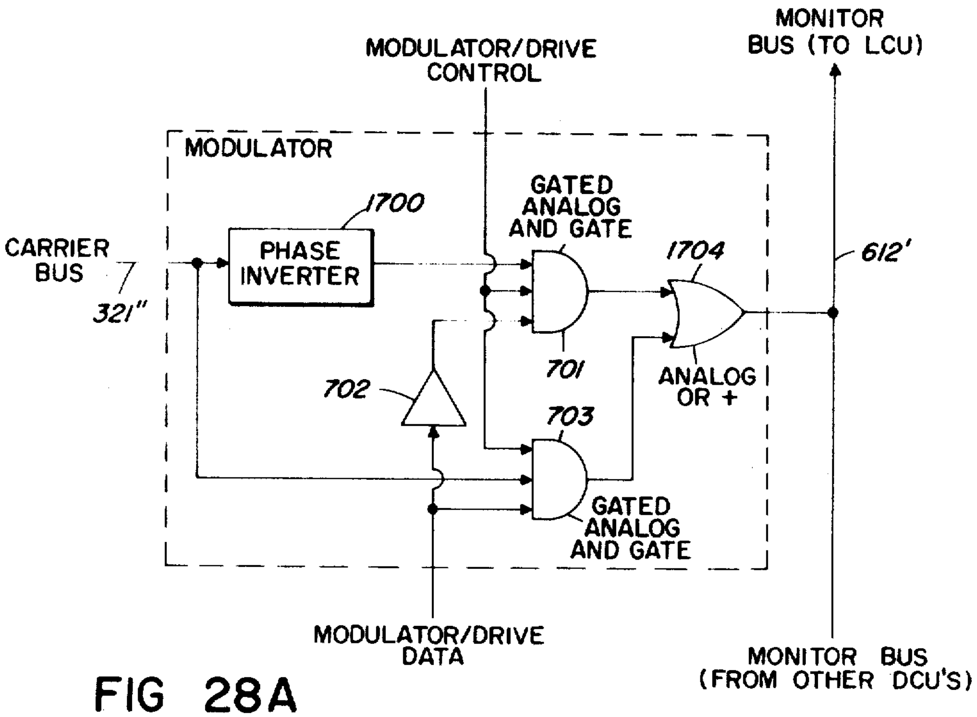
Figure 28B:
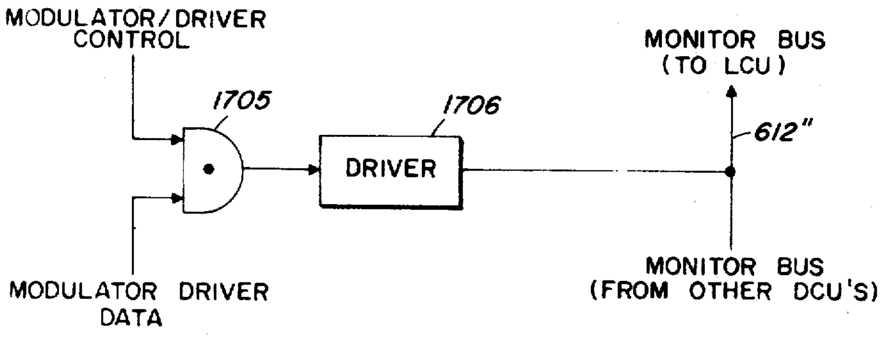
Figure 29:
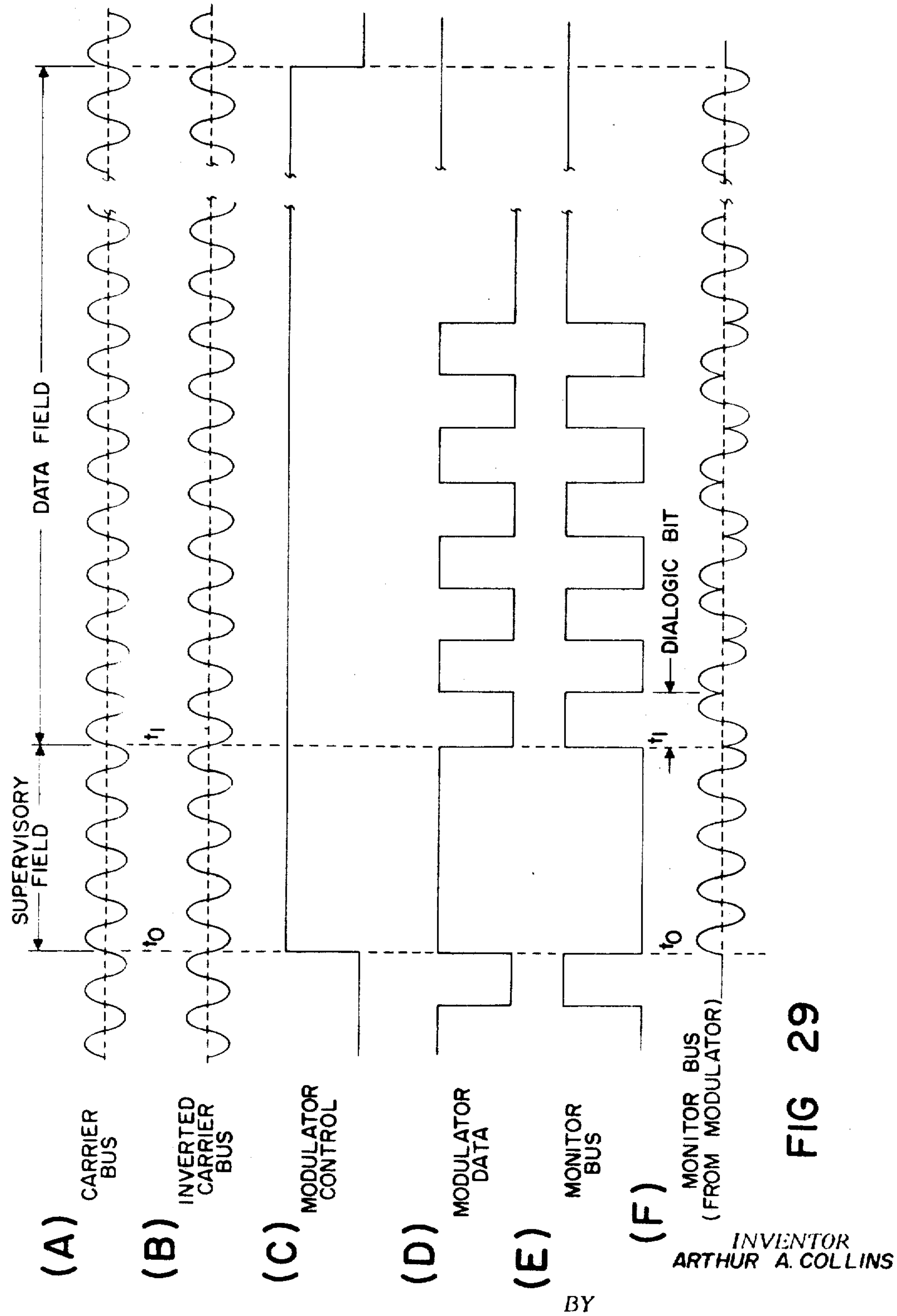
Figure 30:
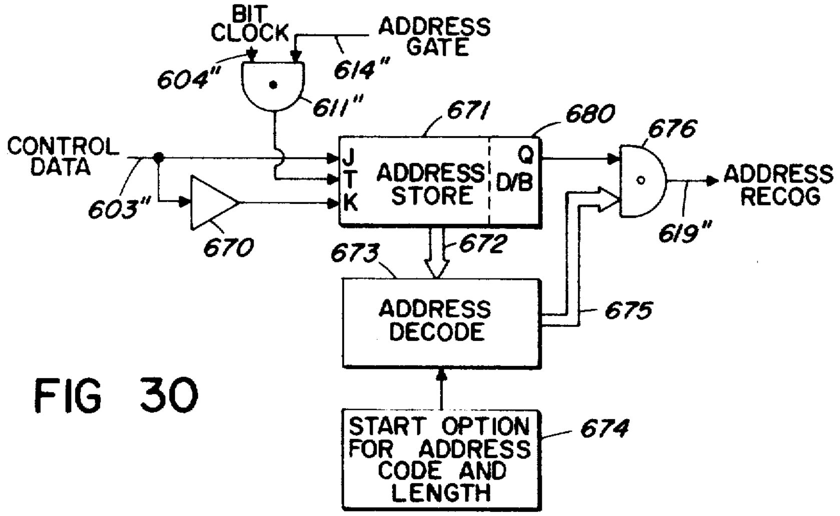
Figure 31:
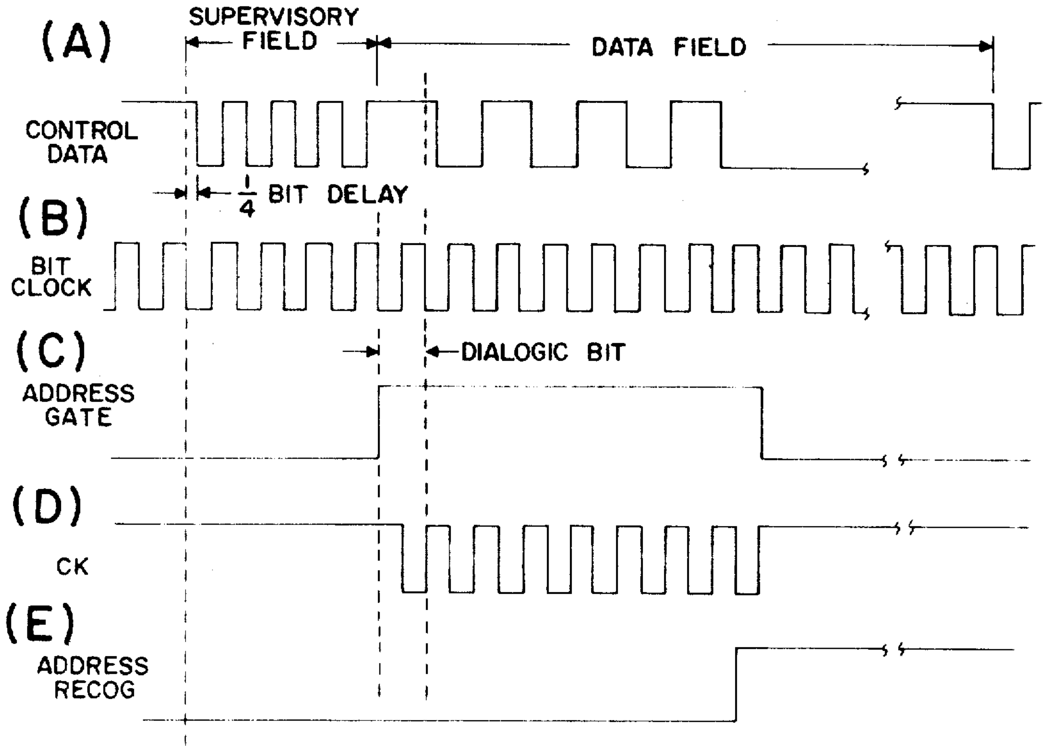
Figure 32:
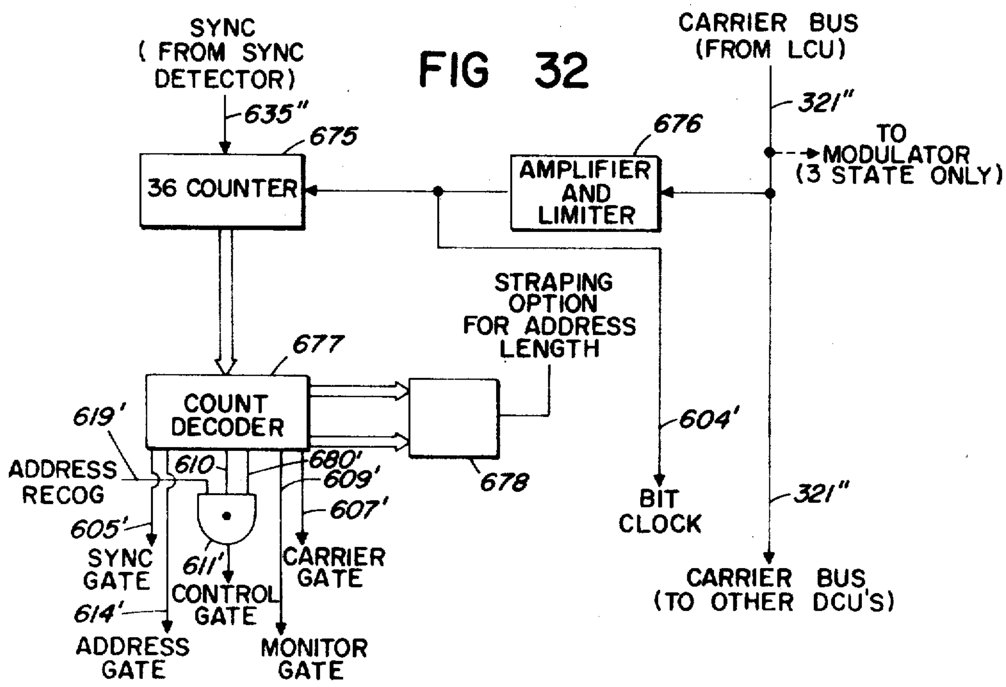
Figure 33:
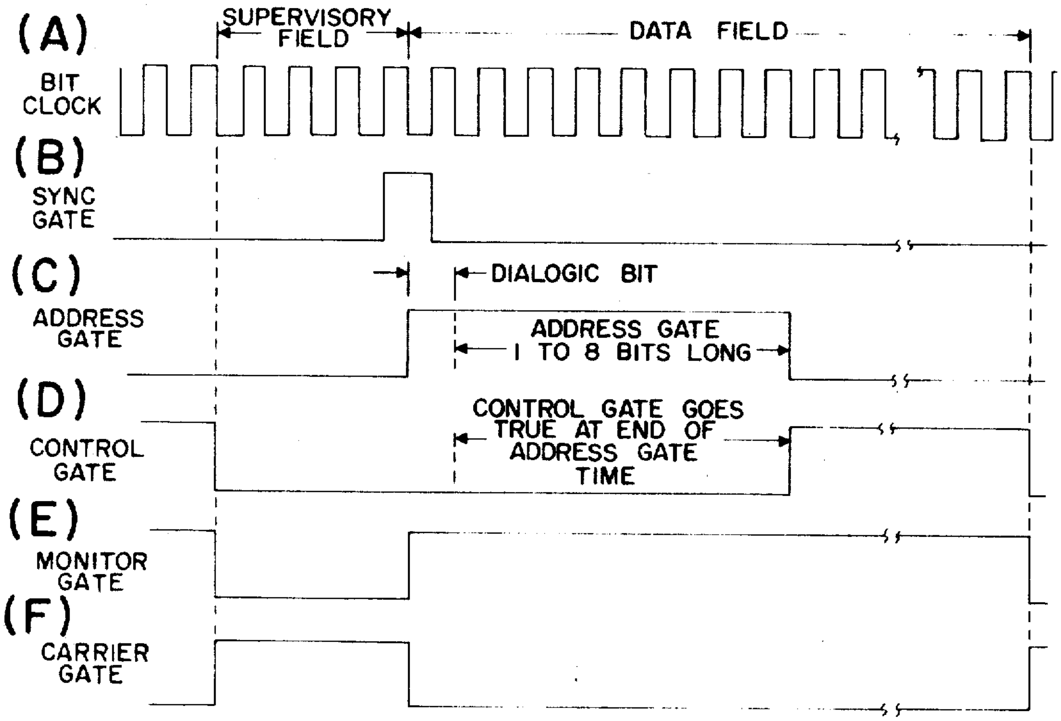
Figure 34:
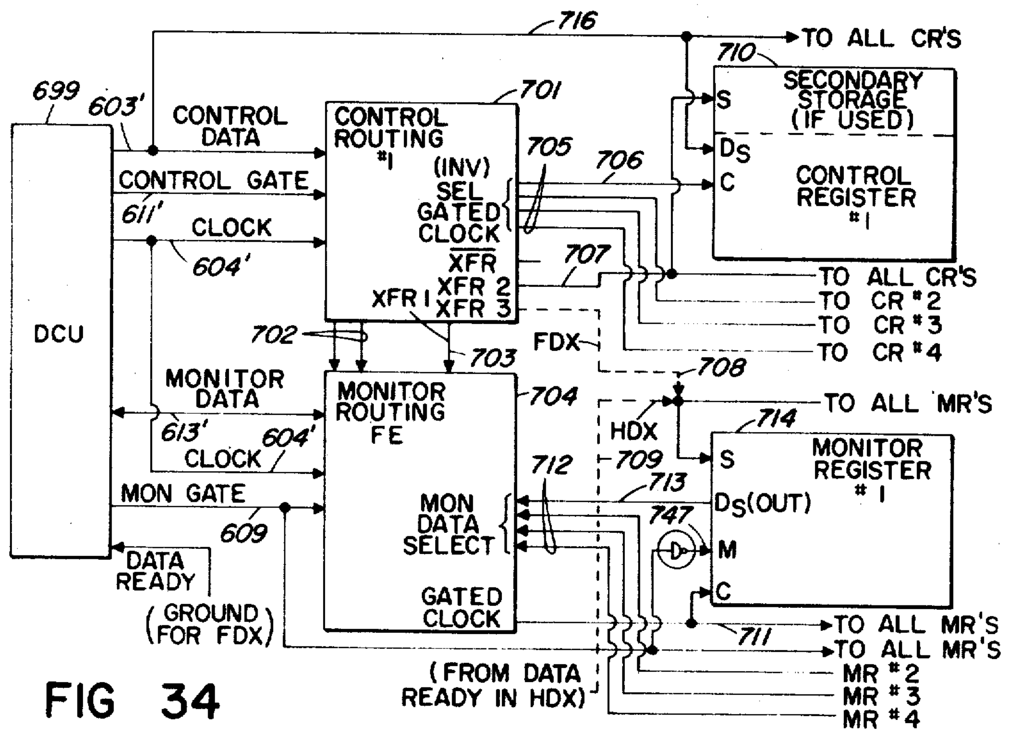
Figure 36:
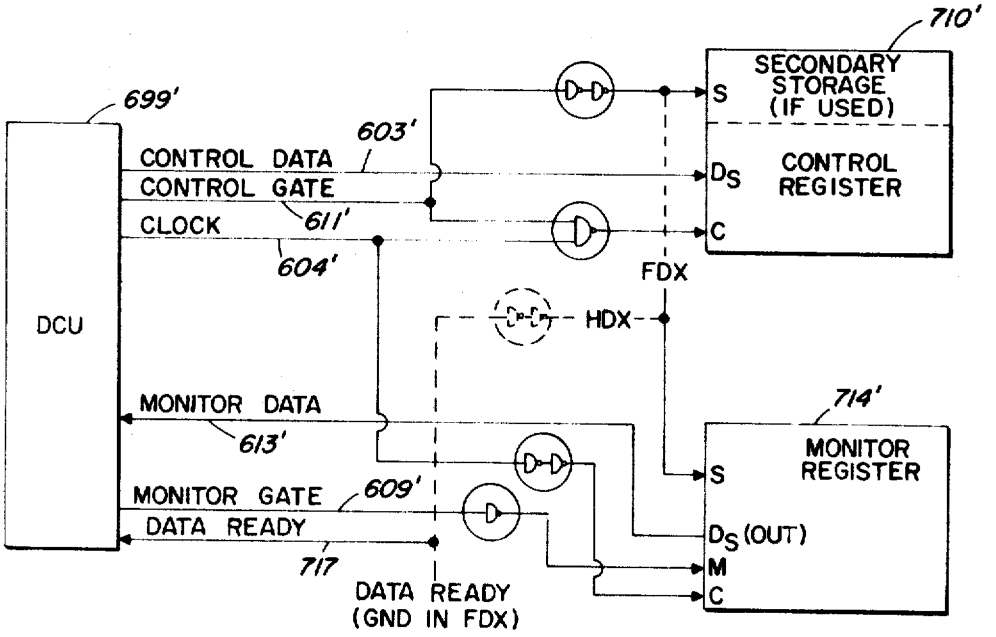
Figure 35:
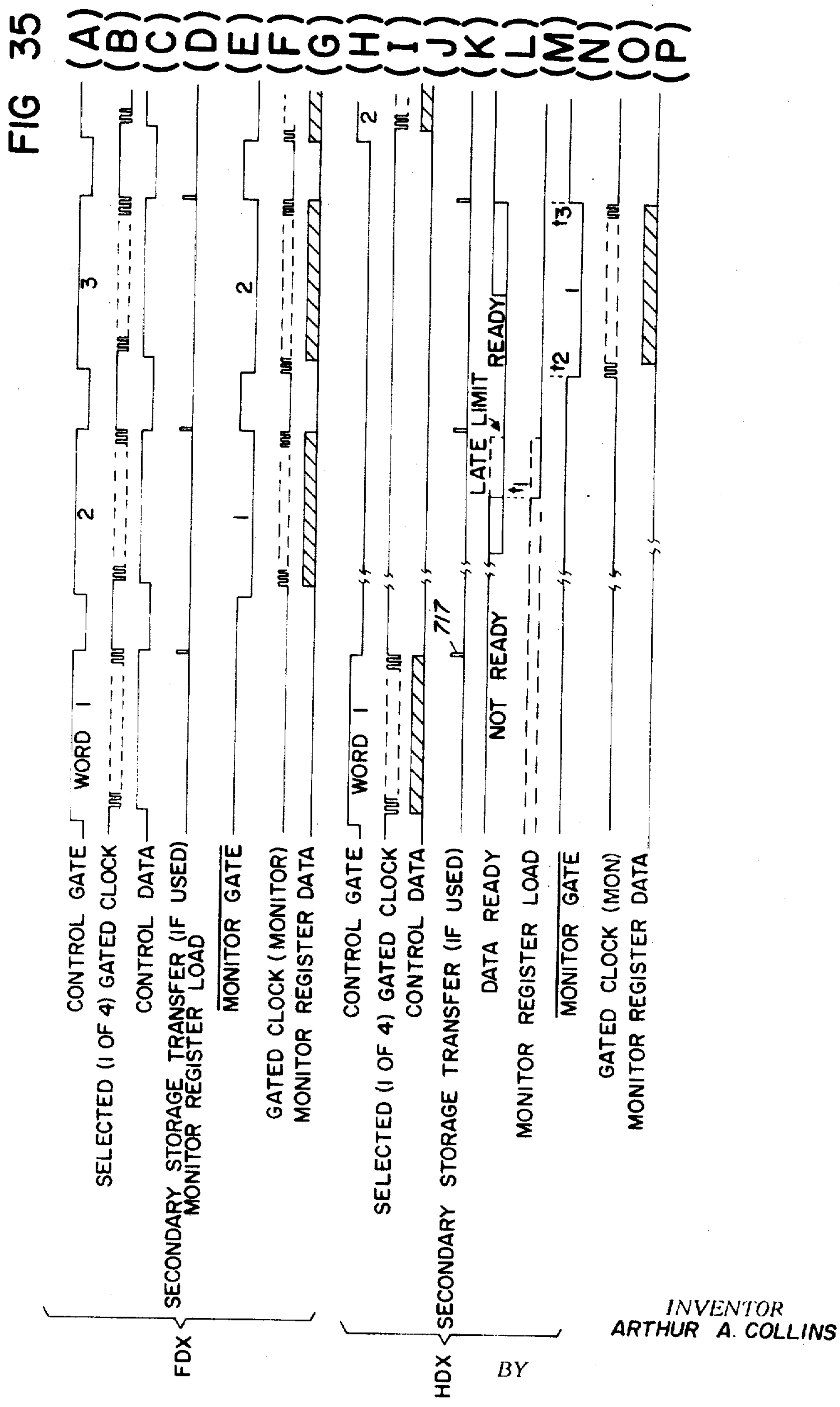
Figure 37:
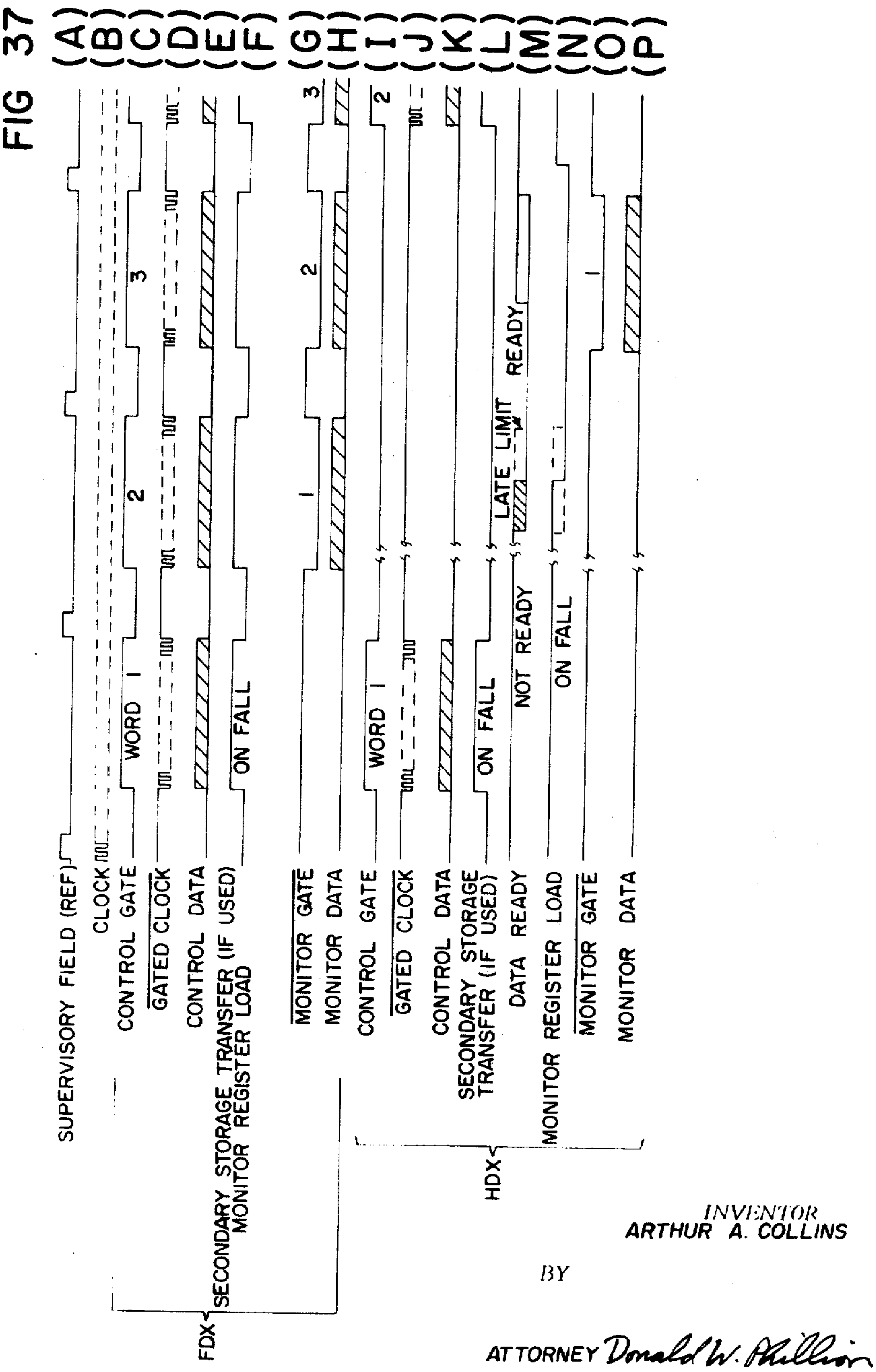
Figure 38:
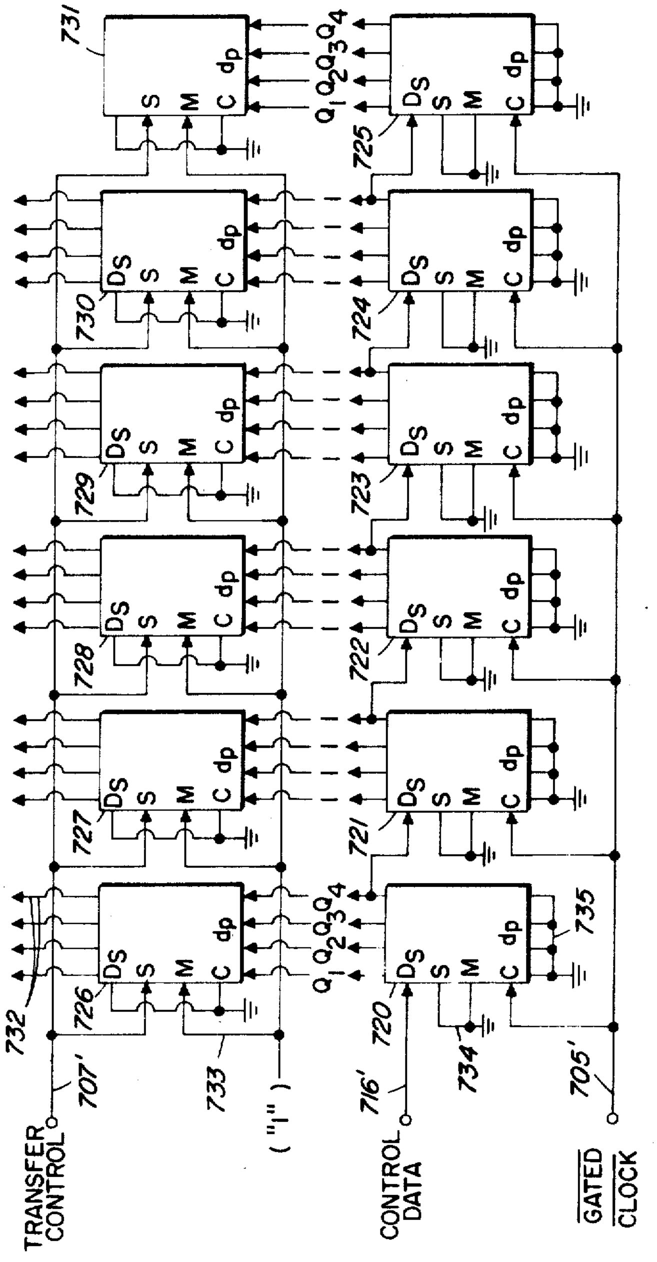
Figure 40:
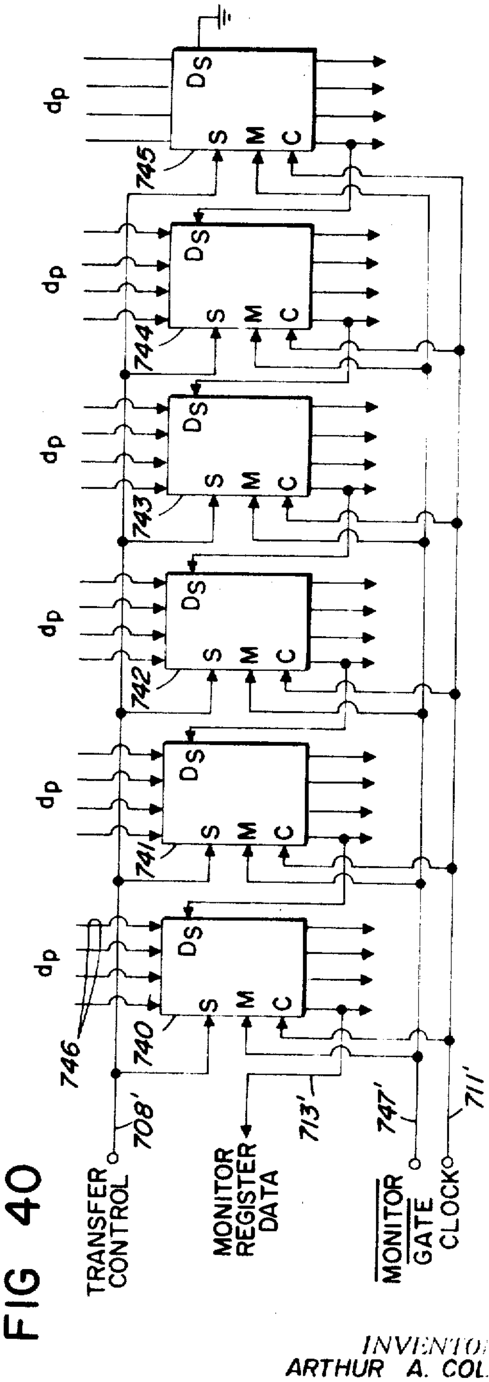
Figure 41:
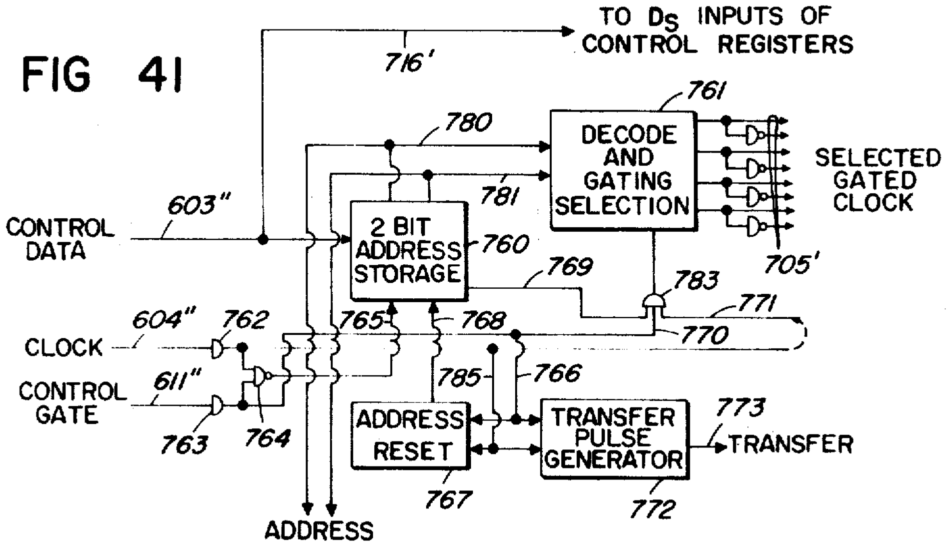
Figure 43:
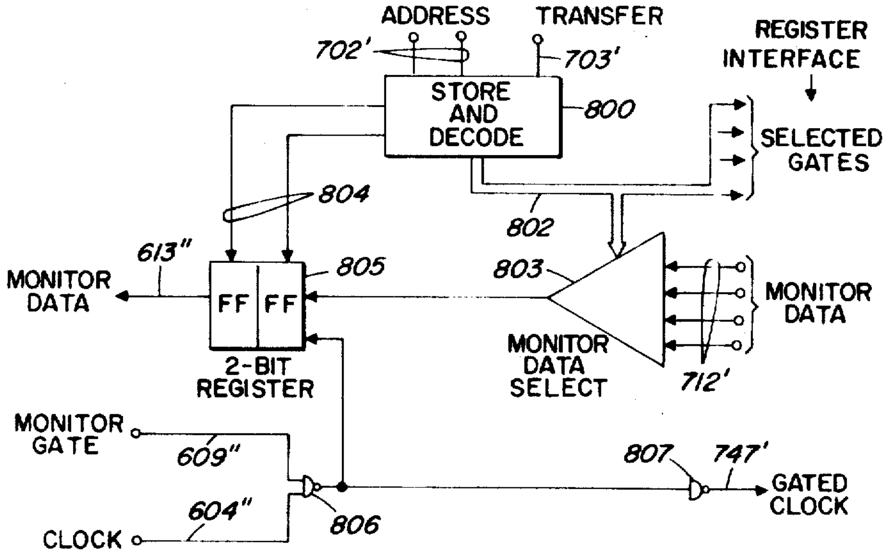
Figure 44:
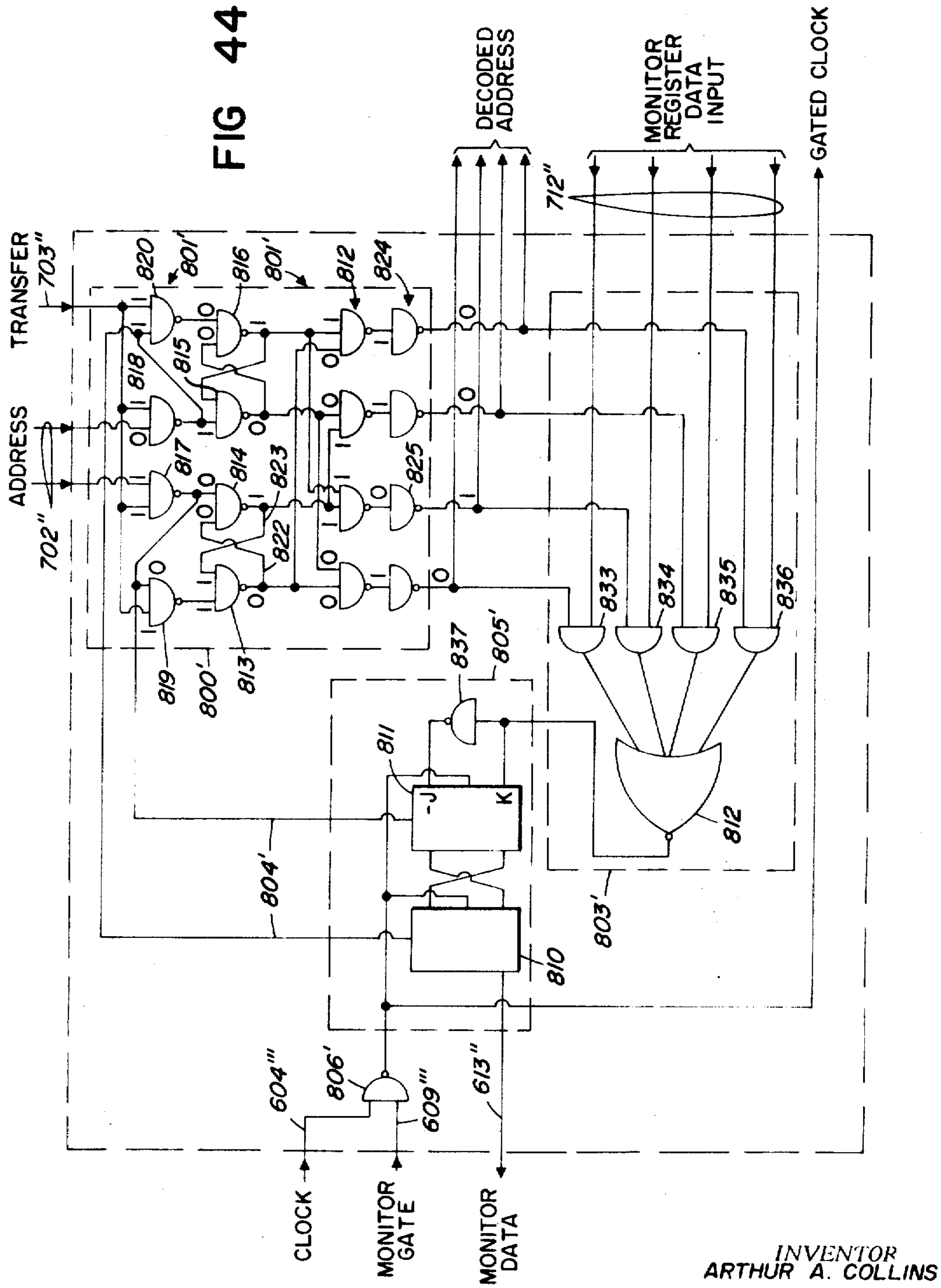
Figure 46:
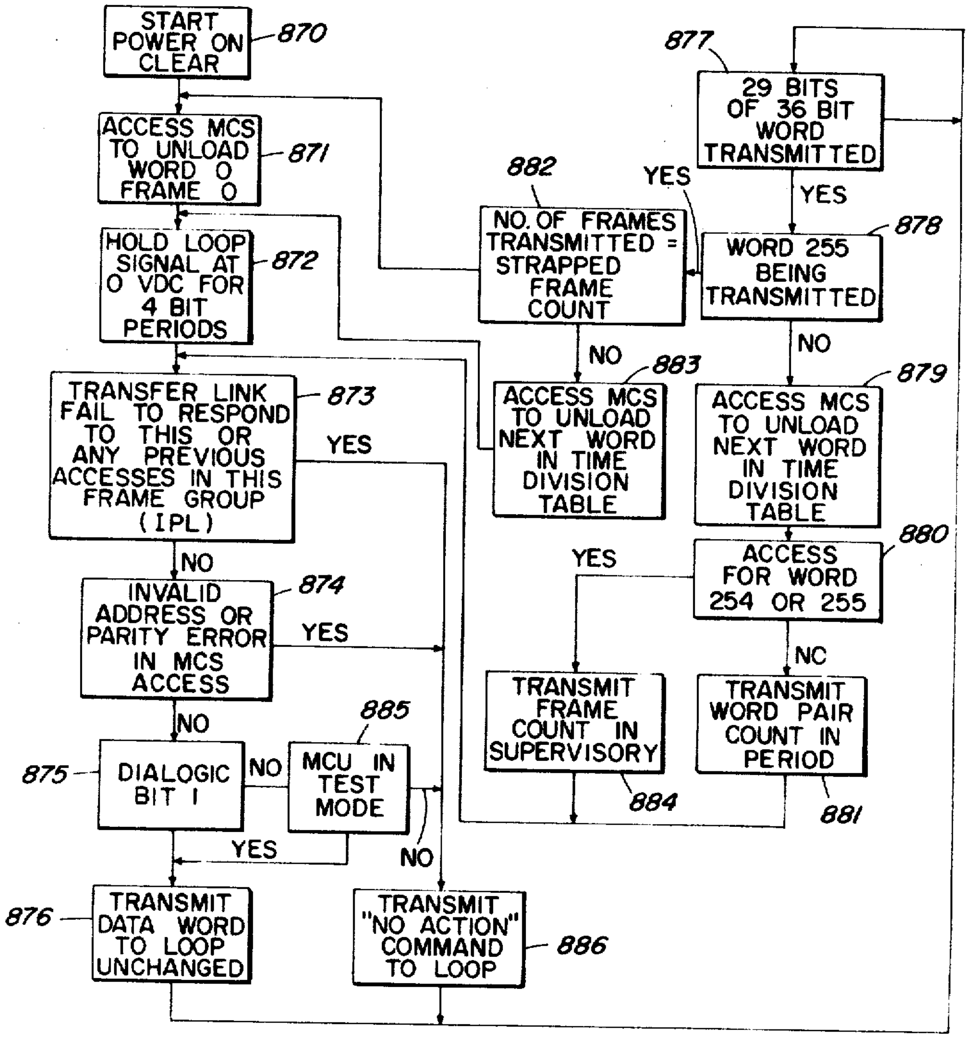
Figure 47:
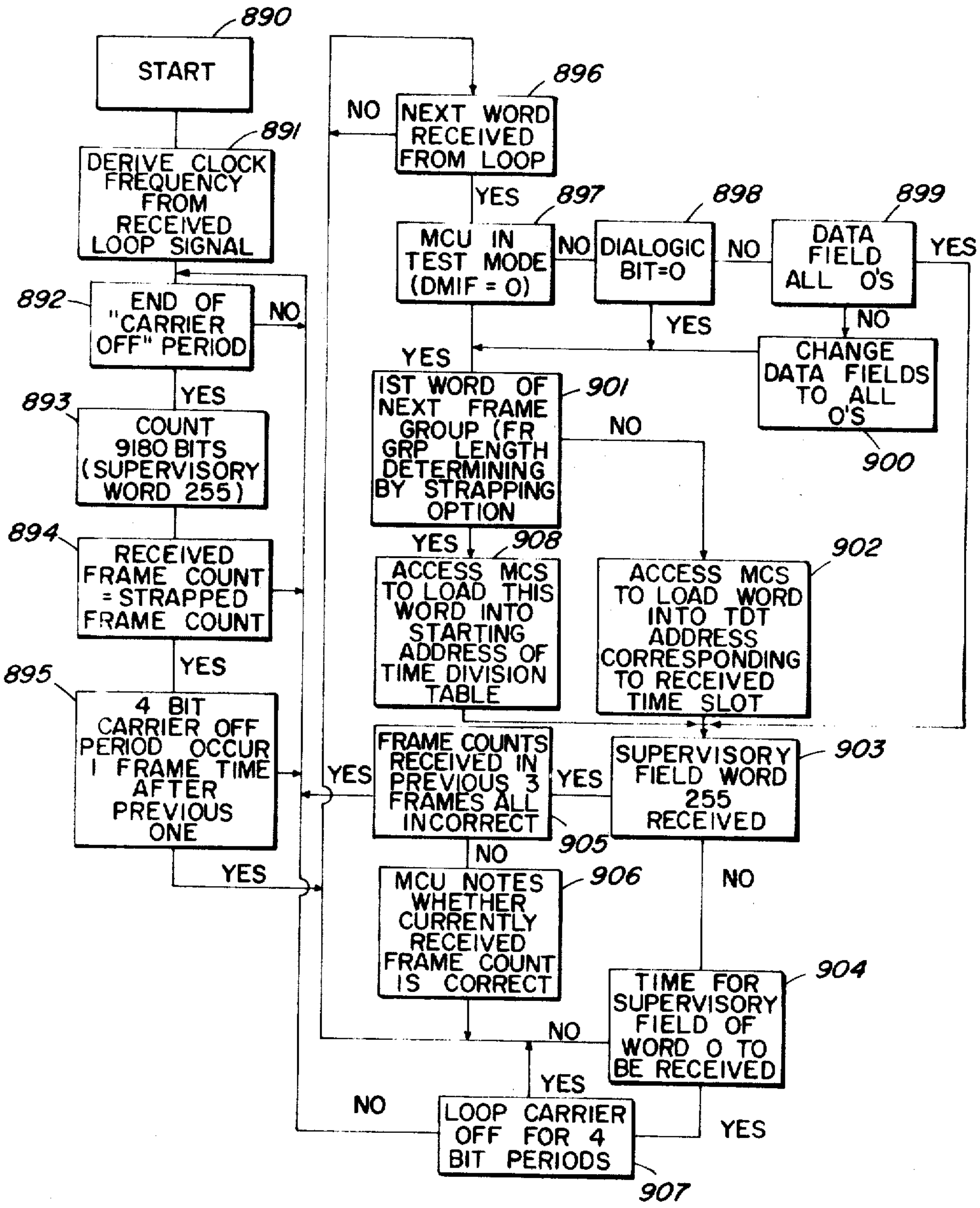
Figure 45:
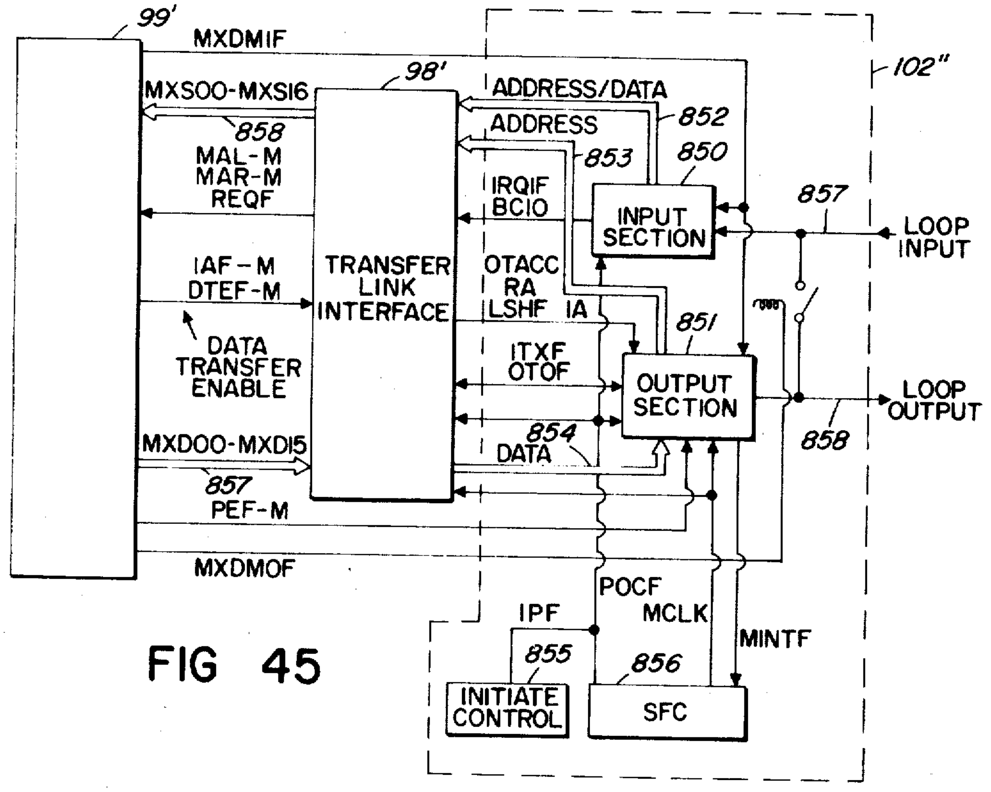
Figure 48:
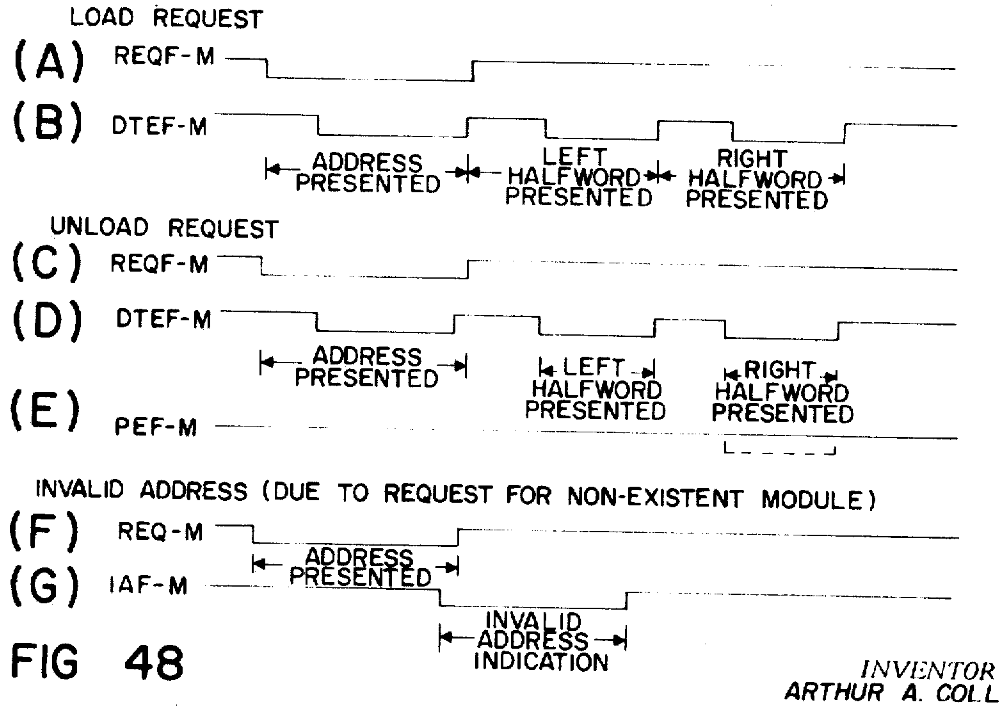
Figure 49:
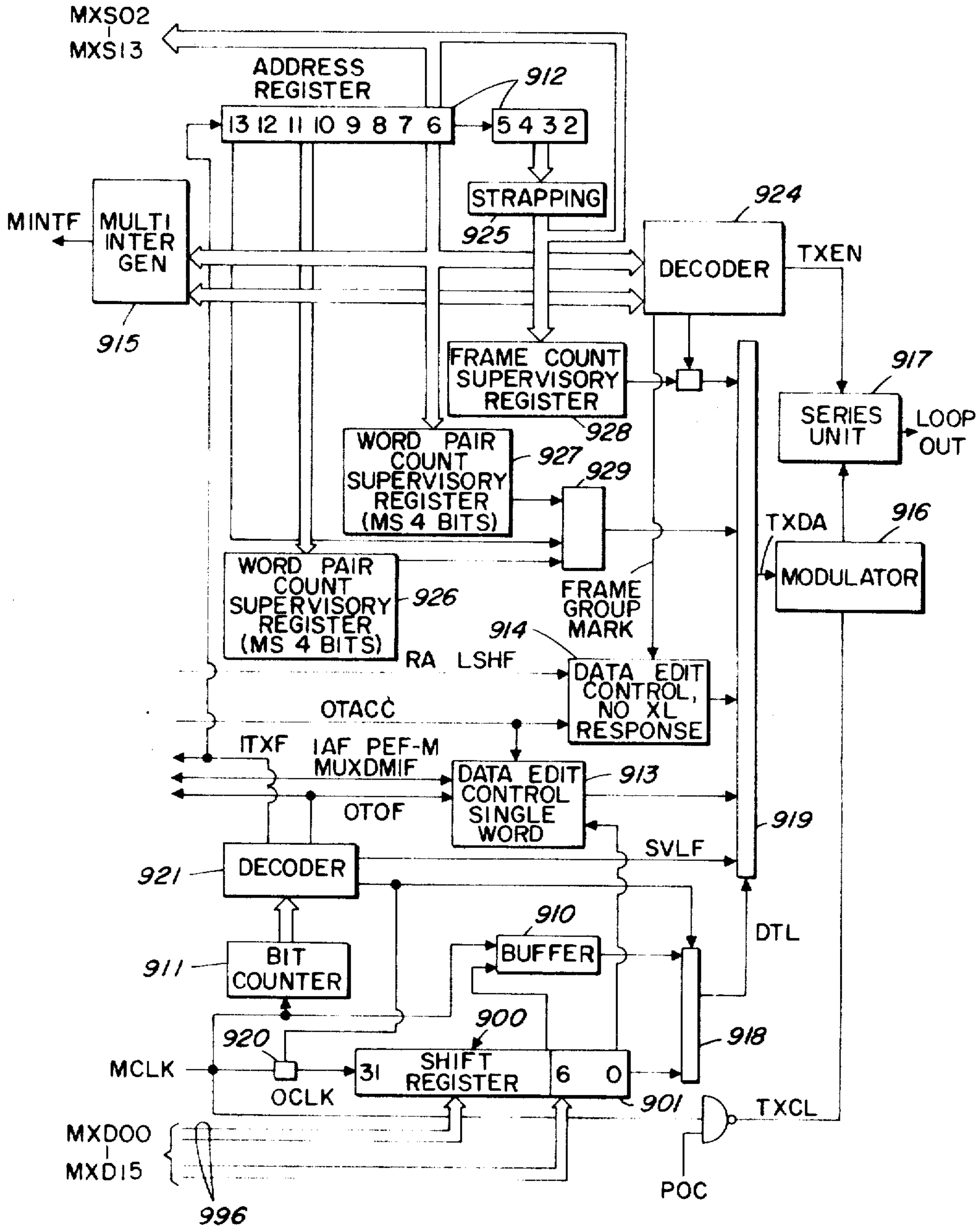
Figure 50:
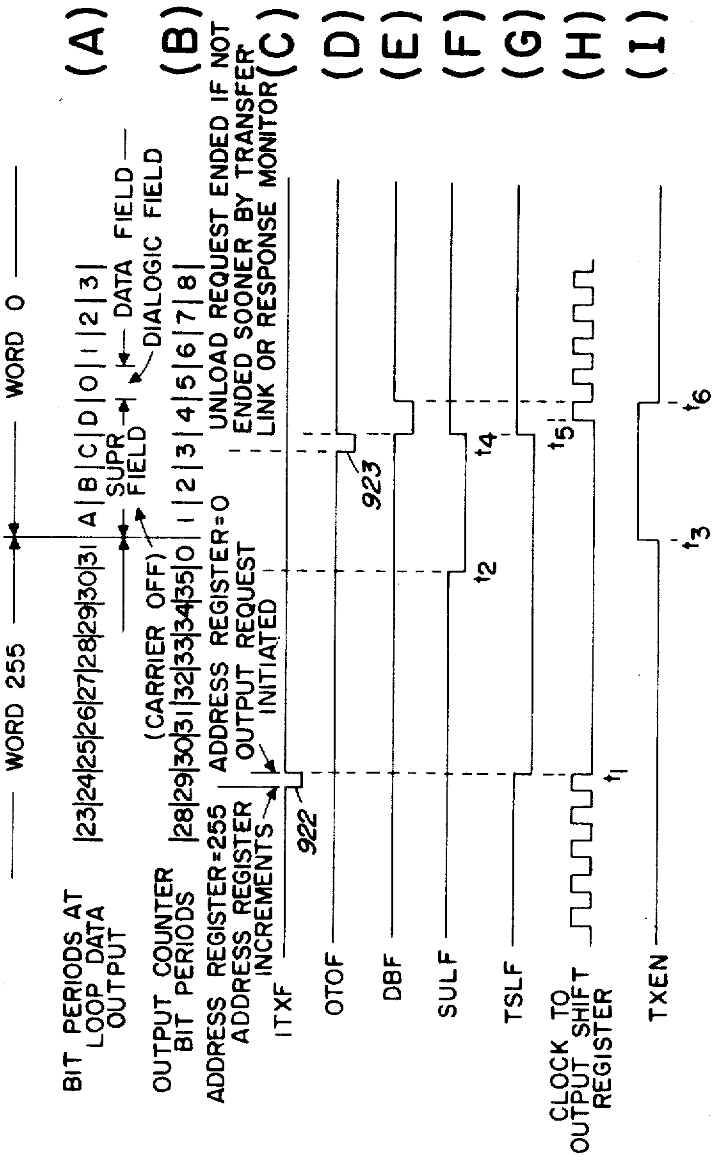
Figure 51:
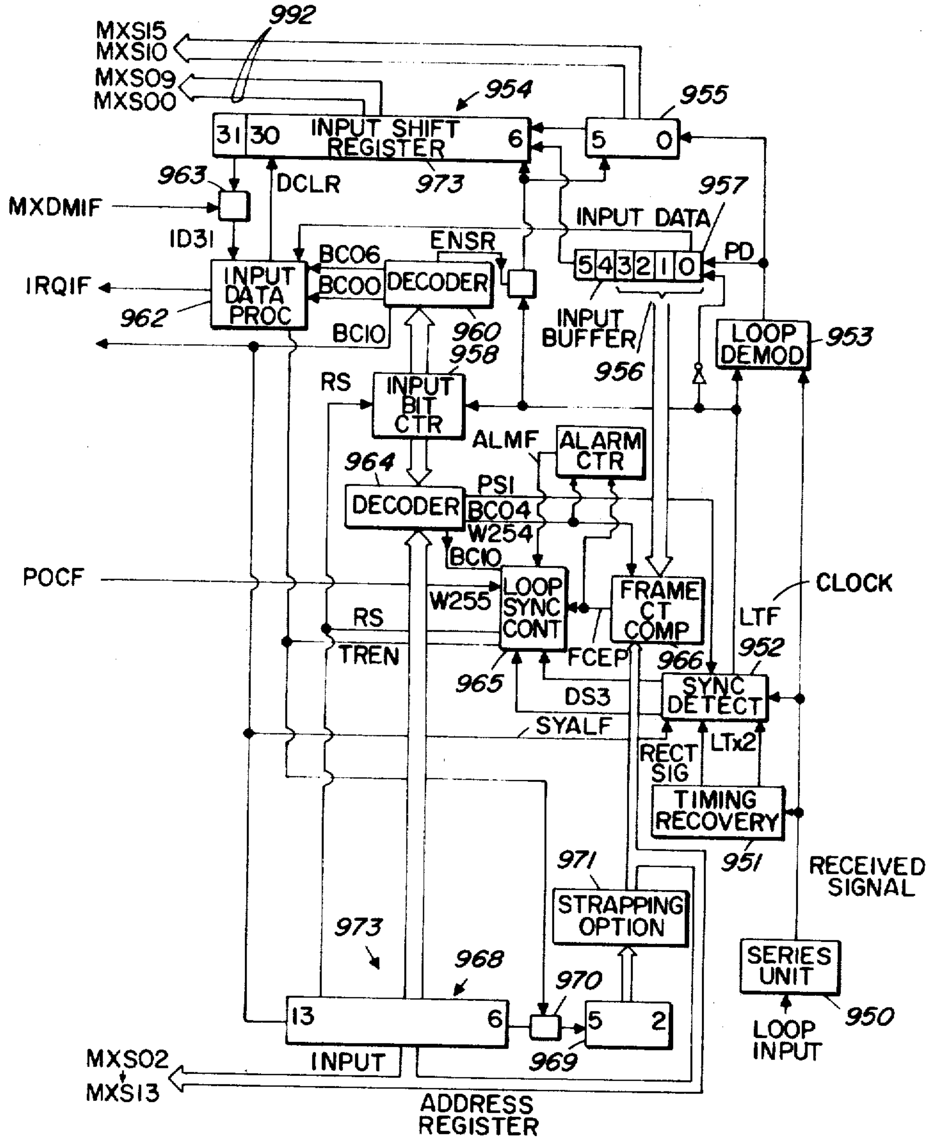
Figure 52:
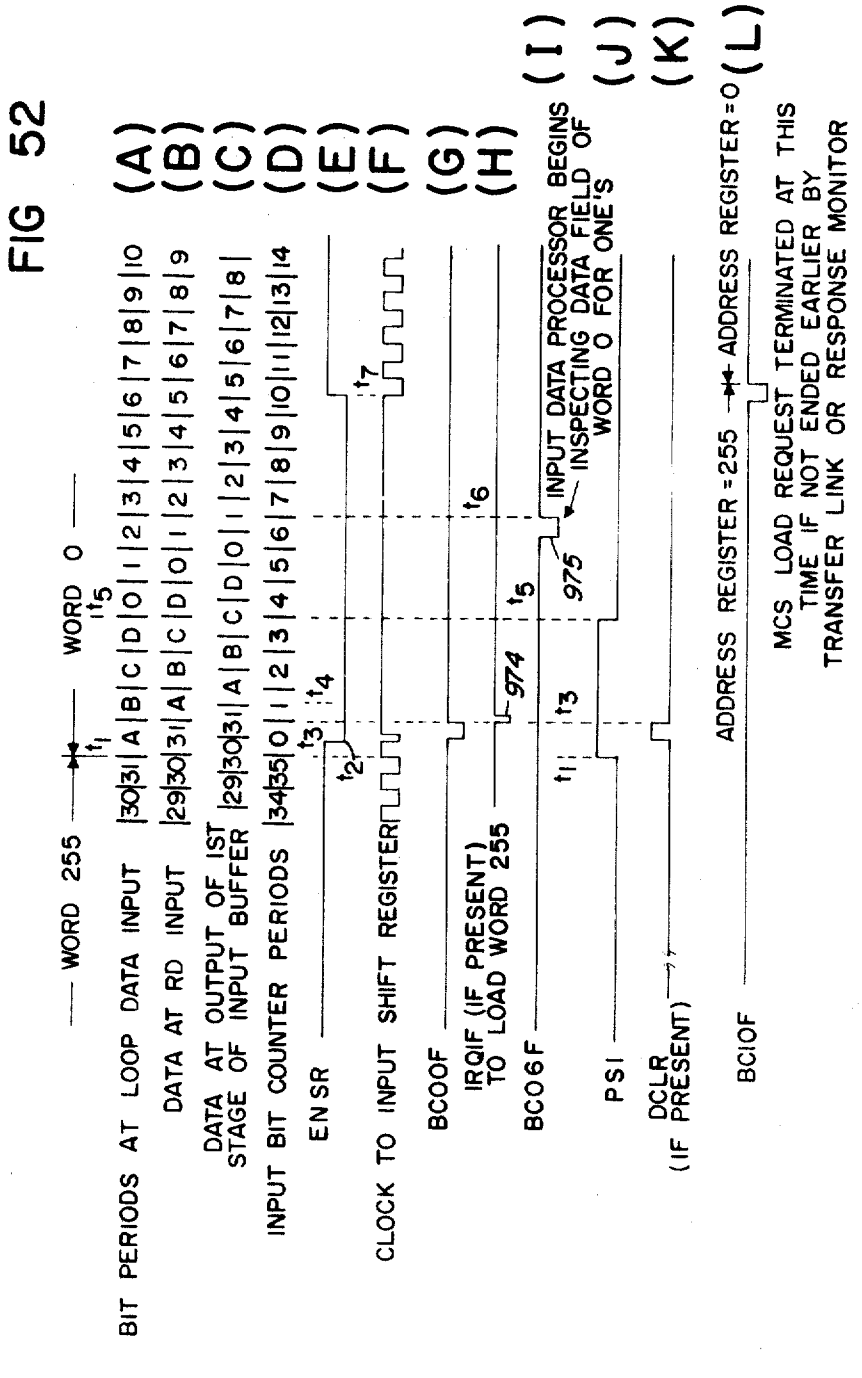
Figure 53:
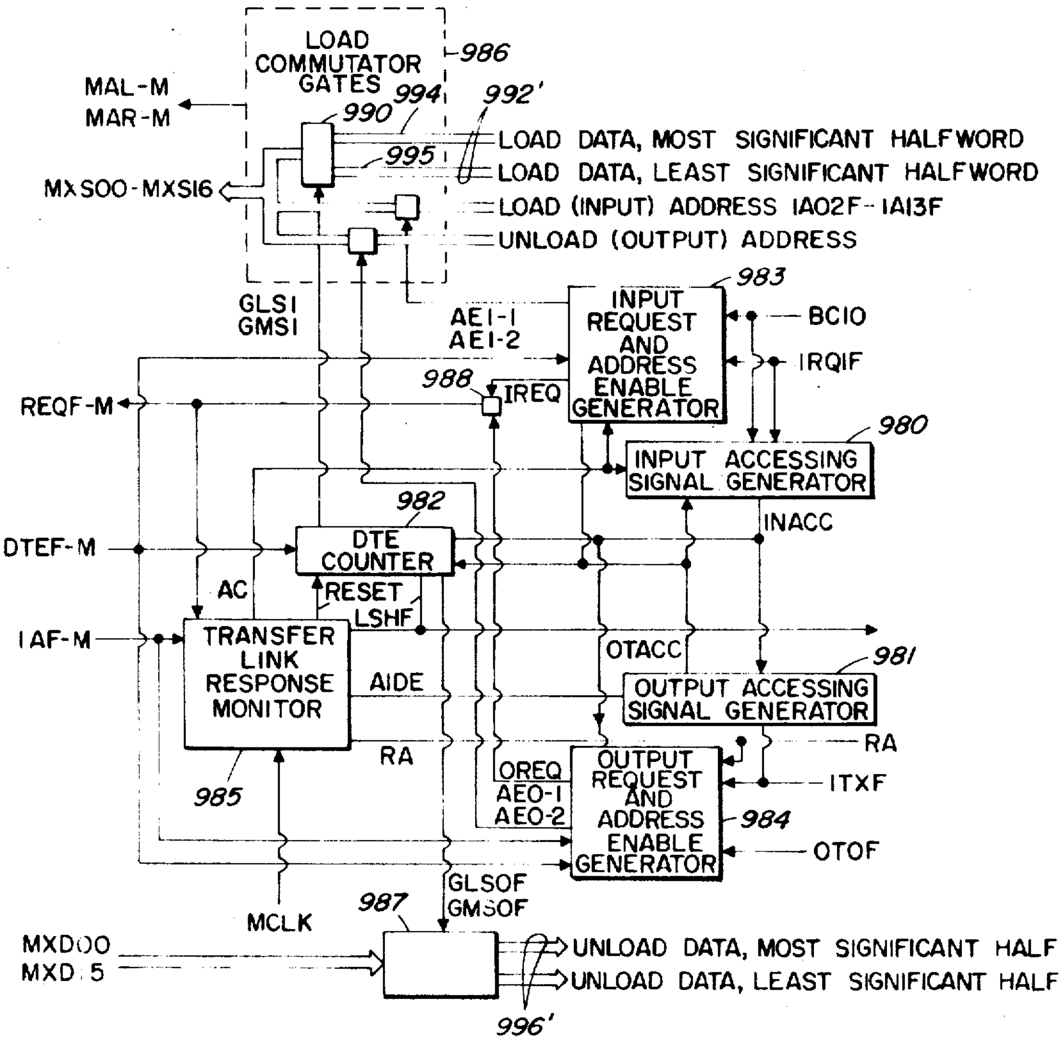
Figure 54:
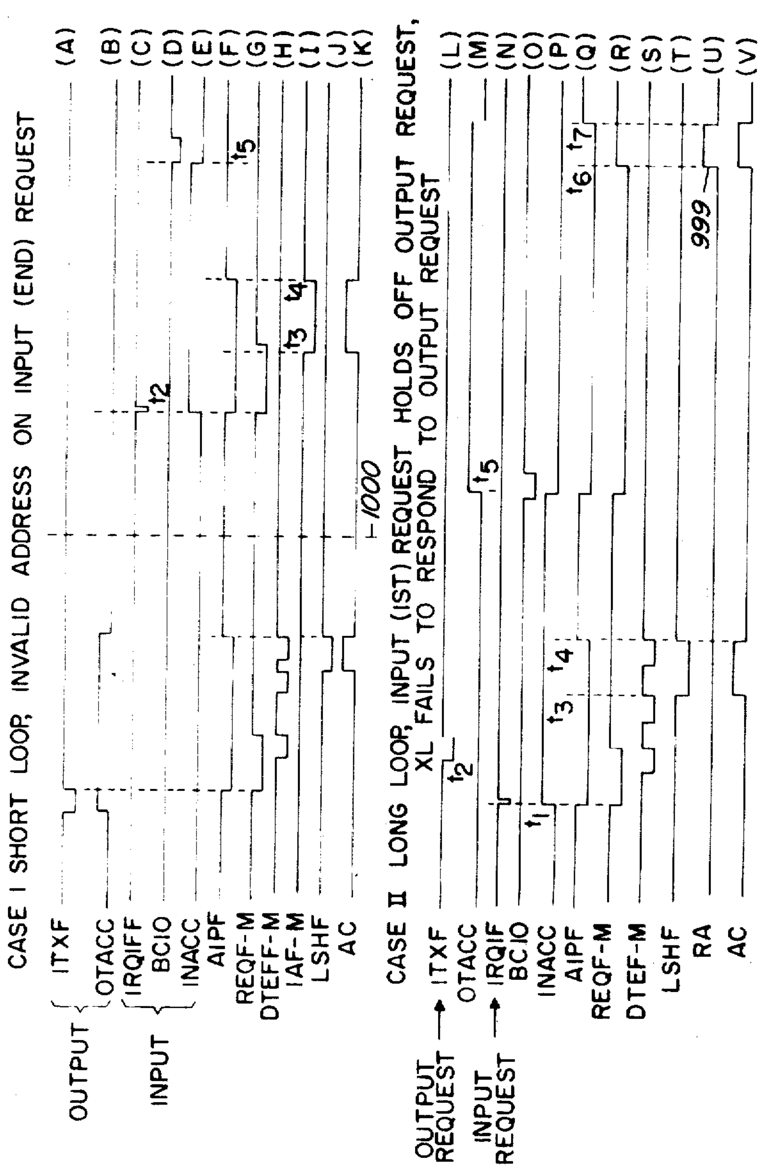
Figure 55:
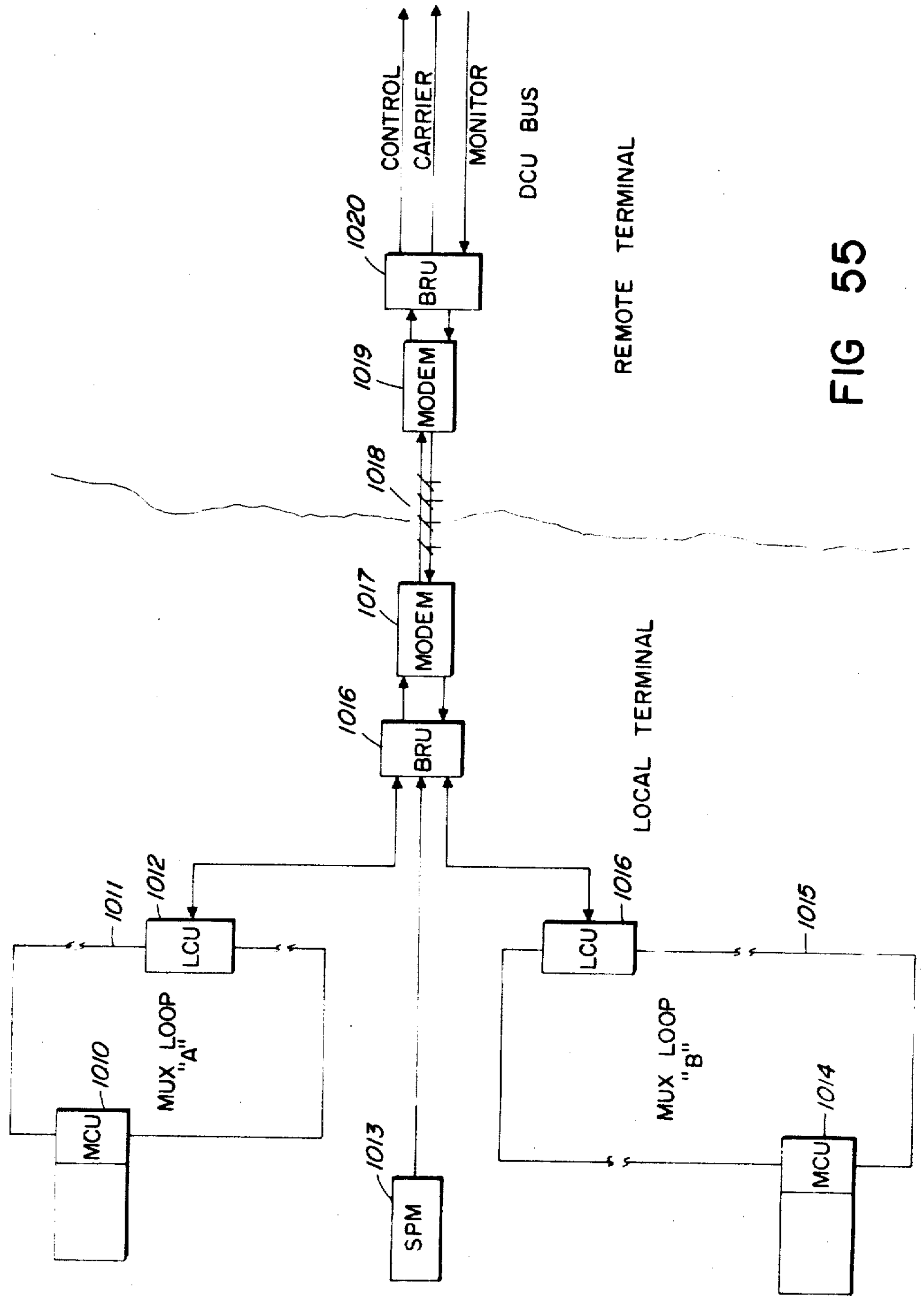
Figure 56:
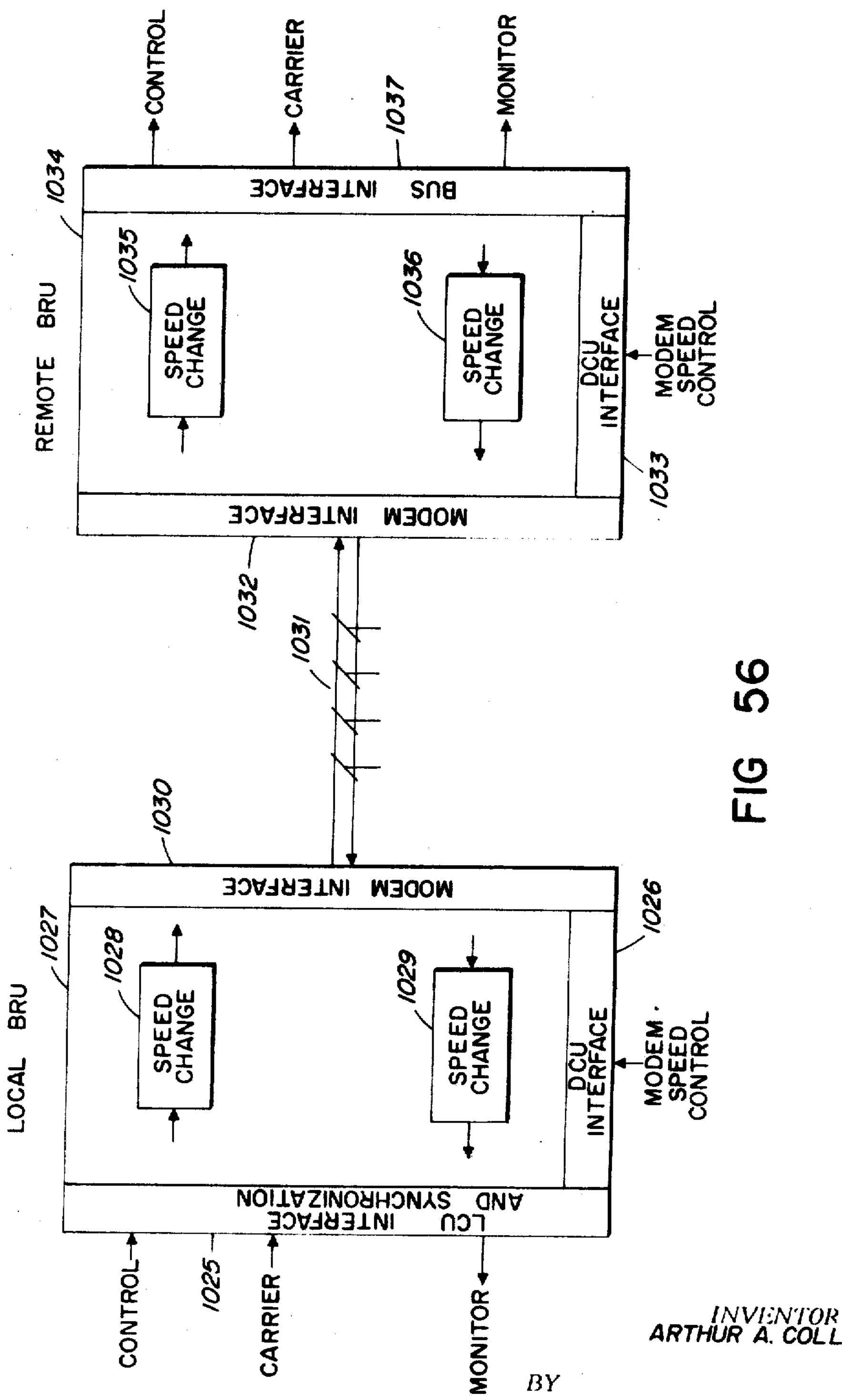
Figure 57:
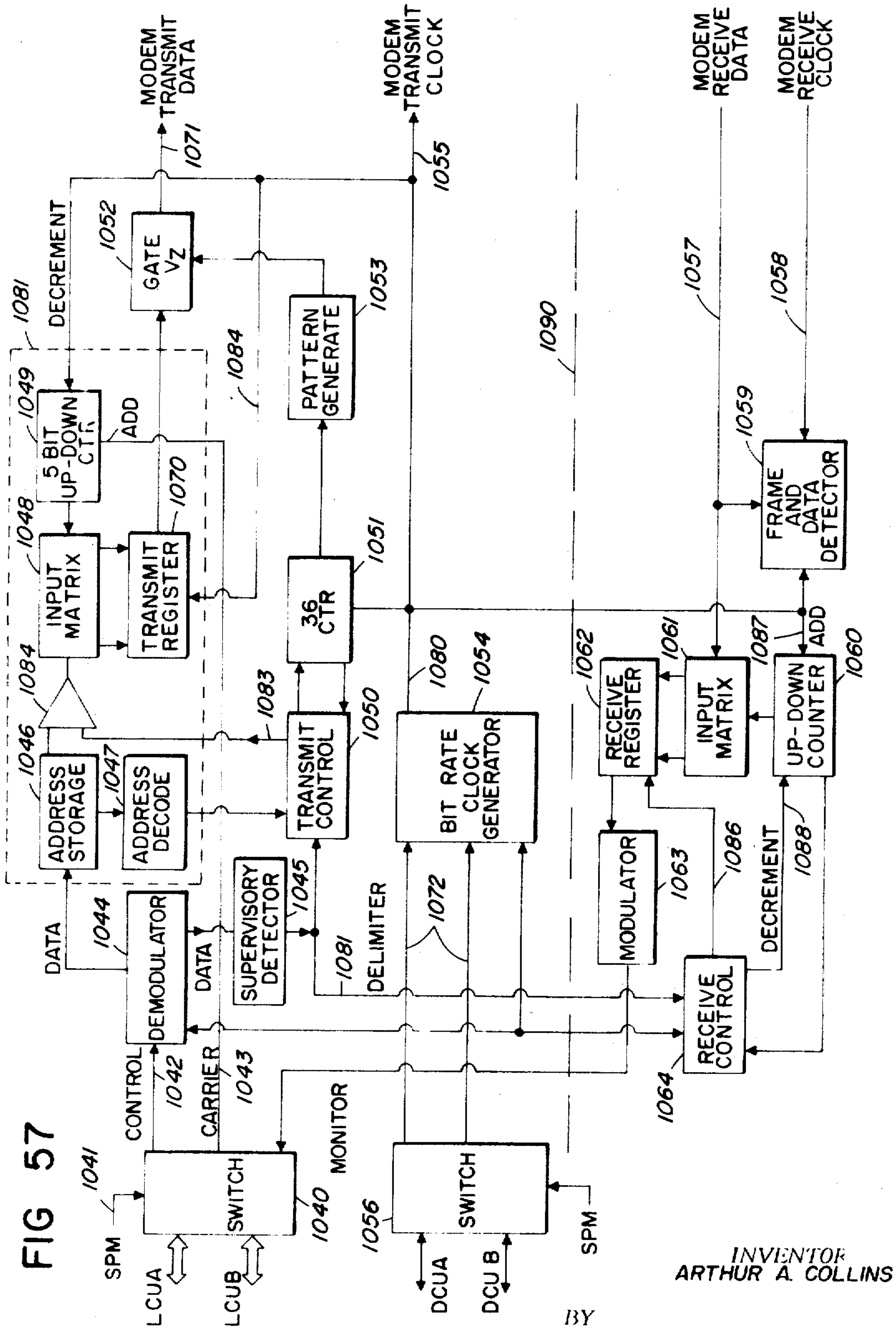
Figure 58:
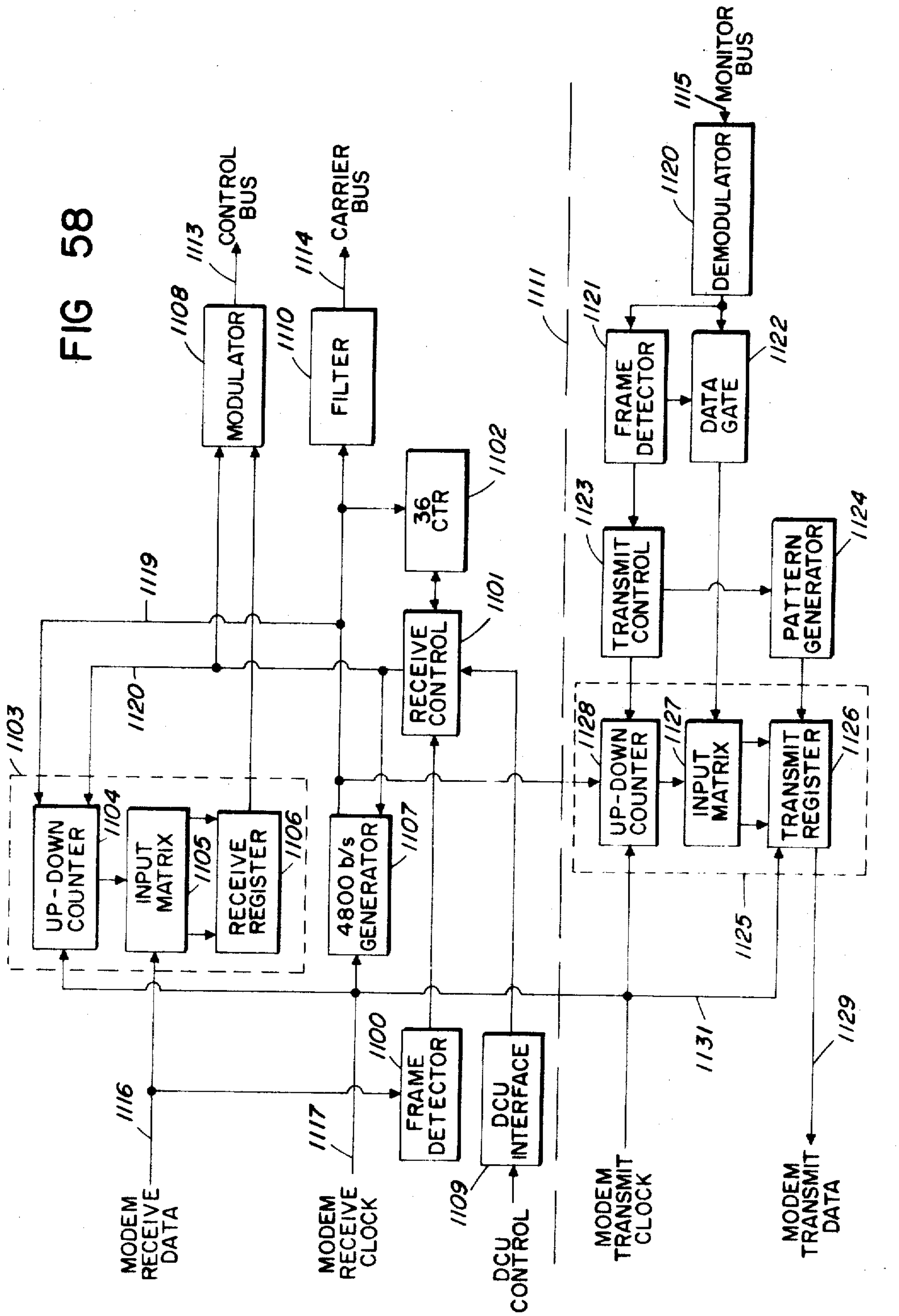
Figure 59:
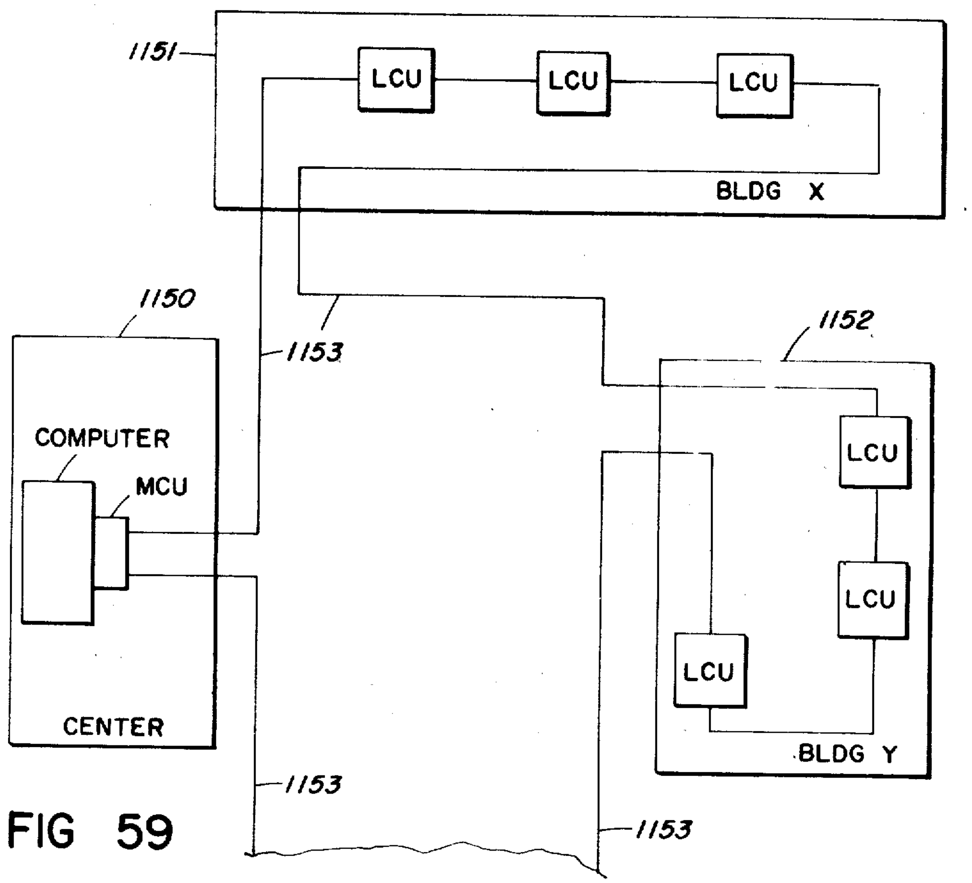
Figure 60:
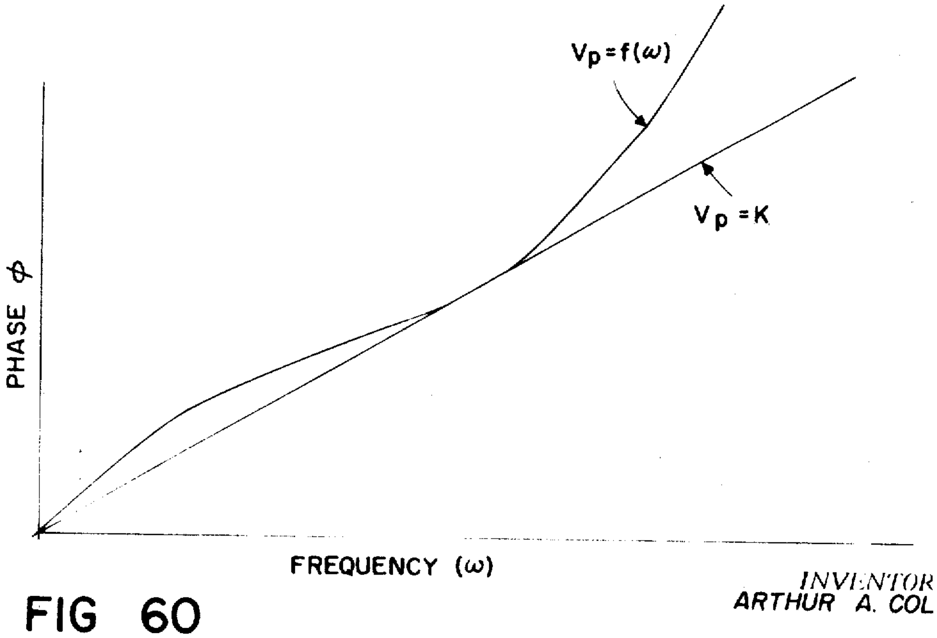

FIGS. 4A, B, C, and D show the control and DCU but data formats and word detail;

FIGS. 5A, B, and C show the DCU bus signal waveforms with sine wave signaling;

FIGS. 6A, B, and C show the DCU bus waveforms employing two level logic signaling;

FIG. 7 is a general block diagram showing the multiplex control system boundaries;

FIG. 8 is a block diagram of an LCU;

FIG. 9 shows waveforms of LCU timing;

FIG. 10 is a logic diagram of the LCU speed change buffer;

FIG. 11 shows a logic diagram of the series unit which couples the LCU to the multiplex loop;

FIG. 12 is a block diagram of the general modulating/demodulating circuits and the timing recovery means;

FIG. 13 is a set of waveforms showing the outputs of FIG. 12 and also some waveforms relating to FIG. 14;

FIGS. 14 and 14A are the LCU loop synchronizing detector which functions to derive word synchronization from the received signal;

FIG. 15 is a set of waveforms relating to the circuit of FIG. 14;

FIG. 15A is a logic diagram of the LCU synchronizing and address recognition unit;

FIG. 16 is a logic diagram of the LCU supervisory timing unit which generates a pulse marking the four bit supervisory field of each word;

FIG. 17 is a block diagram of the LCU bus modulator and demodulator means;

FIG. 18 is a logic diagram of the monitor response detector which detects the presence of a monitor response word in the monitor bus;

FIG. 19 is a set of waveforms relating to the monitor response detector;

FIG. 19A is a general block diagram of a device control unit (DCU);

FIG. 20A is a block diagram of the DCU demodulator when sine wave signaling is employed in the DCU bus;

FIG. 20B is a demodulator or terminator when two level logic signaling is employed in the control bus;

FIG. 21 is a set of waveforms illustrating the timing of the demodulator of FIG. 20A;

FIG. 22 is a set of waveforms showing the timing of the terminator of FIG. 20B;

FIG. 23 is a logic diagram of the DCU synchronizing detector;

FIG. 24 is a set of waveforms illustrating the timing of the synchronizing detector when sine wave signaling is employed;

FIG. 25 shows the timing of the synchronizing detector when logic level or two state signaling is employed;

FIG. 26 is a block diagram of the DCU modulator control;

FIG. 27 is a set of waveforms illustrating the timing of the DCU modulator control;

FIG. 28A is a block diagram of the DCU modulator for modulating words received from the DCFE into sine wave signaling;

FIG. 28B is the driver employed for amplifying the word received from the DCFE and supplying it to the monitor bus when two level logic signaling is being employed;

FIG. 29 is a set of waveforms showing the timing for the modulator circuit of FIG. 28A;

FIG. 30 is a logic diagram of the DCU address recognition circuit which functions to recognize the address of the word received from the LCU on the control bus;

FIG. 31 is a set of waveforms showing the timing of the address recognition circuit of FIG. 30;

FIG. 32 is a logic diagram of the DCU time base means which generates the basic timing signals used in the DCU unit;

FIG. 33 is a set of waveforms showing the timing of the time base means;

FIG. 34 is a generalized block diagram of a typical device control functional element (DCFE) which couples the DCU units to the device being controlled;

FIG. 35 is a set of waveforms showing the timing and the data inputs and outputs of the block diagram of FIG. 34 for both half duplex and full duplex operation;

FIG. 36 is another block diagram of a device control functional element employing only a single control register and a single monitor register;

FIG. 37 is a set of waveforms showing the timing of the DCFE unit of FIG. 36 for both the half duplex (HDX) and full duplex (FDX) modes of operation;

FIG. 38 is a block diagram of a control register which can be employed in the circuits of FIGS. 34 or 36;

FIG. 40 is a more detailed diagram of the monitor register interface of the DCFE;

FIG. 41 is a block diagram of the control routing functional element which selects one of the plurality of control registers available;

FIG. 43 is a block diagram of the monitor routing element which functions to select one of the plurality of monitor registers available;

FIG. 44 is a more detailed logic diagram of the structure of FIG. 43;

FIG. 45 is a general functional diagram of the multiplex channel unit (MCU);

FIG. 46 is a flow diagram for the MCU data output sequence;

FIG. 47 is a flow diagram for the MCU sync acquisition and data input sequence;

FIG. 48 shows waveforms illustrating certain aspects of the MCU transfer link interface;

FIG. 49 is a functional block diagram of the MCU output section which supplies data to the loop;

FIG. 50 is a set of waveforms relating to the output section of FIG. 49;

FIG. 51 is a functional block diagram of the MCU input section which receives data from the loop;

FIG. 52 is a set of waveforms relating to the input section of FIG. 51;

FIG. 53 is a functional block diagram of the transfer link;

FIG. 54 is a set of waveforms relating to the transfer link 53;

FIG. 55 is a general diagram showing the general function of bus remote units (BRU);

FIG. 56 is another diagram showing the general function of BRU's;

FIG. 57 is a block diagram of a local BRU terminal;

FIG. 58 is a block diagram of a remote BRU terminal;

FIG. 59 is a diagram showing a typical layout of the coaxial loop employed in the system; and FIG. 60 is a characteristic curve showing the phase-frequency response of a typical coaxial cable loop.

Due to the relative complexity of the specification, there will first be set forth a definition of terms, followed by an outline of the manner in which this invention will be presented.

DEFINITION OF SOME ACRONYMS

MCU—Multiplex Control Unit
LCU—Loop Coupler Unit
DCU—Device Control Unit
DCFE—Device Control Functional Element
BRU—Bus Remote Unit
TTL—Two Level Signal Logic
MCS—Main Core Memory of the Computer
TDT—Time Division Table in MCS Certain other terms which are used rigorously in this specification are defined below:

DEFINITIONS

OUTPUT—refers to data directed *from* the computer.

INPUT—refers to data directed *to* the computer.

MULTIPLEX LOOP—refers to the cable loop which circulates the data from the output of the MCU through the LCU's, and back to the MCU.

CHANNEL—an LCU, the buses associated with it, and the one or more time division addresses assigned to that LCU.

CONTROL BUS—refers to the data bus delivering data from an LCU to a DCU(s).

MONITOR BUS—refers to the data bus delivering data from a DCU(s) to an LCU.

CARRIER BUS—used to distribute carrier signal from an LCU to a DCU(s) for timing purposes.

DELIMITER BUS—used to distribute a word reference to the DCU when the Control and Monitor Buses employ logic level signalling.

CARRIER OFF—used to describe a condition of no sine wave carrier signal on the Loop or Bus representing the third state of a sine wave signalling scheme employing phase reversal for the other two states.

TIME DIVISION ADDRESS—used to distinguish a particular Time Division Multiplex word within a Frame Group from all other Time Division Multiplex Words.

TIME SLOT—used to identify the time interval occupied by a Time Division Multiplex Word.

DIALOGIC CONTROL BIT—a single bit field in the Time Division Multiplex Word used to exchange control between the computer program and the DCU/Device.

TIME DIVISION TABLE (Also Word Table)—A table of words in main core memory (MCS) of the computer which supply and receive words in sequential order, to and from the Multiplex loop.

OUTLINE OF PRESENTATION (I) GENERAL DESCRIPTION OF OPERATION
- (A) General Structure of System (FIGS. 1, 2, 3)
  - (1) Remote DCU's (FIG. 1)
- (B) Various Types of Bus Fields (FIGS. 4, 5)
  - (1) Bus field utilizing sine wave signaling (FIG. 5)
  - (2) Bus fields utilizing logic level signalling (FIG. 6)
- (C) Half Duplex and Full Duplex Modes of Operation
  - (1) Half duplex mode
  - (2) Full duplex mode
- (D) Division of Functions (FIG. 7)
  - (1) Communications facility
  - (2) Input/output control program (II) DETAILED DESCRIPTION OF LOOP COUPLER UNIT (FIGS. 8, 9)
- (A) Speed Change Buffer (FIG. 10)
- (B) Series Unit (FIG. 11)
- (C) Loop Demodulating and Modulator Circuit and Timing Recovery Circuit (FIGS. 12, 13)
- (D) Loop Sync Detector (FIGS. 13, 14, 15)
- (E) Synchronization and Address Recognition Unit (FIG. 15A)
- (F) Supervisory Timing Unit (FIG. 16)
- (G) Bus Modulator and Demodulator Logic (FIG. 17)
- (H) Monitor Response Detectors (FIGS. 18, 19)

(III) DETAILED DESCRIPTION OF DEVICE CONTROL UNIT
- (A) General Description (FIG. 19A)
- (B) Demodulator/terminator Circuit (FIGS. 20A, 20B, 21, 22)
- (C) Synchronizing Signal Detector (FIGS. 23, 24, 25)
- (D) Time Base (FIGS. 32, 33)
- (E) Address Recognition Circuits (FIGS. 30, 31)
- (F) Modulator Control Means (FIGS. 26, 27)
- (G) Modulator Driver (FIGS. 28A, 28B, 29)

(IV) DEVICE CONTROL FUNCTIONAL ELEMENT (DCFE)
- (A) General Description (FIGS. 34, 35, 36, 37)
- (B) Reisters in DCFE
  - (1) Control register interface (FIG. 38)
  - (2) Monitor register interface (FIG. 40)
- (C) Control Routing Element (FIGS. 41, 42)
- (D) Monitor Routing Functional Element (FIGS. 43, 44)

(V) DETAILED DESCRIPTION OF THE MULTIPLEX CHANNEL UNIT (MCU)
- (A) MCU Functional Description
  - (1) General (FIG. 45)
  - (2) Data editing (FIG. 45)
  - (3) MCU sequence of operation
    - (a) Data output sequence (FIG. 46)
    - (b) Loop sync acquisition and data input sequence (FIG. 47)

(c) Operation in test mode (FIG. 45)
(B) Transfer Link Interface (FIGS. 45, 48)
(C) MCU Output Section (FIGS. 49, 50)
(D) MCU Input Section (FIGS. 51, 52)
(1) Bit synchronizing acquisition
(2) Loop sync acquisition
(3) Frame and frame group sync acquisition
(4) Editing and processing input data
(E) MCU Transfer Link Interface Circuitry (FIGS. 53,54)
(VI). DETAILED DESCRIPTION OF BUS REMOTE UNIT
(A) General (FIGS. 55, 56)
(B) Local Terminals (FIG. 57)
(1) Transmit mode (FIG. 57)
(2) Receive mode (FIG. 57)
(C) Remote Terminal (FIG. 58)
(1) Receive mode (FIG. 58)
(2) Transmit mode (FIG. 58)
(VII) DETAILED DISCUSSION OF MULTIPLEX LOOP CABLE (FIGS. 59, 60)

(I) GENERAL DESCRIPTION OF OPERATION

Figure 1:
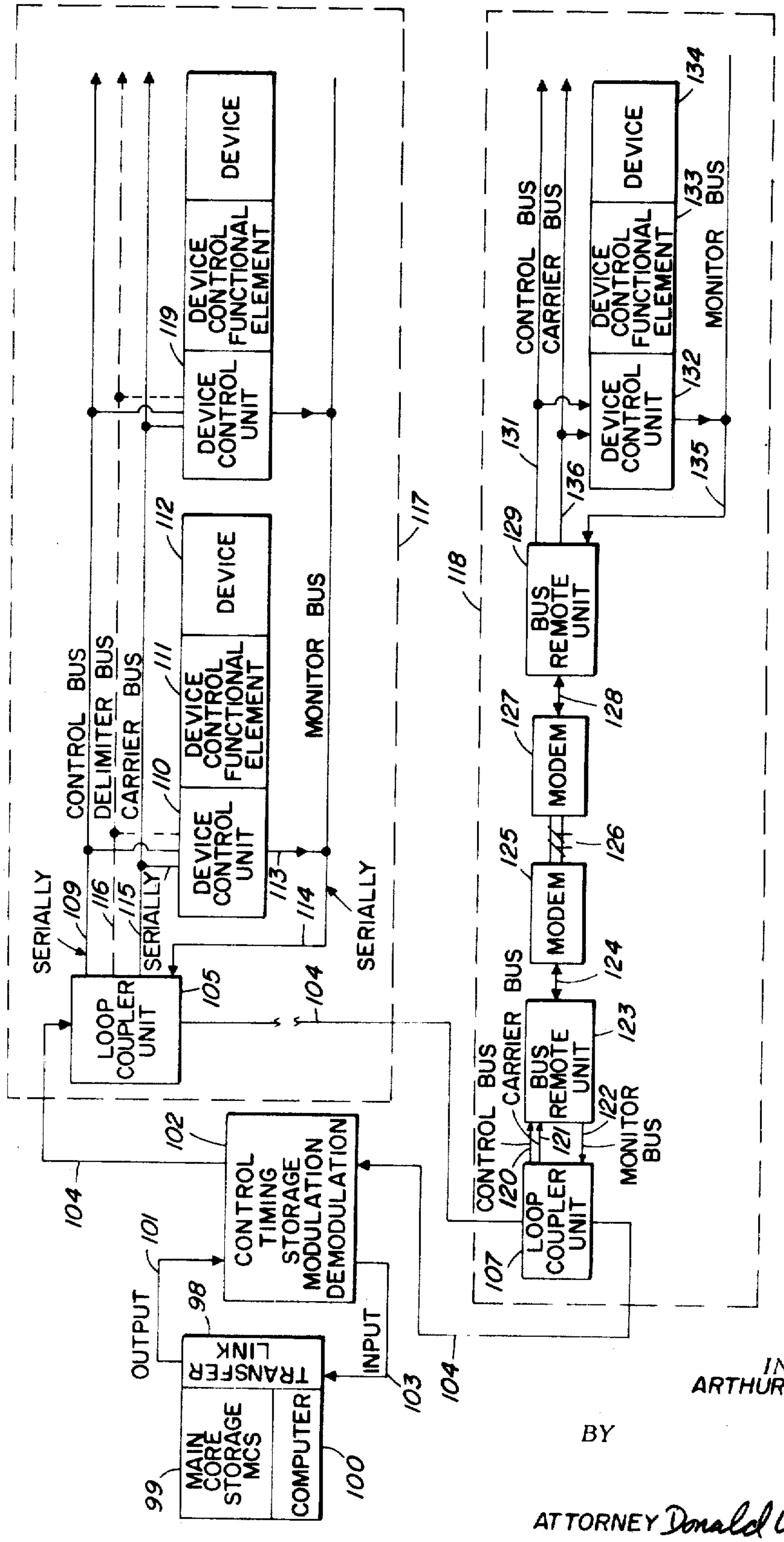
FIG. 1 is a general block diagram of the overall multiplex system.
Figure 2:
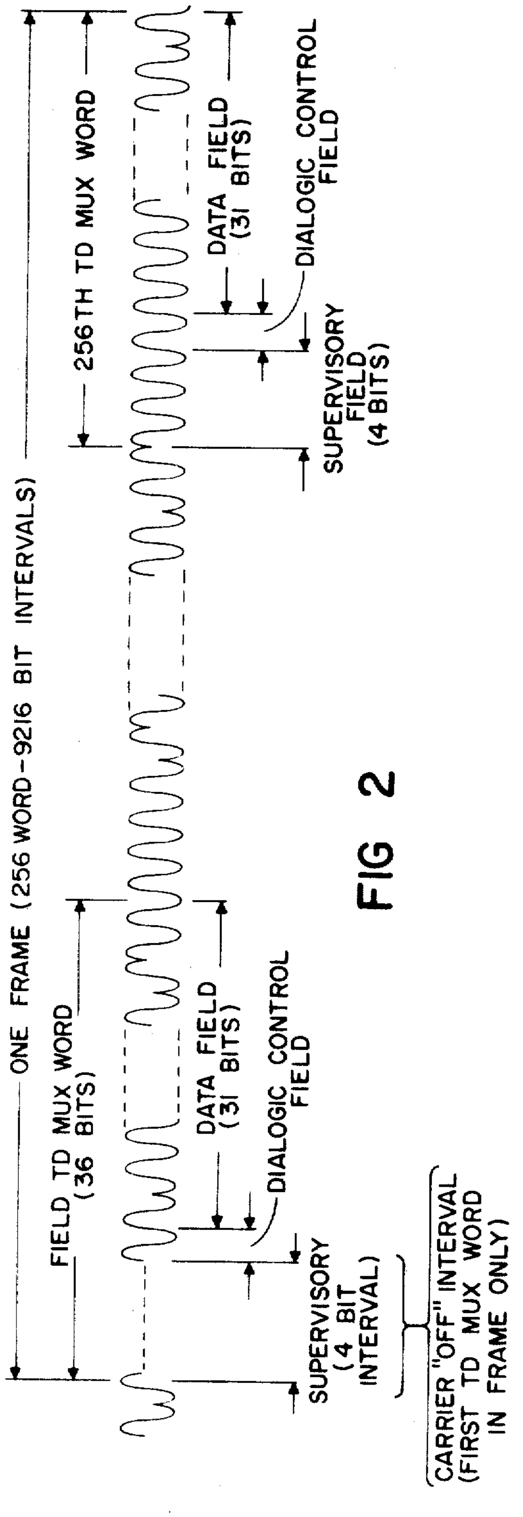
FIG. 2 is a waveform of the signal appearing on the multiplex loop with a sine wave carrier.
Figure 3:
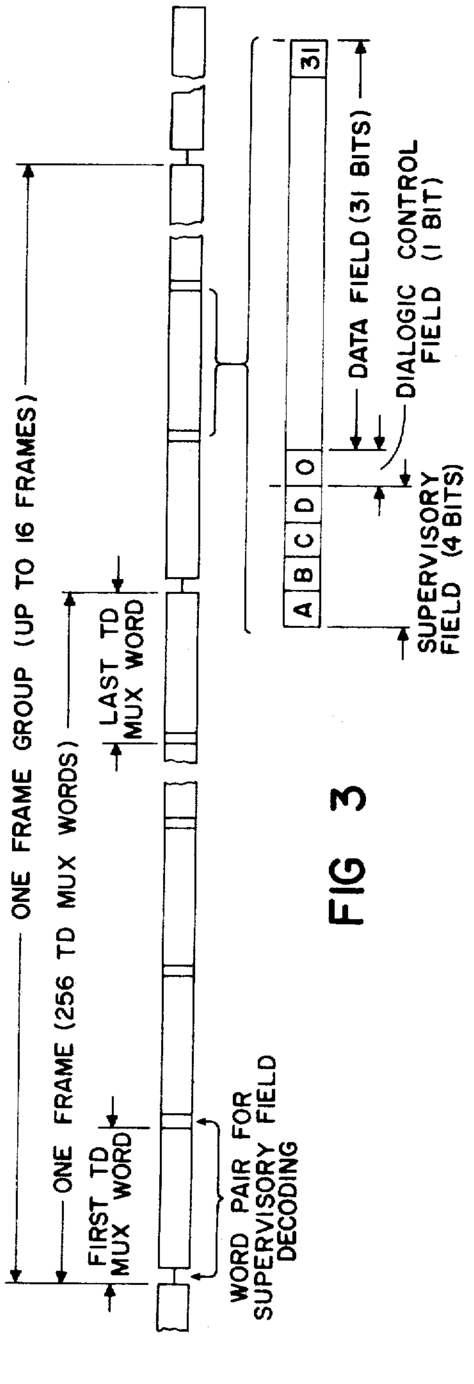
FIG. 3 is a chart showing the time division multiplex loop format.

(A) General structure of system (FIGS. 1, 2, 3)

Referring now to FIG. 1, there is shown a general block diagram of the invention. A computer 100 contains a table of words in its main core memory (MCS) 99. This table of words is defined herein as the Time Division Table (TDT) or more simply as the word table and preferably consists of $2^n$ words. Assume, for purposes of this specification, that the TDT contains 256 word locations, with each location containing a word, and that these 256 words are further defined as a frame. The MCU 102 sequentially and continually accesses the words in the table through a transfer link 98 and outputs them serially onto the loop 104 which couples into LCU's 105 and 107, and then back to an input of MCU 102. Each word supplied back to MCU 102 from loop 104 is stored in the same MCS word location from which the corresponding command word was accessed. Worded in another manner, each time slot in the data circulating in the loop has a particular word location in the MCS word table from which it receives words and to which it supplies words.

The MCU 102 is constructed to provide the necessary controls, timing, storage, and signal modulation and demodulation to transfer words between the MCS and the time division multiplex loop. The transfer link 98 grants access to memory 99, accepts an address and loads or unloads data into or from MCS 99. The format of the words supplied between the MCS and the MCU can either be parallel or series depending upon the particular design of the MCU. Such words usually are in parallel form, however.

However, words supplied from MCU 102 to loop 104 are in serial form and are time synchronous, with each word consisting of 36 bits, as shown in FIG. 2 or FIG. 3. In one form, the signal employed on the loop, as can be seen from FIG. 2, is a sine wave carrier at the data rate frequency. In some applications two-level logic signalling is employed, as will be described later herein.

In the sine wave signalling of FIG. 2, data is encoded in the phase of each cycle relative to the preceding cycle of carrier, with a binary "1" being represented by a zero phase shift and a binary "0" being represented by a 180° phase shift of the carrier for a one-cycle interval. The first four bits of each word constitute the supervisory field and, along with the fifth bit known as the dialogic control field, determines the status of a word at any given time in the time division multiplex loop and on the control and monitor buses, as will be discussed in more detail later. The last 31 bits comprise the data field and include a five or a seven bit address which identifies the specific device control unit for which the data is intended. Such five or seven bit address includes the sixth to the tenth or the sixth to the twelfth bit of the 36-bit word. The remainder of the word, consisting of twenty-four or twenty-six bits, depending on whether the address is seven or five bits long, constitutes the operator-operand field of the word.

Each LCU is constructed to count each word as it passes therethrough, measured from the frame start, and to respond to the words only in those time slots allocated to that LCU. In some usages of the equipment it is desirable to identify the time slot of each word by means of the encoding in the supervisory fields.

To accomplish such identification, the supervisory field comprising the first four bits of each word are grouped in pairs to define an eight-bit supervisory code.

To identify the start of a frame, i.e., the beginning of the first word of the 256 words comprising a frame, the four-bit supervisory field of such first word is in an off carrier state wherein no carrier is transmitted. This gap in carrier transmission is detected by the LCU's and thereby identifies the beginning of a frame.

For example, as shown in FIG. 3, the four-bit supervisory field of the first and the second word are grouped together to form an eight-bit supervisory field, the four-bit supervisory fields of the third and the fourth word are grouped together to fom an eight-bit supervisory field, and the four-bit supervisory fields of the fifth and the sixth words are grouped together to form an eight-bit supervisory field.

The first pair of words, that is the first and second words, are identified in the eight-bit supervisory field as pair No. 0, the second pair of words consisting of words 3 and 4 are identified as word pair No. 1, etc. Thus, pair No. 2, which consists of the fifth and the sixth words, has an eight-bit supervisory binary word 0000–0010. It is apparent that some means must be provided in the LCU units to store two words simultaneously in order to assemble the two four-bit supervisory fields of the two words and thereby determine which pair of words is passing through the LCU.

In those systems employing more than one frame of 256 words, some means is required in order to identify the specific frame passing through an LCU. Such identification is accomplished by encoding the two four-bit supervisory words of the last pair of words of each frame. Thus, for example, if there are 16 frames, each consisting of 256 words employed in the system, the first frame would be identified as frame 0 and the four-bit supervisory fields of the last two words would be 0000–0000. The four-bit supervisory fields of the last two words of the 16th frame, which would be identified as frame 15, would be 0000–1111, as shown in FIG. 3.

As stated above, each of the LCU units, such as LCU's 105 and 107 of FIG. 1, is constructed to respond to the words occupying particular time slots in each of the frames passing therethrough. For example, each LCU could be constructed to respond to one word in each train of words. Thus, if there were 16 frames, each LCU would respond to 16 words during the flow of the 16 frames therethrough. Alternatively, each LCU could be constructed to respond to two words in each frame, so that each LCU would respond to 32 words.

If, however, each LCU were constructed to respond to two words in each frame, the two words would be spaced apart in accordance with a power of two. For example, LCU 105 might be constructed to respond to the first word and the 17th word in each frame, and LCU 107 to the second word and the 18th word of each frame.

A third example would be the case where each LCU were constructed to respond to four words in each frame. Under these circumstances, a given LCU 105 would respond, for example, to the 1st, 9th, 17th, and 25th word of each frame, and LCU 107 to the 2nd, 10th, 18th, and 26th word of each frame.

By the above-identified multiplexing scheme, the rate at which words are received from the MCU is divided by the LCU by some power of 2; the lesser word rate being more compatible with the rate at which a device such as device 112 in FIG. 1, for example, can receive instructions.

As discussed above, the LCU's identify the time slots assigned thereto by recognizing the beginning of each frame and then simply counting each word as it passes through the LCU. Those words contained in the time slots assigned to a given LCU are diverted by the LCU into the control bus associated therewith.

Upon identifiaction of a command word directed thereto, the LCU will modify the four-bit supervisory field thereof in such a manner to indicate that the word is a proper one to be received by the addressed DCU and will supply said modified word to the control bus 109, which in turn is connected to a plurality of DCU's such as DCU's 110 and 119, arranged in parallel with respect to said control bus.

Each of said DCU's is constructed to examine the address of each word appearing on the control bus 109, and will respond only to its own unique address. Assume DCU 110 responds to the address of a particular word appearing on bus 109. DCU 110 will then function to pass the operator-operand field of such word to the device control functional element (DCFE) 111, which in turn will function to control the device 112. The device 112 can be, for example, a lathe, a drill press, a process controller, a printer, or any one of many mechanical or electrical devices.

Upon completion of its function, or if desired, simply upon receipt of the instruction, the DCFE 111 will generate a response signal which is supplied to DCU 110 which affixes the proper address to said instruction, encodes the supervisory field in a certain manner, and sets the dialogic bit to a zero. The 32-bit word, now being complete, is transmitted from DCU 110 to its output terminal 113 and then to the monitor bus 114 which carries said word back to LCU 105. LCU 105 stores said word until the corresponding time slot in the multiplex loop occurs, at which time LCU 105 will insert the word back into the multiplex loop.

The inserted word then propagates back through loop 104 and the other LCU's on the line, such as LCU 107, to MCU unit 102 which functions to place said received word into the proper address location in the time division table.

(I–A–1) Remote DCU's (FIG. 1)

As discussed above, many LCU's can be positioned along the multiplex loop. Many of these LCU units feed directly into DCU's as is illustrated by LCU 105, and DCU's 110 and 119. However, there are circumstances where it is desired to have an LCU control a device which might be many hundreds or even thousands of miles away from the LCU site. Under these circumstances it is necessary to encode the word intercepted by the LCU into a suitable form for transmission over long distances. At the remote receiver it is necessary to demodulate the word and supply it to the DCU's located at the receiver. The general logic of such a structure is shown in the dotted block 118 of FIG. 1.

In general, the output of LCU 107 is supplied to a bus remote unit (BRU) 123 which functions generally to adapt the information received to a form usable in modem 125. The output of modem 125 is then transmitted via telephone lines, for example, to a receive modem 127. The output of receive modem 127 is supplied to a bus remote unit 129 which functions to alter the information into a format usable by the DCU's, such as DCU 132.

In the reverse direction of operation, DCU 132 will supply a monitor bus word to BRU 129 which will appear to DCU 132 generally as an LCU and will supply the received data to modem 127, where it will be properly encoded. At the local site, modem 125 will receive, decode, and supply the decoded data to BRU 123. BRU 123 will then function as a DCU and supply the data to LCU 107.

It can be said that the local bus remote unit 123 functions as an interface to simulate one or more DCU's to LCU 107, while the bus remote unit 129 functions to generate the signals supplied to the control bus 131 and, in effect, simulates an LCU.

More specifically, input data from LCU 107 is processed and presented to modem 125 by means of BRU 123 at the proper bit rate. Both the local BTU 123 and the remote BRU 129 are designed to accept bus data at a 4800 Hz. signaling rate and present such data to modem 125 or modem 127, respectively, at an operating rate of 4800, 3600, 2400, or 1200 bits per second. BRU 123 and BRU 129 also accept data from modems 125 and 127, respectively, at 4800, 3600, 2400, or 1200 bits per second and present such data to monitor bus 122 and the control bus 131, respectively, at a 4800 Hz. signaling rate.

When operating at a 4800 bit per second modem rate, every word period is passed from the LCU 107 to modem 125. When operating at 3600 bits per second, three out of four word periods are passed to modem 125. When operating at 2400 bits per second, every other word period is passed to the modem, and when operating at 1200 bits per second, only every fourth word is passed to the modem. BRU 123 determines which word periods are to be passed by inspection of the seven-bit address field following the dialogic bit of the word from the LCU. It is, therefore, the interface program's responsibility to insure an all zero address in the proper number of word periods. For example, in the 2400 bit per second case, at least every other word period must contain an address field of all zeros. If more than every other word contains an all zero address, i.e., an idle word, idle words will be sent on the modem. At the remote end, the data is reconstituted and sent on the bus at 4800 Hz. Idle words are used as time differential characters.

Other functions and distinctions between the local and bus remote units 123 and 129 are as follows:

(1) The local BRU 123 contains the necessary logic to synchronize a signal appearing on monitor bus 122 to the signals appearing on control bus 120, so as to maintain the necessary 90° phase relationship (plus one bit) required for a word synchronization at the interface of the LCU 107. The necessity for said 90° phase (plus one bit) relation will be described in detail in a later section herein.

(2) The remote BRU 129 differentiates between on and off carrier on the monitor bus 135 and encodes this condition when sending data back to modem 127. The local BRU 123 either sends to modem 125 the data supplied to it from LCU 107, or alternatively, sends idle words to modem 125.

(3) The local BRU 123 accepts 4800 Hz. timing and generates from it the timing at the modem 125 data rate (1200, 2400, 3600, or 4800 bits per second) while the remote BRU 129 accepts timing from modem 127 and generates 4800 Hz. timing for the remote carrier bus 136.

(I–B) Various types of bus fields (FIGS. 4 and 5)

The four basic types of bus fields employed in the present system are as follows:

(1) Control Bus
(2) Monitor Bus
(3) Carrier Bus
(4) Delimiter Bus

The control bus generally carries the signals being transferred from an LCU to a DCU. The monitor bus carries a word being transmitted from the DCU to the LCU; the carrier bus carries synchronization signals; and the delimiter bus provides a word timing reference from the LCU's to the DCU's in applications utilizing logic level signaling.

Logic level signaling is a two-lever signaling system as opposed to the sine wave signaling system and can be employed, i.e., where the distances do not exceed 60 feet. By using logic level signaling, simplification of the bus termination circuit in the LCU's and the DCU's is obtained.

The general format of the control bus words and the monitor words is shown in FIGS. 4A to 4D. More specifically, in FIG. 4A there are shown three words: 200, 201, and 202, each consisting of four-bit supervisory field 204, a dialogic bit 203, and a data field of 31 bits. The 31 bit data field, as shown in FIG. 4B, is divided into a five or seven bit address field and a 26 or 24 bit operator-operand field.

The general organization of the monitor bus word is quite similar to that of the control bus word. In FIG. 4C, for example, the monitor bus word can be seen to consist of a four-bit supervisory field, a dialogic bit 206 and a 31-bit data field 207.

In FIG. 4D, the detail of the monitor bus word is shown. The data field can be seen to be broken down into a five or seven bit address field and a 26 or 24 bit monitor field.

(I–B–1) Bus fields utilizing sine wave signaling (FIG. 5)

In FIG. 5A there is shown the waveform of the control bus word utilizing sine wave signaling. The four-bit supervisory field 220 consists of a carrier-off condition. Such carrier-off condition is obtained in the following manner. When the LCU intercepts a word on the multiplex loop, the four-bit supervisory field of said word is modified by the LCU to have the carrier-off condition. The DCU's on the associated control bus respond to the four-bit carrier-off supervisory field to derive word synchronization therefrom.

The dialogic bit of the word control bus contains a "1" identifying the word as a control word that is to be received by the addressed DCU.

The monitor response words assembled by the DCU's have a carrier-on condition in their four-bit supervisory fields and contain a logic "0" in the dialogic bit position, as shown in FIG. 5B. The four-bit period supervisory field of carrier-on of a monitor word provides word synchronization at the LCU, and the dialogic bit "0" identifies the word as a monitor response word.

During those word periods when no monitor bus word is present, a carrier-off condition is maintained on the monitor bus for all 36 bit intervals of the word, i.e., when sine wave signaling is employed.

Bit timing synchronization to the DCU's is provided via the carrier bus sine wave signal at the bit rate frequency, as shown in FIG. 5C.

(I–B–2) Bus fields utilizing logic level signaling (FIG. 6)

The formats of bus words employing logic level signals are quite similar to those employing sine wave signaling except that a carrier-off condition in sine wave signaling is represented by all 0's in logic level signaling, necessitating the use of a separate line, called the delimiter bus, in two-level signaling to identify the supervisory field.

Figure 6B:
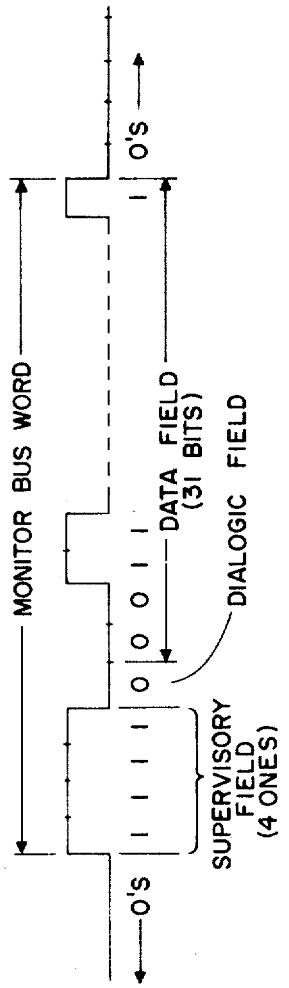
Figure 6C:
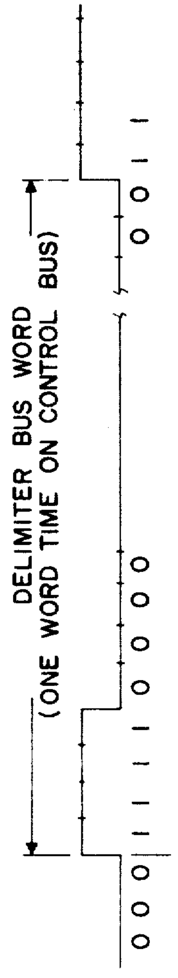

Reference is made to FIGS. 6A, 6B, and 6C which show, respectively, the format for the control bus word, the monitor bus word, and the delimiter bus word. In FIG. 6A the four-bit supervisory field is represented by four 0's and the dialogic field by a logic level 1.

As indicated above, the four 0's making up the supervisory field of the two-level monitor bus word are not employed by the DCU's to obtain word synchronization. The reason for the foregoing is that the DCU would be unable to distinguish the four 0's in the supervisory field from four consecutive 0's appearing at any other place in the word. Consequently, it is necessary to provide a third bus (the delimiter bus) which contains data, as shown in FIG. 6C. Specifically, the delimiter employed contains four 1's during the supervisory field period of the control bus word and contains 0's for the other 32 bits of the word. The delimiter bus word is generated in the LCU and is employed only when two-level logic is utilized.

In a control bus word the dialogic bit contains a binary 1 which identifies the word as a control word. Such dialogic field is labeled in FIG. 6A.

In FIG. 6B the monitor bus word, which is generated and assembled by a DCU, has a supervisory field consisting of four 1's and a dialogic bit of logic 0. Here again, the supervisory field consisting of four 1's is employed by the LCU to obtain word synchronization and the dialogic field of 0 indicates that the information was originated at a DCU and contains data.

(I–C) Half Duplex and Full Duplex Modes of Operation (I–C–1) Half duplex modes

In the half duplex mode (HDX), only one pending transaction is permitted on each DCU bus. This mode allows half synchronous operation between the device control program and the time division multiplex facility.

More specifically, in the half duplex mode, the system program in the computer cannot supply a second command to a given control bus until the program has received a response from the previous command, which response would appear on the associated monitor bus. The particular device whose DCU received the command must respond within a time interval not to exceed a maximum that has been specified for the application. When the DCFE/device indicates to the DCU that it is ready to respond, the DCU provides clocking pulses within the next control bus word to insure that the monitor bus word is returned to the LCU in proper word synchronism. The monitor bus word is delayed one bit (plus up to 90°) from the control bus word in order to maintain synchronism within the system. The reason for such delay will be described later in connection with detailed discussions of the LCU and the DCU.

The DCU will then generate the four-bit supervisory field, the binary 0 dialogic control bit showing the word to be a response from a DCU, and its own five or seven bit address. It will then clock the 24 or 26 data bits from the DCFE onto the monitor bus in serial manner. Also clocked onto the monitor bus immediately preceding the data bits are the four-bit supervisory field, the dialogic control bit, and the five or seven bit address.

Since a response is required from a given command on any given DCU before a second command can be given, a lack of response with the HDX type operation will tie up the facility. Such lack of response constitutes an error condition requiring time out and alarm, both at the device control program and at the device. The response time out requirements will vary according to the application. Typically, it will be in the order of two to three seconds.

Higher transaction rate for a given DCU signaling rate might be achieved by utilizing full duplex (FDX) operation where more than one sending transaction per device is permitted. In the FDX mode, several control words may be outputted from the computer to one or more DCU's prior to receipt of a monitor response from the first output control word.

(I–C–2) Full duplex mode

The full duplex mode permits more than one sending transaction at a time on a channel. In the FDX mode, the program may generate a multiple command to a given control bus, which commands are addressed to one or more DCU's, before receiving corresponding responses from the monitor bus of the channel. In the FDX mode, the following two characteristics are present:

(a) Each DCU responds in the next word period on its channel after the one in which the DCU receives a control word addressed to it. The time interval until the response is thus a function of the bus rate.

(b) The program must provide a guaranteed service interval to the time division table in main core memory (MCS).

If each DCU on a given bus is assigned the word contained in a given time slot on the loop, which time slot is different from that assigned to any other DCU on the bus, Item b above is not mandatory. The reason for the foregoing statement will be apparent when it is considered that if each DCU receives all words contained in a given time division address, then any response appearing in that time division address must necessarily originate at the associated DCU. On the other hand, where the DCU's do not have associated therewith a unique time division address in the FDX mode, it is necessary that the response from each DCU be determined by its relation, in terms of a guaranteed service interval, to the instruction addressed thereto.

In the FDX mode, the DCU will automatically initiate the transmission of a monitor word in the word period following recognition of its own address in a control word. Such initiation will consist of the generation in the DCU of the four-bit supervisory field, a binary zero dialogic bit, and a five or seven bit address, followed by 26 or 24 clock pulses to the DCFE to clock out the monitor response which is generated in the DCFE. This combined 36-bit monitor word will appear on the monitor bus in the word period immediately following (plus one bit plus 90°) the time of recognition of a command word on the control bus. It should be noted that the contents of the DCFE register will be clocked out automatically by the DCU, regardless of the state of the DCFE at that time.

(I–D) Division of functions (FIG. 7)

The entire system described above can be divided into two principal parts, namely, the communications facility and the physical I/O control program, as discussed below:

(I–D–1) Communication facility

The communications facility 250, as shown in FIG. 7, is comprised of all the equipment employed to move data back and forth between the time division table 252, in the computer core (MCS) and the DCFE 256, and specifically includes time division table 252, the MCU 253, loop 257, LCU 254, and the DCU's such as DCU 255.

Each word location of TDT 252 is allocated to a particular time slot on loop 257, and each of these word locations in the TDT at all times contain an image of the data circulating on the loop in the corresponding time slot. To provide the necessary correlation between each word location in TDT 252 and the corresponding time slot on the loop, there are provided in the MCU two counters; one of these counters functioning to provide for input into the TDT of words being received from the loop and the other counter functioning to provide for output of words from the various word locations of TDT onto the loop.

More specifically, at the beginning of each output frame, the output counter begins counting at the first word in the TDT table and sequentially accesses successive words, incrementing at the necessary rate so that the 36 bits of each word are supplied to the loop at a bit rate of 1.2288 mHz. Such incrementing rate is slightly less than 32 microseconds per word.

It is to be specifically noted that the word contained in each word location of TDT 252 is an exact duplication of a word circulating on the loop on the corresponding time slot.

The communications facility portion of the multiplex control system is sensitive to the dialogic control bit of each word circulating in the system to determine if the word is a control word or a monitor word. Consequently, the dialogic control bit must be used in accordance with specified procedures. More specifically, the dialogic control bit is employed to pass control between the DCU/device and the device control program. MCU 253 of FIG. 7 uses the dialogic bit to avoid repeating commands and to avoid overriding responses.

The specific mechanism employed to cause the single transfer of a command from time division table 252 in the main core of the computer is as follows. When a command word is accessed from TDT 252 by MCU 253 and the dialogic bit in the command word is determined to be a logic 1, the MCU outputs said command word to the loop. This command word circulates around the loop and returns to the MCU 253 in the same form as when transmitted by the MCU unless one of the LCU's, such as LCU 254 has replaced said command word with monitored response word, in which case the dialogic bit will have been changed to a logic 0.

If the command word with a dialogic bit of 1 returns to MCU 253, the MCU will function to reset all of the bits in the word to 0 except the dialogic bit, which will remain a 1, before writing the word back into TDT 252. This "all zeros" command is a no action command to all DCU's. The MCU 253 will continue to play this all zero command on the loop each cycle of the time division table 252, but will refrain from writing the word into MCS core each loop circulation until one of the DCU's responds with a monitor word to replace the all zeros command.

The monitor word is identified by a logic 0 in the dialogic bit field and is placed on the loop by the LCU associated with the DCU. For example, in FIG. 7 LCU 254 functions to place monitor words on the loop as a result of receiving such a word from DCU 255. The MCU, upon detection of a 0 dialogic bit on its input, will write the monitor word in its unaltered form into core in time division table 252. The next time and all subsequent times that MCU 253 accesses this particular word location in TDT and finds the dialogic bit to be 0, the MCU will alter the function to supply to the loop a no action command as defined above, wherein all of the bits except the dialogic bit are 0. The monitor word contained in time division table 252 remains unaltered. It should be noted that in actual operation the MCU functions to access the monitor word in the time division table, that is to say, it reads the word out of the time division table, examines it, and if it finds it to be a monitor word, will generate a no action command for the loop and will simultaneously return the unaltered monitor word into its appropriate word location in the time division table 252.

From the above discussion the following operational features can be set forth:

(1) A command word will be delivered once and only once to an LCU.

(2) A monitor word will be written to core in TDT 252 once and only once and will never be overwritten except by the replacement of a new monitor word by the LCU.

(3) The program servicing the TDT 252 need not operate in synchronism with the time division loop except insofar as to insure the handling of full duplex device requirements, as discussed generally above.

(I–D–2) Input/output program (PIOCP)

The program which controls the operation of the various DCFE/devices both as to the devices themselves and also with respect to cooperative effort among several such devices is contained in the PIOCP block 251 of FIG. 7. This block can, for example, represent a program stored in the main core (MCS) of the main data processor or it can be a program supplied into the data processor by some external means such as a magnetic tape or punched cards. The program stored in the PIOCP block 251 is known as a channel interface program, and when communicating with a particular DCFE/device, such as DCFE 256, must interface with the time division table 252. The normal flow of data from the channel interface program to a device starts with the insertion of information into the appropriate word division in the TDT. This information comes from the PIOCP 251 and consists of the dialogic control field and data field of the control bus word detail, as shown in FIG. 4B. At this point the word is 32 bits long since the four-bit supervisory field has not yet been added. Such supervisory field is added by appropriate logic contained in the MCU which logic will be described later herein. At the appropriate time this word is delivered from the MCU 253 to an LCU, such as LCU 254, and thence to the control bus and all connected DCU's. Conversely, the channel interface program 251 extracts monitor data from the TDT and processes such monitor data in accordance with the program.

(II) DETAILED DESCRIPTION OF THE LOOP COUPLER UNIT

In discussing the LCU unit which is shown in block diagram in FIG. 8, the general operation thereof will first be described. The logic of each block will subsequently be described in detail.

In FIG. 8 the data circulating in the loop is received by series unit 300 which functions generally as a gating circuit under control of various timing signals and control signals to control the flow of information from the loop into the DCU and from the DCU onto the loop. The series unit 300 also functions to pass data directly from the loop receive 298 to loop transmit 299 in those instances where the supervisory instructions in a word dictate that the word should be recirculated.

For example, a loss of synchronization due to a lack of a response from the DCU would cause the LCU to continuously pass the received loop signal through series unit 300. Similarly, an all zeros or no-action command will be transferred directly through the series units to the loop transmit 299.

Before proceeding with more discussion of the general block diagram of FIG. 8, the overall timing relationships involving data transfers between the multiplex loop and the DCU's will be considered. Assume the following specific set of conditions. Assume first that the bit rate on the loop is 1.2288 mHz. with a total of 256 36-bit words in a single frame and that only a single frame is on the loop. Thus there is a total of 9216 bits circulating on the loop. The time required for these 9216 bits to make one complete circulation around the loop, including going through the MCU, is 7500 microseconds. Since a word is 36 bits long, it requires a time interval of 29.3 microseconds for a 36-bit word to be received by the series unit 300 of FIG. 8. Similarly, it requires 29.3 microseconds for a word to be transferred from the LCU onto the loop.

Thus, once every 7500 microseconds there occurs a 29.3 microsecond time period during which a 36-bit word can be diverted from the loop and into an appropriate shift register means in the LCU and at the same time a word previously received from the monitor bus and stored in the same shift register means can be unloaded onto the multiplex loop at the 1.2288 mHz. rate.

During the remainder of the 7500 microseconds time interval, the shift register in the LCU delivers the words stored therein to the control bus at the much slower rate of 4800 bits per second, with each bit having a period of approximately 208 microseconds. Substantially simultaneously the 36-bit shift register is also receiving at its input a 32-bit word from the monitor bus also at a 4800 bit per second rate. Thus it can be seen that during the 29.3 microseconds of each complete loop circulation time the LCU is receiving a word from the loop and supplying a word onto the loop. During the remainder of the time the LCU is supplying a word to the control bus at a 4800 bit per second rate and substantially simultaneously receiving a word from the monitor bus at the 4800 bit per second rate.

Since only one 36-bit shift register is employed to accomplish these four different types of data transfers, it is apparent that the high bit rate transfers must occur during a time interval completely independent from the larger time interval during which the slow bit rate transfers occur. The reason why there is no conflict between the slow and fast transfers is that the word supplied from the shift register to the control bus has a four-bit supervisory period therein during which the condition thereof is carrier-off. Similarly, the word received by the shift register from the monitor bus has a four-bit supervisory period which contains no infomation and which has the equivalent of the carrier-off condition as it is supplied to the shift register. Since these two four-bit supervisory periods of the control bus word and the monitor bus word overlap by almost three bit periods, it can be seen that the high speed transfers into and from the shift register can be made during this overlapping period.

The foregoing can be more readily understood from an examination of the timing waveforms of FIG. 9 in which FIG. 9A shows the word rate of a frame consisting of 256 words. Word 20 has arbitrarily been selected as the word contained in the time slot allocated to a given LCU. In FIG. 9B there is shown the time slot pulses generated by a particular LCU which function to extract the corresponding word from the stream of data flowing through series unit 300 of FIG. 8. Thus, during the occurrence of time slot pulse 350 of FIG. 9B, which is generated by the sync and address recognition circuit 303 of FIG. 8, word 20 of FIG. 9A is supplied through series unit 300 of FIG. 8 from the loop demodulator and time recovery circuit 305 and then into speed change buffer 309 which contains the 36-bit storage shift register referred to in the preceding paragraph and wherein the bit rate of the words are changed.

At the termination of the time slot pulse 350 of FIG. 9B, the entire 36 bits of word 20 have been stored in the shift register of block 309 (FIG. 8) and immediately thereafter are begun to be read out of said shift register and onto the control bus 313 of FIG. 8 through bus demodulator 307, all of which will be discussed in more detail later. The control bus word is shown in FIG. 9B and can be seen to have a much slower bit rate than word 20 of FIG. 9A.

During the same time period (but delayed by approximately one and one-quarter bit period) the monitor bus word, as shown in FIG. 9E, is received at the input of the shift register in block 309 of FIG. 8.

It will be observed that the four-bit supervisory field of the control bus word, which occurs between time $t_1$ and $t_4$, overlaps the four-bit supervisory field of the monitor bus word which occurs between time $t_2$ and $t_5$, the overlapping period being the time interval $t_2$–$t_4$, which is equal to almost three bit periods at the 4800 bit per second rate. It is during this period, as can be seen from FIG. 9 that the time slot pulse 350 occurs to enable the high speed transfer of data.

It should be noted that bit 32 terminating at time $t_1$ is the last bit of the immediately prceeding control bus word and that the bit 32 in FIG. 9E terminating at time $t_2$ is the last bit of the immediately preceding monitor bus word.

The waveforms of FIGS. 9C, 9F, 9G, 9H, and 9I are all timing waveforms necessary for the transfer of data and will be discussed separately in connection with various blocks of FIG. 8. Generally, they function as follows:

The supervisory timing waveform of FIG. 9C is derived from the supervisory field of the control bus word of FIG. 9D, and is implemented by structure within the block 303 entitled "Synchronizing and Address Recognition Circuit" of FIG. 8. This supervisory timing pulse is employed basically to distinguish between the four-bit supervisory field of the control bus words and the monitor bus words, and the other 32 bits thereof.

The monitor response waveform of FIG. 9F is employed primarily to define the time interval when a monitor bus word, exclusive of the supervisory field, is being supplied to the 32-bit shift register in the speed change buffer 309 of FIG. 8.

The $T_x$ Enable waveform of FIG. 9G is a timing waveform generated by the data gate control 311 of FIG. 8 and performs the function of recognizing the fact that a monitor bus word has been stored in the speed change buffer shift register and signals the series unit 300 so that such word should be delivered onto the multiplex loop at the next time slot for the particular LCU involved.

The bus transfer clock waveform of FIG. 9H performs the function of transferring data during the positive transition thereof from the speed change buffer 309 of FIG. 8 onto the control bus. It will be noted that during the four-bit supervisory field of the control bus words, the bus transfer clock for FIG. 9H delivers no output. More specifically, its output is blocked by appropriate gating means, as will be seen later.

The loop transfer clock of waveform of FIG. 9I functions to produce a series of pulses at the control loop bit rate, which are gated to occur during the time slot 350 of FIG. 9B, and which function to transfer the words stored in the shift register of speed change buffer 309 of FIG. 8 through loop modulator 308 and then through series unit 300 and onto loop transmit 299.

Returning again to the block diagram of FIG. 8, the loop demodulator and timing recovery block 305 functions to derive bit timing and also data from the loop. Bit synchronization is accomplished over a relatively long integration period to assure immunity to random impulse noise. In FIG. 8 the bit synchronization signal is identified as locked timing and is supplied to the loop sync detector 302, the sync and address recognition circuit 303, the speed change buffer 309 and the loop modulator 308.

For purposes of obtaining loop sync timing, a limited signal, which is basically the input waveform amplified and squared, is supplied to loop sync detector 302 along with the locked timing. The loop sync detector 302 functions to identify the start of each frame period and supplies this loop synchronizing signal to the sync and address recognition circuit 303 which in turn responds thereto to generate a time slot.

This time slot pulse appearing on output lead 315 of the sync and address recognition circuit 303 of FIG. 8 and represented typically by pulse 350 of FIG. 9B is supplied to the speed change buffer 309, the data gate control block 311 of FIG. 8, and the supervisory timing unit 304. The application of this time slot pulse to the speed change buffer 309 activates gates within said speed change buffer to supply the locked timing appearing on lead 316 to the speed change buffer, and also to enter the received data on input lead 317 into the shift register of speed change buffer 309 at the locked timing rate, which is the high speed rate of the loop.

Simultaneously, the time slot pulse 350, along with a sync pulse from sync and address recognition circuit 303 and a monitor response from detector 312 will generate a $T_x$ Enable pulse from gate 311 which is supplied to the series unit 300 to permit reception thereby of data from loop modulator 308 and subsequent transmission thereof onto loop transmit circuit 299.

The timing signals discussed in the immediately preceding paragraphs relate to the high speed bit rate of the loop and, more specifically, relate to the high speed timing required to transfer information between the loop and the speed change buffer. It is also necessary, as discussed above, to transfer information from the speed change buffer to the control bus 313 at the much slower rate of the control bus. Such timing is derived from the sync timing originating in the loop timing system. More specifically, the time base 306 is constructed to respond to the time slot output signal of sync and address recognition circuit 303 to initiate the slower bus rate timing, which in the example being discussed is 4800 bits per second.

Such bus timing is supplied to the bus modulator 307, the bus demodulator 310, and to the speed change buffer 309. The speed change buffer 309 is responsive to the 4800 bit per second bus timing to unload word stored in the 36-bit shift register contained therein into the bus modulator 307 where the signal is modulated into the A-C type signal shown in the waveform of FIG. 5A. It is to be noted that the bus modulator 307 also contains appropriate logic circuit to respond to the bus timing to sample the incoming data from the shift register at the appropriate time, and at the 4800 bit per second rate.

Similarly, with respect to data being supplied from the monitor bus to the speed change buffer, the bus demodulator 310 is responsive to the bus timing to gate the modulator 307 where the signal is modulated into the speed change buffer at the proper 4800 bit per second rate. The transfer of data occurs on lead 314 and the timing signals are present on lead 318.

Since the monitor bus word is not always present on the monitor bus during each cycle of the loop, some means are necessary to indicate the presence or absence of a monitor bus ward. Such means are included within the monitor response detector 312 which functions to recognize a unique coding in the supervisory field of the monitor bus word and if such supervisory field indicates the presence of a monitor response word, then to supply a monitor response pulse to the speed change buffer 309 and to the data gate control circuit 311 via lead 319. In the absence of such a monitor response word, the speed change buffer will not accept information from the bus demodulator, nor will there be produced an output from the data gate control circuit 311. The reason for such lack of output from data gate control 311 in the absence of a monitor response pulse is that there would have been no monitor bus word stored in the speed change buffer during that cycle of operation of the loop. Consequently, there would be nothing to transfer from the speed change buffer to the loop.

The output lead 320 from supervisory timing unit 304 is also connected to the delimiter bus 320. As will be recalled a delimiter timing signal is required when logic level signaling is employed rather than phase modulation. The reason for the separate delimiter bus is as follows:

When phase modulation (or sine wave) signaling is employed, there are three states inherent therein; specifically, the signal can be zero phase, 180° phase, or an off-carrier condition can exist. When logic level signaling is employed, an off-carrier condition would be the equivalent to one level of the signal and, consequently, would be indistinguishable from four consecutive bits of that level. Therefore, a separate bus called the delimiter bus is employed to define the four-bit supervisory field of the word in a logic level signalling of mode.

The carrier bus 321 carries the timing for the DCU's which timing is derived from the time base block 306 and the bus demodulator circuit 307 and is at a 4800 bit per second rate.

The individual blocks of FIG. 8 will now be discussed separately.

(II–A) Speed Change Buffer (FIG. 10)

The speed change buffer is the heart of the LCU unit in that it provides both the storage for the information passing back and forth between the loop and the DCU bus and also provides the change of bit rate required in the loop and on the DCU bus.

Most of the timing signals developed in the various blocks in FIG. 8 and the modulating and demodulating functions of FIG. 8 are connected to the speed change buffer as can be seen from an examination of FIG. 10 which shows a logic diagram thereof.

In FIG. 10 there is provided a shift register 370 comprised of 32 stages of which stage 1, 2, and 32 are shown and designated, respectively, by reference characters 366, 367, and 368. This one shift register performs all the functions of storage in transferring information between the loop and the DCU bus and also provides the function of changing the bit rate thereof.

Consider first the function of reading high speed data from the loop into the shift register and then transferring high speed data from the shift register back to the loop. The data from the loop is supplied to input 350 of AND gate 357 in FIG. 10. It should be noted that all of the data in the loop is supplied to input lead 350 of FIG. 10 through demodulating circuit 305 of FIG. 8. However, only during the occurrence of the time slot pulse for the particular LCU unit involved does data pass through the AND gate 357 and into the shift register of FIG. 10. Such time slot pulse is supplied to the other input 351 of AND gate 357 so that during the selected time slot the selected word is supplied through AND gate 357, OR gate 361 and into stage 366 of shift register circuit 370.

The shifting of information along the shift register is accomplished by shift pulses derived from the locked timing synchronizing waveform supplied to input 354 of AND gate 359. The locked timing synchronizing signal is derived from the loop demodulating and timing recovery circuit 305 of FIG. 8.

In FIG. 10 it will be seen that the time slot pulse is also supplied to the AND gate 359 so that a burst of locked timing pulses is passed through the AND gate 359 at the same time that the data is supplied to AND gate 357. Such locked timing pulses then pass through the OR gate 362 and are supplied to the clock input lead of all of the stages of shift register 370. In this context the locked timing synchronizing signal is denoted as the clock signal.

Thus the data is entered into the shift register 370 and advanced along the various stages thereof until the 32 bits of the word are contained one each in the 32 stages of the shift register 370.

It is to be specifically noted that the four-bit supervisory field of each word is not entered into the shift register; only the dialogic bit and the 31-bit data field are entered into said shift register. The specific logic means employed to accomplish the foregoing will be discussed later in connection with the discussion of the sync and address recognition unit 303 of FIG. 8.

At the same time that the 32 bits are being read into shift register 370 at the high speed loop rate, a monitor word that had already been entered into and stored in the shift register from the monitor bus is shifted out onto output lead 369 through loop modulator 308 of FIG. 8 to series unit 300. Thus the shifting out of a word from the shift register onto the loop and the shifting into the shift register of the 32-bit words from the loop are accomplished simultaneously.

As discussed above, the high speed transfer of data into and out of the shift register occurs during the supervisory field interval of the much slower control bus word. Reference is made to FIG. 9B wherein a typical time slot, such as time slot 350, can be seen to occur during the supervisory field of the control bus word of FIG. 9D and the monitor bus word of FIG. 9E.

Consider now in more detail the transfer of a monitor bus word into the shift register and the transfer of a control bus word from the shift register onto the control bus.

In the case of the transfer of the monitor bus word to the shift register, the monitor bus data is supplied to an input 352 of AND gate 358. To a second input lead 353 of AND gate 358 there is supplied the inverse of the time slot pulse which functions to prevent any signal from passing through AND gate 358 during the time that the high speed data is being read into and out of the shift register 370. On the third input lead 371 of AND gate 358 there is supplied a not supervisory timing pulse, which functions generally to prevent passage of information through AND gate 358 during the four-bit supervisory field of the monitor bus data. For reasons that will be discussed later, the monitor bus data is delayed from the control bus data by one and one-quater bit intervals. Consequently, the not supervisory timing supplied to the input 371 of AND gate 358 is also delayed by one and one-quarter bit intervals, as can be seen from the waveforms of FIGS. 9E and 9D. The reason for preventing information from passing through AND gate 358 at this time is to avoid conflict with the high speed data being transferred through AND gate 357 during the time slot, which occurs during the supervisory timing pulse, delayed 1.25 bits.

Thus the monitor bus data is supplied through AND gate 358 and through the OR gate 361 to the shift register beginning at the time marked $t_5$ in FIG. 9F. The shift pulses supplied to the shift register during entry of a monitor bus word are supplied via input lead 356 of AND gate 360 and are derived directly from the output 321 of bus modulator 307 of FIG. 8. These timing pulses are shown in FIG. 9H and can be seen to form a rectangular waveform. The actual shifting of information occurs on the positive transition of the bus timing waveform of FIG. 9H, which is a 4800 bit per second rate.

At the same time that a monitor bus word is being entered into the shift register 370, a control bus word that had been stored therein during the previous time slot is shifted out of said shift register and into bus modulator 307 of FIG. 8, and thence onto the control bus 313.

The time base 306 of FIG. 8 is designed in such a manner that upon termination of a time slot pulse, such as time slot pulse 350 of FIG. 9B, the time interval for the first bit of the control bus word begins, as can be seen at time $t_4$ of FIG. 9D. Because of certain practical considerations, which will be described in more detail later, the monitor bus word formed by one of the DCO units is delayed with respect to the co-existing control bus word by about 1.25 bit periods. This delay can be seen by a comparison of the waveforms of FIGS. 9D and 9E.

(II–B) Series Units (FIG. 11)

The information circulating in the loop is received by the AGC controlled amplifier 401 which functions to amplify and reshape the data to a desired amplitude and form. All of the amplified data is then supplied to the loop demodulator and timing recovery circuit 305 of FIG. 8. Then, by means of timing circuits in the LCU, only that word contained in the time slot allocated to the particular LCU involved is entered into the speed change buffer 309 of FIG. 8 and then sent out onto the DCU bus in the general manner described hereinbefore. All of the remaining words (time slots) circulating in the loop are blocked from entering into the speed change buffer.

All of the data circulating in the loop is also supplied, with one exception, through AND gate 403, summing circuit 404, output amplifier 405, and onto the loop transmit 299', where it continues to circulate. The one exception is during the occurrence of a $T_x$ Enable pulse from data gate control circuit 311 of FIG. 8. The $T_x$ Enable pulse is supplied onto input lead 411 of FIG. 11 and then through inverter 407 to AND gate 403. Specifically, the presence of a $T_x$ Enable pulse in its inverted form functions to block transmission of data through AND gate 403. During this time, gate 406 is energized by the $T_x$ Enable pulse so that data from loop modulator circuit 308 of FIG. 8 is supplied through AND gate 406, summing circuit 404, output amplifier 405 and onto loop transmit 299'.

Thus, in effect, the word from the loop modulator 308 replaces a corresponding word in the loop. The two AND gates 403 and 406 operate under the control of the $T_x$ Enable output as a switch so that when one gate is open the other is closed.

In the event that an LCU begins to function improperly, such as for example in the event of a power supply failure, it is necessary to completely disconnect the LCU from the loop. Otherwise, it would be quite possible for the LCU to read false information, not only into its own time slot in the loop, but also into time slots allocated to other LCU's.

To accomplish such LCU disconnect quickly, there is provided a loop relay means 414 which, when energized by the output from relay driver 410, can be seen to shunt the LCU unit through lead 419. More specifically, when the power sensing circuit 409 detects a fault in the operation of power supply 408, the relay driver circuit 410 energizes winding 418 of relay 414 Energization of winding 418 closes the armature 416 upon the contact 415 from the normal position shown in FIG. 11, thereby shunting the LCU unit through lead 419. When winding 418 is de-energized relay armature 416 returns to make contact with contact 420.

(II–C) Loop Demodulating and Modulator Circuit and Timing Recovery Circuit (FIGS. 12, 13)

In FIG. 12 there is shown logic diagram for the loop demodulator and timing recovery circuit 305 of FIG. 8 and also the loop modulator circuit 308 of FIG. 8.

Considering first the demodulator circuit, the received signal from output lead 402 of the series unit of FIG. 11 is supplied to limiter and amplifier 423 which functions to produce from the received biphase A-C signal the two-level signal of FIG. 13B. This limited signal is supplied via lead 425 to the loop sync detector 302 of FIG. 8 and performs a function which will be discussed in detail in connection with the logic diagram of said loop sync detector 302.

In order to transform the limited signal from amplifier 423 into a non-return-to-zero (NRZ), the limited signal is supplied to a digital exclusive OR circuit 424. Also supplied to exclusive OR circuit 425 is the locked timing signal from clock source 440 of FIG. 12, which locked timing (clock pulse) is shown in FIG. 13A.

The exclusive OR circuit 424 compares the limited signal and the locked timing signal to produce the non-return-to-zero $R_x$ data signal of FIG. 13C, wherein the upper level represents a binary 1 and the lower level represents a binary 0. The time interval $t_1$–$t_2$ of FIG. 13B represents the supervisory field of the received word during which there is a carrier-off condition. During such time period, the output of the exclusive OR circuit 424 of FIG. 12 is a series of pulses 450, 451, 452, and 453 in the R data waveform of FIG. 13C.

The $R_x$ data waveform can be seen from FIG. 12 to be supplied not only to the loop synch detector 302 of FIG. 8, but also to the speed change buffer 309. The locked timing is also supplied to loop sync detector 302 and speed change buffer 309. The function of the $R_x$ data and the locked timing with respect to the speed change buffer has been described hereinbefore. The function of the limited signal, the $R_x$ data signal, and the locked timing signal, as relates to loop synch detector 302, will be discussed in a following section.

The locked timing signal is derived from the received signal. More specifically, the output of the limiter and amplifier circuit 423 is supplied through a frequency doubler and filter circuit 432. Such doubled frequency is then supplied through a phase detector 433, a low-pass filter 434, and then to variable control oscillator 435, which is phase locked with the output of the frequency doubler via phase lock loop 436.

The output of variable control oscillator 435 is then supplied to frequency divider 437 which produces two outputs having opposite phases on leads 438 and 439, respectively. The reason for such two outputs is because of the possible ambiguity in the clock pulse. The clock phase selection logic 440, under control of the sync verify pulse supplied via lead 455, functions to resolve the phase ambiguity of the clock pulse so that the locked timing on locked timing bus 427 is of the proper phase.

The modulator included in block 456 of FIG. 12 includes an analog exclusive OR circuit 444. Supplied to this OR circuit 444 are two signals. One of these signals is the two-level NRZ data signal supplied via lead 446 from the speed change buffer 309 of FIG. 8, as shown in FIG. 15A. The other signal is a filtered locked timing signal, as shown in FIG. 15B. The filter 441 responds to the two-level clock pulse from clock 440 to produce the sine wave locked timing signal of FIG. 15B.

In response to the two signals supplied to exclusive OR circuit 444 there is produced the bi-phase sine wave signal of FIG. 15C which is supplied directly to the series unit 300 of FIG. 8.

(II–D) Loop Sync Detector (FIGS. 13, 14, 15)

The loop sync detector circuit of FIG. 14 continuously monitors the received data applied thereto on input lead 460 to detect and verify the presence of two successive framing periods, each of exactly four bits duration, in the loop. Once synchronization has been obtained, the address (time slot) recognition unilogic, shown in FIG. 15A, is enabled. The data will be accepted from, and replaced in, the assigned time slot as long as synchronization is maintained.

The circuit of FIG. 14 is designed to meet certain criteria for determining synchronization and permitting data exchange. Such criteria are as follows:

(1) When not in synchronization (i.e., initial power-on or synchronization loss), the first carrier-off period of exactly four bits duration will produce a reset count which will function to reset all the counters of the synchronization and address recognition unit of FIG. 14. A second carrier-off period of exactly four bits duration must occur at the predicted sync interval to achieve synchronization. Once synchronization has been achieved, the data exchange can occur.

(2) When in synchronization, failure to recognize an exact four bit carrier-off period at the predicted sync interval will result in conditional sync. Data will be accepted and passed onto the DCU bus, but data insertion into a loop will not be permitted. One subsequent verified recognition will restore synchronization status.

(3) When in synchronization, any detected carrier-off period of four or more cycles at any count other than the predicted sync intervals or four successive non-verified carrier-off periods at the predicted sync interval is defined as being out of sync.

Generally speaking, the circuit of FIG. 14 can be divided into four major portions. The first major portion is a two-phase counter contained within the block 462 which functions generally to recognize a carrier-off period of exactly four bits duration. The second major portion is contained within block 485 and contains the conditional sync flip-flop 470 which operates in response to the recognition of the first carrier-off period of four bits duration. The third major portion includes the flip-flop circuit 472 which is energized when two consecutive carrier-off periods of four bits duration are detected. The fourth major area is that logic within block 486 and in general performs the function of detecting an out-of-sync condition and then returns the circuit to a conditional sync condition.

The flip-flop circuits 463, 464, 470, and 472 of FIG. 14 are conventional. Specifically, each flip-flop has a set and a reset input labeled S and R, respectively, and a trigger impulse input marked T. The flip-flops are activated by the plus-to-minus transition of the pulse supplied to the trigger input. Thus, for example, flip-flop 463 would be triggered by the plus-to-minus transition of waveform 13D at time $t_2$.

Flip-flops 464, 470, and 472 are, however, constructed a little differently from flip-flop 463 in that they do not have connections from the Q and $\overline{Q}$ outputs back to the reset and set inputs as does flip-flop 463. This difference in structure manifests itself in that it enables flip-flop 463 to change state each time a plus-to-minus transition is supplied to the trigger input T. More specifically, if a high level output (a binary 1) happens to exist on the $\overline{Q}$ output of flip-flop 463 at a given time, such 1 will also be supplied back to the set input through leads 489. Then when a trigger pulse is supplied to the trigger input T, the flip-flop will shift its state so that a high level output (a binary 1) will appear on the output Q thereof and a zero will appear on the output $\overline{Q}$.

Such operation is not present in the construction of flip-flops 464, 470, and 472 since there are no cross connections from the Q outputs back to the set and reset inputs. These latter three flip-flops require that a 1, for example, be supplied to the reset input at the time that a trigger pulse is supplied to the input pulse in order for a 1 to appear at the $\overline{Q}$ output. Similarly, it is necessary that a 1 appear on the set input in order for a trigger pulse to produce a 1 at the Q output.

In operation of the circuit of FIG. 14, the $R_x$ data waveform of FIG. 13C is supplied to input lead 460 and passes through inverter 461 to produce the $\overline{R}_x$ data output of FIG. 13D. Prior to the first plus-to-negative transition of the $\overline{R}_x$ data input which occurs at time $t_2$ in FIG. 13D, the condition of flip-flops 463 and 464, which are designated also as flip-flops #1 and #2, is as shown in the first row of the truth table of FIG. 14A which is the starting condition. It will be noticed that $Q_1$ outputs and the $Q_2$ outputs of the two flip-flops are both zero.

When the first positive-to-negative transition occurs at time $t_2$ in FIG. 13D, which occurs with bit #1 in the left-hand column of the truth table, the flip-flop 463 shifts its state so that a 1 appears at its Q output. Such a 1 will also be supplied to the set input S of flip-flop #2. There will, however, be no change in the Q output of flip-flop #2 at this time.

At time $t_3$ the second positive-to-negative transition of the $\overline{R}_x$ input occurs and flip-flop #1 will reverse states again so that a 0 appears on its Q output, which 0 input will also be supplied to the set input of flip-flop #2. Because, however, of the 1 existing on the set input of flip-flop #2 at the time of trigger pulse, the Q output of flip-flop #2 is changed to a 1, as shown in the truth table.

At time $t_4$ when the third positive-to-negative transition is supplied to the T input of flip-flop #1, said set flip-flop #1 will again shift phase so that a 1 appears at its Q output. Such 1 will also appear on the set input of flip-flop #2. However, there will be no change in the Q outputs of flip-flop #2 at this time. Thus, at this time, there will be 1's on the Q outputs of both flip-flops #1 and #2 so that AND gate 465 will be energized to supply a 1 through an input lead to each of AND gates 471 and 469.

Since a 1 existed at the $\overline{Q}$ output of conditional sync flip-flop 470 at this time, there will be a 1 at the output of AND gate 469, so that at the next plus-to-minus transition of the locked timing supplied on input lead 467 and occurring at time $t_5$ in FIG. 13, the conditional sync flip-flop 470 will change states, so that a 1 will appear at the Q output thereof. The 0 then appearing at the $\overline{Q}$ output of flip-flop 470 represents the conditional synchronizing state and is supplied to the data gate control 311 of FIG. 8 via lead 490 to the loop sync detector, as shown in FIG. 14.

The 1 appearing at the Q output of conditional sync flip-flop 470 is supplied to one of the inputs of AND gate 471. As can be seen from the waveform of FIG. 13E, the sync verify flip-flops 463 and 464 are reset at time $t_7$ by the positive-going pulse of the limited signals supplied via input lead 466, thus producing a 0 at the output of AND gate 465 which is connected to the upper input lead of AND gate 471.

However, if at the next predicted sync interval there occurs four bits of carrier-off condition the sync verify circuit 462 will again count so that a 1 is produced at the output of AND gate 465.

Thus there are 1's at the second consecutive occurrence of four bits of off-carrier signals. There will then appear 1's on the upper two input leads of AND gate 471. If at the same time the predicted sync interval pulse is supplied through lead 468 to the bottom input lead of AND gate 471 there will appear a 1 at the output of AND gate 471 which will be supplied to the set input of flip-flop 472. Then upon the subsequent positive-to-negative transition of the locked timing pulse the flip-flop 472 will have a 1 produced on its Q output so that a sync indicating potential will be produced on lead 497 (491 of FIG. 16 is identical). Thus synchronism has been established.

It should be noted that when conditional sync was initially established, the pulse generator 473 was energized to produce a pulse to reset counters 500 and 501 of FIG. 15A. As will be discussed in connection with FIG. 15A, the predicted sync interval pulse appearing at the output of AND gate 502 is produced by a certain count of counters 500 and 501 and, more specifically, will occur during the first four counts of the next word following the establishment of the conditional sync. Such predicted sync interval will appear on input lead 468 of FIG. 14.

Once in synchronism, failure to recognize an exact four bit carrier-off period at the predicted sync interval, will result in conditional sync. The foregoing occurs in the following manner. In the absence of recognizing an exact four bit carrier-off period by sync verifier 462, there will be produced a 1 at the output of inverter 474, which 1 will be supplied to AND gate 476. A 1 will also be supplied to a second input of AND gate 476 from the Q output of conditional sync flip-flop 470. When the predicted sync interval on input lead 468 occurs a 1 will be produced at the output of AND gate 476, which will reset sync flip-flop 472 to produce a 0 on the Q output and a 1 on the $\overline{Q}$ output thereof. Thus the sync signal appearing on lead 497 will no longer exist. Only the conditional sync signal on 490 will be supplied to the data gate control 311 of FIG. 8.

Another example of how synchronization is lost is as follows: When in synchronization any detected carrier-off period of four or more cycles at any count other than the predicted sync intervals or, alternatively, four successive nonverified carrier-off periods at the predicted sync interval is defined as out of sync.

Considering the latter case first i.e., the occurrence of four successive nonverified carrier-off periods, the operation is as follows. The output of inverter 474 will be a 1 during each of these nonverified carrier-off periods and will be supplied to AND gate 477. Also supplied to AND gate 477 is the predicted sync interval. If four such occurrences occur consecutively, the output of the sync loss counter is supplied to an OR gate 480 and sent to the reset sides of both the conditional flip-flop 470 and the sync flip-flop 472 to return the circuit to its state of nonsynchronization. Similarly, if a detected carrier-off period of four or more cycles occurs at any count other than the predicted sync intervals AND gate 478 will be energized to produce a 1 which passes through OR gate 480 to again reset both the conditional sync flip-flop 470 and sync flip-flop 472.

In the event that before four successive nonverified carrier-off periods occur, there occurs at least one verified carrier-off period, AND gate 498 will be energized to reset sync loss counter 479 to 0.

It will be noticed that pulse generator 473 functions to generate a reset count only under the following conditions. Firstly, when the $\overline{Q}$ output of the conditional sync flip-flop 470 changes from a 1 to 0 and, secondly, when both the conditional sync flip-flop 470 and the sync flip-flop 472 are reset so that 1's appear on the $\overline{Q}$ outputs thereof.

(II–E) Synchronization and Address Recognition Unit (FIG. 15A)

In FIG. 15A the logic diagram of the synchronization and address recognition unit is shown along with its relation to the loop sync detector 510 which is shown in detail in FIG. 14, and also with respect to the various signals generated in the loop demodulator and timing recovery circuit of FIG. 12.

The operation of the circuit of FIG. 15 is generally as follows:

The counter reset pulse generated by the loop sync detector 510 and appearing on output lead 503 of the loop sync detector is employed to reset the counters 500 and 501 to zero at the beginning of each frame.

The counter 500 counts cyclically to 36 and, in effect, counts each word under control of the input from the locked timing signal appearing on bus 504. Counter 501 counts to 256 and functions to count each of the 256 words in a frame and is under control of the output of bit counter 500.

Each of the counts of counter 501 is supplied to the time slot selector 505 which is essentially a coincidence circuit. The input leads 506 are strapped in such a manner as to represent a particular time slot for word positions in the frame. Then when the count of counter 501 coincides with the address strapped onto the leads 506, the time slot selector will be energized to produce a time slot pulse on output lead 508. The determination of coincidence is made under control of the locked timing appearing on bus 504.

The counter blocks 509 and 510 provide for the situation where more than one frame is circulating on the loop. More specifically, blocks 509 and 510 will accommodate 16 frames on the loop as indicated by the count of 16 in counter 509.

Recognition of the particular frame is accomplished by the frame group synchronizing unit 510 which has four input leads 511, 512, 513, and 514 thereto. The lead 511 defines the last word in each frame and the lead 512 defines the time interval containing the first four bits of the last word in the frame. Such first four bits, which constitute the supervisory field of the last word in the frame, contain the binary number representing the particular frame being sampled.

It is, of course, necessary to examine the particular data contained in this supervisory field. This examination is provided by means of the input data which is supplied to the frame group synchronizing unit 510 through input lead 514. The fourth input lead 513 carries the locked timing clock impulses.

The counter 509 can be seen to be under control of the output of counter 501 and counts one increment for each frame in the loop up to a total of 16 frames. The output of frame group synchronizing unit 510 appearing on leads 516 functions to reset the counter 16 to zero at the proper time.

It is to be noted that in the particular embodiment of the invention being defined herein, there is but one frame circulating on the loop. It is possible, however, to have 16 frames, 8 frames, 32 frames, or in general $2^n$ frames circulating on the loop, where $n$ is an integer.

Assume, however, for purposes of discussion, that only one frame is circulating on the loop. Consider, then, the generation of the predicted sync interval pulse appearing on lead 490' of FIG. 15A. Such a synchronizing pulse is generated by the outputs of counters 500 and 501 and AND gate 502. More specifically, at the coincidence of word zero, as indicated on output lead 517 from counter 501, and the count of zero to four during such word, as indicated by the output lead 518 of counter 500, the AND gate 502 will produce the predicted sync interval output. Such output pulse is supplied to the loop sync detector 510 via lead 490' (468 of FIG. 14).

(II–F) Supervisory Timing Unit (FIG. 16)

The supervisory timing signal is generated by the logic of FIG. 16 and performs several functions in the LCU units. Generally, the supervisory timing pulse functions to define the four-bit supervisory field of the control bus word and also the four-bit supervisory field of the monitor bus word. Since the monitor bus word is delayed by approximately 1.25 bits from the corresponding control bus word, the supervisory timing pulse must also be delayed by a corresponding amount to properly identify the supervisory field of the monitor response word.

Reference is again made to the waveforms of FIG. 9 and, specifically, to the waveforms of FIGS. 9C, 9D, 9E, and 9F which show the relation of the supervisory timing field to the supervisory field of the control bus word and the monitor bus word.

It is necessary to identify and define the four-bit supervisory field of the control and monitor bus words, not only to properly code these supervisory fields, but also to determine the nature of the words.

The supervisory timing pulse is referenced from the time slot pulse, such as time slot pulse 350 of FIG. 9B, and is obtained by the logic of FIG. 16 in the following manner.

A time slot pulse is supplied to a pulse generator 537 from output lead 508 of the sync and address recognition unit of FIG. 15. The pulse generator 537 responds to the trailing edge of said time slot pulse to produce a pulse which resets flip-flop 535, thus terminating an existing supervisory timing pulse, such as a timing pulse 540 of FIG. 9C, and initiating a clock means which, in turn, will define the beginning of the next supervisory timing pulse.

More specifically, when flip-flop 535 is reset, AND gate 532 is opened; i.e., becomes conductive, assuming that the system is in sync and a high level signal exists on the input lead 539 to AND gate 532.

The output of AND gate 532 functions to enable bit counter 534 to count in response to the bus timing clock pulses supplied thereto on lead 533. The bus timing pulses are shown in the waveform of FIG. 9H and in the particular example being discussed in this discussion of the LCU unit, occur at a 4800 kHz. rate. At the termination of 32 such bus timing clock pulses (time $t_1$ in FIG. 9), the 31 bit data field and the dialogic bit of the control bus word being transmitted will have been shifted onto the control bus, and counter 534 of FIG. 16 will produce an output pulse to set flip-flop 535 and initiate another supervisory timing pulse which, in turn, will be terminated four bit periods later by the trailing edge of the next time slot pulse at time $t_4$.

The flip-flop 531 has three inputs: a set, reset, and a trigger input. The synchronizing pulse is supplied to the set input and then upon the occurrence of the trailing edge of the time slot pulse supplied to the trigger input, the Q output of flip-flop 531 will have a 1 thereon, indicating the in-sync condition.

In the event that the equipment is not in sync, flip-flop 531 will be reset by the time slot pulse because of the non-sync signal level applied to reset input 530.

(II–G) Bus Modulator and Demodulator Logic (FIG. 17)

The control data supplied from speed change buffer 309 of FIG. 8 to the bus modulator 307 is a two-level waveform and must be altered into the biphase sine wave signal form. Conversely, the data from the monitor bus which is supplied to the bus demodulator 310 of FIG. 8 is in the biphase sine waveform and must be changed into the two-level form in order to be supplied to speed change buffer 309. In FIG. 17 there is shown the logic required to effect these changes in the signal waveform.

The bus timing from the time base 306 of FIG. 8 is employed in both transformations. In FIG. 17 such bus timing is supplied via lead 533'' directly to filter 552 and also to a digital exclusive OR gate 555. The output of the filter 552 is a sine wave, such as shown in waveform 559 which, in turn, is supplied to phase gate 550. Such phase gate 550 is part of the bus demodulator circuit. Also supplied to the phase gate 550 is control data from the speed change buffer and is represented by the waveform 561 of FIG. 17.

The phase gate 550 responds to the waveform 561 to supply at its output either the uninverted form of the sine wave 559 supplied thereto, or the inverted waveform thereof, depending on the level of the control data signal 561. The output of the phase gate 550 is shown in waveform 562 and, as can be seen, is the biphase sine waveform of signal. Such biphase sine wave signal is supplied to a driver 551 where it is amplified and then supplied to the control bus.

The supervisory timing pulse signal is also supplied to driver 551 via lead input 538' to cut off said driver during said supervisory timing pulse. Since the supervisory timing pulse is coincident with the four-bit supervisory field of the control bus signal, said four-bit supervisory field will contain a carrier-off condition.

Referring now to the bus demodulator portion of FIG. 17, the monitor bus signal, which is a biphase sine wave signal, as shown in waveform 563, is supplied to terminating limiter amplifier circuit 554 which functions to produce the waveform 564. Digital exclusive OR gate 555 responds to the limited signal 564 and also to the bus timing signal present on lead 533″ to produce the two-level monitor data waveform 565 which is supplied to the speed change buffer through low pass filter 556.

The output of driver 553 is the carrier bus signal, as shown by waveform 560, and is supplied onto the carrier bus. Utilization of the carrier bus signal will be more fully understood from the discussion of the device control unit (DCU) to be described in detail later herein.

(II–H) Monitor Response Detector (FIGS. 18, 19)

The monitor response detector 312 of FIG. 8 functions to produce a monitor response pulse in response to the presence of a monitor word on the monitor bus. At the end of said monitor bus word, i.e., after it has been entered into the speed change buffer 309, the data gate control 311 will respond to the monitor response pulse when it occurs simultaneously with the synchronizing pulse and with the time slot pulse to produce a $T_x$ Enable pulse at its output. Such $T_x$ Enable pulse will function to open a gate in the series unit 300 to permit the aforesaid monitor bus word to be transferred at high speed out of the speed change buffer 309 through loop modulator 308, into the series unit 300, and then onto the loop transmit cable 299 at the high speed bit rate of the loop.

The monitor response detector is shown in the logic diagram of FIG. 18, and the relevant waveforms are shown in FIG. 19. It will be noted that the waveforms of FIG. 19 are identified by capital letters A through I.

In the operation of the structure of FIG. 18, the monitor bus signal (19A) is supplied from monitor bus 575 to a full wave rectifier 576, the output of which is supplied to smoothing filter 577. The output of the smoothing filter 577 is shown in FIG. 19B and is supplied to one input of AND gate 578. It is to be noted that smoothing filter 577 only has an output in the presence of four cycles of carrier-on during the four-bit supervisory field between time $t_0$ and time $t_4$. The presence of such four cycles of carrier-on indicates the existence of a monitor bus word on the monitor bus.

Thus, AND gate 578 has an output which increases substantially as the rising potential of the output of smoothing filter 577. At time $t_1$–$t_3$ the output of AND gate 578 becomes large enough to trigger flip-flop 579. More specifically, at that time the input to terminal J of flip-flop 579 is sufficiently large so that the minus-to-plus transition of the bus timing supplied to the clock pulse input 585 of flip-flop 579 will cause flip-flop 579 to set and have a 1 on its Q output. The Q output of flip-flop 579 is shown in the waveform of FIG. 19F with the upper level representing a 1 and the lower level representing a 0.

Assume, for discussion purposes, that flip-flop 579 was set at time $t_3$ so that a 1 appears on the Q output 582 at time $t_3$ which 1 is supplied to the J input of flip-flop 580. At the plus-to-minus transition of supervisory timing wave form of FIG. 19C (time $t_4$), which is supplied to the clock input 590 of flip-flop 580, said flip-flop 580 will set to produce a 1 on the Q output, as shown in FIG. 19G at time $t_4$. This output is identified herein as the monitor response output and, in turn, is supplied to an input of AND gate 595. Said monitor response signal is also supplied to the K input of flip-flop 580 which is clocked at input 591 on the plus-to-minus transition of the time slot pulse of FIG. 19H. Thus, at time $t_9$ the flip-flop 580 will be reset to place a 0 on its Q output, as shown at time $t_9$ in FIG. 19G.

During the presence of the time slot pulse, i.e., during the time period $t_8$–$t_9$, however, AND gate 595 has a 1 on its output lead 592, assuming that a sync pulse is supplied to the third input of AND gate 595 during this time period $t_8$–$t_9$. The synchronizing pulse referred to is the synchronizing pulse appearing on output lead 497 of the loop sync detector shown in FIG. 14.

It is to be noted that the flip-flop 579 is reset at time $t_6$ which occurs at the end of the transfer of the bus monitor word into the shift register of the speed change buffer.

If, during the next four-bit supervisory field occurring between times $t_6$ and $t_{10}$, there is a carrier-off condition indicating the absence of a monitor bus word, the output of the smoothing filter 577 of FIG. 18 will decay towards zero as shown after time $t_6$. Consequently, flip-flop 579 will not become reset again. Then, since the Q output of flip-flop 579 has a 0 thereon, the flip-flop 580 will not be set at the plus-to-minus transition of the supervisory timing occurring at time $t_{10}$, thus maintaining a 0 on the Q output 589 of flip-flop 580. Consequently, AND gate 595 is blocked and no $T_x$ Enable pulse will be generated at the occurrence of the next time slot, which is not shown in FIG. 19.

It will be seen from an examination of the waveforms of FIG. 19F and FIG. 19G that there is no time conflict between the operation of flip-flops 579 and 580. More specifically, the flip-flop 579 is set at either time $t_1$ or time $t_3$ and a 1 appears on Q output 582 thereof at that time. However, the output of flip-flop 580 cannot be changed until the plus-to-minus transition of the supervisory timing waveform of FIG. 19C, which plus-to-minus transition does not occur until time $t_4$. Consequently, a time slot pulse of FIG. 19H (occurring during time $t_2$–$t_3$) will function to reset flip-flop 580 at time $t_3$ at least a full bit period before flip-flop 580 will react to the new condition of flip-flop 579.

(III) DETAILED DESCRIPTION OF DEVICE CONTROL UNIT (DCU)

(III–A) General Description (FIG. 19A)

As dicussed above in the specification, the DCU is that part of the time division multiplex loop communication system which interfaces the digitally controlled device, such as a lathe for example, with the communications channel. The device control functional elements (DCFE), which have not yet been discussed in detail, are digital interphase elements that form the input portion of the device, such as a lathe, which is to be controlled.

The general block diagram of the DCU unit is shown in FIG. 19A and can be divided into two main functional sections. The first of these sections is identified herein as the DCU bus section and is contained within the dotted block 617. The second section is identified herein as the timing/transfer section and is contained within the block 618. Generally speaking, the DCU bus function interfaces with the DCU bus which, in turn, interfaces with the LCU unit. The DCU bus includes the delimiter bus 320′, the control bus 313′, the carrier bus 321′, and the monitor bus 612. The timing transfer functions within the block 618 interfaces with the DCFE through the various lines 603, 604, 611, 609, and 613 of FIG. 19A.

Referring again to the DCU bus section with block 617, such section contains those circuits which are necessary to detect the control and carrier bus signals present on the control bus 313′ (and the delimiter bus 320′ in the case of a two-state signalling mode), and the carrier bus 321′, and also functions to generate the monitor bus signals on bus 612. The received and generated signals may be either of two forms; that is, the three state sine wave type signal, or the two state signal discussed hereinbefore and illustrated in FIGS. 5 and 6.

Where three state sine wave signalling is employed, the four-bit carrier-off period during the supervisory field intervals of FIG. 5A is employed by the DCU to obtain word synchronization, as will be discussed in detail later. With the two state signalling mode, the four-bit interval of high level signal, shown in FIG. 6C and appearing on the delimiter bus, is employed to obtain word synchronization.

The two state signalling technique offers a simpler DCU because of the simplification of the modulators, demodulators, and synchronization circuits and, as discussed above, can be employed in applications where there is close proximity between the LCU and its associated DCU's and where the cable bandwidth and the freedom from noise are independent of external effects commonly encountered over long line connections.

For the purposes of this discussion, it will be assumed that the three state sine wave signalling mode is employed. Where necessary, descriptive matter will be directed to the two state mode in order to enable the reader to understand both modes. However, the two state mode for the most part can readily be understood by those skilled in the art from the description of the three state mode.

In FIG. 19A the input signal from the control bus (the waveform of FIG. 21A) is supplied to the demodulator terminator circuit 600 where it is amplified, limited, and then applied to the input of an exclusive OR circuit contained in circuit 600 and which will be shown in detail later. The carrier bus signal is similarly shaped and used as the other input to the exclusive OR circuit and is identified as the bit clock, and is shown in FIG. 21C. The output of the OR circuit is the demodulated control bus word shown in FIG. 21F, which is supplied to the address recognition circuit 616 of FIG. 19A, the synchronizing detector 601, and also to the DCFE via lead 603. The limited signal generated in the demodulator terminator block 600 is supplied to the sync detector 601 via lead 602.

It is to be noted in the circuit of FIG. 19A that the delimiter bus is represented by a dashed line 320' and that leads 602 and 603 and a part of 603 from the demodulator terminator 600 are represented by dotted lines. The remaining leads are represented by solid lines. The solid lines represent those connections that are common to both the two state and the three state signalling modes. The dotted lines represent those connnections which are used only in the three state signalling mode. The dashed lines of delimiter bus 320' represents a lead which is employed only in the two state signalling mode.

The sync detector 601 responds to the control data signal and the limited signal supplied thereto to generate from a flip-flop located therein, a synchronizing signal output as shown in the waveform of FIG. 24F. Such sync signal exists during the entire 32 bits of the data field and indicates that synchronization of the system has been obtained.

Further, such sync signal is received by the time base circuit 606 which responds thereto and also to the carrier bus signal to generate the various timing signals employed in the DCU. The time base circuit also provides for certain control signals which inform the DCFE's that data may be passed between the DCU and the DCFE.

As a prerequisite for information passing from the DCU to the DCFE, however, it is necessary that the address of a particular word be identified as being the address of the particular DCU location. To effect address recognition there is supplied the address recognition circuit 616 which recognizes the proper address and enables AND gate 610. The output of AND gate 610 is supplied to a control gate in the DCFE (not shown) and functions to permit the word to pass from the DCU to the DCFE via control data lead 603 of FIG. 19A.

Words are received from the DCFE into the DCU via lead 613 and under control of the monitor gate signal appearing on lead 609 of FIG. 19A. The monitor data is represented by the waveform of FIG. 29D and is supplied to the modulator control 1612 of FIG. 19A. The modulator coitrol 1612 is under the control of certain gating signals, including the monitor gate signal appearing on lead 609, and is also under control of the carrier gate signal appearing on lead 607. Said carrier gate signal is shown in FIG. 33F and functions, primarily, to define the supervisory field of the monitor bus word being formed and to cause said supervisory field to consist ultimately of binary 1's.

Under control of the modulator control circuit 1612 is the modulator driver circuit 611 which, in effect, transforms the carrier bus signal, which is a sine wave supplied thereto via lead 321', into the sine wave data. More specifically, the modulator driver 611 contains means for inverting the carrier bus signal so that either the uninverted or the inverted form of the carrier bus signal can be gated to the monitor bus 612 to form the monitor bus word.

(III–B) Demodulator/terminator Circuit (FIGS. 20A, 20B, 21, 22)

In FIG. 20A there is shown a block diagram of the demodulator/terminator 600 of FIG. 19A when the three state sine wave signalling mode is employed. The incoming sine wave data on control bus 313'' is supplied to amplifier and limiter 620 which produces the waveform shown in FIG. 21B. Such limited signal is supplied to the sync detector 601 of FIG. 19A and is also supplied to the exclusive OR gate 623 of FIG. 20A.

Also supplied to exclusive OR gate 623 via lead 604' is the not bit clock signals shown in FIG. 21C. The output of exclusive OR gate 623 is the two-level signal shown in FIG. 21D which can be seen to contain noise spikes caused by imperfect combining of the signals in the exclusive OR gate.

The output of the exclusive OR gate 623 is then supplied to low pass filter 625, which produces an output waveform, as shown in FIG. 21E. After squaring of the waveform of FIG. 21E by squaring amplifier 626 of FIG. 20A, there is produced the clean waveform of FIG. 21F which comprises the control data signal. It is to be specifically noted that the control data signal of FIG. 21F is delayed from the signal received on the control bus by approximately one-quarter bit. In order that the interface timing be the same for the three state sine wave signalling mode as for the two state signalling mode, the two state signal is also passed through a low pass filter, as shown in FIG. 20B. The control data signal appearing on output lead 603' of FIG. 20A is the signal which, in FIG. 19A, is supplied to sync detector 601, the address recognition circuit 616, and to the DCFE via lead 603.

Referring now specifically to FIG. 20B, there is shown the block diagram of the demodulator employed when a two state signal rather than the three state sine wave signal is present on the control bus. Such two-level signal is shown in FIG. 22A and is supplied to terminator 628. The terminator 628 amplifies the signal and supplies it in square waveform to low pass filter 629 which produces at its output the waveform of FIG. 22B. Such a waveform, when passed through the squaring amplifier 630, will result in a control data word, as shown in FIG. 22C, which is delayed approximately one-quarter of a bit period from the control bus word initially supplied to the terminator 628.

The control data word appearing on the output terminal 603'' is supplied to the same places as the control data word appearing on the output terminal 603' of FIG. 20A.

(III–C) Synchronizing Signal Detector (FIGS. 23, 24, 25)

The logic diagram of the synchronizing signal detector, referred to herein as the sync detector, is shown in FIG. 23 with pertinent timing diagrams being shown in FIGS. 24 and 25.

The principal function of the sync detector is to determine the location of the control bus word transitions by detecting the four-bit carrier-off interval which occurs at the start of each word interval. It should be noted that in the case of a two state control bus word, the delimiter bus signal is detected by the sync detector in order to establish the locations of the bus word transitions.

The criteria on which the sync detector operates are listed below:

(1) When not in synchronization, the first four-bit carrier-off interval (or the first four logic ones on the delimiter bus) detected will result in an in-sync condition.

(2) When in sync, a four-bit carrier-off interval (or four logic ones in the delimiter bus) not occurring during the predicted interval will result in an out-of-sync condition.

(3) When in sync, a four-bit carrier-off interval (or four logic ones of the delimiter bus) occurring during some other time than the predicted interval will result in an out-of-sync condition.

Referring now to FIG. 23, assume that the bus word is a three state sine wave signal. Under such circumstances, the control data is supplied from the demodulator/terminator/terminator circuit 600 of FIG. 19A through lead 655 to the trigger terminal T of flip-flop 630 of sync interval counter 658.

As can be seen from the waveform of FIG. 24B of the control data signals, four pulses 659, 660, 661, and 662 occur during the supervisory field. Since these pulses occur consecutively, the sync interval counter 658 will count in the manner shown in waveforms of FIGS. 24C, 24D, and 24E. More specifically, the plus-to-minus transitions of each of the pulses 659 through 662 change the state of flip-flop 630. Thus, at time $t_0$, which corresponds to the plus-to-minus transition of the first pulse of pulses 659 through 662, flip-flop 630 changes from a reset condition to a set condition so that there is a 1 on the Q output thereof. At the next plus-to-minus transfer, which occurs at time $t_1$ of the trailing edge of pulse 660 of FIG. 24D, the flip-flop 630 will change states again so that the Q output has a 0 (lower level) thereon. Similarly, at times $t_2$ and $t_3$ the flip-flop 630 will change states.

The second stage of counter 658 (flip-flop 631) responds to plus-to-minus transitions of the first flip-flop 630. Thus at time $t_1$ and $t_3$ the second flip-flop 631 changes states, as shown in FIG. 24D.

The third flip-flop 632 changes at the plus-to-minus transitions of second flip-flop 631. Thus at time $t_3$ flip-flop 632 changes from a reset to a set condition so that a 1 appears on the output theerof.

At this same time, $t_3$, the plus-to-minus transition of the not Q ($\overline{Q}$) output of flip-flop 632 will pass through the AND gate 633 to trigger sync flip-flop 634 to its set condition so that a 1 appears on the Q output 646 thereof.

It is to be understood that prior to the setting of flip-flop 634, a 1 existed on the $\overline{Q}$ output which was supplied back through lead 652 to the second input of AND gate 633, thus permitting the plus-to-minus transition of the $\overline{Q}$ output of flip-flop 632 to pass through the AND gate 633 at time $t_3$ and set flip-flop 634.

If at any time during the occurrence of the four pulses 659 through 662 of waveform of FIG. 24B, there had occurred a plus-to-minus transition of the limited signal supplied through lead 602' and lead 656 to the DC reset inputs of flip-flops 630, 631, and 632, all three of said flip-flops would have been reset, thus necessitating the count of four in the sync interval counter 658 to begin again from zero.

Thus it can be seen that if sync interval counter 658 reaches the count of four before being reset by the limited signal of FIG. 24A and the sync flip-flop 634 is not set (i.e., a 1 on the Q output), criteria #1, which is set forth above, is satisfied and sync flip-flop 634 is set to the in-sync condition.

Now, once sync flip-flop 634 is set and there is an output on the synch output lead 635, it is necessary that future counts of four in sync interval counter 658 coincide with a sync gate pulse which is supplied to input lead 605' of FIG. 23 and which is shown in waveform 24H. The sync gating pulse of FIG. 24H is derived from the time base circuit 606 of FIG. 19A and, more specifically, is generated as a result of the generation of the sync pulse on output lead 635 of FIG. 23. Thus, when the equipment is initially started out there is no sync gate pulse and the first four consecutive pulses appearing in the control data applied to input lead 603'' of FIG. 23 will function to generate the sync condition without the presence of a sync gate pulse. However, each time thereafter that four consecutive pulses occur in the control data, without a plus-to-minus transition of the limited signal of FIG. 24A, there must be an accompanying sync gate pulse, as shown in FIG. 24H. Otherwise, the system will go out of sync. The logic implementing the above function will now be discussed.

Assume that four pulses, such as pulses 659 through 662 of FIG. 24B, occur in the absence of a sync gate when the system is already in sync. Under these conditions, there will be a 1 supplied to the middle input terminal of AND gate 642 from the Q output of sync flip-flop 634 of FIG. 23. There will also be a pulse generated from pulse generator 639, as shown in FIG. 24G, as a result of the resetting of flip-flop 632 at time $t_4$, by the plus-to-minus transition of the limited signal. If, during the occurrence of the pulse 660 of FIG. 24G there is no sync gate pulse, then the output of inverter 637 will be positive and there will be a high level, i.e., a 1 output from AND gate 642. Such a 1 output will pass through OR gate 643 and lead 644 to reset sync flip-flop 63, thus placing an out-of-sync voltage level on the output lead 635.

A second condition where sync is lost occurs when a four-bit carrier-off interval does not occur during the predicted time. For example, if the sync gate pulse 1661 of FIG. 24H had occurred and had not been preceded by four pulses, such as 659 through 662 of FIG. 24B, and the equipment had been in sync up to that time, an out-of-sync condition would be initiated in the follwing manner. The middle input of AND gate 641 has a 1 thereon from the Q output of sync flip-flop 634. The input 645 of AND gate 641 has a 1 thereon since flip-flop 632 is in a reset condition. Upon occurrence of the sync gate pulse of FIG. 24H there will be generated a sync pulse 1662 of FIG. 24I by pulse generator 638 which will be supplied to the third input lead 647 of AND gate 641, thus generating a 1 at the output of AND gate 641, which 1 will pass through OR gate 643 and lead 644 to reset sync flip-flop 634 to a non-sync indicating condition.

A third instance where a non-sync condition of the equipment occurs is when more than four consecutive pulses occur on the control data without the occurrence of a plus-to-minus transition of the limited signal. Under such conditions the sync interval counter 658 will count beyond four and to five. At the count of five there will be ones on both input leads of AND gate 640 so that a 1 will be produced on the output thereof, which 1 will pass through OR gate 643 and lead 644 to reset the sync flip-flop 634 to a non-sync indicating condition.

In FIG. 25 there is shown timing diagram for the case where a two-level signal mode rather than a three state signalling mode is employed. In FIG. 23 when the two state signalling mode is employed, the bit clock is supplied to the trigger input of flip-flop 630 of the counter via input lead 604' and the signal on the delimiter bus is supplied to the DC reset of the counter flip-flops via input lead 320''. The signal on the delimiter bus and the bit clock waveform are shown in waveforms 25A and 25B, respectively. The pulse 669 on the delimiter bus defines the four-bit supervisory field and permits the operation of the sync interval counter 658 of FIG. 23 during such four-bit period. Thus the negative transitions of the four-bit clock pulses 665 through 668 of FIG. 25B will function to operate the counter 658 to produce the waveforms of FIGS. 25C, 25D, and 25E in substantially the same manner as discussed in connection with the waveforms of FIG. 24. The waveforms of FIGS. 25G, 25H, and 25I are also formed in the same manner as those formed in the case where a three-level signal is employed.

One of rather minor differences between the two sets of timing diagrams of FIGS. 24 and 25 is that the control data waveform of FIG. 24B is delayed a quarter bit, whereas the bit clock timing of FIG. 25B is not. Consequently, all of the waveforms of FIGS. 24C through 24I are delayed a quarter bit as compared to the corresponding waveforms of FIGS. 25C through 25I since such waveforms are determined by the plus-to-minus transitions of the control data and the bit clock timing pulses of FIGS. 24 and 25, respectively.

(III–D) Time Base (FIGS. 32, 33)

The block diagram of the time base circuit 606 of FIG. 19A is shown in FIG. 32. Such time base circuit is controlled entirely by the sync signal from the synchronizing detector 601 of FIG. 19A and from the carrier bus signal appearing on leads 321″ of FIG. 32 (lead 321′ of FIG. 19A). The time base circuit of FIG. 32 generates all of the gating intervals required by both the DCU and the DCFE. Such timing signals are shown in the waveforms of FIGS. 33A through 33F.

In its operation the time base circuit of FIG. 32 accepts a continuous signal at the bit rate from the carrier bus 321″. Such carrier bus signal is first amplified and then limited by means 676. The resulting square wave is shown in FIG. 33A and is the bit clock signal of the system. Such bit clock is supplied both to the DCFE via lead 604′ in FIG. 32 and also to the 36-bit counter 675.

Said 36-count counter is held in a reset condition as long as the DCU is in an out-of-sync condition. On obtaining sync, i.e., when the sync signal is present on input lead 635″, the reset is removed and the counter 675 begins to count. As long as the reset is not present, counter 675 will count continuously, automatically recycling to count zero at the start of the data field. In addition to the clock signal of FIG. 33A, the time base generates the other timing signals shown in the waveforms of FIG. 33, all of which timing signals are identified in the general block diagram of the DCU shown in FIG. 19A.

The uses of the timing signals are, generally, as follows: The sync gate signal of FIG. 33B is employed by the sync detector to predict the interval that the supervisory field should occupy, as discussed above in connection with the description of the synchronizing detector 601 of FIG. 19A.

The address gate of FIG. 33C is employed by the address recognition circuit 616 of FIG. 19A to define the interval when the address field of the control word is shifted into the address store. A strapping option identified generally by block 678 of FIG. 32 is employed to set the length of the address gate, which length usually is either five or seven bits.

At the end of the address gate time of FIG. 33C, the siganl on output lead 680′ of the count decoder 677 of FIG. 32 goes positive and is ANDed with the address recognition signal appearing on lead 619′ of FIG. 32 to produce the control gate signal of FIG. 33D which is used by the DCFE to determine when to shift the remaining data bits (31 minus the address bits) of the control bus word from the DCU to the DCFE. The monitor gate signal shown in FIG. 33E is used by the DCFE to determine when to shift the 32 data bits of the monitor bus word back from the DCFE to the DCU.

Finally, the carrier gate signal of FIG. 33F is used by the modulator driver control shown generally as block 611 of FIG. 19A to determine when to generate the four intervals of logic 1 at the beginning of each transmitted monitor bus word.

Some of the timing waveforms discussed immediately above have already been discussed in detail in connection with some of the other blocks of FIG. 19A. The remaining timing waveforms will become more readily understandable as the remaining blocks of the DCU are discussed in more detail.

(III–E) Address Recognition Circuits (FIGS. 30, 31)

The block diagram of the address recognition unit is shown in FIG. 30 and the relevant timing waveforms are shown in FIG. 31. Generally speaking, the address recognition units of FIG. 30 function to receive, store and decode the address field of each control word received. All of the control words supplied from the associated LCU are received in the address recognition units. However, only the address unique to the particular DCU being addressed is recognized by the address recognition unit. Upon recognition of the appropriate address, the remaining bits of the control bus word are passed on to the DCFE.

The control data word from the demodulator/terminator 600 of FIG. 19A is supplied to the input lead 603″ of the address recognition unit of FIG. 30. Such control data is supplied directly to the J terminal of shift register 671 which functions to store the address. The inverted form of the control data is supplied to the K input of shift register 671 through inverter 670. The entry of specific bits of the control data into the shift register 671 is under control of the plus-to-minus transitions of the bit clock signal which is suplied to the T input of shift register 671 through AND gate 611″.

Since it is desired, however, only to enter those particular bits of the control data word which contain the address into shift register 671, the bit clock supplied to lead 604″ of AND gate 611″ is gated by the address gating pulse appearing on the other input lead 614″ of AND gate 611″. The address gate signal is shown in FIG. 31C and the bit clock pulse signal is shown in FIG. 31B. The control data signal is shown in FIG. 31A.

In the waveforms of FIG. 31 it has been assumed that the address is seven bits long. However, said address can be anywhere from one to eight bits in length by means of logic within block 674 of FIG. 30 which provides an external means for option for determination of address length.

By definition the dialogic bit, which is the first bit occurring after the four-bit supervisory field and identified in FIG. 31, must contain a 1 in order to verify the presence of a control word. The dialogic bit is stored in the first bit position of the register, said bit position being identified in FIG. 30 as bit position 680.

After the dialogic bit and the seven-bit address code have been stored in shift register 671 and if the dialogic bit is a 1 and, further, if the stored address agrees with the address prewired into address decode 673, then an address recognition signal is generated on output 675 of address decode 673. Such address recognition code is supplied to the input of AND gate 676 where it is ANDed with the dialogic bit, as mentioned above. If the dialogic bit is a 1, then an address recognition pulse occurs on output lead 619″ of AND gate 676.

Referring now to FIG. 19A, it can be seen that such address recognition code is supplied to AND gate 610 where it is ANDed with the control interval pulse from the time base 606 to produce a control gate signal on output lead 611. Such control gate signal functions to permit passage of the remaining pulses of the word (31 bits minus the address and dialogic bits) into the DCFE via the control data lead 603 of FIG. 19A.

The purpose of inverting the control data through inverter 670 and applying said inverter data to the K input of shift register 671 is as follows: The control data is a two-level signal, as shown in FIG. 31A. The shift register 671 is made up of a series of J-K flip-flops which have two states and which are properly interconnected to form a shift register function. The data is entered into the first flip-flop stage of the shift register and must be entered either into the J or the K inputs as high-level signals in order for said first flip-flop stage to shift upon presence of a clock pulse supplied to the trigger input T of the shift register 671.

In the event that addresses less than seven bits in length are employed, the unused inputs to the decoding gate 673 are wired to a 1 in order to exclude them from the decoding operation.

(III–F) Modulator Control Means (FIGS. 26, 27)

The logic diagram for the modulator control circuit 1612 of FIG. 19A is shown in FIG. 26 and the pertinent timing diagrams in FIG. 27.

The primary functions of the modulator control is to enable the modulator driver 611 of FIG. 19A when a DCFE response, i.e., a monitor bus word, is to be transmitted from the DCFE through the DCU and onto the monitor bus 612 of FIG. 19A. Prior to transmission of the monitor bus word, the DCFE can enter the data to be transmitted into a shift register in the DCFE (not shown in FIG. 26), and set the first flip-flop of this shift register (which is the dialogic bit) to a logic 0, thus indicating the presence of a monitor bus word. The output of said first flip-flop is the monitor data line 613′ of FIG. 26 which is ORed with the carrier gate on lead 607′ in OR gate 693. The monitor data is shown in FIG. 27A and the carrier gate in FIG. 27B. The output of OR gate 693 of FIG. 26 is identified as the modulator driver data and is shown in FIG. 27F.

It is to be noted that the monitor data line is also supplied through inverter 690 to one input of AND gate 691, and thereby at time $t_0$ placing a 1 on said input. At the next word transition, time $t_1$ in FIG. 27, the negative transition of the monitor gate signal which is supplied to input lead 609″ and which is the inverse of the carrier gate signal of FIG. 27B, is differentiated by the pulse generator 695 to produce the clear pulse 697 of FIG. 27C. Such clear pulse functions to reset the modulator control flip-flop 692.

One hundred nanoseconds later a pulse is generated by pulse generator 694 which, together with the 1 already existing on the other input lead of AND gate 691, produces the set pulse 698 of FIG. 27B. This set pulse sets the modulator control flip-flop 692.

It is to be specifically noted that the pulse generated by generator 694 will be passed through AND gate 691 only if a 0 is stored in the dialogic bit of the word in the DCFE. Such 0 is inverted by the inverter 690 and appears as a 1 on the other input lead of AND gate 691. Setting of the modulator control switch 692 puts a 1 on lead 610′, which is shown as the waveform of FIG. 27E. More specifically, the modulator control signal will enable the modulator driver 611 to pass the modulator data shown in FIG. 27F onto the monitor bus 612 of FIG. 19A.

At the ends of the word interval identified as time $t_2$ in FIG. 27 and which corresponds to the negative transition of the monitor gate pulse, the modulator control flip-flop 692 of FIG. 26 is again cleared in the same manner as it was cleared by pulse 697 of FIG. 27C one word period earlier. If a successive control bus is to be transmitted, flip-flop 692 is again set in 100 nanoseconds. If no monitor bus word is to be transmitted, as indicated by the dialogic bit of the monitor data being a logic 1, then flip-flop 692 will remain reset until a monitor bus word is to be transmitted.

(III–G) Modulator Driver (FIGS. 28A, 28B, 29)

The modulator circuit for the three state sine wave signalling mode is shown in FIG. 28A and for the two state signalling mode is shown in FIG. 28B. Timing waveforms for both the structure of FIG. 28A and FIG. 28B are shown in FIG. 29.

The function of the modulator for the three state mode is to generate a gated sinusoidal signal which contains zero phase shift relative to the carrier bus for the logic 1, and 180° phase shift relative to the carrier bus for logic 0.

More specifically, the carrier signal is supplied to the phase inverter 1700 via carrier bus 321″. The inverted carrier is then supplied to an input of analog AND gate 1701. The noninverted carrier bus is also supplied directly to a second analog AND gate 1703. In FIGS. 29A and 29B there is shown, respectively, the noninverted and the inverted carrier bus signals. The modulator driver control signal shown in FIG. 29C, which was generated by the modulator control 612 of FIG. 19A, indicated the presence of a monitor word also is supplied to both AND gates 1701 and 1703 during the entire 36-bit word, as shown in FIG. 29C.

The modulator driver data from the modulator control 612 of FIG. 19A, and shown in waveform of FIG. 29D, is supplied directly to the third input of analog AND gate 1703. In its upper level, the modulator data signal will open AND gate 1703, i.e., make said AND gate conductive and pass the carrier bus signal therethrough to the input of OR gate 1704. For example, during the four-bit supervisory field between times $t_0$ and $t_1$ of the waveforms of FIG. 29, AND gate 1703 is conductive and passes the carrier bus therethrough. Reference is made specifically to FIGS. 29A and 29F which show the carrier bus and the monitor bus signals.

Inverter 1702 functions to invert the modulator data signal and to produce a waveform, as shown in FIG. 29E, which waveform is supplied to the third input of AND gate 1701. Thus, in effect, AND gate 1701 is conductive during the negative portion (which becomes positive when inverted), of the modulator data signals and will pass the inverted form of the carrier bus to the other input of OR gate 1704. Thus, the output of OR gate 1704 consists of segments of noninverted and inverted carrier bus signals; each segment being an integral multiple of a full cycle thereof. The output of analog OR gate 1704 is shown in FIG. 29F and comprises the monitor bus word transmitted back to the LCU unit.

In the case where a two state signalling mode is employed, the logic is as shown in FIG. 28B, and is considerably simpler than that shown in FIG. 28A. In FIG. 28B, the modulator driver data of FIG. 29D is ANDed with the modulator driver control signal, as shown in FIG. 29C, through AND gate 1705. The output of AND gate 1705 is then supplied to driver 1706 which, in turn, supplies its output directly to the monitor bus 612″ in the form of the two-level signal of the waveform of FIG. 29D.

(IV) DEVICE CONTROL FUNCTIONAL ELEMENT (DCFE)

(IV–A) General Description (FIGS. 34, 35, 36, 37)

The basic function performed by the DCFE element units is the adapting (i.e., digitizing) of any device or process control element instruction to the computer control system and the serial data communications loop described in the foregoing portion of the specification.

The general block diagram of the DCFE is shown in FIG. 34 along with a DCU 699. The said DCU element 699 corresponds to the DCU unit 110 or 119 of FIG. 1 and the remainder of the FIG. 34 comprises the DCFE unit.

The waveforms for the operation of the DCFE are shown in FIG. 35A through 35T. These waveforms will be discussed generally in connection with the discussion of FIG. 34 and will be discussed in more detail as each of the blocks of FIG. 34 is discussed in detail. It is to be noted that the waveforms of FIG. 35 are broken into two groups, the first being identified as full duplex operation (FDX) and half duplex operation (HDX). The differences between these two types of operation have been discussed before and will be discussed in more detail in this general section. Basically, the difference between half duplex and full duplex operation is as follows.

In half duplex operation, a control word supplied to a particular DCFE through its associated DCU must generate an answer and supply said answer to the monitor bus before the control bus can receive another word from the multiplex loop. In the full duplex operation, the DCU is slaved to the LCU so that an answer or monitor word from the particular DCU addressed will always appear on the monitor bus a predetermined number of frames after the control bus word is supplied thereto.

Consider now the general operation of the circuit of FIG. 34. The 26-bit word from the DCU is supplied to a control routing functional element 701 via control data input 603' under control of the control gate pulse appearing on lead 611' and the clock pulse appearing on lead 604'. The three waveforms appearing on leads 603', 611', and 604' are shown, respectively, in the waveforms of FIGS. 35J, 35H, and 35I for half duplex operation.

The control routing functional element is basically a selecting circuit which functions to select one of four control registers, only one of which is shown and identified as control register 710. Each of these four control registers can be employed to supply instructions to an individual digitally controlled device such as, for example, an analog-to-digital converter, a stepping motor control, a capacitance bridge, a frequency counter, or one of many other devices.

It is important to note that the control routing functional element 701 does not actually pass the data therethrough and into a control register. More specifically, the control routing functional element 701 is essentially a two-stage shift register which is responsive to the first two bits of the 26 bits of the word supplied to the DCU to provide the clocking pulses to a selected one of the four shift registers via one of the leads 705. The control data is supplied to all of the shift registers via leads 716. However, only that control register to which the clock pulses are also supplied will function to receive the remaining 24 bits of data. The same two bits employed to select one of four control registers are also supplied to the monitor routing functional element 704 via leads 702 and prepares the monitor routing functional element 704 to supply the output of a selected one of the four monitor registers, such as monitor register 714, to the DCU 699 in the general manner described below.

Before discussing the monitor register 714, however, the reader's attention is again directed to the control register. It will be noted from FIG. 34 that the control register 710 contains secondary storage. The control register itself is essentially a 24-bit shift register into which the 24 bits of a supplied word are entered. Once the 24 bits have been entered into the control register, they can be transferred in parallel into the secondary storage means which also can be a 24-bit shift register or, alternatively for some applications, can be a 24-bit storage register without the capability of shifting. Transfer of the information of a word from the control register into secondary storage is accomplished by means of a transfer pulse which occurs on output lead 707 of control routing functional element 701. More specifically, referring to the waveform of FIG. 35K, there is shown a typical transfer pulse 717 employed to transfer words from the control register into its associated secondary storage means.

The word stored in the control register 710 is then supplied to a controlled device which can be, for example, a servo motor and can instruct said servo motor to change its speed or shaft position, for example, in accordance with the programming associated with the servo motor. At some point in the servo system, a voltage, frequently a D-C voltage, is generated whose polarity and magnitude define the speed or shaft position of the servo motor with respect to some desired speed or shaft position. Such D-C voltage is supplied to an analog-to-digital converter (also not shown), which functions to convert said D-C voltage into a digitalized form which can then be stored in one of the monitor registers, such as monitor register 714.

Said monitor registers are also comprised of a 24-bit shift register, preferably having a serial parallel read-in and serial parallel read-out, although all four of these functions are not necessary for each application. They are desirable, primarily, in that they are universal and make the equipment more versatile and simplify manufacturing problems.

The data generated by the analog-to-digital converter is entered into all of the monitor registers, such as register 714, upon the occurrence of a data ready pulse, such as occurs at the positive-to-negative transition, as shown at the time $t_1$ in FIG. 35L, in the half duplex mode of operation. This positive-to-negative transition of the data ready pulse is supplied to the monitor registers via lead 709. The monitor register is then loaded, as shown in FIG. 35M at time $t_1$.

The next occurring not monitor gating pulse at time $t_2$ in FIG. 35N will enable the data in the monitor register 714 to be shifted therefrom and through the monitor routing functional element 704 in response to the clock pulse supplied to input C of the monitor register via input lead 711. Such clock pulses are shown in waveform 35I.

While the data has been stored in all of the monitor registers, only one of the monitor registers has been selected by the monitor routing functional element 704, and only that selected monitor register will have its stored data supplied through monitor routing functional element 704 and lead 613' into the DCU and, subsequently, onto the DCU monitor bus.

The operation described immediately above has pertained to the half duplex mode wherein the monitor word is not supplied to the DCU monitor bus until it is accumulated in the monitor register which can be any number of frame times from the receipt of the control bus word to which it is responding.

In the full duplex mode of operation, the lead 708 from transfer No. 3 (XFR3 of the control routing functional element 701 is supplied to the S input of the monitor register 714 in lieu of lead 709 indicating a data ready position.

The transfer pulse occurring on lead 708 always occurs a predetermined number of frame periods from the transfer pulse No. 2 (XFR2) appearing on output lead 707, said transfer pulse No. 2 being that pulse which transfers the control bus word into secondary storage and, in essence, marks the receipt of the control bus word by the DCFE. The occurrence of the transfer pulse No. 3 (XFR3) pulse on output terminal 708 is usually one or two cycle times of the multiplex loop, depending upon the desired frequency of operation. Thus, the system will anticipate the exact time that a monitor word will occur in response to a previously supplied control bus word. If the controlled device has not by that time generated a monitor response word, the DCFE will supply to the monitor bus a dummy word indicating the absence of a generated monitor response word.

By the use of the full duplex mode of operation, it is apparent that more than one control bus word can be supplied to any given control bus before a monitor response is received from the first control bus word since the monitor response to each control bus word is known, i.e., the time of response is known.

Referring now to FIG. 36, there is shown a DCFE unit employing only a single control register 710' and a single monitor register 714'. Since only one control register and one monitor register are used in the circuit of FIG. 36, it is not necessary to have a control routing functional element or a monitor routing functional element, as shown in FIG. 34.

More specifically, the control data in the circuit of FIG. 36 is supplied directly into the data $D_S$ input of the control register 710' under control of the control gate pulse on lead 611' and the clock pulse on lead 604'. The control data, the control gate, and the clock waveforms are shown, respectively, on waveforms 37K, 37C, and 37D.

The control register 710' can have a secondary storage means, if required, in the same manner as the control register 710 of FIG. 34 has a secondary storage means.

It is to be noted that in FIG. 36 the control gate waveform on input lead 611' is 24-bit intervals long and allows only 24 data bits into the control register, as compared with the 26 bits allowed into the control routing functional element 701 of FIG. 34. The two-bit difference in word length from the DCU is due to the fact that the control routing functional element 701 of FIG. 34 employs the first two bits to select one of the four control registers and one of the four monitor registers. In the circuit of FIG. 36, there is only one control register and only one monitor register so the two additional bits used for address purposes in FIG. 34 are not required in FIG. 36.

Once a word is stored in control register 710', it can be transferred in parallel to the associated secondary storage means. Subsequently, the 24-bit word can be supplied to the control device which again can be a digitally controlled servo motor, for example. The response from the digitally controlled device is supplied in digitalized form to the monitor register 714' which, in turn, supplies it to the DCU under control of the monitor gate pulse, lead 609', and the data ready pulse on lead 717. The monitor data waveform, the not monitor gate waveform and the data ready waveform are shown, respectively, in curves 37P, 37O, and 37M.

(IV–B) Registers in DCFE

(IV–B–1) Control register interface (FIG. 38)

In FIG. 38 there is shown a 24-bit shift register with secondary storage. The 24-bit shift register is comprised of six 4-bit shift registers 720, 721, 722, 723, 724, and 725. The secondary storage is comprised of six 4-bit registers, including registers 726, 727, 728, 729, 730, and 731 which are connected in parallel, respectively, with the six 4-bit registers in the shift register circuit. Specifically, for example, the parallel outputs Q1 through Q4 of shift register 720 are connected to the parallel inputs of secondary storage register 726. Output from the secondary storage register 726 can be taken in parallel from the four output leads 732. It is apparent that if no secondary storage were needed, the six storage registers 726 through 731 would not be required.

While the functions of the six shift register sections 720 through 725 and the six storage register sections 726 through 731 are not the same, they are structurally substantially identical for purposes of versatility of the equipment and for ease of manufacture. More specifically, each of the 12 four-bit registers shown in FIG. 38 has the capabilities as follows:

(i) Serial in, serial and parallel out; mode line 734 to ground (ii) Parallel in, parallel out; mode line 733 to a logic 1

More specifically, when the connection to the M input of the shift registers are connected to ground, the registers will function as a serial in, and serial and parallel out shift register. On the other hand, when the M input is connected to a 1, the shift register will operate as a parallel in, parallel out device. Thus, it can be seen that the six registers 720 through 725 are serial in serial, and parallel out registers and the storage registers 726 through 731 are parallel in, parallel out registers.

The transfer control signal on lead 707', the control data input on lead 716' and the gated clock input 705' have waveforms, as shown in FIGS. 35K, 35J, and 35O, respectively, and perform the functions as defined in connection with the discussion of general block diagram of FIG. 34.

Each of the 4-bit shift registers 720 through 725, when utilized as a shift register, has its mode input M, its strobe input S, and the parallel data inputs 735, grounded. Each of the 4-bit registers 726 through 731 has its clock input C, and its data input $D_S$ grounded, and its mode input M set to a 1.

To shift data in, the gated clock pulses are fed into all 4-bit registers, sections 720 through 725 simultaneously in synchronism, with 24-bit serial data stream being supplied into control data input 716, which is entered at the most significant end of the register (which is the left-hand end in FIG. 38).

When secondary storage is implemented, the transfer control line 707' must go to a 1 for about 20$\mu$ seconds and then return to zero. This one-to-zero transition enables the transfer of data into secondary storage. Reference is made to the waveform of FIG. 35K. By convention, the state of the transfer control line 707' of FIG. 38 should be held in zero during other operations to increase noise immunity.

(IV–B–2) Monitor register interface (FIG. 40)

In FIG. 40 there is shown the interface of the monitor register 714 of FIG. 34. The monitor register of FIG. 40 is comprised of six 4-bit register arrays 740 through 745, each of which can be the same as the 4-bit register arrays of the control register, as shown in FIG. 38.

In the structure of FIG. 40, the data is entered in parallel from the output of the control device into the data parallel input leads dp, such as the four input leads 746. In actuality, transfer of the data into the monitor shift registers, does not occur, however, until a transfer pulse occurs on transfer input leads 708'. Such a transfer pulse occurs on the 1–0 transition of the data ready pulse appearing on lead 709 of FIG. 34 when the equipment is operating in a half duplex mode. The data ready waveform is shown in FIG. 35L. In FIG. 35M there is shown the completed monitor register load which occurs in response to the 1–0 transition of the data ready waveform at time $t_1$.

It should also be noted that the parallel transfer of data into the shift register of FIG. 40 can occur only when the M inputs are set to 1. The $\overline{\text{monitor gate}}$ pulse applied via lead 747' to the M input is, at time $t_1$ in FIG. 35, at a 1, as shown in the waveform of FIG. 35M. Thus the parallel transfer of data can occur.

Subsequently, in waveform 35N, between times $t_2$ and $t_3$, the $\overline{\text{monitor gate}}$ goes to a 0; thus changing the function of the shift register 740 through 745 to serial operation so that the clock pulses supplied via lead 711' in FIG. 40 will cause the 24-bit word stored therein to be shifted thereout serially and onto the monitor register data lead 713. The clock pulses and the monitor register data output are shown in waveforms of FIG. 35O and 35P, respectively.

(IV–C) Control routing element (FIG. 41)

When multiple control registers are implemented, the control functional element is connected, as shown in FIG. 34. Assume that the DCU is strapped for a 5-bit address field. Then the five bits of the address field plus the dialogic bit, plus the four bits of the supervisory field, make a total of 10 bits which are not passed on to the control routing functional element 701, Thus, only 26 bits are supplied to said functional control routing element 701.

Reference is now made to FIG. 41 which shows a more detailed logic diagram of the control routing functional element. It can be seen from FIG. 41, as well as FIG. 34, that the control data is supplied not only directly to the control routing functional element but also directly to the data input of the control register via lead 716'. However, as discussed generally hereinbefore, none of the control registers can accept data unless they are also supplied with clock pulses which are gated onto only one of the output terminals 705' of the decode and gating selection circuit 761. The function of the control routing functional element is to provide a selected one of the control registers with clock pulse in response to the first two bits of the 26-bit word supplied from the DCU.

The two-bit address storage means 760 is constructed to receive said first two bits and to supply voltage potentials to leads 780 and 781, which potentials will be decoded by the decoding gate and selection means 761 to select the proper one of the four output clock signals 705'. It will be noted, specifically, that the decoding and gating selection circuit 761 will not pass a gated clock pulse until AND gate 783 is open. Such AND gate 783 is under control of two control signals. Specifically, there must be present a control gate pulse on input lead 770, and a 1 must be present on the output lead 769 from the two-bit address storage 760, indicating that the two address bits have been received thereby. When both of the above conditions are met, the clock pulse can pass directly through amplifier 762, and AND gate 783 into the decoding and gating selection circuit 761, and then onto one of the output leads 705' in accordance with the address code appearing on leads 780 and 781. Because the 1 will not appear on output lead 769 of address storage means 760 until after the first two bits of the 26-bit word have been supplied from the DCU, the AND gate 783 will be opened only for the last 24 bits of the word. Consequently, the gated clock pulse will be supplied to the selected control register for only a 24-bit period.

The two-bit address storage means 760 is essentially a two-stage shift register. The shifting of said register is effected by the clock pulses which are supplied through NAND gate 764 and input lead 765 of the address storage means 760. It will be noted that NAND gate 764 will function to pass a shifting pulse only in the presence of a control gate pulse on lead 611''. The control gate pulse and the clock pulse are also supplied to the address reset circuit 767 and the transfer pulse generator 772 via leads 766 and 785, respectively.

The address reset circuit 767 is instructed to respond to the trailing edge of the control gate to reset the two-bit address storage circuit 760 to its zero stage in preparation for reception of the next two-bit address.

The transfer pulse generator 772 is also responsive to the trailing edge of the control gate signal to generate a transfer pulse, as shown in FIG. 35K (pulse 717) which functions, as discussed above, to transfer the word stored in the selected control register into the secondary storage associated therewith.

(IV–D) Monitor routing functional element (FIGS. 43, 44)

A general block diagram of the monitor routing functional element 704, FIG. 34 is shown in FIG. 43. The two-bit address code from the control routing functional element 701 is supplied via leads 702' in FIG. 43 to the store and decode circuit 800, which in turn performs two functions. One of these functions is to supply the two-bit address to the two flip-flop stages of two-bit register 805, where said two bits will form the first two bits of an incoming 24-bit word from the monitor register, as will be discussed below. The other function of the store and decode circuit 800 is to select one of the monitor register outputs 712' by means of a monitor data selecting circuit 803 under control of the store and decode circuit 800, via lead 802, and in accordance with the two bits supplied to said store and decode circuit 800.

The two-bit address code from the control routing functional element 701 of FIG. 34 is supplied via lead 702 to a monitor routing functional element 704 upon the occurrence of a transfer pulse occurring on lead 703. Such transfer pulse is shown in FIG. 35K as pulse 717, for example. It will be observed that transfer pulse 717 occurs at the end of the reception of the control data in a control register, such as register 710 of FIG. 34, as shown in the waveform of FIG. 35J.

After the occurrence of transfer pulse 717, the two bits are stored in the two stages of register 805. Subsequently, the data ready signal occurs as shown in FIG. 35L at time $t_1$, which conditions a monitor register 714 of FIG. 34 to transmit data therefrom. Then still later, at time $t_2$, as shown in FIG. 35N, the monitor gate occurs and is supplied to lead 609'' of FIG. 43 and functions to pass the clock pulse appearing on input lead 604'' to NAND gate 806 and thence through NAND gate 807 utilized as an inverter to output lead 747', and then to the M input of the monitor register 714 of FIG. 34. Said gated clock then functions to clock out the 24-bit word stored in the monitor register 714 of FIG. 34 into the monitor routing functional element of 704. In FIG. 43 it can be seen that said data specifically is shifted into the monitor data select circuit 803 through a selected one of the monitor register output leads 712'.

The 24-bit word is next supplied from the monitor data select circuit 803 into the two-bit register 805 which is now receiving clock pulses from the output of NAND gate 806. The two bits constituting the initial address code stored in register 805 are clocked out onto lead 613'' followed immediately by the 24-bits of the word received from the monitor register. Thus there appears on the monitor data output lead 613'' of FIG. 43 a 26-bit monitor bus word which is supplied to the DCU 699 of FIG. 34.

In FIG. 44 there is shown a more detailed block diagram of the monitor routing element. More specifically, in FIG. 44 there is shown the detailed logic of blocks 800, 805, and 803 of FIG. 43, each of which will be discussed separately below.

The store and decode circuit 800 of FIG. 43 can be seen from FIG. 44 to be an array of NAND gates. The two-bit address code is supplied to the NAND gates 817 and 818 and the transfer pulse is supplied to all four of the NAND gates 819, 817, 818, and 820. When the transfer pulse occurs, there are produced outputs from NAND gates 817 and 818 which are supplied to NAND gates 814 and 815 and are also supplied to the flip-flops 810 and 811 of two-bit register 805', thus in effect storing the two address bits in said shift register 805' in preparation for reassembly of the monitor word immediately before being transmitted to the DCU.

Returning again to the NAND gate array within the block 800', the activation of NAND gates 817 and 818 by the transfer pulse 717 of FIG. 35K produces an output which activates NAND gates 819 and 820 as well as NAND gates 814 and 815.

The outputs of NAND gates 819 and 820 are supplied to one terminal of NAND gates 813 and 816, respectively. Thus the four NAND gates 813, 814, 815, and 816 comprise a decoding means consisting of two flip-flop circuits which can represent any one of four states. More specifically, NAND gates 813 and 814 have cross-coupling connections 822 and 823 which function to insure that one of the NAND gates has a 1 output and the other a 0 output. Similarly, NAND gates 815 and 816 form a flip-flop circuit by means of cross connections so that when one has a 0 output the other has a 1 output.

The four NAND gates 812 form a whiffle-tree-like arrangement which selects one of four possible outputs in response to the particular settings of the flip-flop comprising NAND gates 813, 814, 815, and 816. In order to obtain the proper polarity, there are provided four additional NAND gates 824 which invert the output of NAND gates 812.

In order for the reader to examine the detailed operation of the store and decode circuit 800' 1's and 0's have been placed at the inputs and the outputs of all the NAND gates and inverters included therein when the input address code is as indicated on the two input address leads and when the transfer pulse occurs.

In the particular example given, a 1 appears on the output of inverter 825 whereas 0's appear on the outputs of the three other inverters. The 1 on the output of inverter 825 is connected to an input of AND gate 834 of monitor data selector 805'. Thus the monitor register, whose output is connected to the other input lead of AND gate 834 can supply the data stored therein through AND gate 834 and common OR circuit 812 into the two-bit register 805'.

Thus the output of the store and decoder circuit 800' has functioned to select one of the four monitor registers by means of activating one of the AND gates 833 to 836.

Referring now to the two-bit register 805', it can be seen to be comprised of two flip-flop circuits 810 and 811, with the data from OR gate 812 being supplied to the two inputs J and K thereof. Specifically, the data from OR gate 812 is supplied directly to the K input and is also supplied through inverter 837 to the J input, to provide well-known operation of flip-flop 811.

It will be recalled that the two-address bit had previously been supplied to flip-flops 810 and 811' upon the occurrence of the transfer pulse of transfer input lead 703''. Thus as the 24-bit word from the monitor register is entered into flip-flop 811, the two address bits already stored therein are moved out and into the DCU unit via monitor data lead 613''. It can be seen that the word being supplied to the DCU unit on monitor data lead 613'' is now a 26-bit word with the first two bits comprising the two-bit address word initially stored in the two-bit register 805'.

(V) DETAILED DESCRIPTION OF THE MULTIPLEX CHANNEL UNIT (MCU)

The MCU is comprised of two main portions, an input section to receive information from the loop and an output section to supply data onto the loop. The transfer link functions to link the MCU to the computer and more specifically to the MCS (main core storage) in the computer and to provide access between the input and output sections of the MCU and the word table in MCS.

Each of these two circuits will be described functionally and then will be described from a logic or hardware point of view.

(V–A) MCU functional description

(V–A–1) General (FIG. 45)

In general, the MCU provides the following functions:

(1) Unloads a 32-bit word from the MCS onto the loop via the transfer link.

(2) Adds a 4-bit supervisory field to the 32-bit word to form the 36-bit word.

(3) Converts the two-level logic signal received from the MCU to a biphase modulated sine wave and transmits said modulated sine wave to the multiplex loop.

(4) Acquires and maintains bit word and frame synchronization from the information received from the loop.

(5) Receives information from the loop, converts it to two-level signals and dependent upon the result of the added, loads the 32-bit word into the time division table of MCS via the transfer link.

(6) Adds the data transferred from the MCS to the loop and from the MCS to determine whether such data is valid, and in general to determine what disposition should be made of any particular word.

In FIG. 45 there is shown a general block diagram of the MCU, the transfer link, and the main core storage. More specifically, the MCU is shown in very general block diagram form within the dotted rectangle 102''. The transfer link is represented by block 98' and the main core memory in the computer is represented as being within the block 99'. It should be assumed that the block 99' also contains those portions of the computer which are necessary for the operation of the invention.

The connection between the computer 99', the transfer link 98' and the MCU 102'' are represented by mnemonic identification which will be discussed in detail later herein.

In the data unload function, the length and starting address of the time division table (TDT) in MCS are determined by strapping options in the MCU. Possible starting word addresses are as follows:

| | TDT starting address |
|---|---|
| Selected MCS modules: | |
| #40 | 2,048, 4,096, 6,144, 8,192, 10,240, 12,288, 14,336 |
| #1, #2, #3 | 0,000, 2,048, 4,096, 6,144, 8,192, 10,240, 12,288, 14,336 |

The MCU 102'' of FIG. 45 has no protection override capability. No part of the table can be in a protected area of MCS. The length of the table (and the corresponding length of a frame group on the loop) may be 1, 2, 4, 8, or 16 frames. However, the maximum length is 8 frames if the starting address is 2,048, 6,144, 10,240, or 14,336. There are 256 words in a frame.

Following a "power on clear" input, which resets all of the circuits in MCU 102'', the MCU begins at the starting address and continuously cycles through the table, unloading contiguous MCS locations in ascending order. It presents the address to the transfer link 98' as a 19-bit wide parallel transfer (17 address bits and two memory module selection lines) and receives the data in two halfword 16-bit wide parallel transfers, with the most significant halfword first. The operation in case of an error indication from the transfer link 98' will be described later herein. MCU 102'' functions to add the necessary four-bit supervisory field which, as discussed above, precedes the most significant bit of the 32-bit data word to form the 36-bit word which is eventually unloaded onto the multiplex loop. Said 36-bit word is then converted in the MCU from its serial digital two-level logic form into a biphase modulated sine form and transmitted onto the loop output terminal 858 at a rate determined by the clock from the standard frequency clock 856 (SFC) shown in FIG. 45. Data received from the loop input 857 by the MCU as biphase modulated sine wave is converted into two-level logic signals. The circuit means for changing the signal from a two-level logic (TTL) is contained in the input sections 850 and 851 of MCU 102''.

The delay between the time the MCU transmits any bits to the loop and the time it receives that bit from the loop, is the time required for the signal to travel around the loop. Since this delay will vary with the type of installation, all synchronization and timing for processing and loading input data into the proper address in the time division table must be derived from the received loop signal. The following synchronizing signal must be obtained:

(1) Bit synchronization
(2) Phase, word, and frame synchronization
(3) Frame group synchronization Bit synchronization can be derived directly from the frequency of the phase-modulated sine wave received from the loop.

Phase, word, and frame synchronization are derived from the four-bit carrier-off period which occurs at the beginning of each word in the received signal from the loop. Such four-bit carrier-off period determines the beginning of each frame and establishes the time reference for determining the phase of the incoming sine wave.

More specifically, the MCU establishes the said time reference and then first acquires sync with frame times on the loop by sensing the end of the carrier-off period. Next acquired is frame group synchronization. Subsequently, the MCU predicts the time of the next carrier-off period by counting bits, and drops out of sync if the period does not occur during the expected time. In deriving frame group synchronization, the MCU determines the relative position of received frames of information within the frame group by examining the supervisory field received in word 255, which is the last word in a frame.

After acquiring frame sync by sensing the carrier-off period, the MCU inspects the frame count in the supervisory field of word 255 of each frame. When the received frame count equals the highest numbered frame in the frame group (frame group size determined by strapping option), the MCU is in frame group sync. After acquiring frame group sync, the MCU loads incoming data into the Time Division Table beginning with word 0 of frame 0.

When in frame group sync, the MCU inspects the supervisory field of word 255 to insure that the frame count increments in each frame. If the expected count and the count actually received differ in three consecutive frames, the MCU drops out of sync.

In effecting the data load function, the MCU, starting with word 0 of frame 0 after it has acquired frame group synchronization, loads 32-bit words (dialogic control field and data field) into the Time Division Table as the contents of the corersponding time slots are received from the loop. The address portion of the word is presented to the transfer link and data is loaded in two 16-bit wide parallel transfers, the most significant half-word being presented first. The MCU cycles continuously through the table, loading contiguous MCF locations in ascending order as long as frame group synchronization is maintained. One exception occurs when the data received is a "no action" command, in response to which the MCU does not make a memory load request.

If the transfer link does not respond or indicates an invalid address, any data from that time slot is lost.

(V–A–2) Data editing (FIG. 45)

Data editing is necessary to determine the nature of the word and also to determine if a given word or address is erroneous. The MCU edits data unloaded from the Time Division Table to avoid transmitting monitor words or incorrect control words to the loop. The MCU also edits data received from the loop before loading it into MCS, and may, in fact, not make any load request at all in order to prevent the same control word from being transmitted twice to the loop and to prevent pertinent data in MCS from being overwritten.

The manner in which the MCU edits data depends on the state of MXDM1F input of FIG. 45. For normal operation, a logic 1 is present. For test purposes, a logic 0 may be applied (see section V–A–3–c).

In normal operation, editing occurs under several circumstances as listed below:

(1) Monitor word unloaded.
(2) Invalid address or parity errors.
(3) No transfer link response.
(4) Valid control word received.
(5) "No action" command received.

Each of the foregoing editing functions will be described briefly.

If the most significant bit (dialogic bit) of a word unloaded from the Time Division Table is zero (monitor word), the MCU 102″ transmits dialogic bit equal to 1, and data field equal to all 0's ("no action" command), to the loop in the corresponding slot.

If the transfer link indicates an invalid address or parity error in response to an MCU unload request, the MCU transmits the "no action" command to the loop in the corresponding time slot.

If the transfer link sends neither an invalid address indication nor three Data Transfer Enable pulses (DTEF) within 5 to 9 bit periods in response to any MCU unload request, the MCU transmits the "no action" command to the loop in the corresponding time slot and in all subsequent time slots until the end of that frame group.

If a word received from the loop contains dialogic bit equal to 1 and at least one "1" in the data field, the MCU changes the data field to all 0's and loads the "no action" command into the corresponding location in the Time Division Table. Thus, if the MCU unloads this location before the program has inserted another control word, the "no action" rather than a duplicated command is transmitted to the loop.

If a word received from the loop contains dialogic bit equal to 1 and data field equal to all 0's, no load access is made to the corresponding location in the Time Division Table.

When editing in the test mode (MXDM1F=0), the following two conditions can exist:

When a monitor word is unloaded from the MCS, it is transmitted unchanged to the loop. For an incorrect MCS access, the "no action" command is transmitted to the loop as in normal operation. In the loading function, all data from the loop is loaded unchanged from the Time Division Table.

(V–A–3) MCU sequence of operation (V–A–3–a) Data output sequence (FIG. 46)

Reference is made to the flow diagram of FIG. 46 which shows the data output sequence.

After the occurrence of a start power-on clear pulse which resets all of the MCU circuits (step 870), the MCU makes an unload access request for the first word in the Time Division Table (step 871). The output loop signal is sustained at 0 volt during the four-bit period (step 872).

If in error, free memory access is accomplished, and the dialogic bit of the unloaded word is "1," the information will be sent to the loop unchanged (steps 873, 874, 875, and 876). If the dialogic bit is 0 (step 875), or if the transfer link indicated an error (step 874), or did not respond before the end of the supervisory period (step 873), the "no action" command will be sent to the loop (step 886).

The MCU converts the two-level voltage signal to a biphase sine wave and transmits the information serially to the loop (step 877). After 29 bits of the 36-bit word have been so transmitted to the loop, the MCU makes an unload access request for the next word in the Time Division Table (step 879). It is assumed that word 255 is not being transmitted as tested in step 878.

Next the proper half of the word pair count is sent to the loop during the supervisory period (step 881). Again, it is assumed that access it not being made for word 254 or 255 as tested in step 880.

If the memory load was error free (step 874), if the dialogic bit is "1" (step 875), and if the transfer link has not failed to respond to any previous MCU unload request in this frame group (step 873), the information is sent to the loop unchanged (step 876). On the other hand, if the dialogic bit is "0" (step 875), if an invalid address or parity error was indicated (step 874), or if the transfer link did not respond within five to nine bit periods or before the end of the supervisory period on this or any previous MCU unload access in this frame group (step 873), the "no action" command is sent to the loop.

The above steps are repeated until the unload access for word 254 has been made. Four zeros for word 254 are sent to the loop during the supervisory period. Next the data from the MCS for word 254, or alternatively the "no action" command, is sent to the loop, as described above, and in biphase sine waveform.

The next cycle begins with an unload access for word 255, which is the last word in the frame, and is performed in step 871. The frame count is sent to the loop during the supervisory period (step 884), rather than the word pair count, which would be sent to the loop in step 881.

The data of word 255 is then sent to the loop, assuming that it meets the test of steps 873, 874, and 875.

If the MCU has attempted unload accesses for all of the words in the Time Division Table, that is all of the words in all of the frames, then on the 255th word of the last frame, step 882 of FIG. 6 would have functioned to so indicate and the next MCU unload request would be for word "0" of frame "0" as indicated in step 871 to begin the entire process over again.

(V–A–3–b) Loop sync acquisition and data input sequence (FIG. 47)

Reference is made to FIG. 47 which shows a flow chart for the loop sync acquisition and the data input sequence.

The operation is started by a power-on clear pulse as indicated in step 890. The incoming data in the form of a biphase modulated sine wave is accepted by the MCU from the loop which converts the information to TIL voltage level and derives the clock frequencies from the received signal (step 891). Next the MCU searches for the end of any period of absence of sine wave signal and marks the end of this "carrier-off" period (step 892). Up to this time, no MCS requests are made to load data.

Using the end of the "carrier-off" period as a starting time reference, the four bits, which should be the supervisory field of word 255, are inspected when received from the loop (step 893). If the four bits are not equal to the highest-numbered frame in the frame group size for which the MCU is strapped (step 894), the MCU returns to step 892. On the other hand, if the received frame count does compare, or is equal, to the highest-numbered frame, the MCU is designated as being in frame group synchronization and goes to step 895.

In step 895, the MCU checks for the absence of group signal during the first four periods of the next frame (word zero of frame zero). If loop signal is present during any of these four bits, the MCU drops out of sync and returns to step 892. If word zero of frame zero is received from the loop, however, the MCU processes it as follows: the word passes through steps 896 and 897; then, if the dialogic bit is "1" (step 898), and the data field is all zeros (step 899), the MCU does not attempt to load the data into the MCS. On the other hand, if the dialogic bit is "1" (step 898) and at least one data bit is a "1" (step 899), the MCU changes the data field to all zeros (step 900), makes the load request to the starting address of the Time Division Table and loads the "no action" command into MCS (step 908). If the dialogic bit is zero (step 898) and the data field contains a "1" (step 899), the MCU accesses a starting address and loads the data field into MCS unchanged.

When the next word is received (step 896), the MCU edits said word in steps 897, 898, and 899. If an MCS load is to be performed, the corresponding address in the Time Division Table is accessed (step 902). The foregoing steps are repeated until word 254 has been received.

The MCU then inspects the supervisory field of received word 255 (step 903). If the frame count of word 255 equals the relative position of that frame within the Time Division Table, frame group synchronization is confirmed (steps 905 and 906). If a miscompare occurs, the MCU remembers this fact (step 906) and continues to receive and process the data. In the next frame, word 255 is processed as set forth above. Immediately after reception of the second 255th word, the MCU checks for the absence of loop signals during the first four-bit periods of word "0" (step 904). If loop signal is present, the MCU drops out of sync (step 907), and returns to step 892.

When word zero has been received from the loop, the MCU edits it as in steps 896, 897, 898, 899, and 900. If the previous frame group was the last in the frame group (length of frame group being determined by strapping option), the MCU returns to the beginning of the Time Division Table (steps 901 and 908). If not, the MCU continues to the next contiguous MCS location (steps 901 and 902) corresponding to word "0" of the next frame.

The MCU then continues receiving and demodulating information from the loop and editing and loading words into MCS as described above.

If the frame count in three consecutive frames miscompares (step 906), an alarm counter which has now counted to three indicating three consecutive miscompares, functions to drop the MCU out of sync, returning the operation to step 892. Any correct frame comparison will instantly and automatically reset the alarm counter to zero.

The foregoing sequence of operation continues until a power-on clear signal is applied in start step 890, which power-on clear signal functions to reset all of the circuits in the MCU.

(V–A–3–c) Operation in test mode (FIG. 45)

A logic zero applied to lead MXDM0F of FIG. 45 causes the MCU to transmit all output information directly into the signal input from the loop, thus completely bypassing the loop. The MCU is isolated to the extent that no signal is transmitted or received from the loop. A logic zero on the lead MXDM1F input prohibits editing as described in section V–A–2.

The type of data patterns which can be circulated after the MCU has acquired sync (assuming error-free memory access) are summarized in the following table:

TABLE I

| Word unloaded from Time Division Table | Data at output to loop | | Data loaded into Time Division Table | |
|---|---|---|---|---|
| | MXDM1F=1 | MXDM1F=0 | MXDM1F=1 | MXDM1F=0 |
| 0 0---- | 1 0 | 0 0 | (*) | 0 0 |
| 0 1---- | 1 0 | 0 1 | (*) | 0 1 |
| 1 0---- | 1 0 | 1 0 | (*) | 1 0 |
| 1 1---- | 1 1 | 1 1 | 1 0 | 1 1 |

*The MCU loads nothing from the corresponding time slot. The two digits represent the contents of the dialogic and data fields as follows:
First digit=0
First digit=1
Second digit=0
Second digit=1
Dialogic bit=0
Dialogic bit=1
Data field is all 0's
At least one 1 in the data field.

(V–B) Transfer Link Interface (FIGS. 45, 48)

The transfer link 98′ of FIG. 45 grants access to the MCS memory, accepts an address therefrom, and loads or unloads data in two halfword transfers. The control and data lines between the transfer link 98' and the MCU 102' are listed below with mnemonic designation:

TABLE II.—MCU-TRANSFER LINK INTERFACE

| Signal function | Signal mnemonic | Signal source | Signal destination | Number of signal lines |
|---|---|---|---|---|
| Control signals: | | | | |
| Request from MCU | REQF-M | MCU | XL | 1 |
| Data transfer enable to MCU | DTEF-M | XL | MCU | 1 |
| Invalid address to MCU | IAF-M | XL | MCU | 1 |
| Parity error to MCU | PEF-M | XL | MCU | 1 |
| MCU diagnostic line #1 | MXDM0F | XL | MCU | 1 |
| MCU diagnostic line #2 | MXDM1F | XL | MCU | 1 |
| MSC module address | MAL-M, MAR-M | MCU | XL | 2 |
| Data signals: | | | | |
| Unload data | MXD00 | XL | MCU | 16 |
| | . | | | |
| | . | | | |
| | . | | | |
| | . | | | |
| | MXD15 | | | |
| Present address/load data | MXS00 | XL | MCU | 17 |
| | . | | | |
| | . | | | |
| | . | | | |
| | . | | | |
| | MXS16 | | | |

Except for MAL-M and MAR-M, the quiescent level of all data and control lines is a logic "1." Each of the control and data lines has a mnemonic associated therewith.

In the following paragraphs each of these control and data lines, identified by their mnemonics, will be discussed separately to provide an understanding of the general operation of the structure of FIG. 45.

Request from MCU (REQF-M)—The MCU requests access to memory by setting REQF-M to zero. This occurs when a 0 is applied to the POCF input (Power on Clear) and a maximum of twice per word time thereafter (word time=29 $\mu$s. for loop data rate of 1.2288 bits/sec.). Request returns to 1 when (1) a 0 is received on the invalid address line or (2) the trailing edge of the first DTEF-M pulse is received or (3) there is no response from the transfer link within five to nine clock periods (clock rate determined by SFC strapping). The MCU will make no further access request until (1) IAF-M returns to 1 or (2) the trailing edge of the third DTEF-M pulse is received.

Data Transfer Enable (DTEF-M)—One pulse may precede an invalid address indication from the transfer link. Normally three pulses to logic 0 will be received following any load or unload request.

For a load request, the trailing edge of the first DTEF-M pulse causes the MCU to remove Request and the address (presented during Request) and place the left (most significant) halfword on data lines MXS00—MXS15. At the trailing edge of the second DTE, the MCU removes the left halfword and places the right (least significant) halfword on MXS00-MXS15. At the trailing edge of the third DTE, the MCU returns MXS00-MXS16 to logic 1 (quiescent level).

For an unload request, the trailing edge of the first DTE causes the MCU to remove Request and the address. The contents of data lines MXD00-MXD15 (left halfword) is sampled during the second DTE. The contents of MXD00-MXD15 (right halfword) is sampled again during the third DTE.

Invalid Address (IAF-M)—The MCU receives a 0 on the IAF-M input if it attempts to access a non-existent memory module or a protected area of memory (the MCU has no protection override capability). This 0 causes the Request and the address signals to return to 1.

Parity Error (PEF-M)—If a parity error is detected on a data unload, the MCU receives a pulse to logic 0 on the PEF-M input during the second halfword transfer.

MCU Diagnostic Line #1 (MXDM0F)—Logic 0 applied to this input causes the signal lines between the MCU and the TDM loop (TDL-O and TDL-I) to be opened and the loop output to be shorted to the loop input.

MCU Diagnostic Line #2 (MXDM1F)—Logic 0 inhibits editing as described in section V-A-2.

MCS Module Address (MAL-M, MAR-M)—MAL-M and MAR-M are strapped to a *constant* logic level as indicated depending on the 16K word MCS memory module in which the Time Division Table is located:

| | MAL-M | MAR-M |
|---|---|---|
| Memory module: | | |
| 0 | 0 | 0 |
| 1 | 0 | 1 |
| 2 | 1 | 0 |
| 3 | 1 | 1 |

Unload Data Lines (MXD00-MXD15)—During a memory unload access, the MCU samples MXD00-MXD15 for true data during the second DTEF-M pulse (most significant halfword) and the third DTEF-M pulse (least significant halfword).

Address/Load Data Lines (MXS00-MXS16)—The MCU presents the address to the transfer link immediately prior to applying 0 to REQ-M. MXS14-MXS16 are codes as follows:

| | MXS14 | MXS15 | MXS16 |
|---|---|---|---|
| Load Request | 0 | 1 | 1 |
| Unload Request | 1 | 1 | 1 |

MXS00-MXS13 contain the word address. On an MCS load the most and least significant halfwords are presented on MXS00-MXS15 as described in the Data Transfer Enable definition above, while MXS16 is sustained at logic 1. All address and data presented is true information.

Standard Frequency Counter Interface—The SFC 856 accepts the Multiplex Interrupt signal from the MCU and provides power-on clear and clock.

Multiplex Clock (MCLK)—The Standard Frequency Counter (SFC) can be strapped to provide a symmetrical square wave clock to the MCU at any of the following frequencies:

76.8 kHz.
153.6 kHz.
307.2 kHz.
614.4 kHz.
1.2288 mHz.

MCU rate of operation and the loop data rate are determined by MCLK.

Multiplex Interrupt (MINTF)—Quiescent state is logic 1. The MCU generates a pulse to logic 0, ½ bit wide, whose period is derived from the loop data rate. With any MCLK frequency, the MCU can be strapped to provide any of the following interrupt periods:

.23 ms.
.469 ms.
.937 ms.
1.875 ms.
3.750 ms.
7.500 ms.
15.000 ms.

Power On Clear (POCF)—When power is initially turned on, the SFC applied a 0 to POCF which is sustained for approximately 300–500 ms., resetting all MCU logic to its initial state. The quiescent level is logic 1.

Initiate Control Interface—The Initiate Control generates a pulse to logic 0 on the POCF input during the IPL sequence (Initial Program Load).

Loop Interface—Digital data encoded as a biphase modulated sine wave is transmitted and received through two coax cables. The input signal is isolated by transformer coupling, and the shield is not grounded in the MCU. The output shield is grounded in the MCU.

The four lines comprising the loop interface are:

| | |
|---|---|
| TDL–O | Data output to loop |
| TDL–OS | Shield for output |
| TDL–I | Data input from loop |
| TDL–IS | Shield for input |

Certain of the waveforms represented by the mnemonics defined above are shown in FIG. 48. More specifically, in FIG. 48, waveforms A and B show the relation of Request signal (REQF–M) and the data transfer Enable pulse (DTEF–M) when a load request is made. In waveforms C, D, and E of FIG. 48, there is shown the relationship between the same two mnemonics REQF–M and DTEF–M and also the Parity Error Check waveform (PEF–M) when request is made to unload data from the MCS. Thirdly, the relation between the Request for Data (REQ–M) and the Invalid Address Response (RAF–M) is shown in waveforms F and G of FIG. 48.

(V–C) MCU Output Section (FIGS. 49, 50)

The purpose of the Output Section is to initiate MCS access requests to unload words from the Time Division Table, edit unloaded data, add four-bit supervisory fields to each 32-bit word, modulate the data as a biphase sine wave, and transmit it onto the TDM loop. The functional units comprising the output section are shown in FIG. 49. The 32-bit shift register 900 provides the storage required to accept parallel data transfers from the transfer link via 16 input leads MXD00–MXD15 and to transmit data serially onto the loop through OR gate 918, logic gate 919, modulator 916 and series unit 917. The clock supplied via lead MCLK is inhibited by inhibiting means 920 during the time allowed for MCS unload. More specifically, the 32-page bit counter 911 functions to count from zero to 31 as the 32 bits of each word in shift register 900 are serially shifted therefrom and onto the loop. At the count of 29 during each word transfer, the decoder 921 responds to said count in bit counter 911 to close inhibit circuit 920, thus preventing the clock from supplying pulses to the shift register 900 during this time. However, as will be discussed in more detail later, such clock pulses are still supplied to the six-stage buffer shift register 910 which contains the next six bits of the word being transferred to the loop. More specifically, the next six bits are bits 30 through 35. During the periods that the bits are being transferred from buffer storage register 910, the new words can be transferred from MCS into shift register 900.

The data is jam set into the most and least significant halves of register 900 in two successive 16-bit parallel transfers.

It is to be noted that a four-bit supervisory field must be generated and transmitted to the loop prior to the shifting of the dialogic bit and the 31-bit data field from shift register 900. The four-bit shift register is generated in decoder 921 and is transmitted to main OR gate 919 via lead SVLF. It occurs during counts 0 through 3 of bit counter 911.

After the supervisory bits have been transmitted, the clock OCLK is enabled by means of opening inhibit gate 920 to shift the dialogic and data fields to the loop. The clock frequency is the same as MCLK as from SFC 856 of FIG. 45.

As stated above, the six-bit buffer shift register 910 accepts serial data from the seventh stage of the 32-bit shift register 900. It continues shifting the last six bits of any word through the loop after the clock is inhibited to the larger register 900 during the time allowed for an MCS unload.

Reference is made to the waveforms of FIG. 50 wherein waveform 50A shows the bit period of the loop data output and FIG. 50B shows the output counter 911 bit periods, and FIG. 50G shows the 10-bit period during which the clock impulse input to shift register 900 is inhibited.

It will be noted that at time $t_1$, the bit counter 911 of FIG. 49, at its count 29, initiates an output request pulse ITXF as shown in FIG. 50C and also function to inhibit the clock pulse from shift register 900 by means of pulse TSLF of FIG. 50G. The remaining bits 25 through 31, which are now present in the buffer storage shift register 910, and also in the seven bit section 901 of shift register 900, are shifted out of buffer storage 910 and onto the loop since the clock is not inhibited from said buffer storage 910 after time $t_1$. Thus, during the time interval $t_1$–$t_2$, the new word from MCS can be unloaded into the shift register 900 in parallel.

Examination of the waveform of FIG. 50G shows that the shift register 900 receives no clock pulses until time $t_4$ which allows time for the four-bit supervisory field shown in FIG. 50A to be generated by decoder 921 and supplied to the loop via OR gate 919.

The waveform of FIG. 50E (DBF) defines the time period of the dialogic bit and in effect forces the dialogic bit of a word to 1 in all output words unless the MCU is in test mode (MXDMIF=0). Termination of the MCS request is represented by pulse 923 of the waveform of FIG. 50D and is generated by decoder 921 of FIG. 49 at count 3 of each new word.

The transfer enable pulse (TXEN) of FIG. 50I is generated by decoder 924 of FIG. 49 and defines that four-bit supervisory period of the first word of the first frame, and further functions to deactivate the series unit 917 so that a carrier-off four-bit supervisory field is generated during this time period. The means by which the decoder 924 produces the TXEN pulse will be discussed later, but in essence is in response to the output of the address register 912.

The 36-state output bit counter 911 is incremented at at the frequency of MCLK. Power On Clear (POCF) starts the bit counter 911 in the all-zero state. After POCF, said bit counter 911 cycles continuously counting from zero to 35 in binary code. Decoding means 921 provides reference signals to the rest of the output section to coordinate functions which occur on a word basis.

The following signals are generated and, as discussed above, are shown in FIG. 50:

| Mnemonic: | Function or purpose |
|---|---|
| ITXF | Leading edge increments address register, trailing edge initiates MCS unload request. |
| OTOF | Terminates unload MCS request if not already honored by transfer link or terminated by response monitor in transfer link interface section. |
| DBF | Defines time of dialogic bit. |

Mnemonic: Function or purpose

SVLF ---- Defines period of the supervisory field in output words.

TSLF ---- Inhibits clock to output shift register during time allowed for MCS unload.

For operation with a 2 microsecond memory, 8 microseconds (10 bit periods at 1.2288 mHz.) must be allowed for any section of the MCU to complete an MCS access. A worst case situation occurs when loop delay is such that the input section initiates a load request immediately prior to the output section's unload request initiate (ITXF) signal. The MCU transfer link interface will not present an unload request until the load access has been completed. If the computer or record channel (RC) was granted a memory access immediately prior to both MCU requests, each MCU request will have to wait as long as 2 additional microseconds. Thus, 3 memory accesses may have to be completed (RC, MCU load, RC) after ITXF, before the unload request is honored. Thus 10 bit periods are allowed to complete any MCU memory access.

For an MCU data unload request appearing on lead ITXF of FIG. 49 and shown in waveform of FIG. 50C, the output address register 912 and the strapping option 925 produce address bits MXS02–MXS13. The remaining address bits are generated by the gating in the transfer link interface as will be discussed in connection with the transfer link interface circuitry. The address register 912 is a 12 stage binary counter incremented once each word at count 29 of the bit counter. More specifically, the ITXF pulse 922 shown in FIG. 50C and generated by the decoder 921 of FIG. 45 functions to increment the address register 912.

The 12 stages of the address register 912 give the MCU the capability of addressing the 4096 word time division table in MCS. For shorter tables, the option masks the higher order stages and provides constant level outputs. Strapping these outputs to 0 or 1 permits selection of different starting addresses for the table.

Segments of the address register 912 are parallel transferred into three 4-stage supervisory registers 926, 927, and 928. The two registers 926 and 927 are word pair count registers and respectively generate the least significant four bit supervisory field and the most significant four bit supervisory field of a pair of words. The third register 928 is a frame count supervisory register and generates the supervisory field of the 255th word which identifies the particular frame being outputed. Decoding associated with the address register 912 and the SVLF pulse from decoder 921, which defines a four bit period, gates the appropriate output registers 926, 927 and 928 into the loop data stream via OR gate 919 to provide the word pair count or frame count in the first four bits of each loop word.

The block 929 is in effect a two stage switch which alternately connects the output of registers 926 and 927 to the OR gate 919 to properly assemble the two four bit supervisory fields of the words comprising a pair of words. The switch 929 is switched each word by means of the least significant bit of address register, which appears in stage 13 thereof.

The output data editing circuit has two sections; one of these circuits identified as block 913 in FIG. 49 and entitled "Data Edit Control Single Word," functions to transmit a "No Action" command to the loop for one word time. The other data editing circuit is entitled "Data Edit Control No XL Response" and is identified by reference character 914. This latter edit control transmits a "No Action" command in every word for the remainder of the frame group. The bit counter decode DBF forces the dialogic bit to 1 in all output words unless the MCU is in test mode (MXDMIF=0).

Consider first, in more detail, the case of data editing for a single word. If either of the following conditions occur following an MCS unload request, the MCU transmits the "No Action" command to the loop in the corresponding time slot under control of data error control block 913.

(1) Error indication from transfer link, i.e.: an invalid address (IAF) or parity error (PEF–M) occurring during an output section memory access (OTACC=1).

(2) Monitor word (dialogic bit=0) unloaded. The contents of the most significant stage of the shift register 900 are sampled at the end of counter bit 3 (at this time this is the dialogic bit if the MCS access was error free). This sampling function is prevented if MXDMIF is 0.

The flip-flop locking the data field to zeros is set in the last half of count 4 if the above conditions occur. OTOF resets said flip-flop in count 3 of the following bit counter cycle. Said flip-flop is located in the data edit control and cooperates with logic in the logic circuit 919 to effect said locking of the data field to zeros.

Consider next data editing over a frame group period. If either of the following conditions occur following an MCS unload request, the MCU transmits a "No Action" command to the loop in all time slots until the end of the frame group, under control of Data Edit Control Block 914.

(1) A request abort signal (RA) is received from the response monitor in the transfer link interface circuitry during an output access (OTACC=1).

(2) The trailing edge of the third DTE pulse (indicated by the trailing edge of LSHF from the transfer link interface circuitry) or an invalid address pulse (IAF) is not received during an output access before the end of count 3.

Either of the above indicate the failure of the transfer link to give a complete response to a request. The flip-flop locking the data field to 0's for the remainder of the frame group is set in the last half of count 4. Said flip-flop is reset by OTOS in word 0 of frame 0 of the next frame group. The said flip-flop which locks the data field to 0 is responsive to outputs from both the data edit control block 913 and the data edit control block 914, and is located in the logic circuit 919, and is not specifically shown.

The multiplex interrupt pulse (MINTF) is generated in the multiplex interrupt generator 915 in the last half portions of counts 17 and 35 of each bit counter cycle. The next longer period is formed from count 35 alone. This repetition rate is divided by two, nine additional times by the address counter to provide all interrupt periods required.

Modulator 916 and series unit 917 of FIG. 49 comprise the loop interface analog circuitry. More specifically, the modulator 916 functions to convert the TTL voltage level supplied thereto from OR gate 919 into a biphase modulated sine wave and the series unit 917 functions to transmit the signal onto the coaxial loop.

The logic circuit shown in FIG. 49 sends three TTL signals to the analog circuitry as follows:

TXCL—Equals 0 during power on clear, equals inverted MCLK (from SFC) at all other times, and determines frequency of loop waveform.

TXDA—Information in supervisory, dialogic, and data fields presented serially at the loop data rate, for modulation.

TXEN—Equals 1 during power on clear and the first 4 bits of each frame. Causes series unit to generate "carrier off" period on loop.

The TXCL signal is filtered to produce a sine wave at the MCLK frequency. Both 0° and 180° components are generated. These two components and TXDA from OR gate 919 are combined in modulator 916 which can be a diode ring. The 0 or the 1 level of TXDA selects the appropriate component of 0° or 180° so that the output of the modulator 916 is the bi-phase modulated sine wave. Such a biphase modulated sine wave is accepted by series unit 917 where it is amplified to the proper value and then supplied to the loop. It is to be specifically noted that the loop waveform is maintained as 0 volt when TXEN is a 1. As mentioned hereinbefore TXEN is a 1 during the 4-bit supervisory field of zero word of zero frame.

(V–D) MCU Input Section (FIGS. 51, 52)

The general purpose of the input section as shown in FIG. 51 is to receive the biphase modulated signal from the loop, derive clock, demodulate the loop signal to obtain TTL level data, acquire sync with frame and frame group periods on the loop, and edit and initiate memory requests to load received data into MCS when appropriate.

In the description of FIG. 51 the various blocks shown therein will first be described in a general manner and their relation to each other. Then, in order to obtain a better understanding of the operation of FIG. 51, a more detailed discussion of the acquisition of bit sync, frame sync, frame group sync, and the editing process will be set forth.

The series unit 950 is basically an AGC amplifier which receives the low level loop signal in biphase sine wave form and restores it to a larger amplitude signal but still in biphase modulated sine waveform. From the series unit 950 the signal is supplied to timing recovery circuit 951 and also to loop demodulator circuit 953.

Timing recovery circuit 951 functions to respond to the received signal to provide a clock whose frequency is derived from the frequency of the received loop signal. More specifically, the received signal from the series unit 950 is amplified, rectified and filtered to provide a sine wave with the frequency equal to twice the loop data rate. This signal is then phase shifted (delay is approximately 90°) and applied to a phase comparator within block 952 (not shown), along with the output of a voltage controlled oscillator VCX0 (also contained in timing recovery 951 and not shown). The VCX0 has a center frequency equal to twice the nominal loop data rate. By means of the phase comparator, the frequency of the VXC0 is phase locked to a frequency twice the loop data rate. The VCX0 output LTX2 in FIG. 51 is employed as a clock by the sync detection circuit 952 which in turn produces a clock pulse LTF having a frequency equal to frequency of the received signal.

Loop demodulator circuit 953 accepts both the received loop signals from series unit 950 and the clock signal LTF from sync detector 952 which is employed as a reference to sample the phase of the received loop signal. Proper filtering and amplification in loop demulator circuit 953 function to provide a TTL level output voltage corresponding to the received data. Said data is shown in symbolic form in the waveform of FIG. 52B. More specifically, the waveform of FIG. 52B shows the bit timing relationship of the output of loop demodulator 953 with that of the loop data input and with respect to other timing signals in the circuit.

From loop demodulator 953 the TTL data is supplied to 32 bit input shift register 954 which is divided into two sections, including the six stage register 955 and the 26 stage register 973. The 32 bit register 954 accepts the data serially and provides storage for the single dialogic bit and the 31 bit data field in preparation for loading the 32 bit word in parallel into the Time Division Table via leads MXS00–MXS15. Data from demodulator 953 is sampled in the middle of a bit period by clock pulses LTF passing through inhibitor 961 and into the two section shift register 954.

Said clock isinhibited by inhibitor 961 during the time allowed for a memory access, during which time data is presented in parallel via lead MXS00–MXS15 to the transfer link interface circuitry. In an error free memory load, the data is loaded in two successive 16 bit wide transfers.

Reference is made to the enable shift register pulse (ENSR) of FIG. 52E. Between the times $t_2$ and $t_7$ the enable shift register pulse from decoder 960 of FIG. 51 activates inhibitor 961 so as to prevent clock pulses from passing therethrough to shift register 954. It is during this time period $t_2$–$t_7$ that the word in the shift register is transferred to the transfer link interface via leads MXS00–MXS15. Specifically, the transfer of the word from shift register 954 into the transfer link interface circuitry is initiated by the occurrence of the IRQIF pulse 974 at time $t_3$ as shown in FIG. 52H.

During time interval $t_2$–$t_7$ when no clock pulses are entering the shift register 954 some auxiliary storage means must be provided to take care of the bits being outputed from loop demodulator 953. Such auxiliary storage means is provided by means of input buffer shift register 957 which is a six bit shift register constructed to store the supervisory dialogic bit and the first 5 bits of the data field of the next received word while the shift register 954 holds the previously 32 bit word for loading into MCS memory.

More specifically, the first bit A of word ZERO of the output of demodulator 953, shown at time $t_1$ in FIG. 52B, is entered into the first stage of input buffer 957 of FIG. 51 at time $t_4$. Nine bits later at time $t_7$ a total of 10 bits have been entered into the input buffer 957, four of which have been pushed out of the last stage thereof and have been lost. The four lost bits constitute the supervisory field bits A, B, C, and D as shown in FIG. 52B. The dialogic bit 0 of word ZERO and the first five bits 1, 2, 3, 4 and 5 of the data field are contained in input buffer 957.

At time $t_7$, a shown in FIG. 52E, the enable shift register pulse ENSR shifts to its high level, thus enabling inhibit gate 961 of FIG. 51 and permitting clock pulses to enter shift register 954. Since clock pulses are continuously applied to input buffer 957, the overall result is that the 6 bits stored in input buffer will now be shifted into the 6th stage of shift register 954. The remaining 26 bits of the 32 bit word will pass into and through input buffer 957 into shift register 973 so that when the entire word has been entered into buffer 957, 26 bits of said word will be in shift register 954 and 6 bits will be in 957. The same 6 bits that are in 957 will also be in shift register 955. The entire word is then contained in shift registers 973 and 955 and can be transferred in parallel to MCS while the input buffer 957 is accepting the ten bits of the next succeeding word.

The 36 stage input bit counter 958 is reset to a binary four when the reset signal RS supplied thereto is 0. When RS goes to 1, input bit counter 958 is enabled to be incremented by clock pulses LTF, and cycles continuously from 0–35 in binary code. Decoding of the binary output of counter 958 provides a reference signal to the input section shown in FIG. 51 to coordinate functions which occur on a word basis. Pertinent decodes and related signals are shown below:

| Mnemonic: | Function or purpose |
|---|---|
| BC00F | Leading edge resets ENSR to inhibit clock to shift register. Generates DCLR signal when appropriate. Trailing edge generates IRQ1 if appropriate. |
| BC04F | Samples received frame count in word **255** to check frame group sync. |
| BCI0F | Leading edge sets ENSR, terminates an MCS load request if not already ended by transfer link or response monitor in transfer link interface circuitry. Trailing edge increments address register. |
| PSI | Predicts presence of carrier off period in supervisory field of word 0. |

Mnemonic: Function or purpose
BC06F ----- Initiates inspection of data field of received word for 1's.
DCLR ------ Sets data field to 0's if control word received.
IRQIF ------ Initiates MCS load request unless "no action" command received.
ENSR ------ Inhibits clock to shift register during time allowed for MCS load.

The input address register 1973 which includes a first eight shift register section 968 and a second four stage shift register section 969 in cooperation with strapping option 971 generates address bits for the twelve lines MXS02–MXS13 for an MCU load data request. The address register 1973 is a twelve stage binary counter incremented once each word time at the end of count ten of the bit counter 958 through lead BC10 from decoder 960. After being incremented it contains the number of the word currently being received. The twelve stages of register 1973 provide the capability of addressing a 4,096 word Time Division Table in MCS. For shorter tables the strapping option 971 masks the incrementing of the higher order stages and provides outputs of constant level.

Counts 254 and 255 from input address register 1973 are decoded to indicate respectively the time for receiving the frame count from the loop (word 255) and for generating the PSI pulse (word 0).

(V–D–1) Bit synchronizing acquisition

The output of the timing recovery circuit 951 which is LTX2, is a source of clock locked to the data rate with a frequency equal to twice the loop data rate. The sync detector section 952 divides LTX2 by two, resulting in a TTL level clock LTF which provides timing and synchronism for most TTL circuitry in the input section.

The phase of LTF is determined by sensing the end of the "carrier off" period. The counter reset pulse, generated by the trailing edge of the detected sync signal, sets LTF so that is is 0 during the first half of the bit period of the received data.

In general, the MCU logic circuitry predicts the time when the "carrier off" period should occur by counting the bit periods i.e., using the clock LTF. More specifically, the signal PSI (Predicted Sync Interval) is generated by decoding bits 0–3 of word 0 as indicated by input bit counter 958 and address register 1973, and is sent to sync detection circuit 952. If the "carrier-off" period in the loop waveform does not occur during the predicted sync interval, sync detection circuit 952 identifies an out-of-sync condition by setting the sync alarm line (SYALF) to ZERO.

If SYALF is ZERO, sync detect 952 sets SYALF to 1 following the end of the next "carrier off" period. The MCU input bit counter 958 and address register 1973 use the 0–1 transition of SYALF as a starting time reference to determine word and frame timing for processing input data from the loop. Specifically, to obtain bit synchronization, the sync detecting circuit 952 accepts the rectified signal from timing recovery circuit 951 which is the received loop signal after full wave rectification. Regardless of whether 0's or 1's are being received, the rectified signal is a series of positive sinusoidal humps whose frequency is twice the loop data rate. During the "carrier-off" period, the rectified signal is sustained at 0 volt.

The waveform on the rectified signal line from timing recovery circuit 951 is sampled by a flip-flop (not shown) in the sync detector circuit. The "detected sync" signal detected by the aforementioned flip-flop is 1 during any carrier-off interval on the loop. Further means are provided in sync detector circuit 952 so that the signal DS3 is detected sync delayed by two bit periods.

If the loop carrier signal is not in an off condition during any time that predicted sync interval (PSI) from decoder 964 is 1, the sync detect circuit 952 recognizes that the input bit counter 958 and address counter 973 are not properly aligned with the word and frame periods, as received from the loop, and indicates an out of sync condition by dropping SYALF to 0.

Sync detect 952 also drops SYALF to 0 if DS3 and count 10, as decoded from input bit counter 958, are simultaneously in a 1 condition. Such a situation would occur, for example, if the loop were opened.

If SYALF is 0 for any reason, sync detect circuit 952 sets it to a 1 following the end of the next carrier off period. This transition occurs in the middle of bit 4 of word 0 of that frame and provides a time reference for the input bit counter 958 and address register 1973.

(V–D–2) Loop sync acquisition

A 0 either on the sync alarm (SYALF) or Power on Clear (POCF) lines sets the reset signal RS to 0. When RS equals 0, the input bit counter 958 is set and held to a binary 4, and the input adress register is set and held to all 1's and PSI is held at a 1. Application of power or Initial Program Load (IPL) (see FIG. 45) places a 0 on POCF for a few milliseconds, which is sufficient to perform the above-mentioned function.

Since the MCU output section of FIG. 49 transmits no loop signal during power on clear, "carrier off" exists on the loop; PSI is 1 and the level on SYALF is indeterminate. When POCF returns to 1, the output section begins operation beginning with the "carrier off" period followed by the phase modulated signal.

If SYALF of FIG. 51 was 0, it goes to 1 when loop signal is first received (bit 4 of word 0). This transition sets RS from the loop sync control circuit 965 to 1, causing PSI from decoder 964 to go to 0 and permitting the input bit counter 958 and address register 973 to increment with clock LTF, starting from bit count 4. The input section of FIG. 51 is thus in frame sync with the data from the loop.

If SYALF was 1 during power on clear, RS goes to 1 as soon as POCF goes to 1, PSI goes to 0, and the input bit counter 958 and address register 973 begin incrementing. If the frame group sync test (section V–D–2) is valid, PSI goes to 1 when the counter and address register have incremented 9212 bits (4 bits less than 1 frame time). If the frame group sync test is not valid, the MCU input section re-syncs as described in section V–D–2. If the "carrier off" period is not present when PSI equals 1, the Sync Detect circuit sets SYALF to 0 resetting bit counter 958 and address register 968 respectively to binary 4 and all 1's. Following the next "carrier off" period, SYALF goes to 1, starting the input section in frame synchronism with the received loop data. This assures frame sync.

The MCU checks frame sync once each frame. If the "carrier off" period is not present when PSI is 1, the sync detect circuitry sets SYAL to 0 and the MCU reacquires frame sync as described above.

(V–D–3) Frame sync acquisition

When input bit counter 958 and address register 1973 indicate that the supervisory field of word 255 has been received from the loop, the MCU inspects the last four data bits received to check the frame count. If not in frame group sync at this time, frame group sync will not be acquired until the highest numbered frame in the frame group is received. After acquiring frame group sync, the MCU checks to see if the frame count increments properly in successive frames.

The foregoing general discussion of frame group sync will be discussed in more detail in the following paragraphs. The outputs of the four most significant bits of input address counter 1973 is incremented when the bit counter 958 changes from ten to eleven. This output occurs on lead BC10 from decoder 960. For the remainder of any frame after bit 10 for word 0, the outputs of the strapping option 971 are the number against which the MCU compares the frame count received in the supervisory field of word 255. Input address counter 1973 thus provides three functions.

(a) It keeps track of which word in the frame group is being received.

(b) It generates the address bits on lines MXS02–MXS13 for an MCS load request.

(c) It provides a reference for determining the frame group sync.

If the MCU is in frame sync, the supervisory field of word 255 will be in the first four stages of input buffer register 957 when the address register equals 254 and the bit counter 958 increments from 4 to 5. This count of 4 to 5 is decoded in decoder 964 and appears on output lead BC04 as does the decode of word 254 (W254). At this time, the frame count comparator 966 compares the first four stages of input buffer 957 with the output of strapping option 971. If the two outputs are equal, the frame count equal line (FCEF) goes to 0, and the system is in frame synchronization.

When SYALF is 0, the loop sync control circuit 965 responds thereto so that RS and TREN are both 0. When SYALF goes to 1 (end of "carrier off" period) RS goes to 1, allowing bit counter 958 and the address register 1973 to increment. TREN remains at ZERO, preventing any MCS load requests from block 962 in lead IRQIF and preventing the most significant 4 bits in section 969 of the address counter 1973 from incrementing.

The most significant 4 bits in section 969 thus remain at 1 and outputs of the strapping option 971 equal the highest numbered frame in the frame group size for which the MCU is strapped.

In word 255 the MCU checks the frame count. If that frame was not the last in the frame group, RS is set to 0 by bit 10 (BC10) of word 255. The foregoing resets bit counter 958 and the address counter 973 to zero and PSI from decoder 974 to 1. Since PSI is 1 while the loop signal is not held at zero volts, the sync detect circuit sets SYALF to 0. About ¾ word time later, the carrier off period occurs and ends, and SYALF goes to 1. In word 255, the MCU again checks the next received frame count and the process is repeated.

When the received frame count equals the output of strapping option 971, RS remains at 1. PSI goes to 1 only during bit counter 958 periods 0–3 of word 0 (address register equals 255). TREN is set to 1 by 0–1 transition (leading edge) of DS3. Frame group sync is now acquired, the entire address counter including both portion 968 and 969 thereof can increment, and MSC load requests can be initiated.

To check the frame group sync the following procedure and structure is employed. After TREN has gone to 1 the most significant 4 bits of the address counter 969 can increment. Thus the outputs of the strapping option increment once each frame when word 0 is being received, cycling from zero through the highest numbered frame in the frame group size for which the MCU is strapped. If the MCU is properly synchronized with the received loop data, the outputs after incrementing, equal the number of the frame currently being received.

If the frame count received in word 255 does not equal the strapping option output, the FCEF line goes to 1 when the bit counter 958 increments from 4 to 5. Nearly one frame period later, in the middle of count 4 of the bit counter during word 255 (address register 973 equals 254), the state of the FCEF line is sampled by the alarm counter 967.

The alarm counter 967 is a four-state counter which is clocked once a frame in the middle o f count 4, word 255, if TREN equals 1. If the frame count received in the previous frame was incorrect (FCEF=1) the alarm counter increments. If the previous frame count was correct (FCEF=0) the alarm counter returns to (or remains at) its starting state. One half a bit period later the present received frame count is compared with the strapping option outputs and FCEF is set to the appropriate state.

After three consecutive miscompares the alarm counter 967 increments from state 3 to 4. This occurs approximately 1 frame period after the third bad frame count was received and occurs regardless of whether the current received frame count is correct or not.

When in state 4 the Alarm line (ALMF) goes to 0. This sets RS and TREN to 0, resetting bit counter 958 to 4, address register 1973 to all 1's, PSI to 1, and resets the alarm counter 967 to its starting state. With PSI at a ONE and no carrier-off period on the loop, the sync detect circuit 952 sets SYALF to 0. The MCU then begins again the process of acquiring frame and frame group sync.

(V–D–4) Editing and processing input data

If frame group sync has been acquired, the input data processor 962 of FIG. 1 will initiate an MCS load access (IRQIF of FIG. 52H) following receipt of any word which is not a "no action" command.

More specifically, from count 6 on bit counter 958 until the end of count 0 of the following cycle, the input data processor 962 inspects data in each word as it appears at the output of the first stage of the input buffer register 957. The count 6 pulse initiating such inspection is shown in the waveform of FIG. 52*i*, and specifically is represented by pulse 975 thereof. Such inspection of the first stage of input buffer register 957 over the time period mentioned above corresponds to the data field of each word received. When the entire word (dialogic and data fields) has been completely shifted into the input shift register 954, the dialogic bit (line ID 31) from gating circuit 963 is inspected.

If the dialogic bit is 1 and the data field is all 0's, the input request initiate pulse (IRQIF), normally occurring at the end of count 0 of the bit counter 958 is inhibited. On the other hand, if the dialogic bit is 1 and there is one or more 1's in the data field (control word received) the data field in the input shift register is cleared to all 0's by a data clear pulse (DCLR) from input data processor 962 in the last half of count zero and IRQIF initiates a load request to load the "no action" command. If the dialogic bit is 0, there is no DCLR pulse and IRQIF is issued.

The function of MXDMFIF input to the gate 963 has been discussed before. In general, it is an editing control function and when it is a 1 it represents normal operation so that the dialogic bit is a 1 the input data processor 962 functions to change the data field to all 0's and loads the "no action" command into the Time Division Table. On the other hand, if MXDMIF is a 0 indicating editing in a test mode, all data from the loop is loaded unchanged in the Time Division Table.

(V–E) MCU Transfer Link Interface Circuitry (FIGS. 53, 54)

The general purpose of the transfer link interface circuitry shown in FIG. 53 is to accept memory request initiate signals from the output and input sections of FIGS. 49 and 51, respectively, present a load or unload request, and the associated MCS address, to the transfer link, gate data between the MCU and the transfer link in response to the DTEF–M pulses, and ascertain if the transfer link makes a complete response to every request (3 DTE's pulses or an Invalid Address indication) within 5 to 9 clock periods at the MCLK frequency. The three DTE pulses are shown in waveforms 54H and 54S for the two conditions as indicated in the titles of the two groups of drawings in FIG. 54. A more detailed description of the function of the DTE's will be given below:

The alignment of the input bit counter 958 of FIG. 51 relative to the output bit counter 911 of FIG. 49 depends upon the time required for signals to travel around the loop. The loop delay varies with the system configuration. Consequently, request initiate signals (IRQIF) from the input section of FIG. 51 and request initiate signals (ITXF) from the output section of FIG. 49 can occur at any time with respect to each other. Problems are created if the request initiate signals from the input section and output section overlap. Such problems are resolved as discussed in the following paragraphs.

The input access signal (INACC) generated by input accessing signal generator 980 and the output accessing signal (OTACC) generated by output accessing signal generator 981 go to 1 throughout an MCS access by the input or output section respectively. If either signal is present when a request initiate signal is received from the other section, the transfer link interface circuit of FIG. 53 does not present the address and request signal (REQM–M) for the last mentioned section until after the access by the first mentioned section is completed. A completed access is indicated by:

(1) The trailing edge of the 3rd DTE pulse of FIGS. 54H or 54S and occurring at time $t_4$.

(2) The trailing edge (0–1 transition) of an invalid address signal (IAF–M) as shown in waveforms 54I at time $t_4$.

(3) The trailing edge of the request abort signal (RA) from the response monitor 985 of FIG. 53 as shown in waveform of FIG. 54U at time $t_7$.

Normally, the transfer link returns a series of 3 DTEF pulses in response to any request. The DTEF counter 982 is a three state counter which responds to the three DTEF pulses supplied thereto to generate two successive gating signals GLSI and GMSI to transfer the most and least significant half words between the transfer link and the MCU registers. If INACC is 1, the gating means 990 responds to the two gating signals GMSI and GLSI to place data from the input shift register 973 of input section of FIG. 51 and appearing on data lines 992 to the transfer link via data lines (MXS00–MXS–15). On the other hand, if OTACC is a 1, the contents of MXD00–MXD15 of FIG. 53 are jam set into the output shift register 900 of FIG. 49 by unload gates 987. More specifically, the unload gate 987 consists of two gates controlled by signals GLSOF and GMSOF from DTE counter 982 which functions to energize unload gates 987 such that the 32 bit word received from MCS is unloaded into shift register 900 in two 8 bit bytes via leads 996′. LSHF is a signal generated by the trailing edges of the second and third DTE pulses from DTE counter 982 and indicate that the least significant halfword is being transferred during such time interval. Thus, in FIG. 54T it can be seen that the LSHF pulse occurs between time $t_3$ and $t_4$ which coincides with the trailing edges of the second and third DTEF pulse of FIG. 54S.

For operation with a two $\mu$s. memory, for example, the transfer link should send a complete response to any MCU request within four $\mu$s. (5 bit periods at 1.2288 mHz.). If the transfer link does not return three DTE pulses (indicated by LSHF) or an IAF–M pulse indicated by the waveform of FIG. 54I within 5 to 9 clock periods at the MCLK frequency, the response monitor 985 of FIG. 53 generates a request abort pulse (RA), which is shown in waveform 54U. RA sets the output data editing circuitry for a no transmit response as discussed in the preceding section.

The function of the request abort pulse RA is shown in the waveforms of FIGS. 54L–54V. More specifically, at time $t_2$ an output request pulse (ITXF) occurs. However, prior to this time an input request pulse (IRQIFM) had occurred at time $t_1$ so that INACC of FIG. 54P had gone to a 1. Thus, at time $t_2$ the output request of FIG. 54L could not be honored. At time $t_5$ the input access (INACC) of waveform 54P was completed, and the output access (OTACC) of waveform 54M was initiated.

In the waveforms as presented, due to some malfunction in equipment, however, the transfer link did not return the three DTEF pulses within the 5 to 9 clock period intervals. Consequently, at time $t_6$ a request abort pulse 999 as shown in FIG. 54U, was generated by the monitor response circuit 985 of FIG. 53 in response to the LSHF pulse from DTE counter 982.

It is to be emphasized that an MCS access is initiated by an input request pulse IREQ from input request generator 983 or an output request OREQ from output request generator 984 through OR gate 988 and then into the data processor as a request for access signal (REQF–M). The DTEF–M signal is in response to the REQF–M signal in the normal operation.

In waveforms of FIGS. 54A–54K, there is shown the case where an invalid address response (IAF–M) is received from the transfer link. More specifically, the portion of the waveform to the left of vertical dotted line 1000 indicate a normal response as discussed in connection with the left-hand portion of the waveforms of FIGS. 54L–54V.

At time $t_2$ shown in the waveform of FIG. 54C, an IRQIF pulse occurs which initiates access signal INACC for MCS. However, due to an incorrect address an invalid address signal (IAF–M), as shown in FIG. 54I, is generated at time $t_3$ and terminated at time $t_4$. Such IAF–M signal occurs in lieu of the three DTE pulses. The trailing edge of said IAF–M pulses at time $t_4$ functions to terminate the access completed pulse (C) of the waveform of FIG. 54K. The access completed pulse (AC) is supplied from response monitor 985 of FIG. 53 to the input generator 983 and the input accessing signal generator 980. As discussed hereinbefore an invalid address signal (IAF–M) causes the MCU to generate a "no action" command. At $t_5$ in the waveforms of FIGS. 54D and 54E, it can be seen that the tenth count BC10 of the counter 958 of FIG. 51 terminates the input access signal (INACC).

The access in process signal (AIPF) is 0 throughout any MCS access, as for example between the times $t_1$ and $t_4$ of FIG. 54Q. In all other conditions, the accessing process signal is a 1. The access complete signal (AC) indicates the end of any access, whether terminated by three DTE's an IAF–M, or a request abort signal (RA). Output moved before the word is to be transmitted to the loop. As mentioned above, bit count 10 (BC10) performs a similar function for the input section.

(VI) DETAILED DESCRIPTION OF BUS REMOTE UNIT

(VI–A) General (FIGS. 55, 56)

In some applications it is desired to control a device control unit located at large distances from the data processor and the associated LCU's. In order to get the information from the data processor to the controlled device it is necessary to first change the data into a form suitable for transmission over long distances, as for example, over telephone lines. At the receiving or remote terminal, it is then necessary to detect the transmitted data, decode it back into the language of the DCU and then supply said data to the device.

The reverse process is necessary in transmitting a monitor response from the device back to the LCU located at the local terminal. More specifically, it is necessary to transform the data received from the DCU located at the remote terminal into a form suitable for transmission over telephone lines. A conventional data modem is utilized for this purpose. At the local terminal it is necessary to decode the received information into a form usable in the LCU's. Here again, a modem is employed to decode the received information. To interface the modems at the local and remote terminals respectively with the LCU's and the device control unit, there are provided bus remoting units.

More specifically, referring to FIG. 55, at the local terminals input data supplied to one of the two LCU's 1012 or 1009, is processed by the local bus remoting unit (BRU) 1016 and is supplied to a modem 1017 at the proper bit rate. In the particular form of invention described herein BRU 1016 is designed to accept bus data from LCU 1012 or 1009 at a 4800 Hz. signalling rate and to present such data to the modem 1017 at 4800, 3600, 2400, or 1200 bits per second. The BRU 1016 is also capable of accepting data from modem 1017 at 4800, 3600, 2400, or 1200 bits per second and to present such data to either the LCU 1012 or the LCU 1016 at a 4800 Hz. signalling rate.

The BRU 1020 at the remote terminal is designed to accept data from modem 1019 and to deliver data to modem 1019 at the same bit rates as discused above in connection with BRU 1016 and modem 1017 at the local terminal.

When operating at a 4800 bit per second modem rate, every word period is passed from the LCU, such as LCU 1012, to the modem 1017, through BRU 1016. When operating at 3600 bits per second, three out of four word periods are passed from the LCU 1012 to modem 1017. When operating at 2400 bits per second, every other word is passed to the modem 1017, and when operating at 1200 bits per second every fourth word is passed from LCU 1012 to modem 1017. BRU 1016 determines which word periods are to be passed by inspecting the 7 bit address field following the dialogic bit. It is therefore the interface program's responsibility to insure an all zero address in the proper number of word periods. For example, in the 2400 bit per second case, at least every other word period supplied to the modem 1017 from LCU 1012 contains an address field on all 0's. If more than every other word contains an all 0 address, i.e., an idle word, idle words will be sent from the modem 1017 to modem 1019. At the remote end the data is reconstituted and sent onto the control bus at 4800 bits. Idle words are used as time differential characters.

FIG. 56 is a functional diagram showing the general similarities and differences of the local and remote BRU's. It is to be specifically noted that both the local and remote BRU's are designed to utilize a modem operating at rates equal to or less than the bus rate. Consequently, in both the local and remote BRU's speed change means are required. Such speed changing functions are required in both directions in both BRU's.

The differences between the local and remote BRU's can be generalized as follows:

(1) The local BRU 1027 simulates a bus interface 1025 to the local LCU while the remote BRU 1034 generates a bus interface 1037, and looks like LCU to said bus interface.

(2) The local BRU 1027 contains logic to synchronize the monitor bus to the control bus so as to maintain the 90° phase relationship (+1 bit) required for word sync at the LCU interface 1025.

(3) The remote BRU 1034 differentiates between on and off carrier on the monitor bus and encodes this condition when sending data to the modem interface 1032 while the local BRU 1027 sends either the control data supplied to it through LCU interface 1025, or alternatively, sends an idle word from modem interface 1030.

(4) The local BRU 1027 accepts 4800 Hz. timing via DCU interface 1026 from the modem speed control and generates therefrom timing at the modem data rate, while the remote BRU 1034 accepts modem timing rate through DCU interface 1033 and generates 4800 Hz. timing for the remote bus via bus interface 1037.

(VI–B) Local Terminals (FIG. 57)

The BRU located at the local terminal such as BRU 1027 of FIG. 56 is shown in the detailed block diagram in FIG. 57. It can be seen that there are two sets of inputs to the DCU. One of these sets of inputs is from either of the two LCU's designated as LCU A and LCU B. The other set of inputs is from either of the two DCU's designated as DCU A and DCU B. The choice of which LCU and which DCU is employed is controlled by the system performance monitor information (SPM), which controls switches 1040 and 1056 respectively.

The reason for the choice of two LCU's and the corresponding DCU's is as follows: The BRU of FIG. 57 is instructed ot receive information from one of the data processor systems, one of them identified as processor A and the other as processor B; hence the designation LCUA and LCUB. The choice of processors is determined by programming within the processors themselves which supply a control entitled System Performance Monitor (SPM) to the switches 1040 and 1056. The information supplied from the LCU's consists of data information and clock information. However, it is sometimes desired to change the modem data rate due to any one of several factors. For example, if the error rate of the transmitted data has become too high, it is desirable to lower the rate of transmission. Such function is controlled by a device control element located at the local site. Such device control element is identified as block 1056 in FIG. 57 and is under direct control of instructions appearing on the DCU bus. As indicated in FIG. 57 such instructions can be received via a DCU bus from processor A (DCUA) or a DCU bus from processor B (DCUB). The selection of which DCU is to control the device 1056 is made by the SPM signal.

The bit rate clock generator 1054, which generates the modem bit rate is under direct control of device 1056 and supplies an output signal via lead 1080 to the modem transmit clock line 1055, the 36 bit conuter 1051, and the 5 bit up-down counter 1049, all of which are associated with the data supplied to the local modem at the modem bit rate as will be expalined in detail later herein.

The inputs from the LCU's consist of a control bus and a 4800 bit per second timing bus having sine wave signalling. The control bus 1042 supplies the data to demodulator 1044 which demodulates the data and supplies it to two circuits. One of these circuits is the supervisory detector 1045 which derives synchronization from the data word by detecting the supervisory field. The other circuit is shown within dotted block 1081 and functions primarily as a means for storing the received data and then retransmitting it to the modem via lead 1071 at the bit rate of the modem. The retransmitting of the data in storage means 1081 to the modem is under control of the transmit control block 1050, the 36 bit counter 1051 and the pattern generator 1053.

(VI–B–1) Transmit mode (FIG. 57)

The operation of the transmit portion of FIG. 57 is as follows:

The supervisory detector 1045 detects the supervisory field of the incoming words and places a signal on delimiter lead 1081 identifying the beginning and the ending of the supervisory field. The transmit control 1050 responds to the beginning of the supervisory field, and more specifically to the dilimiter signal, to reset 36 bit counter 1051 to zero, thus marking the biginning of a 36 bit word. As indicated before, the 36 bit counter is under control of clock generator 1054 and will count at the bit rate of the modem. For purposes of discussion assume that the modem bit rate is 2400 bits persecond as compared to the received bit rate of 4800 bits per second from the LCU. This means that only every other word received from the LCU's can be a data word, with the intervening words being idle words which must be discarded by the system.

Some means must be provided in the system to recognize the idle words. Such a means consists of the address store circuit 1046, the address decode circuit 1047 and a portion of the transmit control 1050. More specifically, the address store circuit can be a 7 bit shift register capable of storing the 7 bit address code. All of the idle words are identifiable by the fact that they have an all zero 7 bit address code which is recognized by the address decode circuit 1047. The transmit control circuit 1050 is instructed to look for time 7 bit address code at the proper time by means of the count within the 36 bit counter 1051. More specifically, the 7 bit address code occurs in the 6th through 13th bit positions of the received word; the first four bit positons a word constituting the supervisory field and the fifth bit position comprising the dialogic bit. Consequently, at the end of the 13th count the address storage means 1046 means contains the 7 bit address which is decoded by the address decode circuit 1047 and detected then by the transmit control circuit 1050. If the address code consists of all 0's, the transmit control circuit functions to supply a signal on output lead 1083 to gate 1094 to block the remaining bits of the word from entering the input matrix 1048. On the other hand, if the address contains at least one 1 the transmit control circuit causes the gate 1084 to be conductive so that tre recognized data word is supplied to input matrix 1048.

Before discussing the operation of the input matrix 1048, transmit register 1070 and the 5 bit up-down counter 1049, all of which operate together, the generation of the supervisory fields of the word supplied to the modem via lead 1071 will be discussed. More specifically, at the beginning of each word, as determined by the resetting of the 36 bit counter 1051, the pattern generator circuit 1053 responds thereto to generate a 4 bit supervisory field consisting of four 1's, at the 2400 bit per second rate. These 4 bits are supplied through gate 1052 to the modem via lead 1071. The remaining 32 bits of the word must come then from the transmit register 1070.

Generally speaking, the input matrix 1048, the up-down counter 1049 and the transmit register 1070 function as a speed change means in that they receive data at a first first rate (4800 Hz.) and then to transmit said data from the shift register 1070 at a second bit rate (2400 bits per second). The operation is generally as follows: As each bit is entered into the input matrix 1048, the up-down counter 1049 is incremented by a count of one via the 4800 bit per second carrier signal appearing on lead 1043. The input matrix 1048 contains decoding circuitry so that it will supply a received bit to a given stage of shift register 1070 in accordance with count contained in counter 1049. For example, if the counter contained within counter 1049 is 5, the input matrix will supply a received bit into stage 5 of the shift register 1070.

Other clock means at the 2400 bit rate of the modem function to shift the data out of the shift register 1070 and through gate 1052 to lead 1071. Specifically, the 2400 bit per second clock is supplied from clock generator 1054 to the shift register 1070 via lead 1084.

Each time a bit is shifted out of register 1070 the up-down counter 1049 is decremented a count of one. Thus, the counter always contains the count corresponding to the stage containing the next bit to be transferred out of shift register 1070 to the modem.

A specific example might clarify the above discussion. Assume, for example, that four bits have been received into input matrix 1048 and routed into the first four stages of shift register 1070, and further that none have yet been transmitted out of shift register 1070. The first of these four bits was directed through input matrix 1048 to the first stage of shift register 1070, the first stage being at the right-hand side of shift register 1070 and the first stage to transmit an output to the modem. The second bit received was directed to the second stage of shift register 1070 via input matrix 1048 since the count of the counter 1049 was then a 2. Immediately after shifting the second received bit into the second stage of the shift register the up-down counter 1049 was incremented so that it contained a three. Thus when the third bit was received by input matrix 1048 it was directed to the third stage of shift register 1070 and the up-down counter was incremented to a four. Thus, after the 4 bits were received, the up-down counter contained a five and the first four stages of the shift register 1070 each contain a bit.

Assume now that the first bit received is shifted out of register 1070 and onto lead 1071 to the modem. Such shifting is effected by the 2400 Hz. clock appearing on leads 1080 and 1084 of FIG. 57. At the same time the clock pulse shifts the first bit out of register 1070, it will decrement the count of counter 1049 from a five to a four. Thus, the next bit received by input matrix 1048, which will be the fifth bit of the word, will be directed to stage four which is now empty, since the fourth bit received has been shifted to the third stage.

As mentioned above, under some circumstances, it might be desired to have a modern bit rate other than 2400 bits per second. Assume, for example, that it is desired to have a modem bit rate of 3600 bits per second with the received bit rate from the LCU equal to 4800 bits per second. Under these conditions, every fourth word should be an idle word with an all zero 7 bit address. The bit rate clock generator 1054 will be changed by instruction from the DCU to generate a 3600 Hz. clock rate and 36 bit counter 1051 will count at the new 3600 Hz. clock rate. The speed change means, including input matrix 1048, the up-down counter 1049 and the shift register 1070, will then all operate at the 3600 bit rate.

(VI–B–2) Receive mode (FIG. 57)

Data and clock are received from the local modem on leads 1057 and 1058, respectively. The frame and data detector 1059 examines the received data to establish synchronism. More specifically, the frame and data detector 1059 looks for the presence of a 1111 or 1100 pattern in the supervisory field of the received data. When the system is in synchronism, one or the other of these two word sync codes should occur every word period.

If the word sync codes are not observed for three word periods, the receive control 1064 will respond thereto to enter an out-of-sync condition and it will then be necessary for the detector 1059 to re-establish synchronism by statistical observation of the encoded word sync codes for several word periods. The first point in the frame to contain one of the two allowable word sync codes will reset the frame counter in the frame and data detector means 1059 and this same field will be examined one frame time later. If a word sync code is again present then the frame detector is reset and the system will again require three word periods where the word sync codes are not recognized to place itself and the receive control 1064 in an out-of-sync condition. On the other hand, if a word sync code is not present when field is examined one frame later, the next occurring word sync code will reset the counter contained in the frame and data detector 1059. This process occurs until synchronism is achieved.

Once the system is synchronized, the incoming data bits on lead 1057 are loaded into a shift register 1062 via input matrix 1061 under control of the up-down counter 1060 in much the same manner as the operation of input matrix 1048, shift register 1070, and up-down counter 1049 of the transmit portion of the circuit.

If a 1111 is detected in the supervisory field by the frame and data detector 1059, indicating monitor data in the word period following, such monitor data is loaded into the receive register 1052 under control of the up-down counter 1060. Initially, the first bit is directed into the first stage of the shift register 1062, the second bit into the second stage, etc. When the monitor word interval defined by the delimiter signal on lead 1081, begins (plus one bit delay) the said receive control circuit 1064 will function to supply a shift pulse to register 1062 via lead 1086 and shift the first stored bit out of the shift register and into the modulator 1063 and then into the LCU through switch 1040.

It should be noted that the up-down counter 1060 is incremented once for each bit supplied through the input matrix to shift register 1062 via lead 1087, and is decremented once each time a bit is transferred out of the shift register 1062 via lead 1088.

The 1 bit delay mentioned above is needed because the monitor bus is normally one bit delayed from the control bus as discussed hereinbefore. Such 1 bit delay thus synchronizes the monitor data with the control data at the LCU interface period. If no valid data has been received from the modem when the delimiter bus defines the start of a monitor period, the receive control circuit 1064 maintains a carrier-off condition for the balance of that word period.

(VI–C) Remote Terminal (FIG. 58)

The remote terminal is shown in detail in the block diagram of FIG. 58. Such remote terminal accepts data from the modem at the remote site at 4800, 3600, 2400 or 1200 bits per second and then functions to generate a control in the carrier bus at a 4800 Hz. signalling rate. Such control and carrier bus signals are supplied to the control bus 1113 and the carrier bus 1114 of FIG. 58, respectively. Time differential characters are supplied by the BRU of FIG. 58 when the word rate differs. Conversely, the BRU of FIG. 58 accepts data from the remote monitor bus 1115 at 4800 bits per second and transmits such data over the modem at 4800, 3600, 2400 or 1200 bits per second.

As in the case of the local BRU, the remote BRU has two modes of operation; one of these modes is the receive operation in which it receives data from the local BRU, and the other mode is the transmit mode in which it receives data from the remote monitor bus and transmits such data back to the local BRU.

(VI–C–1) Receive mode (FIG. 58)

In the receive mode, data is received from the modem on input lead 1116 and the modem clock is supplied to the BRU on input lead 1117. Generally, the structure above the dotted line 1111 of FIG. 58 functions quite similarly to the structure above the dotted line 1090 of FIG. 57, except that in the case of FIG. 58, the data is received from a modem at 2400 bits per second and then is supplied out to the remote control bus 1113 at a 4800 bit rate, whereas the reverse is substantially true in the portion of FIG. 57 above dotted line 1090.

More specifically, the received data from the remote modem is supplied to a frame detector 1100 which functions to detect the beginning of each word by recognizing the supervisory field therein and supplies this information onto the receive control 1101. Said receive control 1101 functions to reset 36 bit counter 1102 at the beginning of each word. The counter 1102, however, does not count at the 2400 bit rate of the data from the modem, but rather counts at the 4800 bit rate of the control bus 1113. Such 4800 bit rate clock is generated by clock 1107, the output of which is supplied to counter 1102 and also to the carrier bus 1114 through smoothing filter 1110. The 4800 Hz. clock 1107 is synchronized with the modem receive clock at least insofar as its frequency is twice that of the 2400 Hz. clock of the modem.

The 4800 Hz. clock is also supplied to the up-down counter 1104 in speed change means 1103 and further is applied to a modulator 1108. Said modulator 1108 functions to receive data from shift register 1106 and to modulate said data into biphase sine wave signal at the 4800 bit clock rate.

The data received from the modem is also supplied to input matrix 1105 at the 2400 bit rate of the modem and then, under control of up-down counter 1103, is supplied to the proper stage of receive shift register 1106 in much the same manner discussed re the speed change means of FIG. 57, described in detail above.

The up-down counter 1104 is incremented via lead 1119 each time a bit is entered therein from the modem and is decremented via lead 1120 each time a bit is shifted from shift register 1106 onto the control bus 1113.

(VI–C–2) Transmit mode (FIG. 58)

The incoming monitor bus data is received on input lead 1115 and demodulated in demodulator 1120. A frame detector 1121 provides for frame synchronization and once this synchronization is obtained, opens data gate 1122 to permit the data to pass into input matrix 1127 of speed change device 1125. It should be noted that the speed change device 1125 also includes an up-down counter 1128, and a transmit shift register 1126, all of which cooperate in much the same manner as the speed change device 1103 of FIG. 58, and the two speed change devices of FIG. 57, previously described.

A transmit control 1123 is responsible to the output of frame detector 1121 to initially activate pattern generator 1124. Said pattern generator 1124 at the beginning of each word generates a four bit supervisory field which is entered into transmit register 1126. Subsequently, transmit control 1123 functions to control the incrementing of the up-down counter 1128 each time a data bit is supplied into input matrix 1127 from the monitor bus 1115. It is to be understood that the data bits from the monitor bus are not supplied to input matrix 1127 until after the pattern generator 1124 has supplied its four bit supervisory field to the transmit register 1126.

Data is shifted out of transmit register 1126 by the modem clock appearing on lead 1131. Said modem clock also functions to decrement the up-down counter 1128. The said data shifted out of transmit register 1126 is transmitted to the modem via lead 1129.

(VII) DETAILED DISCUSSION OF MULTIPLEX LOOP CABLE (FIGS. 59, 60)

The type cable employed in the multiplex loop of the present invention is preferably of the coaxial type. More specifically, for outside purposes one type of coaxial cable is preferable, whereas for use inside a building another type coaxial cable has been found to be better.

When evaluating coaxial cables suitable for use outside, a number of factors must be considered. These factors are primarily installation, maintenance, electrical characteristics, cost, and useful life. It appears at this time that most of the outside plant cable will be contained in underground ducts, conduits, or trenches and that a great variation in cable length will occur. More specifically, it appears that cable runs as small as several hundred feet to runs in excess of 4000 feet will be encountered. The above considerations rule out the use of small and medium solid dielectric cables, especially those which utilize braided shield construction. Therefore, two general types of cables currently in common use remain. These two types of cables are foam dielectric and air-dielectric cables with solid outer conductors. Rigid air dielectric cables are not believed to be feasible due to their high cost and incompatiblity with installation requirements.

In FIG. 59 there is shown an overall picture of a high speed data loop, a part of which is in an outside environment and a part of which is within buildings 1151 and 1152 and also in the data processor site building 1150. It is obvious that a loop can be caused to run through additional buildings. As a matter of fact, the loop might be changed over a given period of time to accommodate a newly built installation and in some instances to bypass buildings which for some reason or other are no longer required in the loop. The aforementioned variables and some others are summarized as:

(1) The total length of the loop is variable, depending upon the particular installation and the change in that particular installation due to the addition or deletion of buildings.

(2) The mix of inside cable vs. outside cables can change due to the reasons in (1) above and also due to the addition of LCU's to the system in any given building.

(3) As mentioned above, the number of LCU's in a system will not remain constant. Since each LCU has some degradation to the system, the addition of each LCU will affect the quality of the signal delivered to each "down stream" LCU.

In view of the above, the cable system must be approached with considerable caution to avoid designing a system which will become obsolete or which restrains the growth of the total overall system. To minimize this possibility, the cable must be broken into discrete sections and these sections designed on a stand-alone basis.

One obvious division of the cable includes the cables outside the buildings. These outside cables represent a considerable investment and usually would be considered permanent once installed.

The inside cables present a somewhat more difficult problem in that changes will occur as LCU's are added or deleted from the system. Therefore, the inside cable system must be supplemented with additional equalizers/repeaters which will allow the cable systems to be compensated as more LCU's are added to the system.

A preferred type of cable for use outside is a foam dielectric coaxial cable which is available as a solid cable in small sizes and available in hollow form for larger cables. Foam polyethylene is used for the dielectric and a smooth aluminum outer conductor is extruded over the dielectric. This cable is available currently with or without a jacket over the outer conductor, and further is available in unbroken lengths of about 1000 feet maximum. Specifically, such cable has a 75 ohm characteristic impedance and can be obtained in sizes of outside diameters of ¼ inch to 1⅝ inch.

Another type cable that can be used outside is the air dielectric coaxial cable. This type cable utilizes a copper center conductor which may be either solid or hollow depending upon cable size. The outer conductor is smooth extruded aluminum. The outer and inner conductors are separated by a polystyrene tape helix. Such a cable is available in unbroken lengths of 1000 feet maximum having a 75 ohm characteristic impedance and diameters of ½ inch to 3⅛ inch.

In selecting a cable for inside use, it is advisable to obtain a coaxial cable with linear characteristics to about 100 kHz. in order to be able to equalize correctly. One type cable that has been found suitable for inside use is coaxial cable commonly used for TV systems (CATV cable).

In installing cables several factors must be considered. For example, in those instances where a cable runs more than several thousand feet some access means, such as manholes, should be placed along the cable run so that the maximum length of cable that must be pulled is less than 1000 feet. It is possible to obtain cable lengths equal to the exact distance between manholes. By purchasing cable in such lengths no cable connectors between manholes are required.

Polyethylene jacketed cable is recommended not only for obvious maintenance reasons, but also to aid in installation. The smooth outside surface of the jacketed cable is easier to pull.

The use of foam dielectric coaxial cable eases installation problems. While connectors for both foam dielectric and air dielectric cable are both readily available, connectors for foam dielectric cable are easier to install. The use of air dielectric cable requires installation of pressurization, dehydration and monitoring equipment. No such additional equipment is required with foam dielectric cable. It is also necessary to take special precautions with air dielectric cable that are not necessary with foam dielectric cable. The ends of the air dielectric cable must be kept capped during installation and the connectors installed under a controlled environment.

Smaller obtainable bend radii obtainable with foamed dielectric influence the ease of installation of the cable. The supporting nature of the foam dielectric makes the cable less likely to kink when being unreeled and permits a smaller bend radius. Pulling strength varies between cables. The pulling strength is a function of the thickness and material of the outer conductor. For the length of cable involved (less than 1000 feet) no problem is anticipated.

A signal transmitted over a coaxial cable system experiences both amplitude and phase distortion. The amplitude distortion is a result of a variation in cable attenuation with frequency. A high frequency component of a signal will experience a higher attenuation than will a low frequency component. The attenuation versus frequency characteristics of a cable system is essentially linear where higher frequency approximations can be made. For most cables one MHz. is the lowest frequency where high frequency approximations are appropriate.

In order to reproduce a signal at the output of a cable system equalizers are required. This device will attenuate the low frequency components of a signal such that all components of the output signal have the same relative magnitude as they had originally at the input.

The phase delay experienced in a cable can be expressed as a function of the length of the cable L, velocity of propagation of the signal through the cable $V_p$ and the frequency of the signal $f$.

$$\phi=\frac{2\pi fL}{Vp} \quad (1)$$

If $V_p$ were a constant, a linear curve of $\phi$ versus $f$ could be drawn. However, $V_p$ is a function of $f$ and thus a departure from the linear phase versus frequency curve is observed. The two curves are shown in FIG. 60.

The differential delay of the system is defined by the slope of the curve defining $\phi$ as a function of frequency. Thus, if the phase frequency curve is not linear, differential delay will be introduced into the system.

As noted in the previous paragraph, distortion in the coaxial cable system is introduced primarily by the amplifiers in the system. A general rule is that sharp changes in the attenuation-frequency characteristic of the system will introduce phase changes for at least a decade above and below the cut-off frequencies. Therefore, to minimize delay distortion, the pass band of each amplifier in the system should be much wider than the band of the signal to be amplified.

Phase equalization can be accomplished by the utilization of an all-pass network with the proper phase characteristics. Alternatively, regenerative repeaters can be used to eliminate the necessity of equalizing both the amplitude and the phase characteristics of a signal. The signal is simply regenerated at intervals along the coaxial line. However, the use of a regenerative repeater with a modulated signal requires the signal to be demodulated, detected, regenerated, remodulated and transmitted down the line. The extra steps of demodulating and modulating and many more components to the repeater, thus increasing the cost and reducing the reliability of the system.

It is to be understood that the form of the invention described herein is but a preferred form thereof and that various and multiple changes can be made in the logic thereof without departing from the spirit or scope of the invention.

I claim:

1. A system for computing, communicating, and controlling comprising:

data processor means having N addressable storage locations therein;

transmission line means having an input means and an output means and constructed to circulate data supplied thereto;

first interface means for accessing each of said N storage locations in a predetermined sequence and for sequentially and serially supplying to said input means of said transmission line means a plurality of data words, each of which is derived from a data word stored in one of said N storage locations, and each of which occupies, in the data circulating in said transmission line means, a time slot corresponding to and having a known and identifiable relationship with the storage location from which said occupying word is derived;

said first interface means further constructed to receive data words serially from the output means of said transmission line means and to supply each of said received data words into the storage location corresponding to the time slot of said received data words;

and a plurality of M stations positioned along said transmission line means, each constructed to intercept predetermined and time identifiable ones of said data words circulating in said transmission line means, to generate response data words, and to insert said response data words in predetermined time slots in said transmission line means.

2. A system in accordance with claim 1 in which:

each of said plurality of stations comprises loop coupling means and device control means;

in which said loop coupling means is constructed to intercept said predetermined and time identifiable data words circulating on said transmission line means at periodic time intervals;

in which said device control means is constructed to identify and to respond to certain ones of said predetermined intercepted data words to generate response data words, and to supply said response data words to the loop coupling means of the same station;

and in which said loop coupling means comprises bit rate change means constructed to receive the data words intercepted from the transmission line means at the bit rate of said transmission line means and to supply said data words to said device control means at a second bit rate, and to receive words from said device control means at said second bit rate and to supply said last-mentioned received data words to said transmission line means at the bit rate of said transmission line means.

3. A communication system in accordance with claim 2 in which:

said first interface means is constructed to provide a first distinctive encoded mark in the data word corresponding to a predetermined reference storage location of said N storage locations and to provide a distinctive encoded mark in every other data word, which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

4. A system in accordance with claim 2 in which:

$$N=2^X \text{ and } M=2^Y$$

where X and Y are integers; and in which each of said loop coupling means is constructed to intercept $2^{X-Y}$ equal-time-spaced data words to effect a multiplexing function.

5. A system in accordance with claim 4 in which:

said first interface means is constructed to provide a first distinctive encoded mark in the data word corresponding to a predetermined reference storage location of said N storage locations and to provide a distinctive encoded mark in every other data word, which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

6. A system in accordance with claim 5 in which:

said $2^X$ storage locations are divided into $2^P$ frames, where P is an integer, where $P \ll X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

7. A system in accordance with claim 2 comprising remote communication means for supplying data words from said storage means in said data processor means at a local site to a remote site; said remote communication means comprising:

first modem means located at said local site;

first bus remote means comprising an interface between at least one of said loop coupling means and said first modem means and constructed to convert the format and bit rate of the data words received from said first modem means and said loop coupling means into a format and bit rate usable by said loop coupling means and said first modem, respectively;

second modem means located at said remote site;

device control means located at said remote site;

second bus remote means comprising an interface means between said device control means and said second modem means and constructed to convert the format and bit rate of data words received from said device control means and said second modem means into the format and bit rate usable by said second modem means and said device control means, respectively;

said first and second modem means constructed to transmit and to receive data words to and from each other.

8. A system in accordance with claim 1 in which:

each of said plurality M stations comprises a loop coupling means constructed to intercept data words circulating on said transmission line means at periodic time intervals;

and in which said loop coupling means comprises bit rate change means constructed to change the bit rate of the data words intercepted from said transmission line means to a second bit rate of said response data words, and to change the bit rate of said response data words into the bit rate of said intercepted data words.

9. A system in accordance with claim 8 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

10. A system in accordance with claim 8 in which:

$$N=2^X \text{ and } M=2^Y$$

where X and Y are integers; and in which each of said loop coupling means is constructed to intercept $2^{X-Y}$ equal-time-spaced data words to effect a multiplexing function.

11. A system in accordance with claim 10 in which:

said first interface means is constructed to provide a first distinctive encoded mark in the data word corresponding to a predetermined reference storage location of said N storage loctaions and to provide a distinctive encoded mark in every other data word, which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

12. A system in accordance with claim 1 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which each of said plurality of stations comprises timekeeping counting means responsive to said first distinctive encoded mark and to the distinctive encoded marks in said other data words to identify the beginning of each data word as it is received by said station and its relation to the data word containing said first distinctive encoded mark.

13. A system in accordance with claim 12 in which:

$$N=2^X \text{ and } M=2^Y$$

where X and Y are integers; and in which each of said plurality of stations is constructed to intercept $2^{X-Y}$ equal-time-spaced data words to effect a multiplexing function.

14. A system in accordance with claim 13 in which:

said $2^X$ storage locations are divided into $2^P$ frames, where P is an integer, where $P \ll X$, and where each frame contains $2^{X-P}$ data words;

in which said first interface means comprises means for providing third encoded marks in a predetermined data word of each frame;

and in which each of said plurality of stations comprises means responsive to said third encoded marks for identifying each of said frames.

15. A system in accordance with claim 1 in which:

$$N=2^X \text{ and } M=2^Y$$

where X and Y are integers; and in which each of said plurality of stations is constructed to intercept $2^{X-Y}$ equal-time-spaced data words to effect a multiplexing function.

16. A system in accordance with claim 15 in which:

said $2^X$ storage locations are divided into $2^P$ frames, where P is an integer, where $P \ll X$, and where each frame contains $2^{X-P}$ data words;

in which said first interface means comprises means for providing third encoded marks in a predetermined data word of each frame;

and in which each of said plurality of stations comprises means responsive to said third encoded marks for identifying each of said frames.

17. A system in accordance with claim 1 comprising remote communication means for supplying data words from said storage means in said data processor means at a local site to a remote site; said remote communication means comprising:

first modem means located at said local site;

first bus remote means comprising second interface means between at least one of said stations and said first modem means and constructed to convert the format and bit rate of said data words received from said first modem means and said station into the format and bit rate usable by said station and said first modem, respectively;

second modem means located at said remote site;

second device control means located at said remote site;

second bus remote means comprising third interface means between said second device control means and said second modem means and constructed to convert the format and bit rate of data words received from said second device control means and said second modem means into the format and bit rate usable by said second modem means and said device control means, respectively;

said first and second modem means constructed to transmit and receive data words to and from each other.

18. A communication system comprising:

data processor means comprising a plurality of at least N storage locations;

data circulating means comprising:

transmission line means having input and output means;

and first interface means constructed to supply time identifiable data words to the input means of said transmission line means from identifiable storage locations of said data processor means, to receive data words from the output means of said transmission line means, to identify the proper storage location of each received data word according to time of receipt, and to supply received data words to their proper storage locations;

a plurality of M stations positioned along said transmission line means with each station comprising:

loop coupling means having input and output means and constructed to time identify and intercept predetermined ones of said time identifiable data words circulating in said transmission line means and to supply said intercepted data words to said loop coupling means output means;

and device control means constructed to identify and to respond to certain ones of said predetermined intercepted data words to generate monitor response words, and to supply said monitor response words to the loop coupling means of the same station;

said loop coupling means further constructed to supply data words derived from said monitor response words, and identifiable by said first interface means, to said transmission line means during predetermined time intervals.

19. A communication system in accordance with claim 18 in which each of said loop coupling means comprises bit rate change means constructed to receive the data words intercepted from the transmission line means at the bit rate of said transmission line means and to supply said data words to said device control means at a second bit rate, and to receive words from said device control means at said second bit rate and to supply said last-mentioned received data words to said transmission line means at the bit rate of said transmission line means.

20. A communication system in accordance with claim 19 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

21. A communication system in accordance with claim 19 in which:

$$N=2^X \text{ and } M=2^Y$$

where X and Y are integers; and in which each of said loop coupling means is constructed to intercept $2^{X-Y}$ equal-time-spaced data words to effect a multiplexing function.

22. A communication system in accordance with claim 21 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises time-keeping counting means responsive to said first distinctive encoded mark and to the distinctive encoded marks in said other data words to identify the beginning of each data word as it is received by said loop coupling means and its relation to the data word containing said first distinctive encoded mark.

23. A communication system in accordance with claim 22 in which:

said $2^X$ storage locations are divided into $2^P$ frames, where P is an interger, where $P \ll X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

24. A communication system in accordance with claim 19 comprising remote communication means for supplying data words from said storage means in said data processor means at a local site to a remote site; said remote communication means comprising:

first modem means located at said local site;

first bus remote means comprising an interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

device control means located at said remote site;

second bus remote means comprising an interface means between said device control means and said second modem means and constructed to convert the format and bit rate of data words received from said device control means and said second modem means into the format and bit rate usable by said second modem means and device control means, respectively;

said first and second modem means constructed to transmit and receive data words to and from each other.

25. A communication system in accordance with claim 18 in which:

each of said loop coupling means is constructed to intercept data words circulating on said transmission line means at periodic time intervals;

and in which each of said loop coupling means comprises bit rate change means constructed to change the bit rate of the data words intercepted from said transmission line means to a second bit rate of said monitor response data words, and to change the bit rate of said monitor response data words into the bit rate of said intercepted data words.

26. A communicating system in accordance with claim 25 in which:

said first interface means in constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises time-keeping counting means responsive to said first distinctive encoded mark and to the distinctive encoded marks in said other data words to identify the beginning of each data word as it is received by said loop coupling means and its relation to the data word containing said first distinctive encoded mark.

27. A communication system in accordance with claim 25 in which:

$$N=2^X \text{ and } M=2^Y$$

where X and Y are integers; and in which each of said loop coupling means is constructed to intercept $2^{X-Y}$ equal-time-spaced data words to effect a multiplexing function.

28. A communication system in accordance with claim 18 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises time-keeping counting means responsive to said first distinctive encoded mark and to the distinctive encoded marks in said other data words to identify the beginning of each data word as it is received by said loop coupling means and its relation to the data word containing said first distinctive encoded mark.

29. A communication system in accordance with claim 28 in which:

$$N=2^X \text{ and } M=2^Y$$

where X and Y are intergers; and in which each of said loop coupling means is constructed to intercept $2^{X-Y}$ equal-time-spaced data words to effect a multiplexing function.

30. A communication system in accordance with claim 29 in which:

said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

31. A communication system in accordance with claim 18 in which:

$$N=2^X \text{ and } M=2^Y$$

where X and Y are integers; and in which each of said plurality of stations is constructed to intercept $2^{X-Y}$ equal-time-spaced data words to effect a multiplexing function.

32. A communication system in accordance with claim 31 in which:

said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

33. A communication system in accordance with claim 18 comprising remote communication means for supplying data words from said storage means in said data processor means at a local site to a remote site; and remote communication means comprising:

first modem means located at said local site;

first bus remote means comprising a second interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site;

second bus remote means comprising third interface means between said second device control means and said second modem means and constructed to convert the format and bit rate of data words received from said second device control means and said second modem means into the format and bit rate usable by said second modern means and said second device control means, respectively;

said first and second modem means constructed to transmit and receive data words to and from each other.

34. A communication system comprising:

data processing means having a plurality of accessible data storage locations therein and constructed to perform preprogrammed operations on data words supplied thereto;

data transmitting means comprising transmission line means having input means and output means and first interface means for supplying time identifiable data words to the input means of said transmission line means from said data processing means, for receiving data words from the output means of said transmission line means, and for supplying said received data words to predetermined storage locations of said data processing means according to time of receipt of said receiving data words;

a plurality of stations positioned along said transmission line means and each station comprising:

loop coupling means having input and output means and constructed to intercept predetermined ones of said time identifiable data words and to supply said intercepted data words to its output means;

device control means constructed to respond to certain identifiable ones of said predetermined data words to generate monitor response data words and to supply said monitor response data words to the associated loop coupling means;

said loop coupling means further constructed to supply said monitor response data words to said transmission line means during predetermined time intervals.

35. A communication system in accordance with claim 34 in which:

each of said loop coupling means is constructed to intercept said predetermined and time identifiable data words circulating on said transmission line means at periodic time intervals;

and in which each of said loop coupling means comprises bit rate change means constructed to receive the data words intercepted from the transmission line means at the bit rate of said transmission line means and to supply said data words to said device control means at a second bit rate, and to receive words from said device control means at said second bit rate and to supply said last-mentioned received data words to said transmission line means at the bit rate of said transmission line means.

36. A communication system in accordance with claim 35 in which:

said first interface means is constructed to provide a first distinctive encoded mark in the data word corresponding to a predetermined reference storage location of the data storage locations in said data processor means and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

37. A communication system in accordance with claim 35 comprising remote communication means for supplying data words from said data processor means at a local site to a remote site; said remote communication means comprising:

first modem means located at said local site;

first bus remote means comprising an interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site;

second bus remote means comprising an interface means between said second device control means and said second modem means and constructed to convert the format and bit rate of data words received from said second device control means and said second modem means into the format and bit rate usable by said second modem means and said second device control means, respectively;

said first and second modem means constructed to transmit and receive data words to and from each other.

38. A communication system in accordance with claim 34 comprising remote communication means for supplying data words from said data processor means at a local site to a remote site; said remote communication means comprising:

first modem means located at said local site;

first bus remote means comprising an interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site;

second bus remote means comprising another interface means between said second device control means and said second modem means and constructed to convert the format and bit rate of data words received from said second device control means and said second modem means into the format and bit rate usable by said second modem means and said second device control means, respectively;

said first and second modem means constructed to transmit and receive data words to and from each other.

39. A communication system in accordance with claim 34 which:

said first interface means is constructed to provide a first distinctive encoded mark in the data word corresponding to a predetermined reference storage location of the data storage location in said data processor means and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

40. A multiplex communication system comprising:

a data processing center;

a plurality of M stations located at various distances from said data processing center;

transmission line means beginning and ending at said data processing center and forming a loop passing through each of said plurality of stations;

said data processing center comprising:

accessible storage means comprising N data word storage locations;

first interface means for accessing said N data word storage locations in a sequential manner and for supplying said accessed data words to said transmission line means, with each data word circulating on said transmission line means in a time slot having a known and identifiable relation to every other time slot in the data circulating on said transmission line means;

receiving means for receiving data words from said transmission line means and for loading selected ones of said received data words into one of said N word storage locations;

said plurality of M stations constructed to time identify and intercept certain of said data words circulating on said transmission line means, to generate monitor response words, and to supply said monitor response words to said transmission line means during predetermined time slots.

41. A multiplex communication system in accordance with claim 40 in which:

each of said plurality of M stations comprises loop coupling means and first device control means;

in which said loop coupling means is constructed to intercept said predetermined and identifiable data words circulating on said transmission line means at periodic time intervals;

in which said device control means is constructed to identify and to respond to certain ones of said predetermined intercepted data words to generate said monitor response words, and to supply said monitor response words to the loop coupling means of the same station;

and in which said loop coupling means comprises bit rate change means constructed to receive the data words intercepted from the transmission line means at the bit rate of said transmission line means and to supply said data words to said first device control means at a second bit rate, and to receive words from said device control means at said second bit rate and to supply said last-mentioned received data words to said transmission line means at the bit rate of said transmission line means.

42. A multiplex communication system in accordance with claim 41 in which:

said first interface means is constructed to provide a first distinctive encoded mark in the data word corresponding to a predetermined reference storage location of said N data word storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

43. A multiplex communication system in accordance with claim 41 in which:

$$N=2^X \text{ and } M=2^Y$$

where X and Y are integers; and in which each of said plurality of stations is constructed to intercept $2^{X-Y}$ equal-time-spaced data words to effect a multiplexing function.

44. A multiplex communication system in accordance with claim 43 in which:

said first interface means is constructed to provide a first distinctive encoded mark in the data word corresponding to a predetermined reference storage location of said N data word storage locations and to provide a distinctive encoded mark in every other data word which is different from said first distinctive encoded mark;

and means in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

45. A multiplex communication system in accordance with claim 44 in which:

said $2^X$ storage locations are divided into $2^P$ frames, where P is an integer, where $P<<X$, and where each frame contains $2^{X-P}$ data words;

in which said interface means comprises means for providing third encoded marks in a predetermined data word of each frame;

and in which said loop coupling means comprises means responsive to said third encoded marks for identifying each of said frames.

46. A multiplex communication system in accordance with claim 41 comprising remote communication means for supplying data words from said storage means in said data processor means at a local site to a remote site; said remote communication means comprising:

first modem means located at said local site; first bus remote means comprising a second interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site; and second bus remote means comprising a third interface means between said second device control means and said second modem means and constructed to convert the format and bit rate of data words received from said second device control means and said second modem means into the format and bit rate usable by said second modem means and said second device control means, respectively;

said first and second modem means constructed to transmit and receive data words to and from each other.

47. A multiplex communication system in accordance with claim 40 in which:

each of said plurality of M stations comprises loop coupling means constructed to intercept data words circulating on said transmission line means at periodic time intervals;

and in which said loop coupling means comprises bit rate change means constructed to change the bit rate of the data words intercepted from said transmission line means to a second bit rate of said monitor response data words, and to change the bit rate of said monitor response data words into the bit rate of said intercepted data words.

48. A multiplex communication system in accordance with claim 47 in which:

said first interface means is constructed to provide a first distinctive encoded mark in the data word corresponding to a predetermined reference storage location of said N data word storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

49. A multiplex communication system in accordance with claim 48 in which:

$$N=2^X \text{ and } M=2^Y$$

where X and Y are integers; and in which each of said plurality of stations is constructed to intercept $2^{X-Y}$ equal-time-spaced data words to effect a multiplexing function.

50. A multiplex communication system in accordance with claim 40 in which:

said first interface means is constructed to provide a first distinctive encoded mark in the data word corresponding to a predetermined reference storage location of said N data word storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

51. A multiplex communication system in accordance with claim 50 in which:

$$N=2^X \text{ and } M=2^Y$$

where X and Y are integers; and in which each of said plurality of stations is constructed to intercept $2^{X-Y}$ equal-time-spaced data words to effect a multiplexing function.

52. A multiplex communication system in accordance with claim 51 in which said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

53. A multiplex communication system in accordance with claim 40 in which:

$$N=2^X \text{ and } M=2^Y$$

where X and Y are integers; and in which each of said plurality of stations is constructed to intercept $2^{X-Y}$ equal-time-spaced data words to effect a multiplexing function.

54. A multiplex communication system in accordance with claim 53 in which:

said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

55. A multiplex communication system in accordance with claim 40 comprising remote communication means for supplying data words from said storage means in said data processor means at a local site to a remote site; said remote communication means comprising:

first modem means located at said local site;

first bus remote means comprising a second interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site;

second bus remote means comprising an interface means between said second device control means and said second modem means and constructed to convert the format and bit rate of data words received from said second device control means and said second modem means into the format and bit rate usable by said second modem means and said second device control means, respectively;

said first and second modem means constructed to transmit and receive data words to and from each other.

56. A communication and control system comprising:

data processing means comprising a plurality of at least N storage locations and constructed to perform preprogrammed operations on data words supplied thereto;

data circulating means comprising:

transmission line means having input and output means; and first interface means constructed to supply identifiable data words to the input means of said transmission line means from identifiable storage locations of said data processor means, to receive data words from the output means of said transmission line means, to identify the proper storage location of each received data word and to supply received data words to their proper storage locations in said data processing means; and a plurality of M stations positioned along said transmission line means, each station constructed to intercept predetermined and identifiable ones of said data words circulating in said transmission line means, to generate monitor response words, and to insert said monitor response data words in predetermined time slots in said transmission line means.

57. A communication and control system in accordance with claim 56 in which:

each of said plurality of M stations comprises loop coupling means and device control means;

in which said loop coupling means is constructed to intercept said predetermined and identifiable data words circulating on said transmission line means at periodic time intervals;

in which said device control means is constructed to identify and to respond to certain ones of said predetermined intercepted data words, to generate said monitor response words, and to supply said monitor response words to the loop coupling means of the same station;

and in which said loop coupling means comprises bit rate change means constructed to receive the data words intercepted from the transmission line means at the bit rate of said transmission line means and to supply said data words to said device control means at a second bit rate, and to receive words from said device control means at said second bit rate and to supply said last-mentioned received data words to said transmission line means at the bit rate of said transmission line means.

58. A communication and control system in accordance with claim 57 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

59. A communication and control system in accordance with claim 57 in which:

$$N=2^X \text{ and } M=2^Y$$

where X and Y are integers; and in which each of said plurality of stations is constructed to intercept $2^{X-Y}$ equal-time-spaced data words to effect a multiplexing function.

60. A communication and control system in accordance with claim 59 in which:

said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

61. A communication and control system in accordance with claim 57 comprising remote communication means for supplying data words from said storage means in said data processor means at a local site to a remote site; said remote communication means comprising:

first modem means located at said local site;

first bus remote means comprising a second interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site;

second bus remote means comprising a third interface said second modem means and constructed to convert the format and bit rate of data words received from said second device control means and said second modem means into the format and bit rate usable by said second modem means and said second device control means, respectively;

said first and second modem means constructed to transmit and receive data words to and from each other.

62. A communication and control system in accordance with claim 56 in which;

each of said plurality of M stations comprises a loop coupling means constructed to intercept data words circulating on said transmission line means at periodic time intervals;

and in which said loop coupling means comprises bit rate change means constructed to change the bit rate of the data words intercepted from said transmission line means to a second bit rate of said monitor response data words, and to change the bit rate of said monitor response data words into the bit rate of said intercepted data words.

63. A communication and control system in accordance with claim 62 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

64. A communication and control system in accordance with claim 62 in which:

$$N=2^X \text{ and } M=2^Y$$

where X and Y are integers; and in which each of said plurality of stations is constructed to intercept $2^{X-Y}$ equal-time-spaced data words to effect a multiplexing function.

65. A communication and control system in accordance with claim 56 in which:

said first interface means is constructed to provide a first distinctive encoded mark in the data word corresponding to a predetermined reference storage location of said N storage locations and to provide a distinctive encoded mark in every other data word which is different from said first distinctive encoded mark;

and in which said loop coupling means comprises timekeeping counting means responsive to said first distinctive encoded mark and to the distinctive encoded marks in said other data words to identify the beginning of each data word as it is received by said loop coupling means and its relation to the data word containing said first distinctive encoded mark.

66. A communication and control system in accordance with claim 65 in which:

$$N=2^X \text{ and } M=2^Y$$

where X and Y are integers; and in which each of said plurality of stations is constructed to intercept $2^{X-Y}$ equal-time-spaced data words to effect a multiplexing function.

67. A communication and control system in accordance with claim 66 in which:

said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

68. A communication and control system in accordance with claim 56 in which:

$$N=2^X \text{ and } M=2^Y$$

where X and Y are integers; and in which each of said plurality of stations is constructed to intercept $2^{X-Y}$ equal-time-spaced data words to effect a multiplexing function.

69. A communication and control system in accordance with claim 68 in which:

said $2^X$ storage locations are divided into $2^P$ frames, where P is an integer, where $P<<X$, and where each frame contains $2^{X-P}$ data words;

in which said first interface means comprises means for providing third encoded marks in a predetermined data word of each frame;

and in which said loop coupling means comprises means responsive to said third encoded marks for identifying each of said frames.

70. A communication and control system in accordance with claim 56 comprising remote communication means for supplying data words from said storage means in said data processor means at a local site to a remote site; said remote communication means comprising:

first modem means located at said local site;

first bus remote means comprising a second interface between at least one of said loop coupling means and said first modem means and constructed to convert the format and bit rate of said data words received from said first modem means and said loop coupling means into the format and bit rate usable by said loop coupling means and said first modem, respectively;

second modem means located at said remote site;

second device control means located at said remote site;

second bus remote means comprising a third interface means between said second device control means and said second modem means and constructed to convert the format and bit rate of data words received from said second device control means and said second modem means into the format and bit rate usable by said second modem means and said second device control means, respectively;

said first and second modem means constructed to transmit and receive data words to and from each other.

References Cited

UNITED STATES PATENTS

| | | | |
|---|---|---|---|
| 3,432,813 | 3/1969 | Annunziata et al. | 340—172.5 |
| 3,411,143 | 11/1968 | Beausoleil et al. | 340—172.5 |
| 3,362,015 | 1/1968 | Mackie et al. | 340—172.5 |
| 3,341,818 | 9/1967 | Mackie et al. | 340—172.5 |

GARETH D. SHAW, Primary Examiner